United States Patent
Watkins

3,736,564
May 29, 1973

[54] ELECTRONICALLY GENERATED PERSPECTIVE IMAGES

[75] Inventor: Gary S. Watkins, Salt Lake City, Utah

[73] Assignee: University of Utah, Salt Lake City, Utah

[22] Filed: June 1, 1971

[21] Appl. No.: 148,801

[52] U.S. Cl.............340/172.5, 340/324 A, 235/151
[51] Int. Cl............................G06f 15/20, G06g 7/48
[58] Field of Search.......................340/172.5, 324 A; 235/151; 315/18, 22

[56] References Cited

UNITED STATES PATENTS

| | | | |
|---|---|---|---|
| 3,145,474 | 8/1964 | Taylor, Jr. | 340/172.5 X |
| 3,454,822 | 7/1969 | Harrison | 340/324 A |
| 3,418,459 | 12/1968 | Purdy et al. | 340/172.5 X |
| 3,519,997 | 7/1970 | Bernhart et al. | 340/172.5 |
| 3,523,289 | 8/1970 | Harrison | 340/324 A |
| 3,527,980 | 9/1970 | Robichaud et al. | 340/324 A |
| 3,539,860 | 11/1970 | Max et al. | 340/324 A |
| 3,602,702 | 8/1971 | Warnock | 340/172.5 X |
| 3,621,214 | 11/1971 | Romney et al. | 340/172.5 X |

*Primary Examiner*—Paul J. Henon
*Assistant Examiner*—Melvin B. Chapnick
*Attorney*—Lynn G. Foster

[57] ABSTRACT

A method and system for electronically generating and displaying shaded perspective images of three-dimensional objects on a two-dimensional view plane by providing electrical signals representative of the surfaces of an object and identifying and utilizing only the signals representing visible surfaces to display the perspective images. More specifically, electrical signals defining surfaces of a three-dimensional object are converted to define the projections of the surfaces onto a two-dimensional image or view plane defined by a raster scan display device. The converted signals defining surfaces which are to be displayed, depending on the desired orientation of the object, are determined by comparing the relative depths of segments of the surfaces along each scan line of the display and selectively subdividing the scan lines according to the visual characteristics of the segments when necessary. Signals defining the visible segments are then utilized to control the intensity of the display. The visibility determination and subsequent displaying of the visible surfaces are provided at a real time rate, i.e., at the scanning rate of the display which may be on the order of 1/30 second.

55 Claims, 133 Drawing Figures

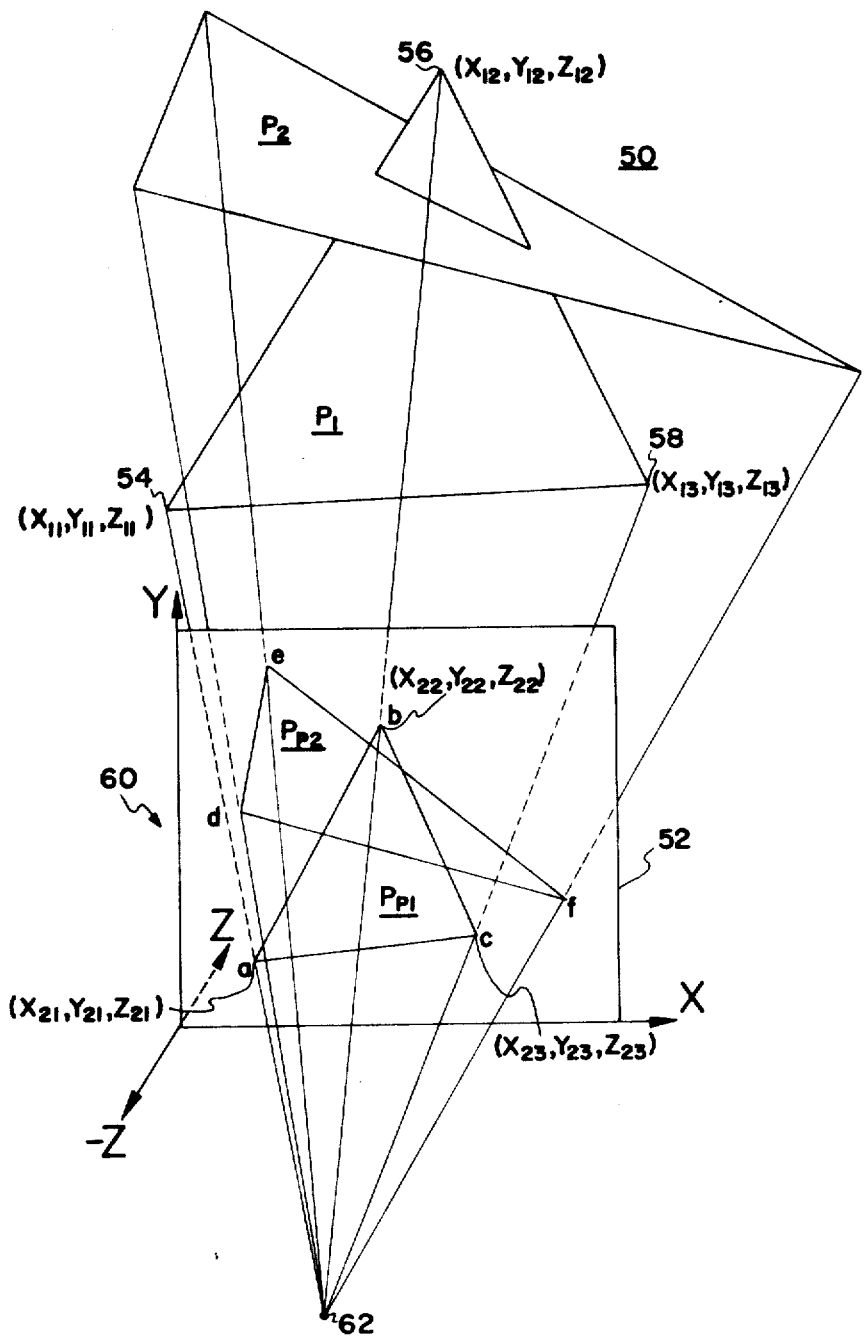
FIG. IA

INVENTOR.
GARY S. WATKINS

INVENTOR.
GARY S. WATKINS

BY
ATTORNEY

INVENTOR.
GARY S. WATKINS
BY
ATTORNEY

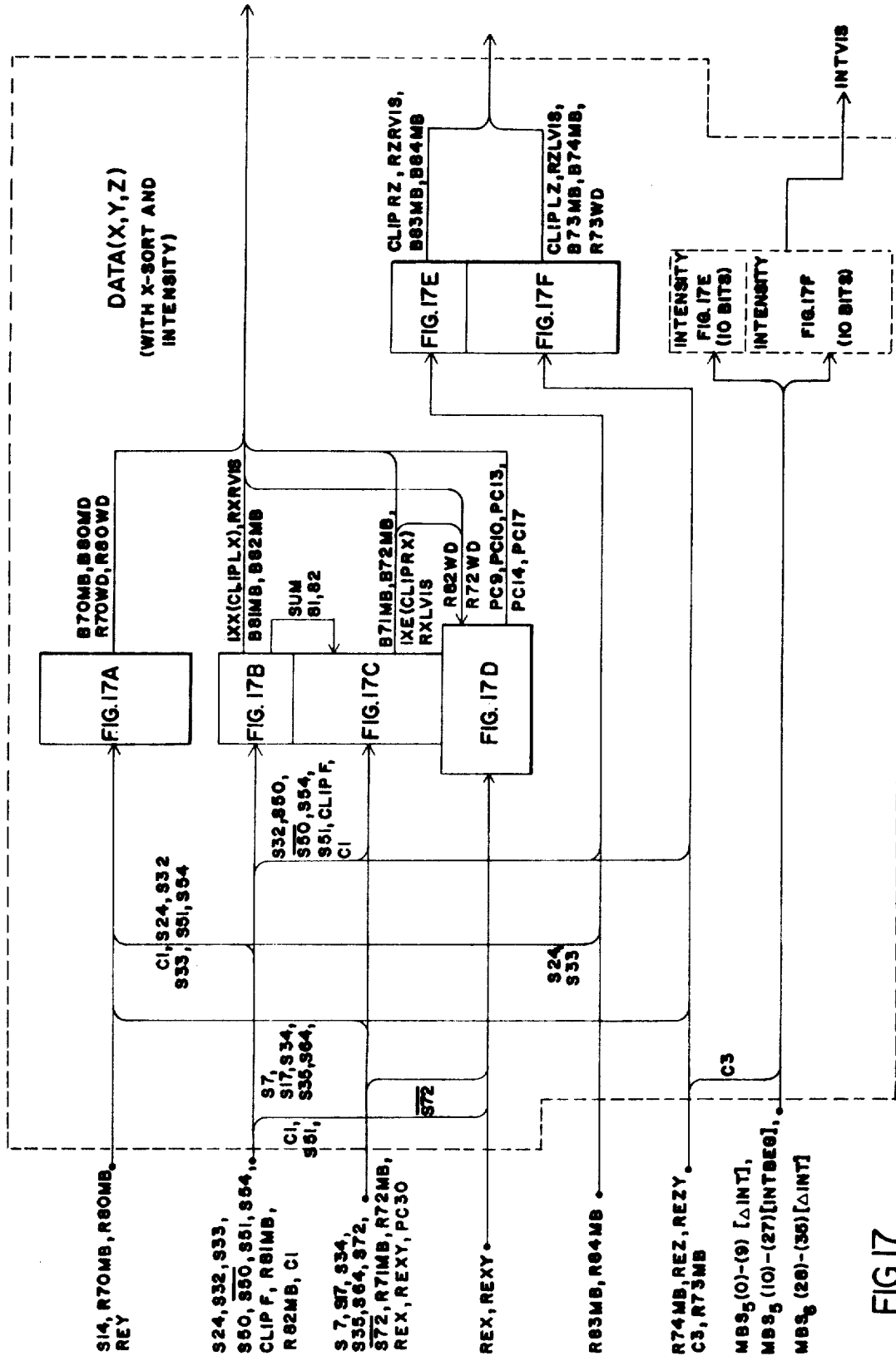

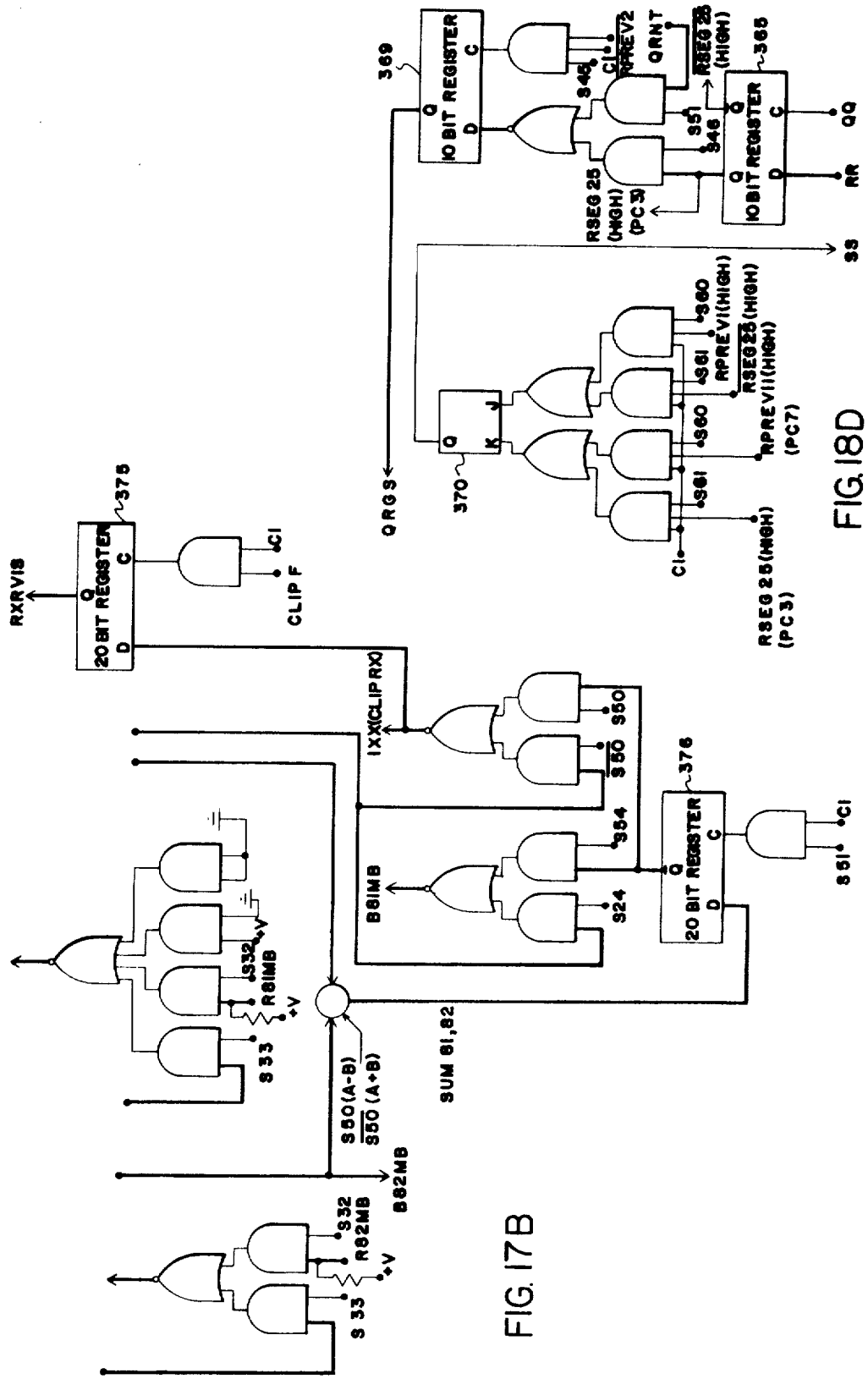

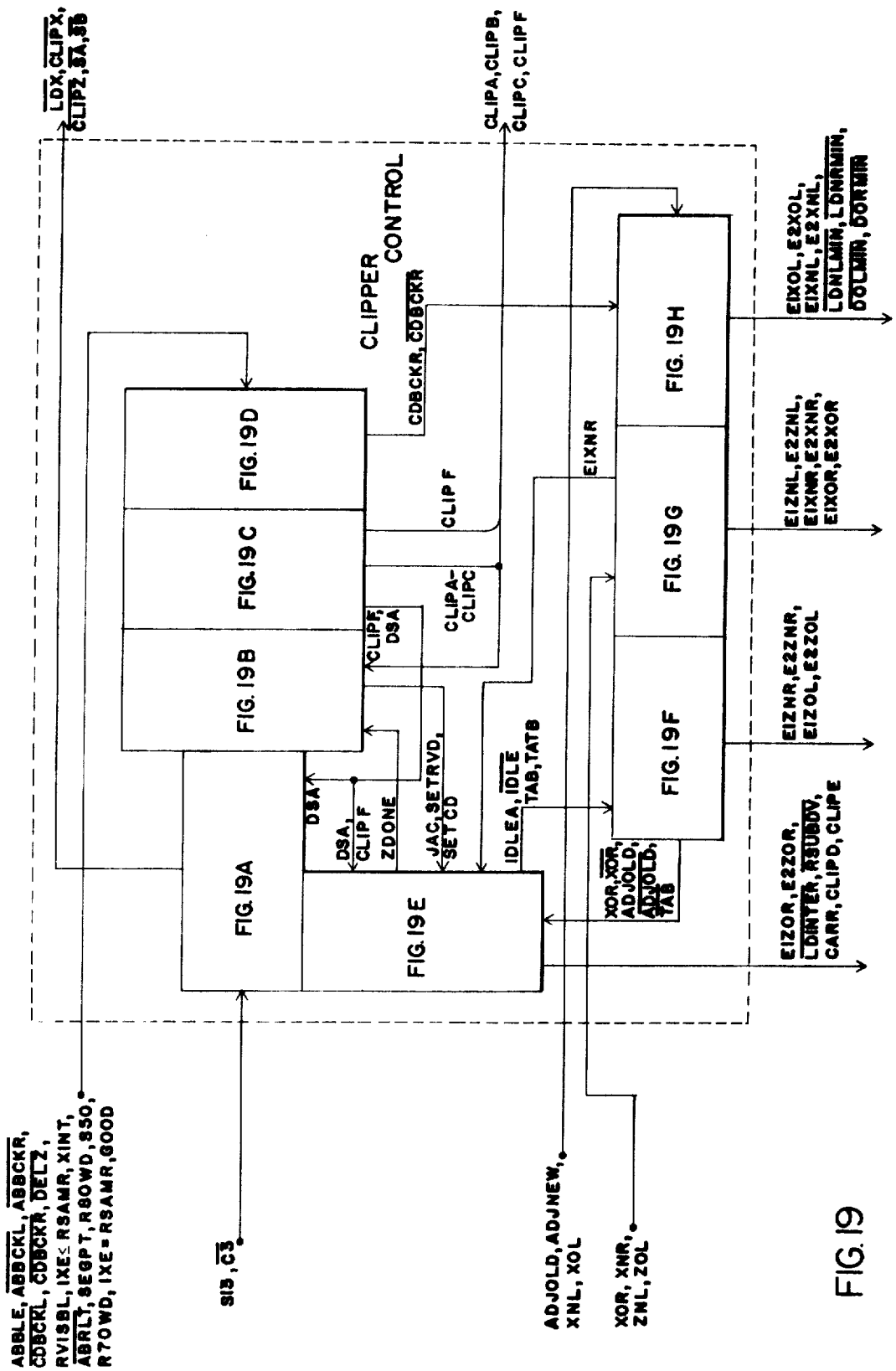

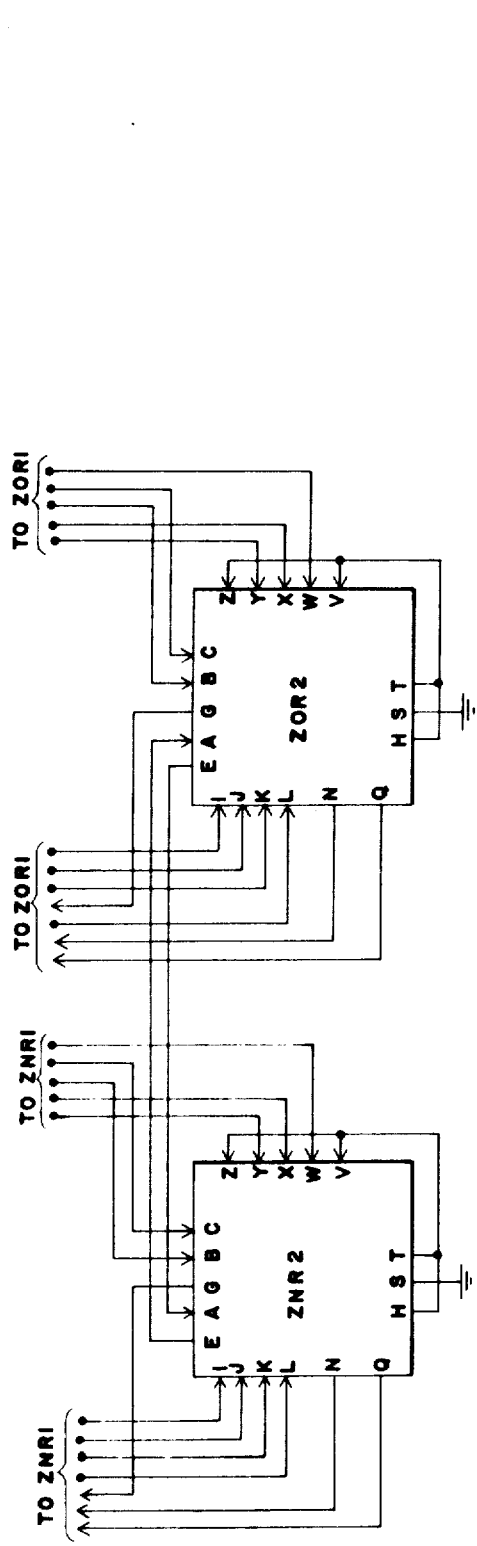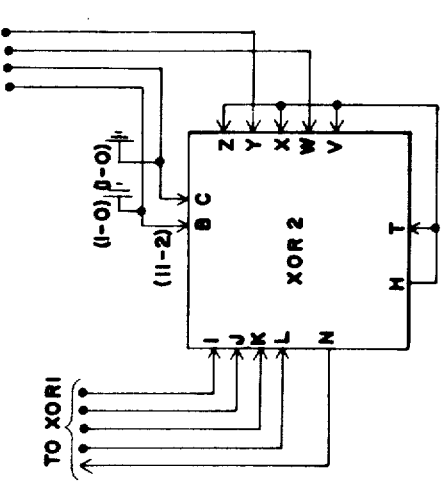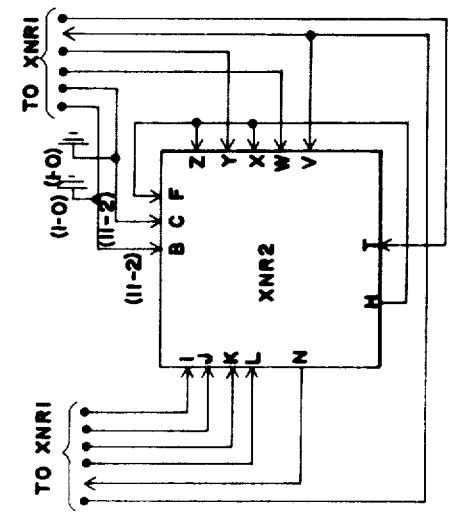
FIG. 20D
FIG. 20E

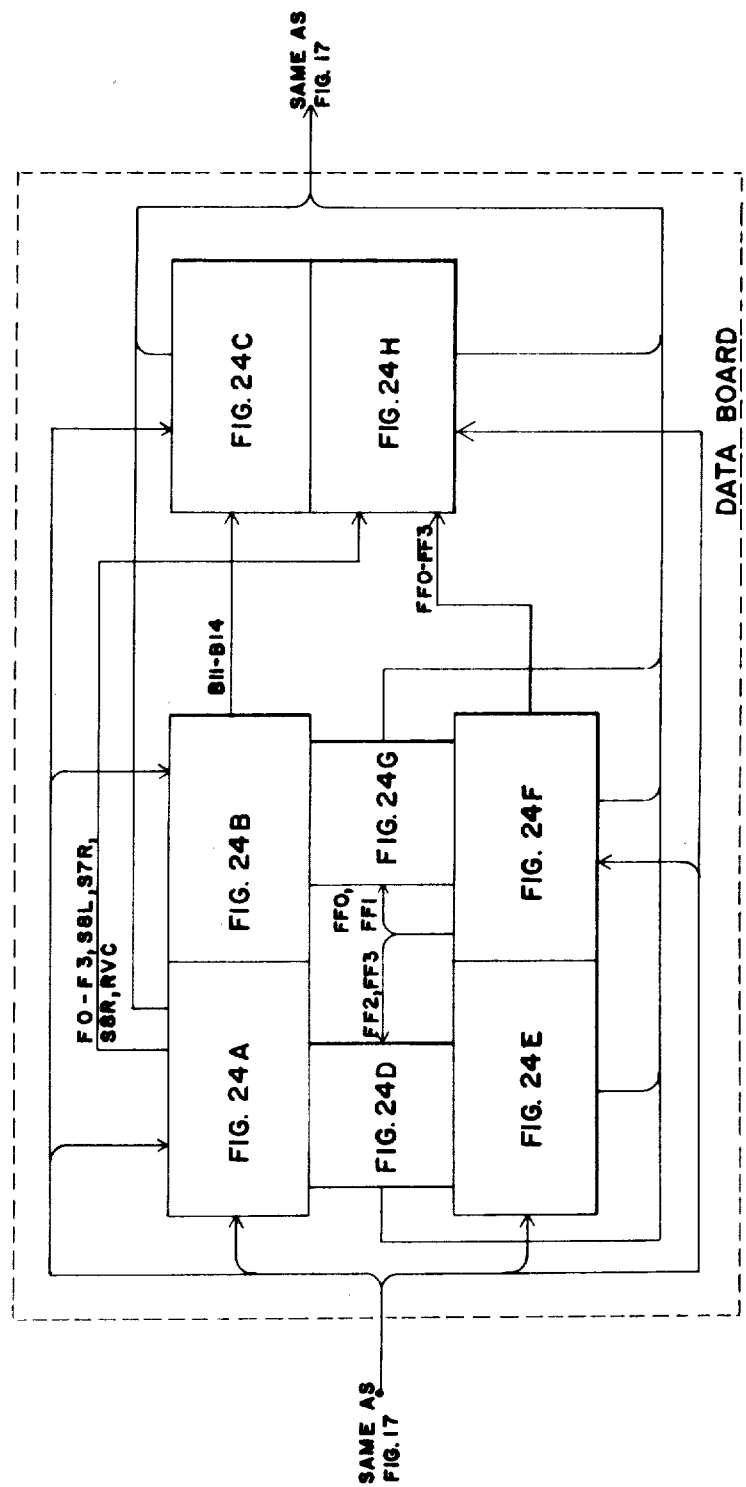

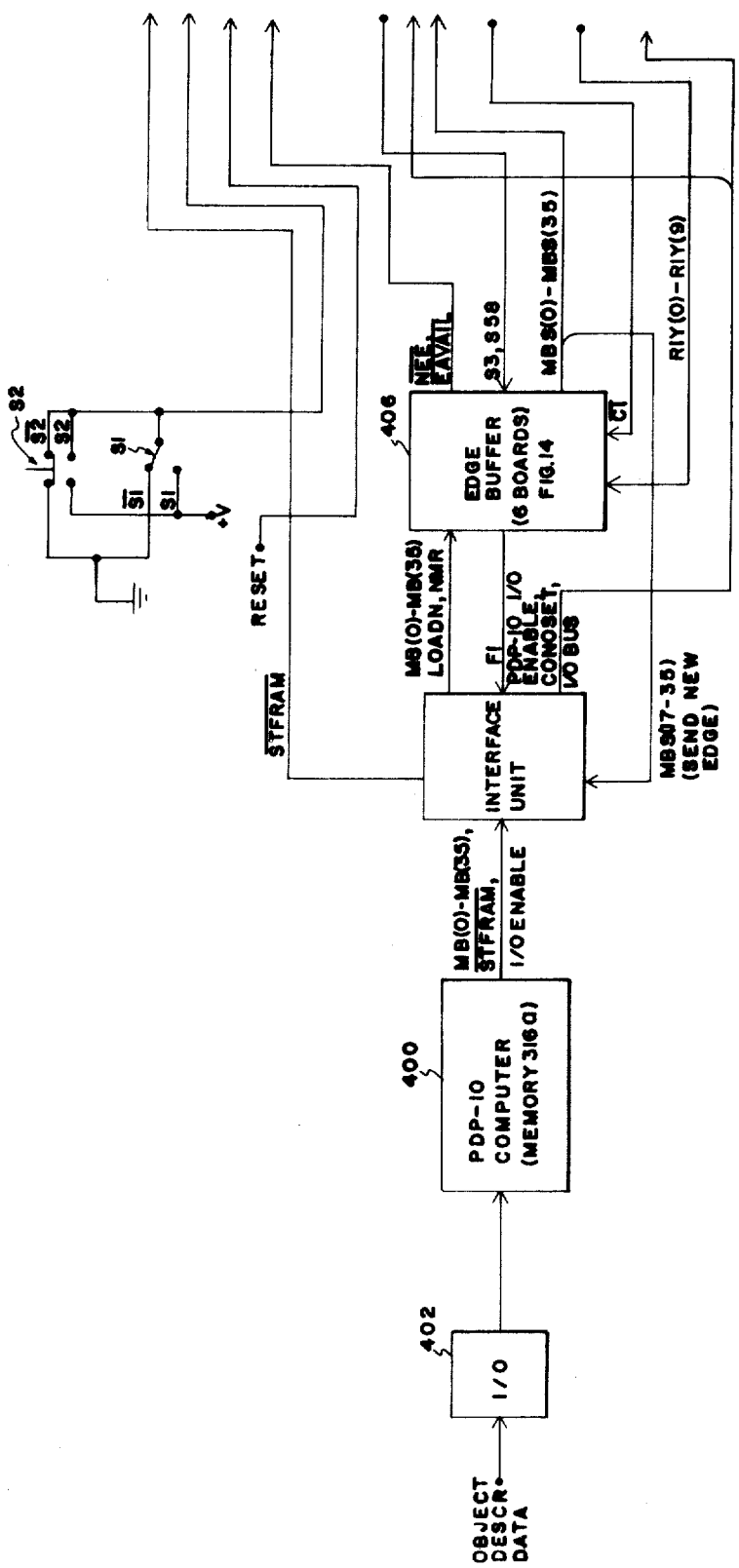
FIG. 27 (LEFT)

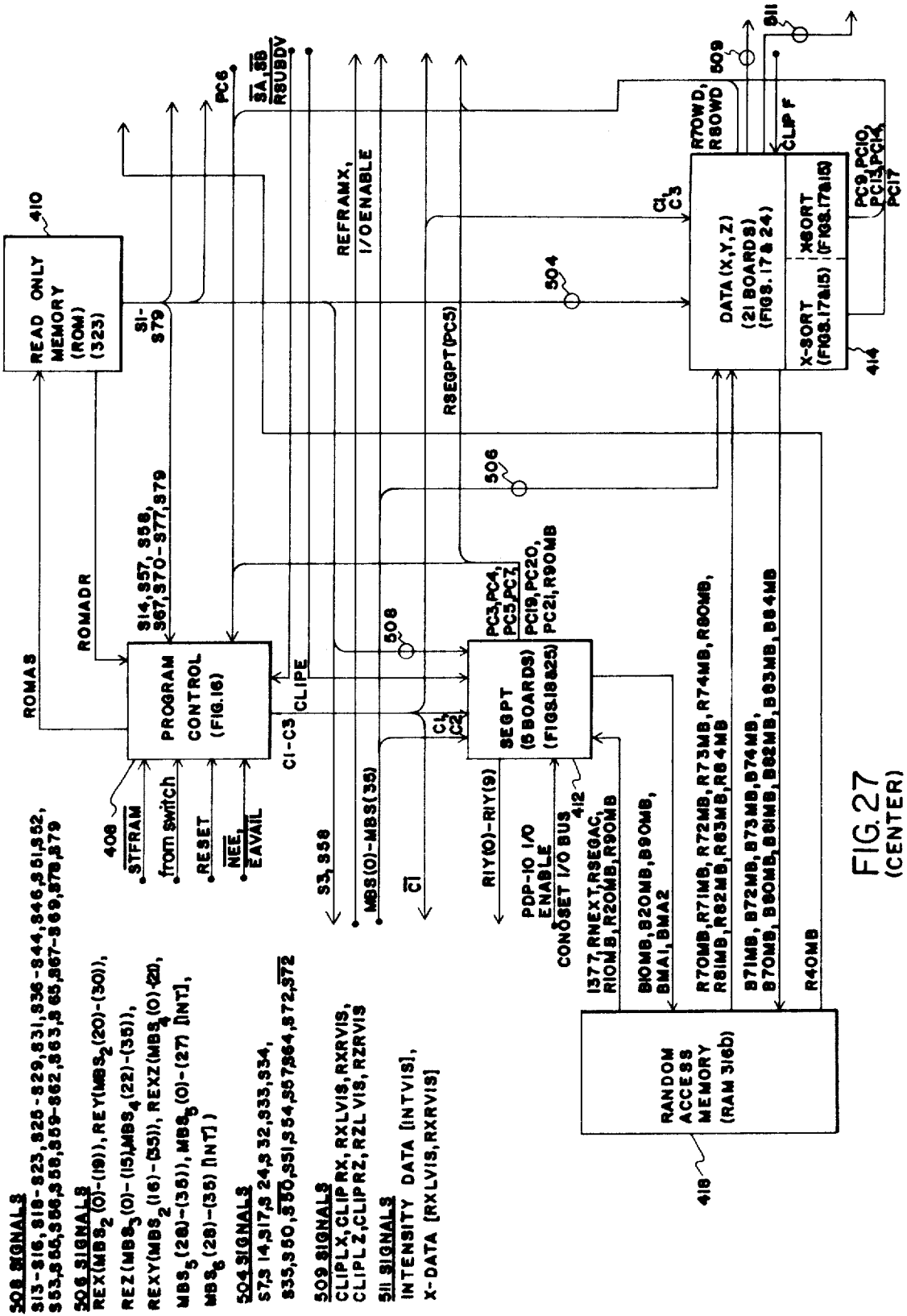

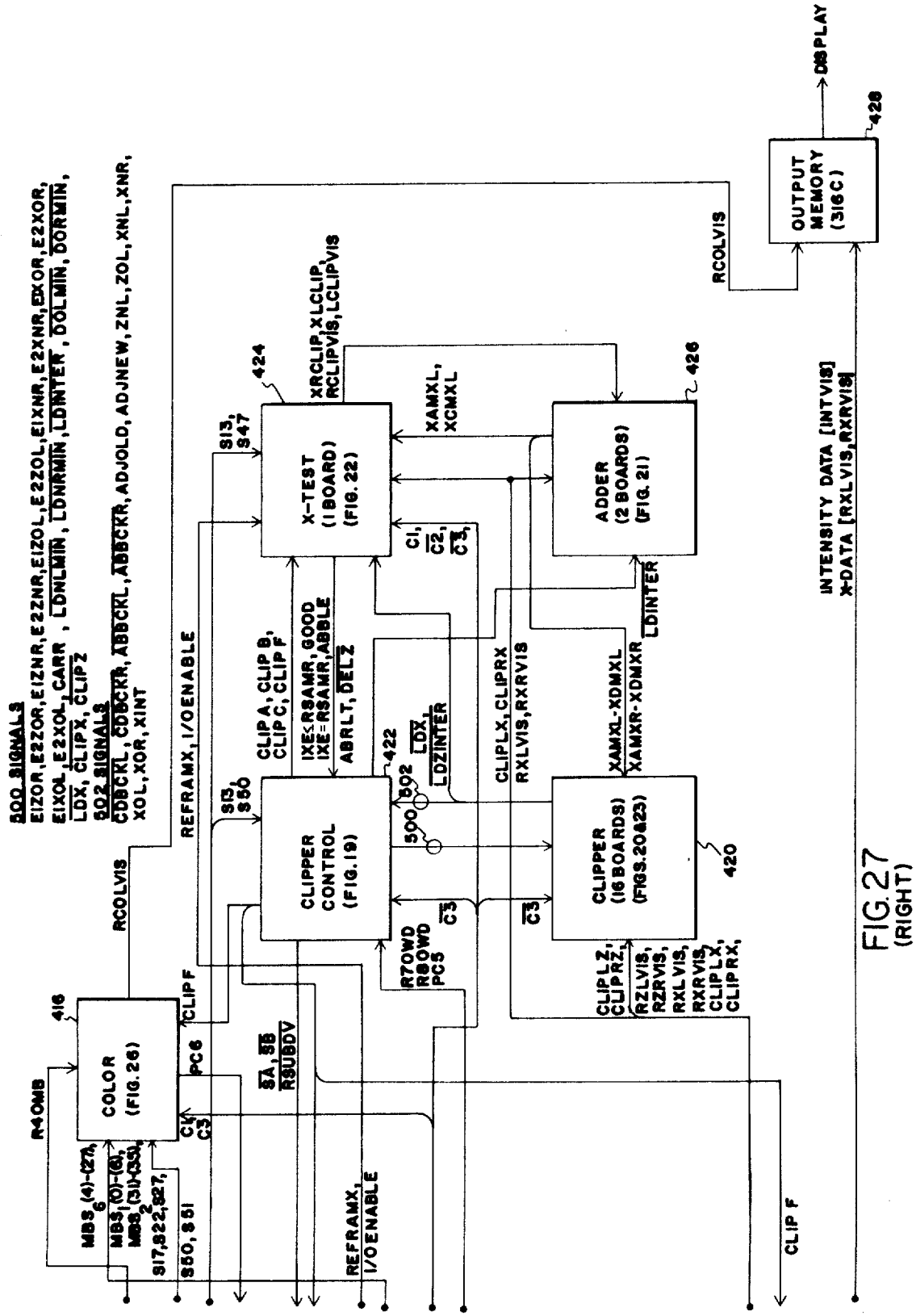
FIG. 27 (RIGHT)

ELECTRONICALLY GENERATED PERSPECTIVE IMAGES

The patentable subject matter was developed under a United States Government contract, and the assignor, University of Utah, does hereby grant and convey to the United State of America, an irrevocable, non-exclusive, and royalty free license to practice, and cause to be practiced for the Government throughout the world, in the manufacture, use, and disposition according to law, of any article or material, and in the use of any method embodying any and all inventions covered by the subject Letters Patent.

BACKGROUND OF THE INVENTION

The present invention relates to a method and system for generating perspective images of three-dimensional (3-D) objects and more specifically to an electronic system for generating shaded perspective images of 3-D objects on a two-dimensional (2-D) raster scan display in real time as, for example, at a rate of 30 frames per second. The system provides for the elimination of hidden lines of the objects and the shading of visible surfaces, through finite techniques which dramatically reduce the computation required to display a 3-D object, reduce the cost of the equipment utilized to generate the display and allow the required surface information to be interpolated from a relatively few surface locations where finite solutions are first obtained.

Perspective views of 3-D objects communicate to the viewer the actual physical arrangement and dimensionality of the object, including the relative positions and intersections of various surfaces of the object. Such views are generally employed in areas of design work such as architecture, machine design, product design and other phases of engineering design. This communication is enhanced greatly by eliminating hidden surfaces, shading the visible part of the perspective view to display the image of the object as it would be seen from a source of illumination and maintaining sharp resolution of any intersections between various parts of the object or objects.

HIdden surfaces consist of the portions of objects which are concealed from the sight of an observer by the parts of the object which are visible in a particular orientation of the objects. Ambiguities and illusions created by the inclusion of hidden surfaces in a perspective view tend to confuse the viewer. This confusion increases greatly with increasing object complexity, substantially eroding the usefulness of the perspective view.

The realism of the perspective images of 3-D objects is enhanced by shading which adds the appearance of depth to the 2-D representation. This appearance of depth greatly improves the ease with which the display can be comprehended by the technically trained as well as the unskilled observer. To further enhance the quality of perspective images of 3-D objects, sharp resolution of the intersections of surfaces of the objects must be maintained. The intersections of objects which, for example, pierce other objects, depict to the viewer the relative depth and positioning of the displayed objects, thus enhancing the understanding of such intersections and the quality of the display and adding to the viewer's comprehension of the display. Such perspective images or drawings are usually manually prepared by a skilled draftsman. As such, they require a large expenditure of time and the correctness of the view depends upon the skill of the draftsman. Moreover, as the complexity of the object increases, more drafting skill is required to prepare the view, and the expenditure of drafting time increases exponentially with the increase in object complexity.

Various attempts have been made to reduce the expenditure of time and the skill required to construct perspective views. Such attempts have included drafting machines which produce simple line drawing perspectives; relay calculators which project the three-dimensional object onto a two-dimensional coordinate system on a point-by-point basis; and various digital techniques which have utilized point-by-point production, constructing the object from basic geometric models and line-by-line construction of the object. These early attempts, however, have produced only simple line drawings, including hidden lines and did not include shading or sharp resolution of the visible intersections between objects.

Various attempts have been made to eliminate hidden lines. One such system which provides for the generation of perspective images in which hidden surfaces are eliminated and the displayed image is shaded is disclosed in U.S. Pat. No. 3,621,214, filed Nov. 13, 1968, by Romney et al. and assigned to the assignee of the present invention. The Romney et al. method and system generates perspective images by quantizing input digital data representing the objects into a plurality of surfaces which in one particular embodiment are planar triangular surfaces. These planar triangular surfaces are projected onto a view plane established according to the desired orientation of the object relative to a specified view point. The established view plane corresponds to the surface of the display device and therefore those surfaces which are determined to be visible appear on the screen of the display device as projected onto the view plane. With a raster scan display device, the determination of the visibility of the non-intersecting surfaces is accomplished by first sorting the projected surfaces according to the particular scan lines on which they appear, and then sorting the projected surfaces according to the order in which they appear along each scan line. Triangle depth comparisons are then made along each scan line at each point where the scan lines intersect the edges of the triangles. This depth comparison information at points of intersection between the scan line and the triangles indicates which of the triangles is visible at that point. By continuing across a scan line, and checking at each such point of intersection, the visible segments of the triangles along a scan line are determined. To generate a shaded perspective image on a display device, these visible segments and the intensity functions for the particular triangle represented by each segment are utilized to generate appropriate control signals which form a shaded perspective image on a display device. Intensity parameters for defining a linear shading function are calculated for each triangle and then utilized to determine both the initial intensity at the beginning of each horizontal scan line segment and the incremental change along the scan line until the next segment is encountered. Constant intensity functions may be provided by making the selected parameters equal to zero.

A related system also providing for the generation of shaded perspective images and the elimination of hidden lines is disclosed in U.S. Pat. No. 3,602,702, filed May 19, 1969, by John E. Warnock and assigned to the assignee of the present invention. The Warnock system utilizes a somewhat different approach from that of the Romney et al. system. In the Warnock system the object to be displayed is defined by surfaces which may conveniently be planar polygons which may intersect. The polygons are projected onto a view plane established according to a specified view point. The polygons which are visible according to the orientation of the object are determined by looking at progressively smaller subdivisions of the view plane or viewing screen upon which the image of the object theoretically appears.

Essentially, the Warnock system uses the approach of taking a difficult problem and dividing it into a plurality of simpler ones. If the projection of an object potentially has a large number of surfaces and it is difficult to determine which polygons are visible, then the viewing screen is subdivided and the projection in each subdivision is then considered separately. The spatial relationship between the projected polygons and the subdivisions is established and the polygons are classified with respect to the subdivision being checked as "enclosing", "involved", or "out" polygons. The depths of all of the "enclosing" and "involved" polygons, i.e., the polygons which either enclose or are at least partially within the subdivision, are then checked in that order relative to the boundaries of the subdivision to determine if only one of the polygons is visible within the subdivision. Where it is possible that more than one polygon may be visible within the subdivision, the subdivision is further subdivided and the resultant smaller subdivisions are checked for visible polygons. This subdividing continues either until the polygons within it are simple enough to determine which are visible or until the resolution limit of the display is reached.

In one embodiment of the Warnock system, the subdividing continues until either a single polygon completely occupies the subdivision being considered and is in front of all other polygons appearing within the subdivision, or until the resolution limit of the display device has been reached. Alternatively, the total number of subdivisions may be reduced by stopping the subdivision process when only two polygons or one polygon at the edge of the object occupy the subdivision being considered if only a single straight line boundary exists between the two visible areas within the subdivision. In both embodiments, this subdivision process produces data consisting of the location of the resultant subdivisions and the polygons determined to be visible therein. This concept of subdividing large problems into smaller (as easier) problems is referred to as a "non-deterministic" algorithm technique.

The system of the present invention provides for determining the visibility of the projected polygons by initially determining the spatial relationship between the projected polygons and subdivisions of the view plane as in the Warnock system. However, the subdivisions utilized in the present invention are spans along each scan line. The spans are selected in accordance with the edges of the view plane and previous visibility determinations. Only previously generated and ordered segments of the projected polygons existing along the scan line in question are used for determining the visibility of the projected polygons, and only the end points of the segments relative to the sample or end points of the selected span need be checked to locate segments existing within the selected span. Since the segments are all continuous lines, the relative depth of the segments may be checked by comparing the depths of the end coordinates thereof.

Where it appears that more than one segment may be visible within a selected span, the relative depths of the segments may be checked by a rapid and easily implemented line clipping technique, and further subdivision is necessary only if more than one segment is definitely visible within the selected span.

When it is necessary to subdivide a selected span, the span is subdivided in various meaningful ways according to the relationship between the segments and the selected span. The resultant subdivisions may or may not be equal in length.

Moreover, the present invention, operating on a scan line basis, can take advantage of the scan line-to-scan line coherence in ordering the various data utilized to determine visibility and in selecting this data while proceeding along each scan line.

It is an object of the present invention to provide a novel method and system for generating perspective images of three dimensional objects.

It is another object of the present invention to provide a novel method and system wherein perspective images of three dimensional objects are generated in substantially less time than in prior art systems.

It is still another object of the present invention to provide a novel method and system for generating perspective images of three dimensional objects wherein the surfaces of the three dimensional object visible from a predetermined position are determined and displayed on a raster scan display in real time.

It is yet another object of the present invention to provide a novel method and system for generating perspective images of three dimensional objects utilizing a non-deterministic technique on a scan line basis.

It is a further object of the present invention to provide a novel method and system for generating perspective images of a three dimensional object by non-deterministically locating visible segments of the projected surfaces of the object on a scan line basis.

It is still a further object of the present invention to provide a novel method and system for locating visible segments of surfaces of a three dimensional object projected on to a view plane subdividing the view plane according to the visual characteristics of segments of the surfaces existing within selected subdivisions of the view plane.

In brief, these and other objects and advantages are accomplished by the present invention wherein a novel and greatly improved method and apparatus are provided for determining which projected surfaces of a 3-D object are visible to an observer from a predetermined eye point and are therefore to be displayed to provide a two-dimensional perspective image of the object. Data representing the 3-D object is converted into data representing surfaces of the 3-D object as projected onto a predetermined view plane. The converted data representing the projected surfaces is then ordered according to the scanning pattern of the display for use in determining which of the projected surfaces are visible and are therefore to be displayed. The visibility of the projected surfaces is determined on a scan line-by-scan line basis from the converted and ordered projected surfaces by generating segment data defining continuous segments of the surfaces existing along a scan line and comparing the relative depths of these segments to determine which of the segments are visible. The segments determined to be visible are then listed in a scanning pattern ordered list for immediate display.

More specifically, sets of edge data defining the edges of the projected surfaces are generated from the converted and ordered data defining the projected surfaces. The segment data is then generated utilizing two adjacent sets of edge data defining the end points of each segment associated with a projected surface which appears along the scan line in question (the current scan line). A sample span comprising at least a portion of the current scan line is selected and the segments existing within the sample space are compared in depth to determine which segment is visible and should be displayed. If more than one visible segment exists within the sample span, the sample span is subdivided in accordance with a subdivision or intersection technique until only one visible segment exists within the subdivision of the sample span. This visible segment may then be listed for subsequent display. The remainder of the segments appearing along the current scan line may then be tested in this manner and all visible segments of the projected surfaces are thus located by applying this technique to all scan lines of the display.

As in the Romney et al. system referred to above, the visibility calculations are conducted in the present invention on a line-by-line basis. However, depth comparisons are not needed at each point of intersection between the scan lines and the projected surfaces to provide the desired visible segment data. Moreover, greater flexibility in describing the 3-D object is provided by the present invention.

In the Warnock system referred to above, a subdivision technique is utilized but not on a scan line basis. This subdivision technique of Warnock is concerned with spatial relationship between areas of the projected surfaces or polygons and selected subdivisions of the display rather than with the relative depths of segments of the surfaces existing between selected points along each scan line.

These and other differences between the present invention and the prior art result in the present invention providing a more rapid display of the object wherein the calculation time is dependent on the visual complexity of the object as opposed to the overall geometrical complexity thereof. Less data storage space and fewer calculations are required thereby further enhancing the system of the present invention.

THE DRAWINGS

FIG. 1A is an overview of the system function and shows to planes $P_1$ and $P_2$ which are part of a 3-D object whose image as observed from view point 62 is projected onto a view plane;

FIG. 14 is a block diagram of the EDGE BUFFER of the visible segment generator and illustrates the manner in which FIGS. 14A–14E are related;

FIGS. 14A–14E are schematic diagrams of the EDGE BUFFER of FIG. 14;

FIG. 15 is a block diagram of the X-SORT circuit and illustrates the manner in which

FIGS. 15A–15E are schematic diagrams of the X-SORT circuit of FIG. 15;

FIG. 16 is a block diagram of the PROGRAM CONTROL circuit and illustrates the manner in which

FIGS. 16A–16E are schematic diagrams of the PROGRAM CONTROL of FIG. 16;

FIG. 17 is a block diagram of the DATA (XYZ) circuit and illustrates the manner in which FIGS. 17A–17F are related;

FIGS. 17A–17F are schematic diagrams of the DATA (XYZ) circuit of FIG. 17;

FIG. 18 is a block diagram of the SEGPT circuit and illustrates the manner in which FIGS. 18A–18D are related;

FIGS. 18A–18D are schematic diagrams of the SEGPT circuit of FIG. 18;

FIG. 19 is a block diagram of the CLIPPER CONTROL circuit and illustrates the manner in which

FIGS. 19A–19H are schematic diagrams of the CLIPPER CONTROL circuit of FIG. 19;

FIG. 20 is a block diagram of the CLIPPER circuit and illustrates the manner in which FIGS. 20B–20E are related;

FIGS. 20B–20E are schematic diagrams of the CLIPPER circuit of FIG. 20;

FIG. 21 is a block diagram of the ADDER circuit and illustrates the manner in which

FIGS. 21A–21D are schematic diagrams of the ADDER circuit of FIG. 21;

FIG. 22 is a block diagram of the X-TEST circuit and illustrates the manner in which

FIGS. 22A–22J are schematic diagrams of the X-TEST circuit of FIG. 22;

FIG. 23 is a block diagram of the CLIPPER BOARD and illustrates the manner in which FIGS. 23A–23J are related;

FIGS. 23A–23J are schematic diagrams of the CLIPPER BOARD of FIG. 23;

FIG. 24 is a block diagram of the DATA BOARD and illustrates the manner in which

FIG. 25 is a block diagram of the SEGPT BOARD and illustrates the manner in which

FIGS. 25A–25H are schematic diagrams of the SEGPT BOARD of FIG. 25;

FIG. 26 is a block diagram of the COLOR circuit and illustrates the manner in which

FIGS. 26A–26F are schematic diagrams of the COLOR circuit of FIG. 26;

FIG. 27 is a functional block diagram of the visible segment generator of the present invention illustrating the manner in which FIGS. 14 through 26 are related and showing the connections of the visible segment generator to the memory 316 of FIG. 13.

GENERAL THEORY OF OPERATION

The input data representing the 3-D object is quantized into sets or blocks of electrical signals. Each set or block of electrical signals defines one of a plurality of surfaces which, taken together, make up the three-dimensional surface of the object in a chosen 3-D coordinate system. The surfaces represented by the sets of electrical signals may be convex or non-convex polygons of any number of sizes or edges which intersect in any manner.

The sets of electrical signals defining the surfaces are then converted into sets of electrical signals which define two-dimensional surfaces as would result if the three-dimensional object were projected onto a two-dimensional image or view plane. The converted sets of signals defining the projected two-dimensional surfaces thus represent the image of the object essentially as it would be seen by an observer in three space.

The conversion of the data defining the three-dimensional object into sets of signals defining two-dimensional surfaces as would result from projecting the three-dimensional surfaces of the object onto a two-dimensional image or view plane may be accomplished as in the aforementioned Romney et al. application Ser. No. 802,702, or the aforementioned Warnock application Ser. No. 825,904. The disclosures of the Romney et al. and Warnock applications are hereby incorporated herein by reference.

Figures 1B, 1C:
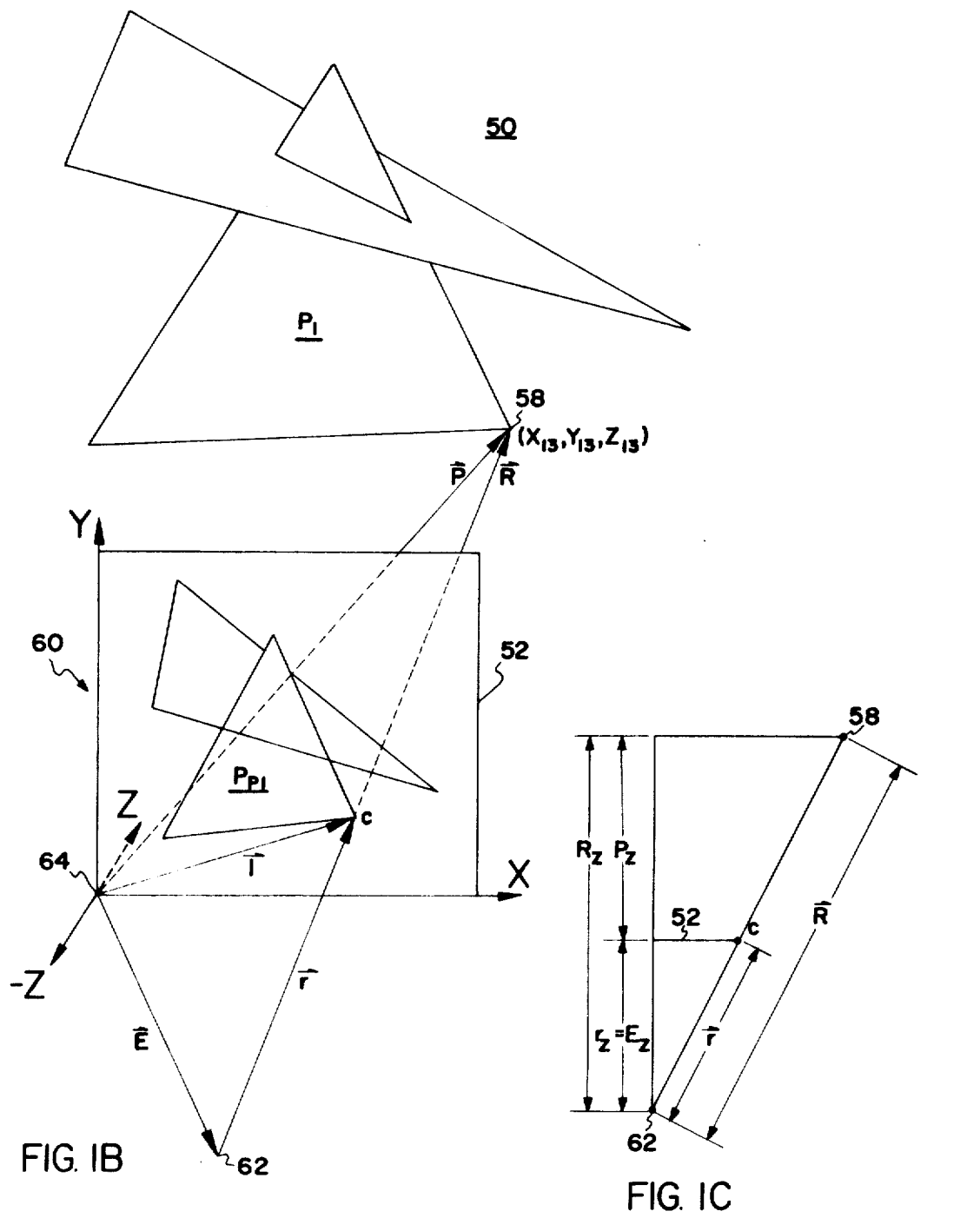
FIGS. 1B and 1C are graphical representations of the 3-D object of FIG. 1A projected onto a 2-D view plane illustrating a projection determining technique as is employed by the present invention.

To facilitate an understanding of the present invention, the Romney et al. method for projecting the object onto a two-dimensional view plane may be briefly described in connection with a graphical example of a three-dimensional object 50 projected onto a two-dimensional image or view plane 52 as shown in FIGS. 1A–1C. The term "three-dimensional object" or "3-D object" is utilized herein to describe any physical object or subject matter which does not have a single depth dimension measured along the line of sight of an observer. Thus, a single plane oriented at an angle to the line of sight would be a 3-D object as would two at least partially superimposed planes which are oriented normal to the line of sight. Moreover, it should be understood that this projection procedure shown graphically in FIGS. 1A–1C, as well as other procedures described in connection with subsequent tangible geometrical examples, is illustrative of that which is caused to be performed electronically.

To simplify the theoretical explanation, the object 50 of FIGS. 1A and 1B is described in terms of closed polygons with only those polygons facing the observer being included in the object description data. Thus, the data describing the exemplary object 50 defines two planar polygons $P_1$ and $P_2$ which intersect as illustrated. For example, the object description data defining the polygon $P_1$ may be, or at least include, the X, Y and Z coordinates of the points 54, 56 and 58, relative to a three space coordinate system 60.

The perspective image of object 50 projected onto the view plane 52 comprises two polygons $P_{P1}$ and $P_{P2}$ defined by points $a, b, c,$ and $d, e, f$, respectively. The coordinate system 60 has three orthogonal axes designated X, y and Z and defines the observer's coordinates system. The view plane 52 is constrained to lie in the $Z = 0$ plane parallel to the X and Y axes. For purposes of description, the projected image is shown on the view plane 52 with all lines visible, including those lines which would ordinarily be hidden from the observers view.

With reference now also to FIG. 1B, the observer's coordinate system 60 is determined relative to the observer, whose viewing position or eye point 62 is specified by the vector $\vec{E}$. The point 58 on the object 50 is at point $(X_{13}, Y_{13}, Z_{13})$ in the coordinate system 60 and is specified relative to the origin 64 of the observer's coordinate system 60 by the vector $\vec{P}$. The point 58 is also specified relative to eye point 62 by the vector $\vec{R}$.

Every point of the image corresponds to the projection of at least one point of the object 50 onto the view plane 52. For example, point c of the projected image corresponds to the projection of the point 58 of the object 50 onto the view plane 52. Point c of the image is specified relative to the origin 64 by the vector $\vec{I}$, and relative to the eye point 62 by the vector $\vec{r}$.

The vector $\vec{I}$ may be defined in terms of vectors $\vec{E}$ and $\vec{r}$ in vectorial addition by the equation:

$$\vec{I} = \vec{E} + \vec{r} \tag{1}$$

Since the vectors $\vec{r}$ and $\vec{R}$ lie along the same line, the vector $\vec{r}$ is proportional to vector $\vec{R}$ and may be expressed by the following equation:

$$\vec{r} = w \cdot \vec{R} \quad (2)$$

where $w$ is a scalar constant.

Moreover, the vector $\vec{R}$ may be defined in terms of vectors $\vec{P}$ and $\vec{E}$ in vectorial subtraction by the equation:

$$\vec{R} = \vec{P} - \vec{E} \quad (3)$$

Substituting equations (2) and (3) into equation (1), the following result is obtained:

$$\vec{I} = \vec{E} + (\vec{P} - \vec{E}) \cdot w \quad (4)$$

Referring to FIG. 1C, wherein the positions of the points $c$ and 58 are described with respect to the Y and Z axes only, it can be seen that by the similarity of triangles shown in FIG. 1C, $$w = \vec{r}/\vec{R} = r_z/R_z = -E_z/(P_z - E_z) \quad (5)$$

where $r_z$, $R_z$, $E_z$ and $P_z$ are the components of the corresponding vectors along the $z$ axis.

The minus signs are necessary since $E_z$ will be a negative value.

Substituting equation (5) into equation (4), the following equation is obtained:

$$\vec{I} = \vec{E} - (\vec{P} - \vec{E})(E_z/P_z - E_z) \quad (6)$$

Thus, the image vector $\vec{I}$ which specifies the projection of a particular point of the object only the view plane may be stated solely in terms of known values.

The X and Y coordinates of the particular point projected onto the view plane 52 may then be determined by calculating the X and Y components of the image vector $\vec{I}$ specifying the particular point. For example, in FIG. 1A, the X coordinate of point $c$, i.e., $X_{23}$, may be determined by the following equation:

$$I_X = X_{23} = E_X - (P_X - E_X)(E_z/P_z - E_z) \quad (7)$$

where $E_X$, $P_X$, $E_z$ and $P_z$ are the X and Z components of the designated vectors at point $c$.

The Y coordinate $Y_{23}$ of the point $c$ may be determined by calculating the Y component of the image vector $\vec{I}$ utilizing the following equation:

$$I_Y = Y_{23} = E_Y - (P_Y - E_Y)(E_z/P_z - E_z) \quad (8)$$

where $E_Y$, $P_Y$, $E_z$ and $P_z$ are the X and Z components of the designated vectors at point $c$.

In this manner, points describing quantized surfaces representing the object may, for the sake of theoretical explanation, be said to be projected onto the view plane, thereby defining all such points in a two-dimensional coordinate system. Each of the points $a$, $b$ and $c$ associated with the projected polygon $P_{P1}$ may be determined in terms of X and Y in the view plane 52 in accordance with equations (7) and (8). In addition, the Z value associated with each projected point may be determined by calculating the Z component of the vector $\vec{R}$, i.e., by calculating the value of $R_z$.

Next, the visibility of the projected polygons $P_{P1}$ and $P_{P2}$ representing the three-dimensional object 50 on the view plane 52 must be determined. This could be done by direct mathematical means to provide an infinite resolution solution. However, the present invention preferably utilizes a raster scan display device such as a cathode ray tube, and thus, since visibility need only be determined along each finite scan line, the infinite resolution obtainable by the aforementioned mathematical means is not necessary.

This type of raster scan display utilizes a plurality of horizontal scan lines, for example, 512 horizontal scan lines which are scanned in increasing X and Y directions to cover the display screen. Each scan line may be identified by its Y value along the Y axis of the two-dimensional coordinate system and the position of information along each scan line may be identified by its X value along the X axis of the coordinate system. One scan line may be considered as being defined in X by 512 points (i.e., X = 0 to X = 512) thereby defining a 512 by 512 point display grid.

Any point on the display screen may therefore be defined by an X value ranging from zero to 512 and a Y value ranging from zero to 512. All data applied to the system is preferably digital in form or is converted to a digital form, thereby permitting all calculations to be accomplished utilizing digital techniques. The entire range of X and Y values must be capable of being defined digitally, preferably in a binary form. To accomplish this, each X and Y value may be defined by a byte of digital information comprising nine bits, i.e., nine binary signals. The nine bits provide the necessary 512 point resolution in X and Y.

Since scanning along the X axis proceeds from Y = 0 for the first scan line to some maximum Y value for the last scan line, the converted data relating to the projected surfaces or projected polygons defining the object as projected onto the view plane 52 is stored in an ordered list in accordance with the Y values.

The term "ordered list" as used throughout the description may, for example, refer to a listing of data in a previously designated section of memory in accordance with increasing X and/or Y values of the data. Each block of data in the list is represented by various combinations of electrical or magnetic characteristics (depending on the type of memory employed) and is given a label or address which designates the position of the block in the list or at least indicates the relative position of the block in the list.

For example, after all translations, rotations and perspective transformations have been applied to the object description data, an ordered list of the information relating to the projected polygons, from which further lists may be generated, may be desired. A first block of projected polygon information, e.g. the X, Y, Z values of all points needed to describe the boundaries of each polygon and the shading and color information associated with each polygon, may be placed into the memory section designated for this information as the first block of data. A second block of projected polygon information is compared with the first block and is placed into the list either before the first block (if the second block appears before the first in the scanning pattern)

or after the first block (if the second block appears later than the first block in the scanning pattern).

All polygon or other information may be placed into an ordered list in this manner in the separately designated section of memory or may be ordered in any other suitable conventional manner. For example, instead of actually rearranging the polygon information itself to conform to the desired order, the addresses designating the locations of the various polygon information may be ordered. Alternatively, pointers may be provided as part of each block of polygon information to indicate the memory locations of other blocks of information appearing before and/or after the immediate block of polygon information.

Data storage space is set aside so that sets of electrical signals called polygon blocks containing information relating to each of the projected polygons may be stored in a Y value or scanning pattern ordered list. Each polygon block contains the following information:

Polygon Block

Pointer to initial segment on polygon
Pointer to next changing polygon
Polygon active bit
Shading and coloring information The "pointers" referred to in the above and subsequent sets or blocks of electrical signals are signals in the memory which indicate the location of each block of signals relative to other blocks of signals when listed in ordered lists. For example, a pointer in a polygon block may indicate the memory address of the next polygon in the list of polygon blocks to facilitate sorting during the generation of visible segments hereinafter described. The polygon active bit is a signal, e.g. a binary ONE signal, which indicates that a particular polygon block contains information which is needed for a current calculation.

The projected polygon information is also utilized to determine edge data for each of the edges defining the polygons. For example, in FIG. 1A, edge data would be calculated for the edges ab, ac, and bc of the projected polygon $P_{P1}$. Likewise, edge data would be calculated for the edges de, df, and ef of the projected polygon $P_{P2}$. Of course, horizontal edges need not be put in the list of edge data since, theoretically, there are no intersections between the scan lines and the horizontal edges. The edge data is stored in memory as edge blocks containing the following information:

Edge Block

Pointer to the next edge block
Pointer to polygon block
Y — maximum
Y — minimum
X — begin (associated with Y—minimum)
$\Delta X$
Z — begin (associated with Y—minimum)
$\Delta Z$ The information stored as edge blocks may be calculated from the projected polygon data in the following manner. For a particular polygon, for example, the polygon $P_{P1}$ of FIG. 1A, projected points $a$, $b$ and $c$ are known after all translations, rotations and perspective transformations have been applied to the data representing the three-dimensional object. In the scanning pattern of the raster scan display, point a defined by $(X_{21}, Y_{21}, Z_{21})$ is encountered first. The Y value of point a is inserted into an edge block as the Y-minimum of that block and the X and Z values of that point are inserted into that edge block as the X-begin and Z-begin values, respectively. The Y value of point $c$ on the projected polygon $P_{P1}$ is inserted as the Y-maximum of that edge block defining edge a.c. and the X, Y and Z values of points a and $c$ are then utilized to determine the increments $\Delta X$ and $\Delta Z$. For example, $\Delta X$ and $\Delta Z$ may be determined by solving the equations:

$$\Delta X = (X_{23} - X_{21})/(Y_{23} - Y_{21})\Delta Y; \tag{9}$$

$$\Delta X = (Z_{23} - Z_{21})/(Y_{23} - Y_{21})\Delta Y; \tag{10}$$

where the value of $Y_{21}$ is less than the value of $Y_{23}$ (i.e., $Y_{21}$ appears first in the scanning pattern), where like subscripts designate the coordinates associated with like points, and where $\Delta Y$ is the incremental value of Y between adjacent scan lines.

The edge blocks are ordered in memory in accordance with increasing values of Y-minimum. The ordered polygon and edge blocks may be utilized to electronically calculate the various surface parameters as will hereinafter be described in greater detail. This ordering facilitates these calculations since a rapid determination of when an edge of a polygon enters or exits on a current scan line may be made without referring to all the sets or blocks of electrical signals for each new scan line.

The electronically calculated parameters include a determination of which of the projected surfaces would be visible to the observer. The determination of which surfaces are visible to the observer is obtained through the use of a visible segment generator. The visible segment generator determines which of the projected surfaces or polygons are visible on a scan line basis and generates signals representative of visible segments of the polygons along each scan line.

Figure 2:
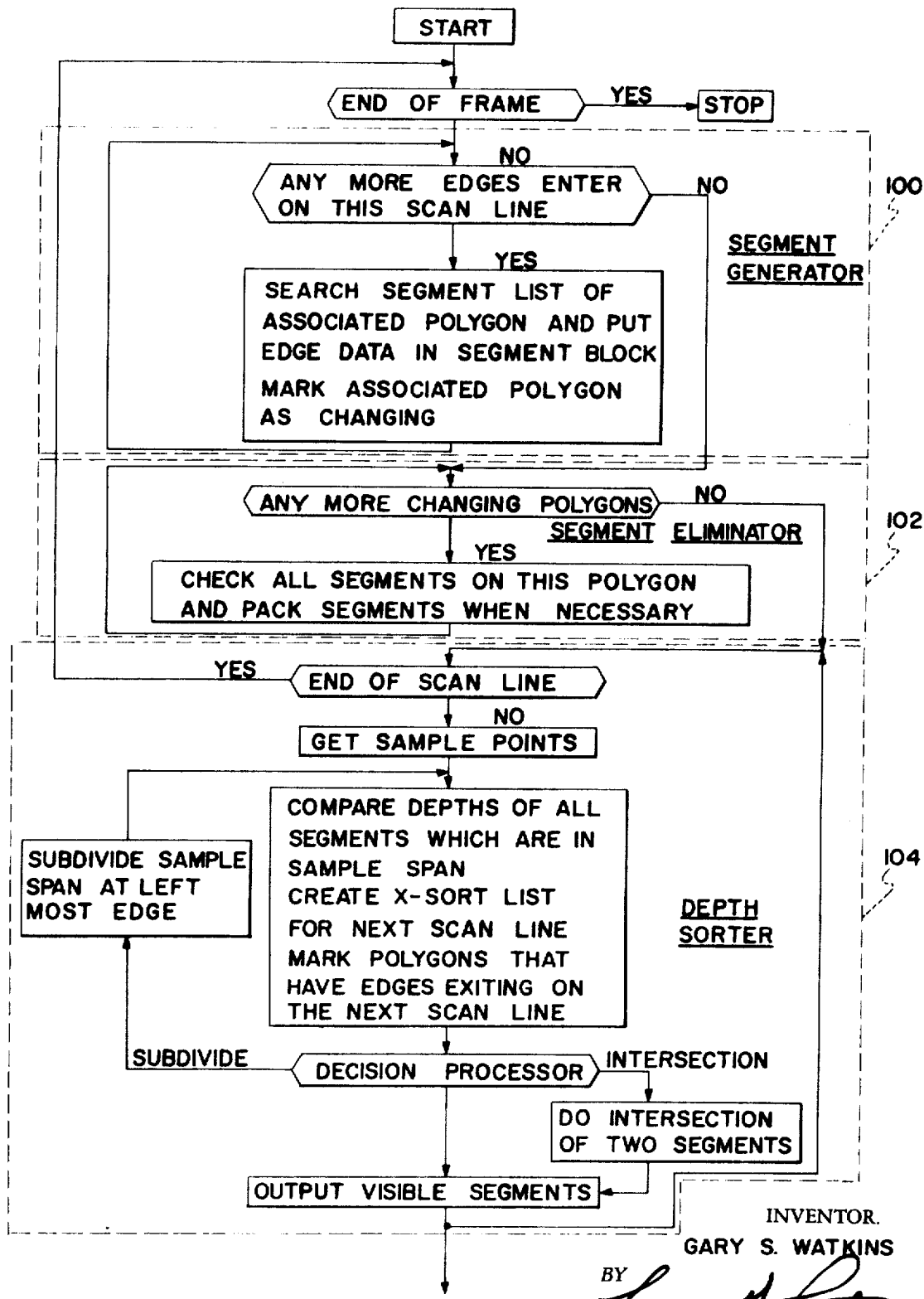
FIG. 2 is a flow diagram of the visible segment generator of the present invention.

Briefly, this is accomplished by the visible segment generator in accordance with the flow diagram of FIG. 2. The various operations of the visible segment generator are divided into a segment generator section 100, a segment eliminator section 102 and a depth sorter section 104 to facilitate the description thereof. The operations performed by the respective sections broadly comprise: 1) generating and ordering sets of electrical signals referred to as segment blocks which represent continuous surfaces of polygons existing between two adjacent edges of a polygon along a scan line; 2) eliminating any of the segment blocks not required for the later computations; 3) sorting the segments along a given scan line according to depth to determine which of the segments along a scan line are visible.

When all visible segments have been located and listed, the visible segment information, together with the shading and color information, is utilized to provide intensity and color parameters for each visible segment. The visible projected surfaces may then be displayed on a suitable display device.

To facilitate an understanding of the theory of operation of the visible segment generator, a number of examples of ways in which segments are generated and visibility is determined will now be discussed in connection with FIGS. 3 through 9.

Figure 3A:
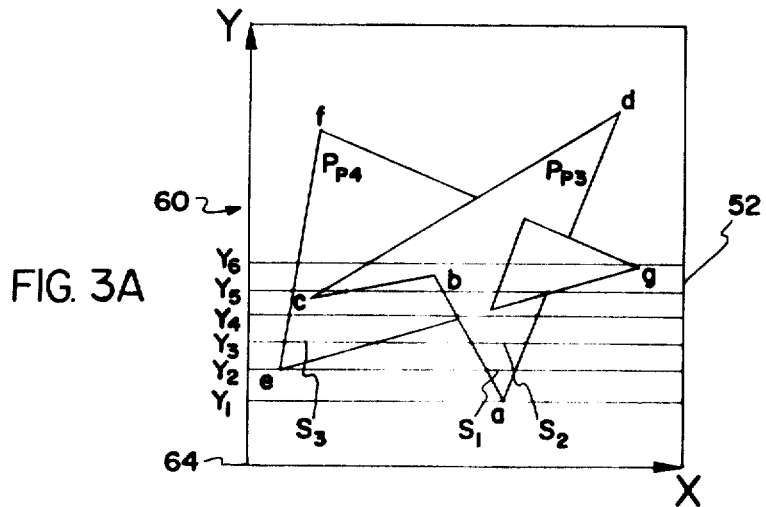
FIG. 3A is an X-Y plot of a 3-D object projected onto a 2-D view plane showing illustrative horizontal scan lines of a raster scan display superimposed onto the view plane.
Figure 3B:
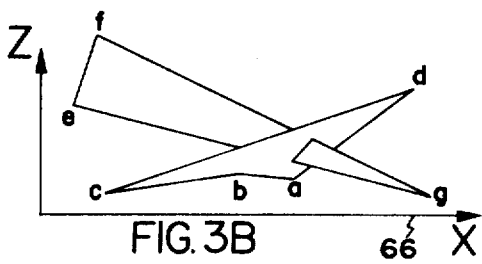
FIG. 3B is an X-Z plot of the object and view plane of FIG. 3A showing the relative depths of the projected surfaces.

Referring now to FIG. 3A, two polygons $P_{P3}$ and $P_{P4}$ represent a three-dimensional object projected onto the observer's two-dimensional view plane 52. The depth or Z values associated with each point on the polygon $P_{P3}$ and $P_{P4}$ are graphically illustrated in FIG. 3B wherein the X axis 66 represents the viewing plane in cross section as viewed from Y-maximum toward the origin 64.

The polygon $P_{P3}$ includes edges ab, bc, cd and ad and the polygon $P_{P4}$ includes edges of ef, fg and eg. Edge and polygon information has been stored in ordered lists as was previously described in the form of polygon and edge blocks. A number of illustrative scan lines $Y_1 - Y_6$ have been chosen to facilitate a description of the segment generation, segment elimination and depth sorting of the visible segment generator. For the purpose of this description, it is assumed that scanning proceeds in equal increments from the origin 64 of the observer's coordinate system 60 to some Y-maximum at the top of the view plane 52, and that the scan line $Y_1 - Y_6$ comprise six consecutive scan lines in the scanning pattern. The depth or Z values of the segments of the polygons $P_{P3}$ and $P_{P4}$ along the scan lines $Y_1 - Y_6$ are graphically illustrated in FIGS. 3C–3H, respectively to facilitate the description.

Scan line $Y_1$ intersects the point a on the polygon $P_{P3}$ and a segment block is set up to store the right and left edges of the segment between edges ab and ad. Each segment block is created from the ordered edge and polygon block information and contains the following data:

SEGMENT BLOCK

POINTER TO PREVIOUS SEGMENT IN X-SORT LIST
POINTER TO NEXT SEGMENT IN X-SORT LIST
POINTER TO NEXT SEGMENT IN POLYGON LIST
POINTER TO POLYGON BLOCK
POINTER TO NEXT SEGMENT IN ACTIVE LIST

Y — END

X

ΔX

Z
                        LEFT EDGE

ΔZ

POINTER TO NEXT SAMPLE EDGE

Y — END

X

ΔX

Z
                        RIGHT EDGE

ΔZ

POINTER TO NEXT SAMPLE EDGE

The polygon block associated with the polygon $P_{P3}$ is tagged as active by setting the polygon active bit and is placed into a list of changing polygons, i.e., polygons having segments entering or exiting on the current scan line. The edge block list is checked to determine if any further edges enter on the scan line $Y_1$ and segments are created as described above for any other edges entering on the current scan line.

The segments entering along the current scan line $Y_1$ are sorted with respect to the left edge of each segment and are placed in an X-sort list having both forward and backward pointers. All segments belonging to a particular polygon on a scan line (the polygon $P_{P3}$ in the example) are ordered with respect to the leftmost segment of the polygon and are listed in a polygon segments list in this order. The segments associated with a particular polygon on a scan line are linked together with the pointer to the initial segment on the polygon (container in the polygon block) pointing to the leftmost segment of the polygon.

An active segment list containing segments from the X-sort list which exist within a specified range of X values and a sample list containing the sorted edges of the segments (each half of a segment block is an edge) which where visible on the previous scan line are also created. The active segment list and the sample list are subsequently described in greater detail.

After all segments appearing on the current scan line $Y_1$ have been generated and listed as described above, control is passed to the segment eliminator. The segment eliminator runs through the list of all changing polygons, i.e., polygons that have edges entering or exiting on the current scan line and which therefore appear in the list of changing polygons. For each of the changing polygons, the segment eliminator disconnects the polygon from the changing polygon list and resets the active bit. The segment eliminator then proceeds through the list of segments attached to that polygon to determine if any data needs to be shifted from one segment block to another and if any segment blocks can thereby be returned to free storage. This occurs, for example, when two segments associated with a particular polygon merge into one as occurs when the scanning pattern advances from scan line $Y_5$ to scan line $Y_6$ as shown in FIG. 3A.

Figure 4A:
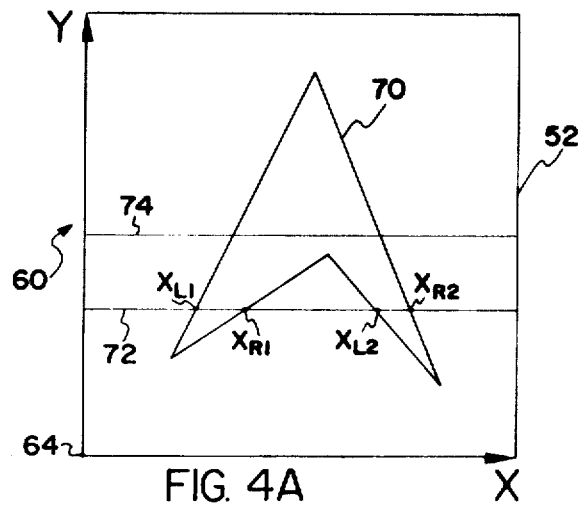
FIG. 4A is an X-Y plot of a concave polygon defining at least a portion of a 3-D object projected onto a 2-D view plane with two exemplary scan lines illustrated.
Figure 4B:
FIGS. 4B – 4D are flow diagrams illustrating the packing of segment blocks as scanning proceeds from one scan line to the next scan line in FIG. 4A.

This elimination of segment blocks where two segments on a polygon merge into one may be more fully understood with reference to FIGS. 4A–4D. In FIG. 4A, a polygon 70 is shown projected onto the view plane 52. For the purpose of description, it is assumed hereinafter that scanning proceeds across the view plane in the increasing X direction and from the origin 64 of the observer's coordinate system 60 in the increasing Y direction, i.e., from left to right and from bottom to top. The actual raster scan device utilized for display may sweep or scan in a different pattern, e.g. from left to right and from top to bottom. One need only change the position of the origin 64 and the positive Y direction, for example, to make this theoretical discussion conform to this different scanning pattern.

To facilitate the description, assume that the two exemplary scan lines 72 and 74 are consecutive lines in the raster scan. Two segments of the polygon 70 defined along the X axis by the X end values $X_{L1} - X_{R1}$ and $X_{L2} - X_{R2}$ appear along the scan line 72. As is functionally illustrated in FIG. 4B, two segment blocks SEG 1 and SEG 2 are created by the visible segment generator for the scan line 72 and are added, in order, to the segments list of the associated polygon 70. The data in segment blocks SEG 1 and SEG 2 includes all of the X, Y and Z edge data relating to the left and right edges of the segments of the polygon 70 along the current scan line. This left and right edge data is represented, to facilitate the description, by the symbols $X_{L1}'$, $X_{R1}'$ and $X_{L2}'$, $X_{R2}'$, respectively.

As will subsequently be described, the polygon 70 is marked as a changing polygon during the depth sorting operation along the scan line 72 since it has edges exiting on the next scan line 74. In addition, the segment X and Z edge data is updated or incremented by adding the associated $\Delta X$ and $\Delta Z$ values thereto to provide updated edge data for the next scan line 74.

Figure 4C:
Figure 4D:
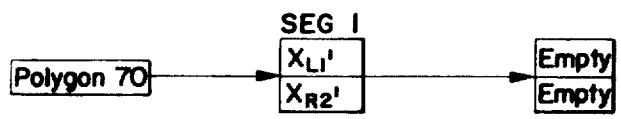

As is illustrated in FIG. 4C, when the scanning pattern proceeds to the next scan line 74, the segment block SEG 1 contains no updated right edge data since this edge does not exist on the scan line 74, i.e., the Y value of scan line 74 is greater than the Y-end value of the right edge bounding the segment defined by the segment block SEG 1. The segment block SEG 2 contains no updated left edge data for the same reason. Thus, each of these segment blocks SEG 1 and SEG 2 contains only the updated edge data for one left and one right edge $X_{L1}'$ and $X_{R2}'$, respectively.

The segment eliminator section 102 notes that the polygon 70 is a changing polygon and notes that each of the segment blocks SEG 1 and SEG 2 contains only one edge description. The segment eliminator therefore packs the leftmost segment block SEG 1, by transferring the right edge description $X_{R2}'$ from the right half of the segment block SEG 2 into the right half of the segment block SEG 1. This "packing" process is illustrated functionally in FIG. 4D. The segment block SEG 2 is then returned to free storage.

In addition, the segment eliminator may reorder the data defining the left and right edge of a segment where the data relating to the left edge, for example, has been placed in the segment block as the right edge of the segment and vice versa. This reverse ordering of the edge information in the segment blocks may occur when the segments are generated by the segment generator. For example, the segment generator may insert an edge into the wrong half of a segment block since the segment generator does not know whether an edge bounds the right or left side of a polygon.

After the segment eliminator section 102 of the visible segment generator flow diagram of FIG. 2 has completed any of the above operations which may have been necessary, control is passed to the depth sorter section 104 for depth sorting of the segments.

Left and right sample points defining a portion of the current scan line are selected to thereby establish a sample span existing between the sample points along the scan line. The left and right edges of the view plane are always implied sample edges and therefore the initial left sample point will be the left edge of the view plane 52. The initial right sample point is the X value of the first edge in the sample list. Since the sample list is a list of edges which were visible on the previous scan line ordered with respect to the X values of the previously visible edges, the initial right sample point is the leftmost edge of the current leftmost segment which was visible on the previous scan line.

Figure 3C:
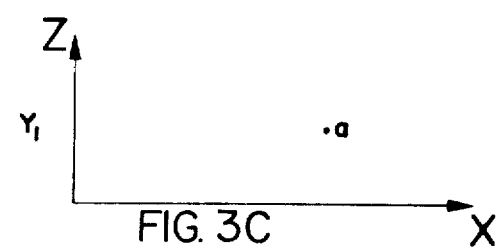
FIGS. 3C – 3H are X-Z plots of the object and view plane of FIG. 3A taken along the individual scan lines.
Figure 3D:
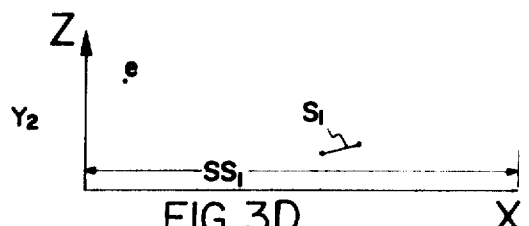

With continued reference to FIGS. 3A and 3C, it would be initially determined that no segments exist along scan line $Y_1$. Proceeding to scan line $Y_2$, a segment $S_1$ existing between the edges ab and ad would be generated by the segment generator section 100 of the visible segment generator of FIG. 2 as was described above. When control is passed to the depth sorter section 104 after checking the entering segment $S_1$ in the segment eliminator section 102, an initial sample span is established between the sample points X=0 (the left edge of the view plane 52) and the first edge appearing in the sample list. Since there were no visible segments along the previous scan line $Y_1$, there are no previously visible edges listed in the sample list. Therefore, the right sample point becomes the X value of the right edge of the view plane 52. The sample span $SS_1$ along the scan line $Y_2$ thus includes the entire width of the view plane 52.

Control is then passed to a depth comparator in the depth sorter section 104 and the depths of all segments which are in the sample span are compared. To accomplish this comparison, all the segments in the X-sort list existing between the left and right sample points are compared in order from left to right, comparing the depth of each incoming segment against the depth of the currently visible segment. The currently visible segment is established by selecting the first incoming segment from the X-sort list as the initial currently visible segment. A depth comparison between this initial currently visible segment and the next segment in the sample span thereafter establishes the next currently visible segment.

The depth sorter also creates an X-sort list for the next scan line by incrementing the X and Z values of the segment to the values associated with the next scan line, storing the incremented segment values back in the associated segment blocks, and placing the incremented segment blocks back in the X-sort list in the proper order. In addition, if either of the edges of any segment exit on the next scan line $Y_3$, the associated polygon is tagged as active and placed in the lift of changing polygons.

If the right edge of a segment extends to the right of the right sample point, the segment must be saved for future depth comparisons when the sample span is moved along the scan line. Thus, segments extending to the right of the right sample point are placed into the active segments list previously mentioned and remain in the active segments list as long as the right edge of the segment is to the right of the right sample point, i.e., as long as a portion of the segment exists to the right of the sample span.

In comparing depths of segments within a sample span, a number of different conditions may exist. Along the scan line $Y_2$ of FIG. 3A, for example, only one segment $S_1$ exists between the left and right sample points. This segment $S_1$ is the initial segment in the sample span and therefore becomes the currently visible segment. Since the segment $S_1$ is also the only segment within the sample span, it must be visible at all points at which it exists within the sample span. The segment $S_1$ may thus be placed, by a decision processor in the depth sorter section 104, into a list of visible segments for subsequent display. In addition, the edges of the visible segment $S_1$ are incremented in X and Z and placed in order of appearance into the sample list for the next scan line as the previously visible edges and also into the X-sort list for the next scan line.

Figure 3E:
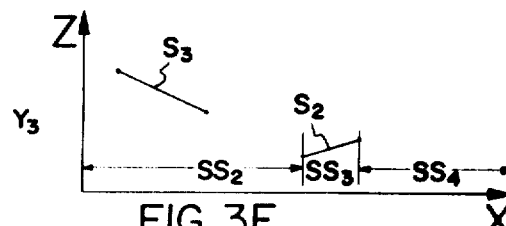

The visible segment generator then proceeds to the next scan line $Y_3$ (FIG. 3E). A segment $S_3$ between the edges ef and eg of polygon $P_{P4}$ is generated and the polygon block associated with $P_{P4}$ is tagged as active. The segment $S_3$ is placed into the X-sort list for the scan line $Y_3$ with the incremented segment $S_1$ (designated $S_2$ in FIG. 3E) which is in the X-sort list from the previous scan line. THe segment eliminator notes that the polygon $P_{P4}$ is active and makes any necessary changes in the segments associated therewith, i.e., the newly generated segment $S_3$. The depth sorter then establishes a sample span between the left edge of the view plane 52 and the X value of the first previously visible edge in the sample list, i.e., the left edge of the incremented segment $S_2$. The first segment in the X-sort list existing in the sample span $SS_2$ becomes the currently visible segment and, since this first segment is $S_3$ and $S_3$ is the only segment within the sample span $SS_2$, the segment $S_3$ is listed as a visible segment for subsequent display.

The segment $S_3$ is incremented and placed into the X-sort list for the next scan line. Since it was determined that the segment $S_3$ is visible, the X values of the edges of the segment $S_3$ are incremented and also placed, in order, into the sample list for the next scan line.

The visible segment generator then proceeds with the location of visible segments along the current scan line $Y_3$. The right sample point of the sample span $SS_2$ then becomes the left sample point of the next sample span $SS_3$ along the scan line $Y_3$. The right sample point of the sample span $SS_3$ is the next visible edge from the sample list, i.e., the right edge of the segment $S_2$. The X-sort list is then checked for segments existing in the sample span $SS_3$ and since only the segment $S_2$ exists therein, the segment $S_2$ is listed as a visible segment for subsequent display.

The segment $S_2$ is incremented and placed into the X-sort list for the next scan line. Since the segment $S_2$ is visible, the edges thereof are incremented and placed, in order, into the sample list for the next scan line. The location of visible segments along the scan line $Y_3$ then continues.

The right sample point of the sample span $SS_3$ then becomes the left sample point of the next sample span $SS_4$ along the scan line $Y_3$. Since there are no more visible edges in the sample list, the right edge of the view plane 52 becomes the right sample point of the next sample span $SS_4$. Since no segments exist in the sample span $SS_4$, control is passed to the segment generator section 100 and the visible segment generator procees to the next scan line $Y_4$.

When the end of scan line $Y_3$ has been reached, two visible segments $S_3$ and $S_2$ have been located and listed as being visible. An ordered X-sort list and an ordered sample list have been prepared for the next scan line. Only new segments entering on the next scan line $Y_4$ need be generated and added to the X-sort list by the segment generator section 100 of FIG. 2.

No new segments enter on the next scan line $Y_4$. Control is therefore passed directly to the depth sorter section 104 for a determination of visibility of those segments already in the X-sort list from the previous scan line. Those segments in the X-sort list from the previous scan line are the incremented segments $S_3$ and $S_2$ which are designated as $S_5$ and $S_4$, respectively, in FIG. 3F.

Proceeding to scan line $Y_4$, sample span $SS_5$ is generated between the left edge of the view plane 52 and the first previously visible edge in the sample list as was previously described. Sample span $SS_5$ is found to contain no segments. Sample span $SS_6$ is then generated between the right X value of the previous sample span $SS_5$ and the next previously visible edge in sample list,
and sample span $SS_6$ is checked for segments existing therein.

The sample span $SS_6$ contains only one segment, the segment $S_5$, and therefore the segment $S_5$ is placed into the visible segment list together with the X values of the sample span $SS_6$ for subsequent display. However, since the right edge of the segment $S_5$ extends to the right of the sample span $SS_6$, the segment $S_5$ is placed into the active segments list for further depth comparisons along the scan line $Y_4$.

A new sample span $SS_7$ is then generated between the right X value of the sample span $SS_6$ and the next previously visible edge from the sample list. This next previously visible edge is the rightmost edge of the segment $S_5$. All segments in the X-sort list existing within the sample span $SS_7$ are taken, together with any segments in the active segment list (the segment $S_5$ in this example), and are compared in depth by the depth sorter. Since two segments $S_4$ and $S_5$ exist within the sample span $SS_7$, it may be necessary to first utilize a clipping technique to determine if only one of the segments $S_5$ and $S_4$ is visible within the sample span and thereafter subdivide the sample span if more than one segment is found to be visible in the sample span.

Figure 3F:
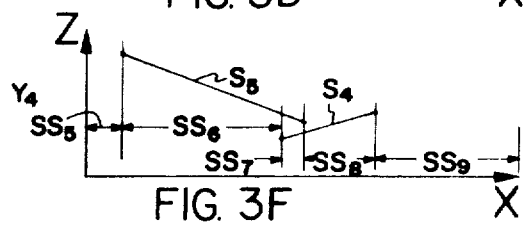
Figure 5:
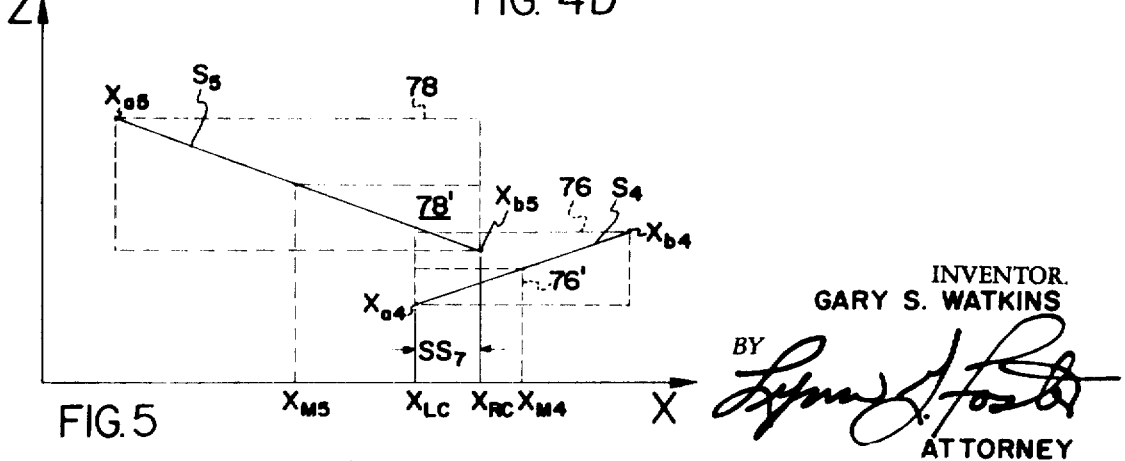
FIG. 5 is an enlarged view of the X-Z plot of FIG. 3F graphically illustrating the clipping or depth comparison technique of the present invention.

For example, referring now to FIG. 5 wherein an enlarged view of FIG. 3F is shown, the two segments $S_4$ and $S_5$ existing in the sample span $SS_7$ are compared in depth, i.e., in Z, as is graphically illustrated by the boxes 76 and 78 which enclose the segments in X and Z. Since there is an overlap of the Z values of the end points of the segments, i.e., the $Z_{MAX4}$ and $Z_{MIN5}$ values overlap, either or both segments may be visible in the sample span $SS_7$. Therefore, the clipping technique is utilized to determine segment visibility.

The clipping technique is basically an electronically implemented, non-deterministic algorithm which divides the segments in cycles until the end values thereof approach or coincide with the limits of the sample span, i.e., the right and left sample points. Each successive clipping cycle results in segment depth or Z values which approach the sample points and which may be compared to determine relative segment depths. If certain limits are reached and the segment Z values still overlap, the sample span is subdivided as will subsequently be described until the problem either becomes simple enough to solve or approaches the limit of display resolution and can therefore be discarded. Division of the problem is accomplished by successively dividing the sample span until a subdivision of the span defines a single visible segment.

Continuing with the example of FIG. 5, two X clipping values are first obtained. The left X clipping value $X_{LC}$ is defined as the rightmost left edge in the sample span, and the right X clipping value $X_{RC}$ is defined as the leftmost right edge in the sample span. If a left edge does not lie in the sample span, the left sample point is taken as the left X clipping value $X_{LC}$. If a right edge does not lie in the sample span, the right sample point is taken as the right X clipping value $X_{RC}$.

With continued reference to FIG. 5, no edges lie in the sample span $SS_7$. Therefore, the left and right sample points are used as the left and right X clipping values $X_{LC}$ and $X_{RC}$, respectively. Electrical signals related to these left and right X clipping values are placed into temporary storage registers 80 and 81, respectively, as illustrated in FIGS. 6A and 6B.

Figure 6A:
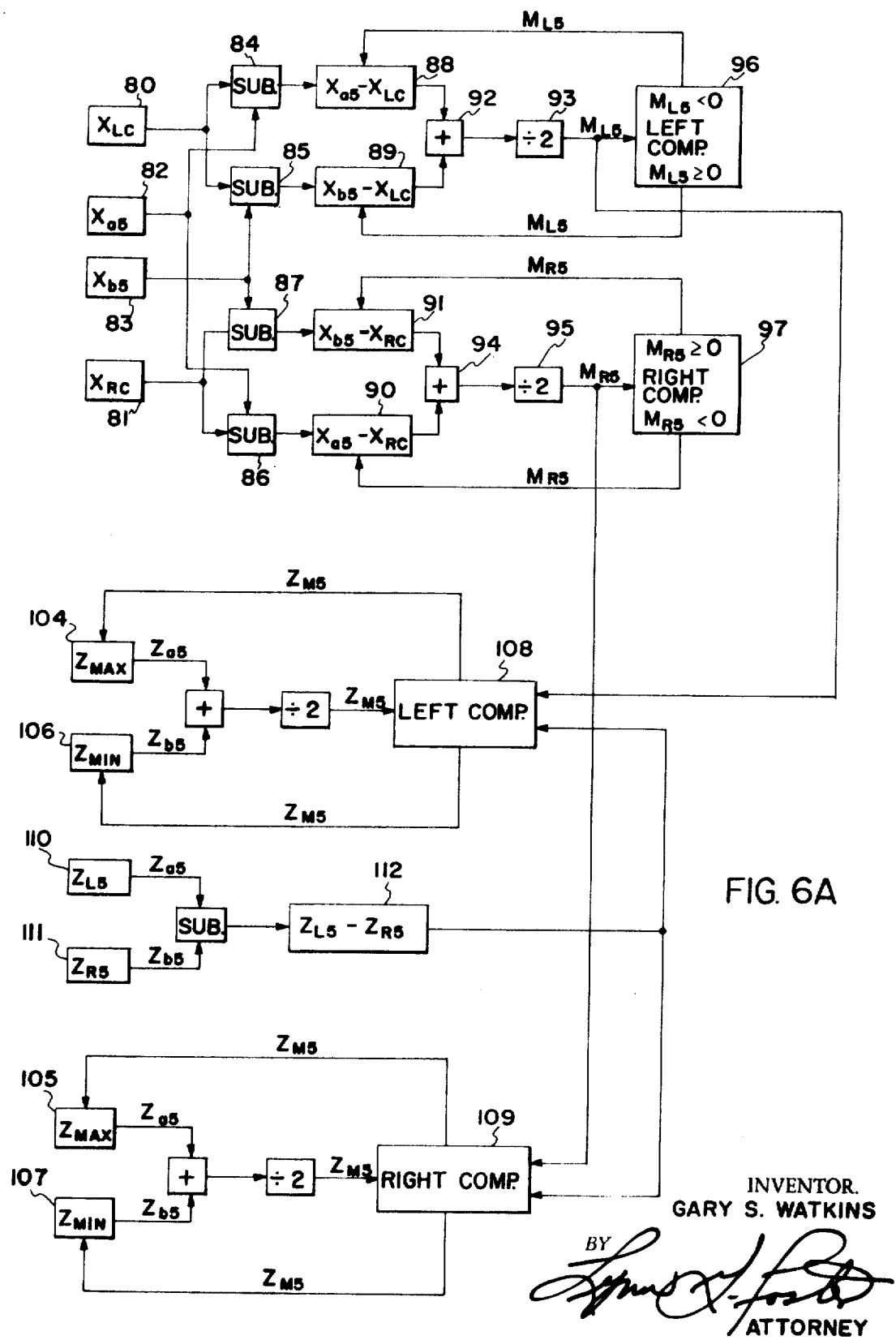
FIGS. 6A and 6B are functional block diagrams of the clipper utilized for segment depth comparison.
Figure 6B:
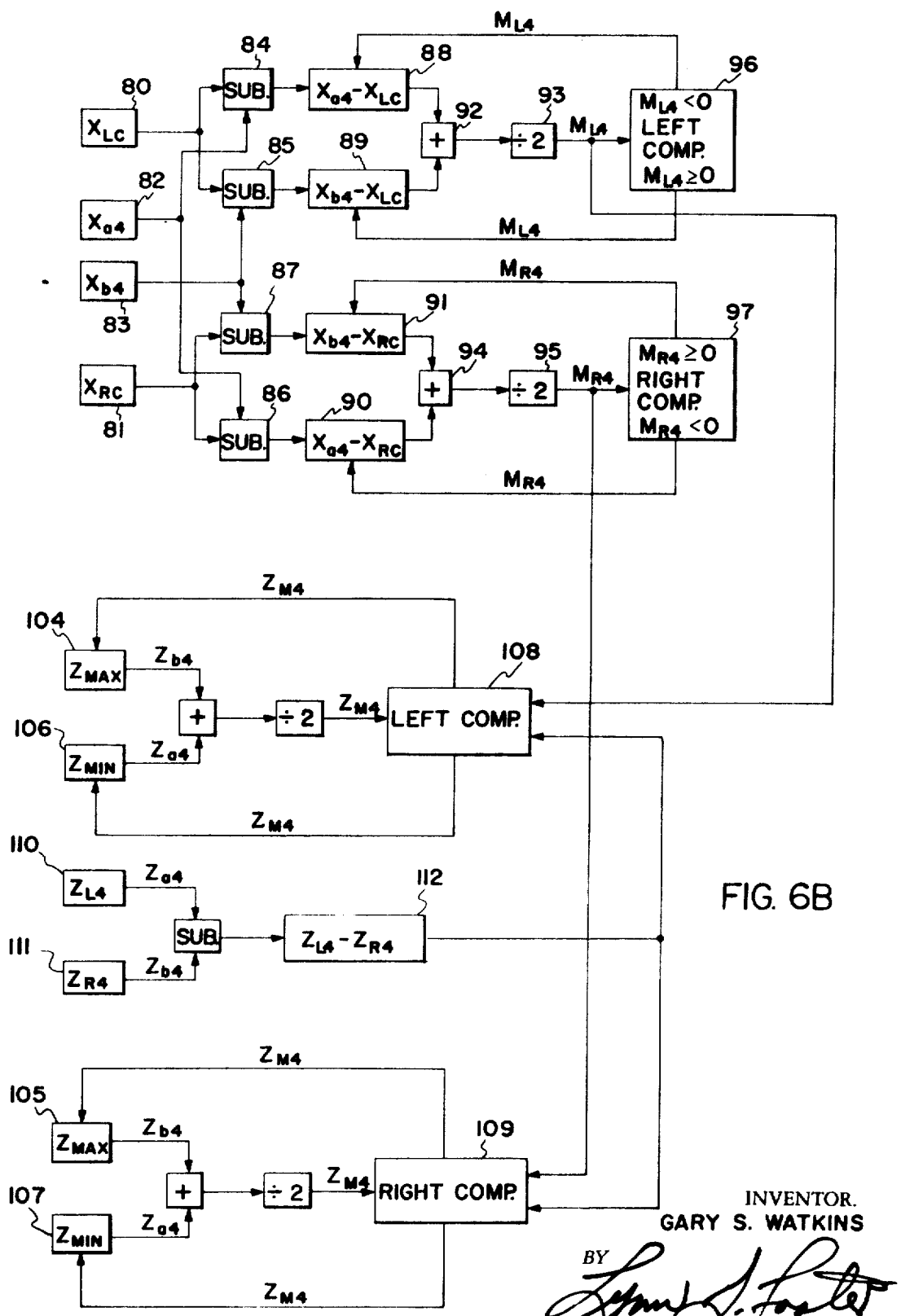

With reference to FIG. 6A, electrical signals related to the X values of the left and right edges of the segment $S_5$, i.e., $X_{a5}$ and $X_{b5}$, may be placed in temporary storage registers 82 and 83, respectively, or alternatively read from the associated segmented block. The $X_{LC}$ value is substracted from both segment edge values $X_5$ and $X_5$ by conventional electronic subtractors 84 and 85 and the $X_{RC}$ value is subtracted from these segment edge values by similar subtractors 86 and 87. The resultant quantities $(X_{a5} - X_{LC})$ and $(X_{b5} - X_{LC})$ are stored in the form of electrical signals in temporary storage registers 88 and 89 and are electronically summed by the adder 92 and electronically divided by 2 by the divider 93. The quantities $(X_{a5} - X_{RC})$ and $(X_{b5} - X_{RC})$ are stored in the form of electrical signals in the temporary storage registers 90 and 91 and are electronically summed by the adder 94 and electronically divided by 2 by the divider 95.

The output signals $M_{L5}$ and $M_{R5}$ from the dividers 93 and 95 may be expressed by the following equations, respectively:

$$M_{L5} = (X_{a5} + X_{b5})/2 - X_{LC} \tag{11}$$

$$M_{R5} = (X_{a5} + X_{b5})/2 - X_{RC} \tag{12}$$

The quantity $(X_{a5} + X_{b5})/2$ in each of the equations (11) and (12) is equal to the X coordinate of the midpoint of the segment $S_5$, i.e., $X_{M5}$ in FIG. 5. Therefore, equations 11 and 12 reduce to:

$$M_{L5} = X_{M5} - X_{LC} \tag{13}$$

$$M_{R5} = X_{M5} - X_{RC} \tag{14}$$

The signs of $M_{L5}$ and $M_{R5}$ thus represent the position of the midpoint $X_{M5}$ of the segment $S_5$ relative to the left and right clipping values $X_{LC}$ and $X_{RC}$. The signs of the M values may be determined by the comparators 96 and 97 of FIG. 6A.

With continued reference to FIG. 6A, the left comparator 96 determines the sign of $M_{L5}$, i.e., compares $M_{L5}$ to 0, and replaces either the quantity $(X_{a5} - X_{LC})$ in register 88 or the quantity $(X_{b5} - X_{LC})$ in the register 89 with the quantity $M_{L5}$. If $M_{L5}$ is less than 0, signifying that the midpoint of the segment $S_5$ is to the left of the left X clipping value $X_{LC}$, the quantity $M_{L5}$ is placed into the register 88 in place of the quantity $(X_{a5} - X_{LC})$. This is equivalent to replacing the quantity $X_{a5}$ with the quantity $X_{M5}$ since $M_{L5} = X_{M5} - X_{LC}$. If the quantity $M_{L5}$ is greater than or equal to 0 signifying that the midpoint of the segment $S_5$ is to the right of the left X clipping value $X_{LC}$, the quantity $M_{L5}$ is placed into the register 89 in place of the quantity $(X_{b5} - X_{LC})$.

The right comparator 97 replaces either the contents of the register 90 or the contents of the register 91 with the $M_{R5}$ value depending upon the sign of the quantity $M_{R5}$. This replacement is determined as was described above in connection with the left comparator 96.

In the example of FIG. 5, $M_{L5}$ and $M_{R5}$ are both negative values signifying that the midpoint $X_{M5}$ of the segment $S_5$ is to the left of both the left and right X clipping values $X_{LC}$ and $X_{RC}$. Therefore, the left comparator 96 replaces the quantity $(X_{a5} - X_{LC})$ in the register 88 with the quantity $M_{L5}$, and the right comparator 97 replaces the quantity $(X_{a5} - X_{RC})$ in the register 89 with the quantity $M_{R5}$.

This same clipping technique is applied to the Z end values of the segment $S_5$ to determine the Z end values of the newly defined segments. With continued reference to FIG. 6A, the Z Coordinates of the segment $S_5$ are checked and the maximum Z coordinate $Z_{MAX}$ is placed into temporaty storage registers 104 and 105 as an electrical signal. This $Z_{MAX}$ coordinate corresponds to the Z coordinate of the leftmost edge of the segment $S_5$, i.e., $Z_{a5}$.

The minimum Z coordinate $Z_{MIN}$ of the segment $S_5$ is placed into the temporary storage registers 106 and 107 as an electrical signal. The minimum Z coordinate of the segment $S_5$ in the example of FIG. 5 is the Z value associated with the rightmost edge of the segment $S_5$, i.e., $Z_{b5}$.

During the first clipping cycle described above, the $Z_{MAX}$ and the $Z_{MIN}$ values are averaged by electronically summing these values and electronically dividing by 2 to obtain the Z coordinate of the midpoint of the segment $S_5$, i.e., $Z_{M5}$. This determination of the $Z_{M5}$ value is made with respect to both the left and right X clipping values, so that the Z end values of both of the newly formed segments are available.

The Z coordinate $Z_{L5}$ of the leftmost edge of the segment $S_5$ and the Z coordinate $Z_{R5}$ of the rightmost edge of the segment $S_5$ are placed into temporary storage registers 110 and 111, respectively, and the right Z value $Z_{R5}$ is electronically subtracted from the left Z value $Z_{L5}$. The difference quantity $(Z_{L5} - Z_{R5})$, or at least the sign $Z_{L5}$ thereof, may be stored in the form of an electrical signal in a temporary storage register 112 and may be applied to both the left and right comparators 108 and 109 respectively for a determination of the sign of this quantity. The quantity $M_{L5}$ or the sign $SM_{L5}$ of this quantity is provided at the left comparator 108 and the quantity $M_{R5}$ or the sign $SM_{R5}$ of this quantity is provided at the right comparator 109.

If the sign $SM_{L5}$ of the quantity $M_{L5}$ is positive and the sign $SL_5$ of the quantity $(Z_{L5} - Z_{R5})$ is negative, or if the sign $SM_{L5}$ of the quantity $M_{L5}$ is negative and the sign $SL_5$ of the quantity $(Z_{L5} - Z_{R5})$ is positive, the $Z_{MAX}$ quantity in the register 104 is replaced by the $Z_{M5}$ quantity and the $Z_{MIN}$ quantity in the register 106 remains unchanged. Stated another way, the $Z_{MAX}$ quantity is replaced by the $Z_{M5}$ quantity if:

$$((SM_{L5} +) \wedge (SL_5 -)) \vee ((SM_{L5} -) \wedge (SL_5 +)). \tag{15}$$

The $Z_{MIN}$ quantity is replaced by the $Z_{M5}$ quantity if the sign $SM_{L5}$ of the $M_{L5}$ quantity is positive and the sign $SL_5$ of the $(Z_{L5} - Z_{R5})$ quantity is positive or if the sign $SM_{L5}$ of the $M_{L5}$ quantity is negative and the sign $SL_5$ of the $(Z_{L5} - Z_{R5})$ quantity is negative, i.e., if:

$$((SM_{L5} +) \wedge (SL_5 +)) \vee ((SM_{L5} -) \wedge (SL_5 -)). \tag{16}$$

The right comparator 109 operates in the same manner to replace either the $Z_{MAX}$ quantity in the register 105 or the $Z_{MIN}$ quantity in the register 107 with the $Z_{M5}$ quantity utilizing the sign $SM_{R5}$ of the quantity $M_{R5}$ in lieu of the sign $SM_{L5}$ of the quantity $M_{L5}$ in expressions (15) and (16) above.

In the example of FIG. 5, the $Z_{MAX}$ values in both the registers 104 and 105 are replaced by the $Z_{M5}$ values from the left and right comparators 108 and 109 respectively since the signs of both the $M_{L5}$ and $M_{R5}$ quantities and the sign $SL_5$ of the quantity $(Z_{L5} - Z_{R5})$ is negative (see equations (13) and (14).) Thus, after one clipping cycle the register 104 contains the quantity $Z_{M5}$, the register 106 contains the quantity $Z_{MIN}$ ($Z_{b5}$), the register 105 contains the quantity $Z_{M5}$, and the register 107 contains the quantity $Z_{MIN}$ ($Z_{b5}$).

After one clipping cycle is applied to the segment $S_5$ of FIG. 5, two newly formed segments defined by the X end values $X_{M5}$, $X_{b5}$ and $X_{M5}$, $X_{b5}$ and by the Z end values $Z_{M5}$, $Z_{b5}$ and $Z_{M5}$, $Z_{b5}$ are stored in the various registers of FIG. 6A. These two newly defined segments, which happen to coincide since the midpoint of the segment $S_5$ is to the left of both the right and left X clipping values, are illustrated graphically in FIG. 5 as being encompassed in X and Z by the box 78'.

The same clipping technique, illustrated in FIG. 6B wherein like numerical designations have been utilized to designate like elements, is simultaneously utilized to subdivide the segment $S_4$ into smaller segments having end values approaching the sample points. The quantity $M_{L4}$ applied to the left comparators 96 and 108 and the quantity $M_{R4}$ applied to the right comparators 97 and 109 are given by the equations:

$$M_{L4} = X_{M4} - X_{LC} \quad (17)$$

$$M_{R4} = X_{M4} - X_{RC} \quad (18)$$

where $X_{M4}$ is the X value of the midpoint of segment $S_4$.

In the example of FIG. 5, the signs of both $M_{L4}$ and $M_{R4}$ are positive signifying that the midpoint $X_{M4}$ of the segment $S_4$ is to the right of both the left and right X clipping values $X_{LC}$ and $X_{RC}$. Thus, after one clipping cycle, the subdivision of the segment $S_4$ by this clipping technique results in two new, coincident segments both defined in X and Z by the end points $(X_{a4}, Z_{a4})$ and $(X_{M4}, Z_{M4})$ where $X_{M4}$ and $Z_{M4}$ are the X and Z coordinates of the midpoint of the segment $S_4$. These newly defined segments are illustrated graphically in FIG. 5 as being encompassed in X and Z by the box 76'.

After this first clipping cycle is complete, a depth comparison is made between the newly defined segments related to the segment $S_4$ and the newly defined segments related to $S_5$. If the Z components of these newly defined segments still overlap, a second clipping cycle is applied to the newly defined segments to further subdivide the segments $S_4$ and $S_5$. However, as is apparent from the example of FIG. 5, there is no overlap in Z, i.e., both $Z_{a4}$ and $Z_{M4}$ are less than $Z_{b5}$ and $Z_{M5}$. Moreover, the newly defined segments of both segments $S_4$ and $S_5$ include within their X boundaries all portions of the segments $S_4$ and $S_5$ which exist between the right and left sample points. Thus, the segment $S_4$ which is always closer to the observer in the sample span $SS_7$ (since $Z_{a4}$ and $Z_{M4}$ are both less than $Z_{b5}$ and $Z_{M5}$) is the currently and only visible segment within the sample span $SS_7$. The segment $S_4$ and the sample points of the sample span $SS_7$ are therefore placed into the list of visible segments by the decision processor and the segment data is also updated and placed into the list of active segments in that it extends to the right of the right sample point.

With reference now to FIG. 3F, the determination of visibility of segments along the scan line $Y_4$ then continues. A sample span $SS_8$ between the right sample point of the previous sample span $SS_7$ and the next previously visible edge in the sample list (the right edge of the segment $S_4$) is created by the depth sorter section 104 of the visible segment generator.

The X-sort list and the active segments list are then checked for segments existing within the new sample span $SS_8$. A single segment $S_4$ in the active segments list from the previous sample span is found to exist in the sample span $SS_8$. Since the segment $S_4$ is the only segment within this sample span, the segment $S_4$ is placed into the visible segments list for subsequent display.

A sample span $SS_9$ between the right sample point of the previous sample span $SS_8$ and the next visible edge in the sample list is created. Since there are no more previously visible edges in the sample list, the right sample point of the sample span $SS_9$ is the right edge of the view plane 52. When it is determined that there are no segments within the sample span $SS_9$, the visisble segment generator proceeds to the next san line $Y_5$, illustrated in FIGS. 3A and 3G.

At the end of the scan line $Y_4$, control is passed to the segment generator section 100 of the visible segment generator of FIG. 2 and a check is made to determine whether or not the end of the frame has been reached. Since it has not been reached in the present example of FIG. 3, the segment generator section checks the current scan line $Y_5$ to determine if any new edges enter on this current scan line. It is found that two new edges cd and cb associated with the polygon $P_{P3}$ enter on the scan line $Y_5$. The polygon $P_{P3}$ is marked as a changing polygon and a segment block is created for the segment $S_6$ defined by the two new edges.

Since the polygon $P_{P3}$ was marked by the segment generator section 100 as a changing polygon, all segments associated with the polygon $P_{P3}$ are checked by the segment eliminator section 102. The order of the edges of the newly created segment $S_6$ is checked and changed if necessary, and since there are no more changing polygons along the scan line $Y_5$, control is passed to the depth sorter section 104 of the visible segment generator.

Figure 3G:
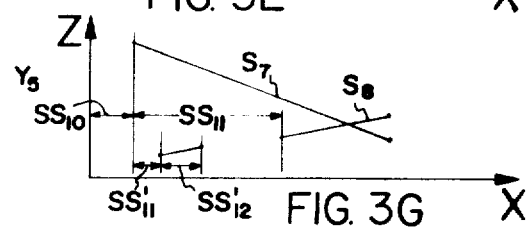
Figure 7A:
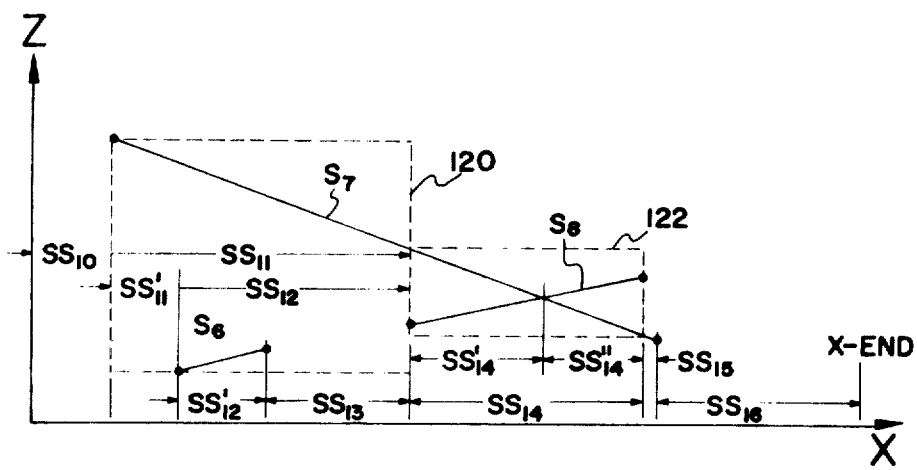
FIGS. 7A – 7G are enlarged views of the X-Z plot of FIG. 3G graphically illustrating the segment intersection determining technique of the present invention.
Figure 7B:
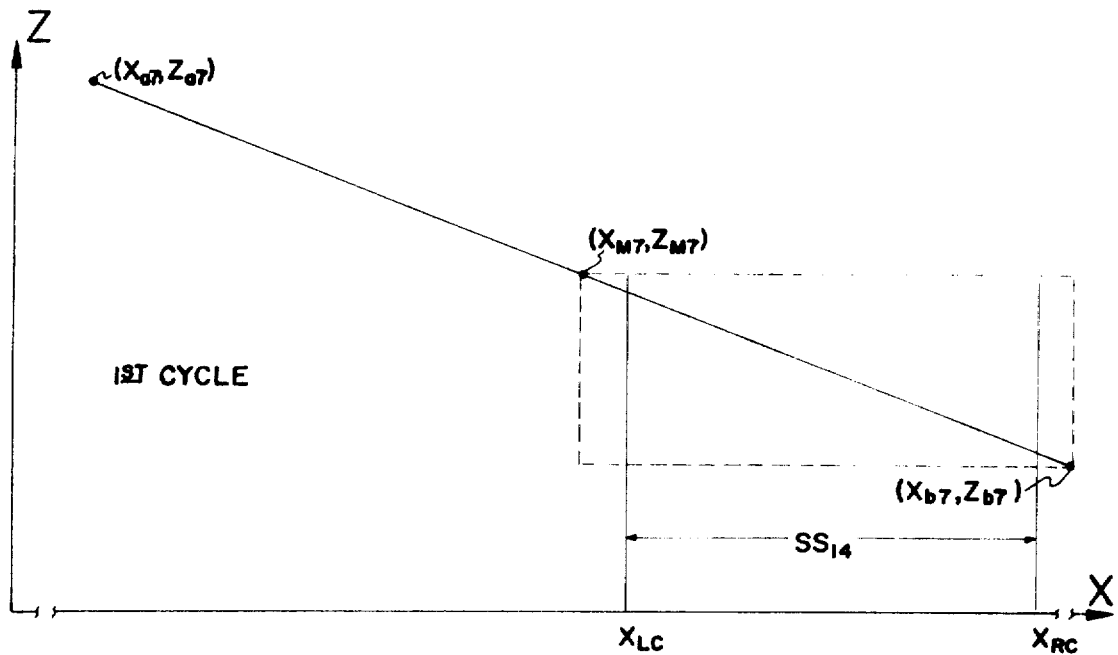
Figure 7C:
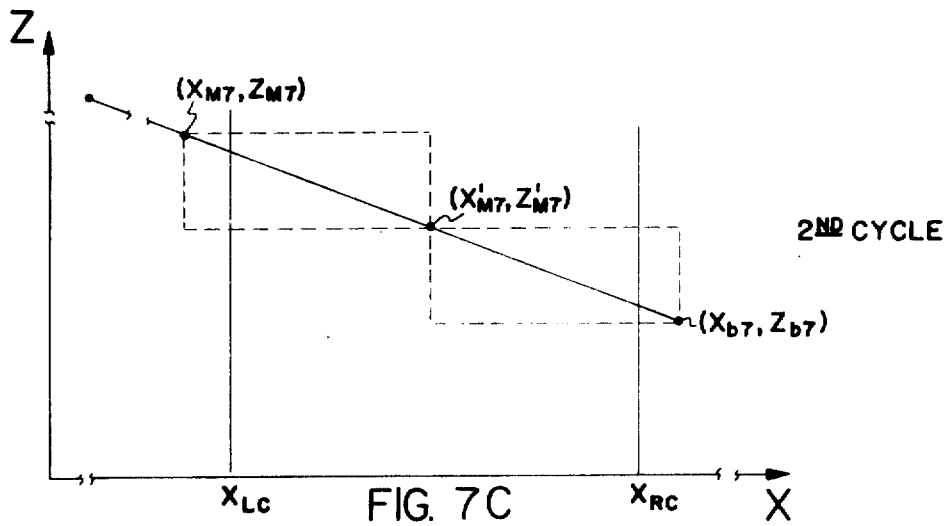
Figure 7D:
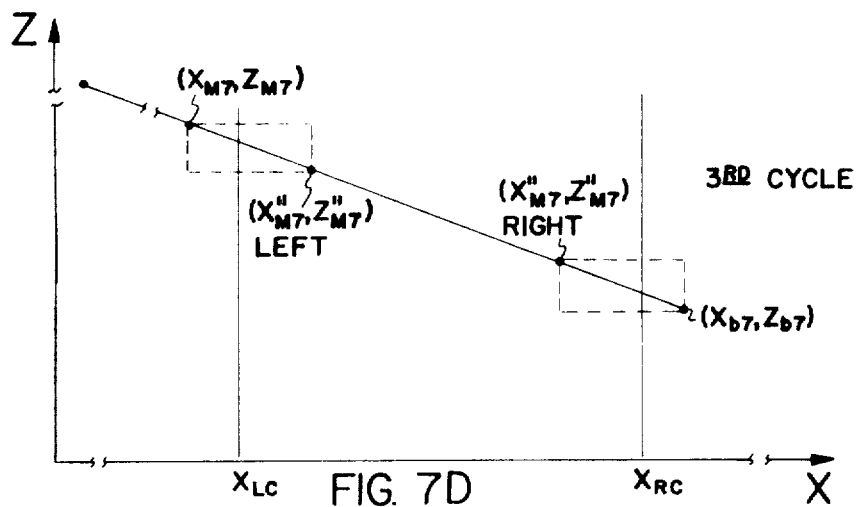
Figure 7E:
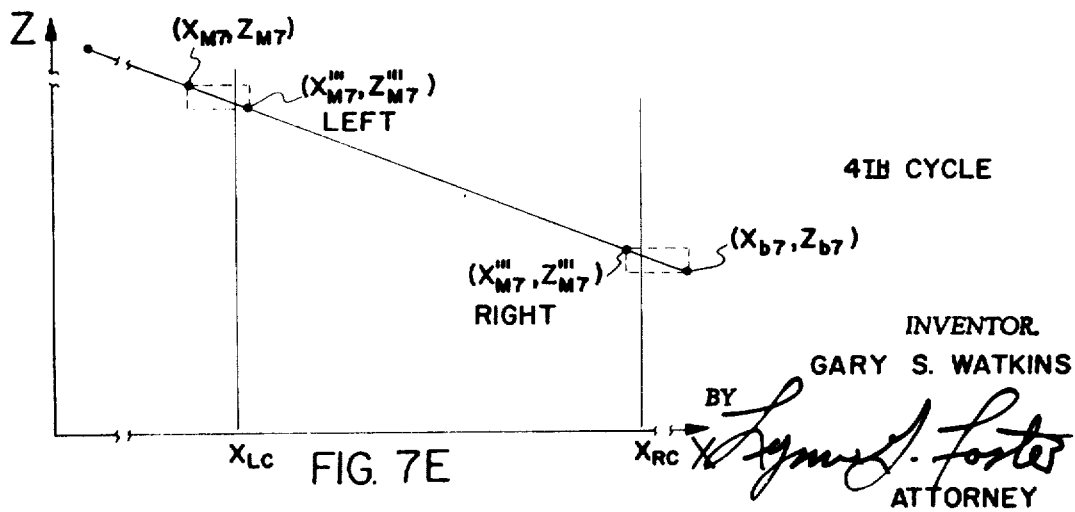
Figure 7F:
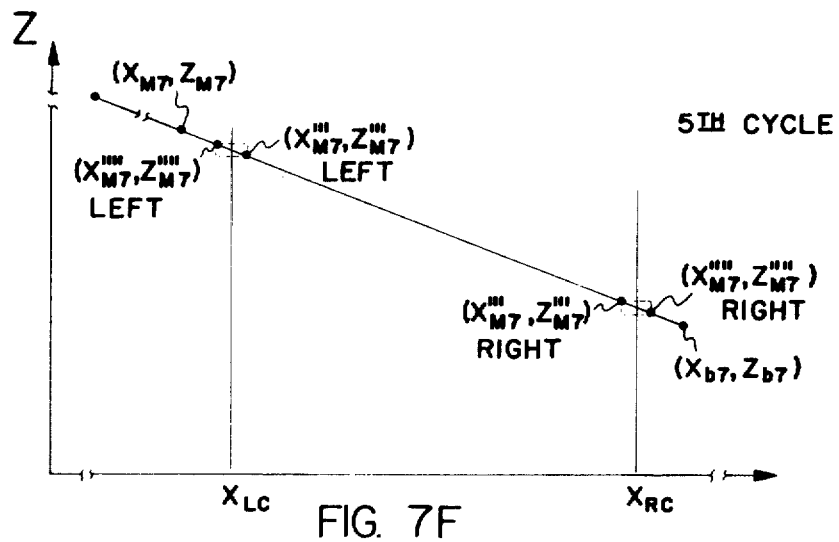

Referring now to FIG. 7A wherein an enlarged view of FIG. 3G is shown, the depth sorter section 104 of FIG. 2 creates a first sample span $SS_{10}$ between the left edge of the view plane 52 and the first previously visible edge in the sample list (the left edge of the updated segment $S_5$, now referred to as $S_7$). No segments exist within the sample span $SS_{10}$ and therefore a new sample span $SS_{11}$ is created between the right sample point of the previous sample span $SS_{10}$ and the next previously visible edge in the sample list (the left edge of the updated segment $S_4$, now referred to as the segment $S_8$). The X-sort list contains two segments $S_6$ and $S_7$ which exist within the sample span $SS_{11}$. The first incoming segment $S_7$ becomes the currently visible segment and it is compared in depth with the next segment $S_6$ which exists within the sample span $SS_{11}$.

The depth comparison between the segments $S_6$ and $S_7$ reveals that the segments $S_6$ is in front of the segment $S_7$ at all places within the sample span $SS_{11}$ at which the segment $S_6$ exists. The depth comparator of the depth sorter section 104 notes, however, that the segments $S_6$ and $S_7$ are both visible within the sample span $SS_{11}$, since the segment $S_6$ does not entirely cover the segment $S_7$ within the sample span. The depth comparator thus creates a visible box 120 just large enough in X and Z to encompass both segments and sets a bit indicating a visible box. The bit indicating a visible box indicates to the decision processor that the sample span $SS_{11}$ must be subdivided in some manner.

The decision processor determines whether or not an edge of one of the segments exists within the sample span $SS_{11}$, i.e., within the visible box 120. If an edge does exist within the sample span, the decision processor subdivides the sample span by moving the right sample point to the leftmost edge within the sample span. Thus, in the example of FIG. 7A, the new sample span $SS_{11}'$ is created between the left sample point of the sample span $SS_{11}$ and the leftmost edge within the sample span $SS_{11}$, i.e., the leftmost edge of the segment $S_6$. Only one segment, $S_7$ exists within the new sample span $SS_{11}'$ and therefore this segment and the sample points of the sample span $SS_{11}'$ are placed into the list of visible segments by the decision processor. The segment $S_7$ is also placed into the active segments list since it extends to the right of the right sample point of the sample span $SS_{11}'$.

A new sample span $SS_{12}$ is created between the right sample point of the previous sample span $SS_{11}'$ and the next previously visible edge in the sample list, i.e., the leftmost edge of the segment $S_8$.

The segments $S_6$ and $S_7$ are taken, respectively, from the X-sort list and the active segments list. The first incoming segment $S_7$ becomes the currently visible segment for the sample span $SS_{12}$. A depth comparison reveals that where the segment $S_6$ exists it is always in front of the segment $S_7$ in the sample span $SS_{12}$ and that a visible box (not shown) must be created since the segment $S_7$ is also visible within the sample span $SS_{12}$. The depth processor, noting the visible box, subdivides the sample span $SS_{12}$ as was previously described by selecting the leftmost edge falling within the sample span $SS_{12}$, as the right sample point of a new sample span $SS_{12}'$.

A depth comparison of the two segments $S_6$ and $S_7$ within the new sample span $SS_{12}'$ reveals that there is only one visible segment, $S_6$, within the sample span $SS_{12}'$. The segment $S_6$ and the sample points of the sample span $SS_{12}'$ are therefore placed into the list of visible segments and is incremented for use along the next scan line.

A new sample span $SS_{13}$ is then created between the right sample point of the previous sample span $SS_{12}'$ and the next edge in the sample list. The new sample span $SS_{13}$ contains only one segment, $S_7$, which is thus placed into the visible segments list by the decision processor for subsequent display.

A new sample span $SS_{14}$ is then created between the right sample point of previous sample span $SS_{13}$ and the next previously visible edge in the sample list (the right edge of the segment $S_8$). The new sample span $SS_{14}$ contains two segments $S_7$ and $S_8$ and a depth comparison between these two segments is made.

The depth comparison between the two segments $S_7$ and $S_8$ existing within the sample span $SS_{14}$ reveals that there is no single currently visible segment within the sample span $SS_{14}$. Thus, a visible box 122 just large enough in X and Z to encompass the two or ore segments within the sample span is created. A bit is set indicating a visible box instead of a visible segment and control is passed to the decision processor of the depth sorter section 104 for determination of whether or not a visible segment may be listed in the list of visible segments.

When it is noted that a visible box is present, the decision processor determines if any edges exist within the sample span. If edges exist within the sample span, the decision processor subdivides the sample span by moving the right sample point to the X value of the leftmost edge existing in the sample span, as was previously descried in connection with the sample span $SS_{11}$.

If no edges exist between the left and right sample points, two conditions may exist: (1) for more than two segments existing in the visible box, the sample span is divided in half and control is passed back to the depth comparator; (2) if only two segments exist in the box, the condition is the intersection condition in the sample span $SS_{14}$ of FIG. 7A and the same clipping hardware used for depth comparisons may be used for calculating the intersection of the two segments.

With continued reference to FIG. 7A, the depth processor determines that an intersection exists within the sample span $SS_{14}$. An intersection calculation is then accomplished in basically two stages as is illustrated in FIGS. 8A and 8B wherein like numerals designations have been utilized to identify elements previously described in connection with FIG. 6.

Figure 8A:
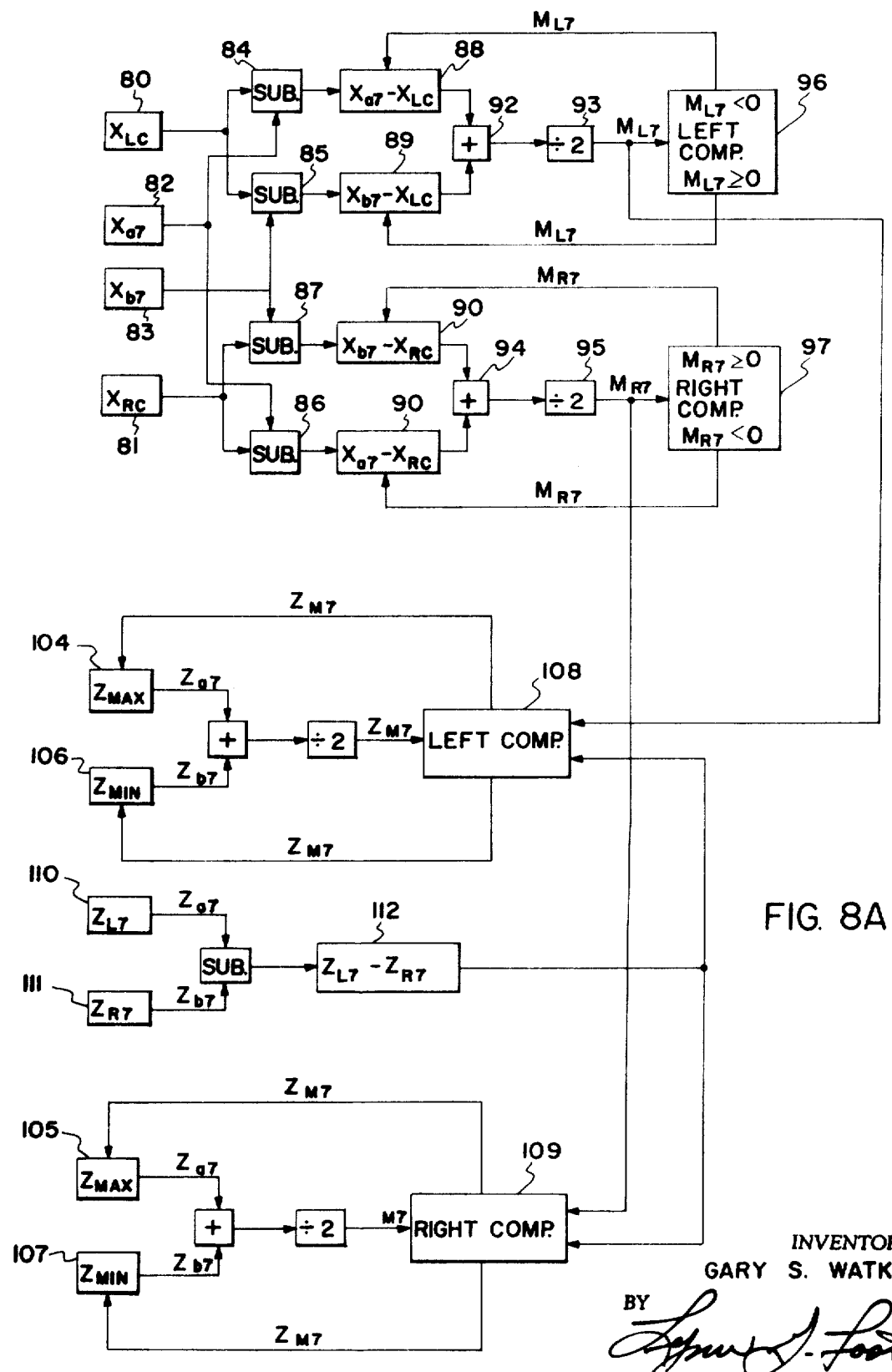
FIGS. 8A – 8B are functional block diagrams of the segment intersection calculator of the present invention.
Figure 8B:
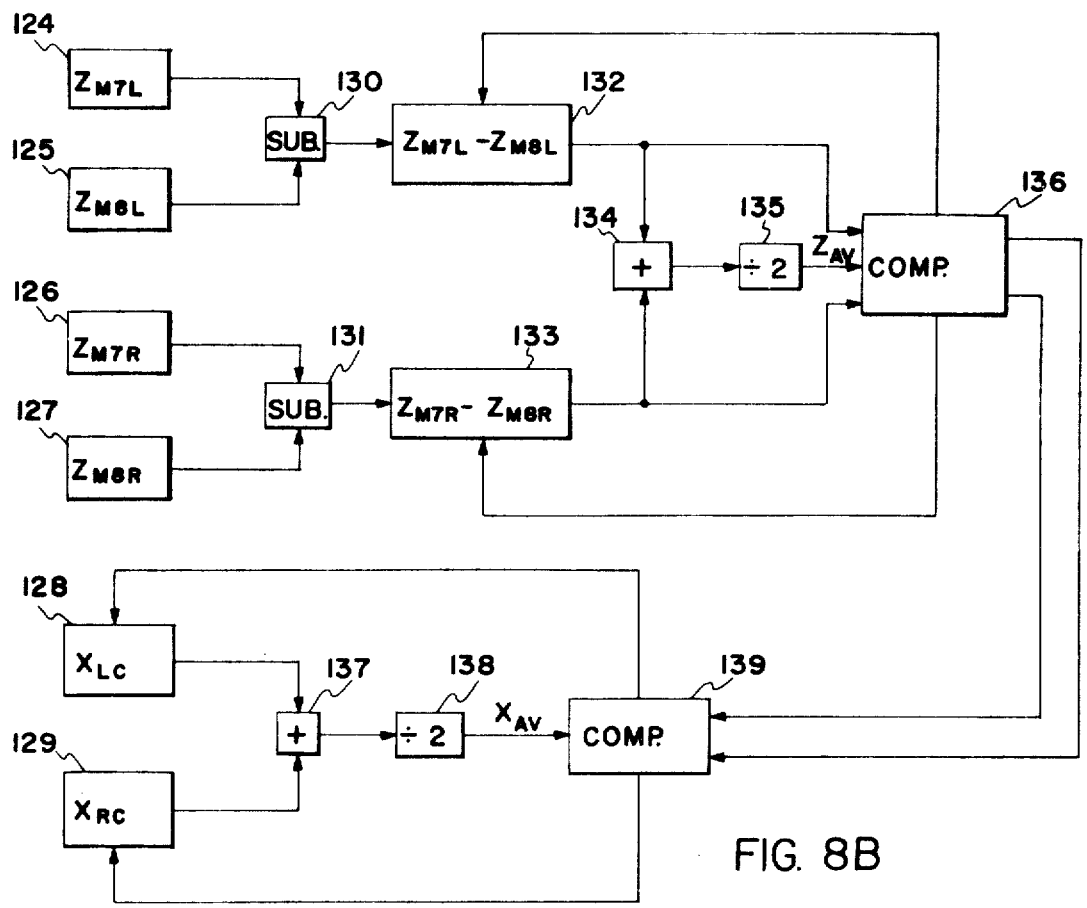

Referring to FIG. 8A, the registers 82 and 83 are loaded with electrical signals representing the X coordinates of the left and right edges of the segments $S_7$, i.e., $X_{a7}$ and $X_{b7}$, respectively. The registers 80 and 81 are loaded with electrical signals representing the left and right X clipping values $X_{LC}$ and $X_{RC}$, respectively, which correspond to the left and right sample points in that no edges exist in the sample span $SS_{14}$.

The registers 104–107, 110 and 111 are loaded with electrical signals representing the various Z values associated with the segment $S_7$ as is illustrated in FIG. 8A, and the clipping of the segment $S_7$ commences.

The same clipping technique is simultaneously applied to the segment $S_8$. Instead of terminating the clipping of segments $S_7$ and $S_8$ when there is no overlap of the Z values of the segments as was previously done when comparing the depths of two segments, the clipping technique is terminated when the registers 88–91 contain either a zero (0) or a minus one (−1). A zero or a minus one in the registers 88–91 indicates that the approximate left and right limits of the clipping process, i.e., $X_{LC}$ and $X_{RC}$, have been reached as is graphically shown by way of example in FIGS. 7B–7F wherein five consecutive clipping cycles applied to the segment $S_7$ are illustrated to facilitate an understanding of the invention.

It can be seen that after the five exemplary clipping cycles, the quantities $M_{L7}$ and $M_{R7}$ approach zero and that by applying a few more clipping cycles, the contents of the registers 88–91 will approach zero or become minus one. At that time, the registers 104 and 105 contain the $Z_{MAX}$ values associated with the point of intersection between the segment $S_7$ and the left and right X clipping values $X_{LC}$ and $X_{RC}$, respectively.

Figure 7G:
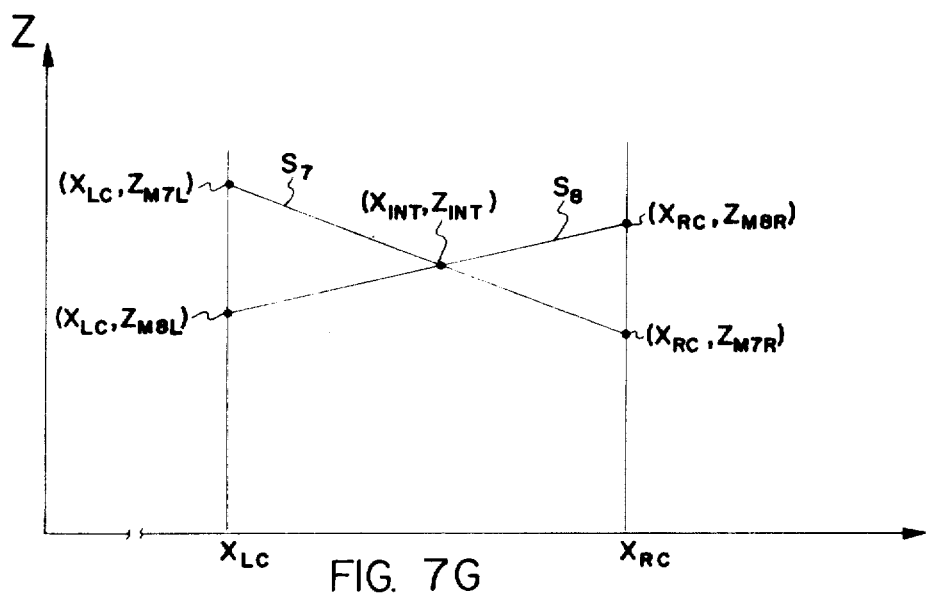

Thus, after the above clipping technique has been applied to both segments $S_7$ and $S_8$, the problem of finding the point of intersection between the segments $S_7$ and $S_8$ is reduced to the problem illustrated in FIG. 7G.

Referring now to FIG. 7G, the portion of the segment $S_7$ between the left and right X clipping values is defined by the end points ($X_{LC}$, $X_{M7L}$), where the Z coordinates $Z_{M7L}$ and $Z_{M7R}$ are the $Z_{MAX}$ values in the registers 104 and 105, respectively, after an appropriate number of clipping cycles have been applied to the segment $S_7$. The portion of the segment $S_8$ between the left and right X clipping values is defined by the end points ($X_{LC}$, $Z_{M8L}$) and ($X_{RC}$, $Z_{M8R}$) where Z coordinates $Z_{M8L}$ and $Z_{M8R}$ values from the registers 105 and 105, respectively, after an appropriate number of clipping cycles have been applied to the segment $S_8$.

The second stage of the intersection determining techniques is illustrated in FIG. 8B. With reference now to FIG. 8B, the Z values $Z_{M7L}$ and $Z_{M8L}$ associated with the left X clipping value $X_{LC}$ are stored in the form of electrical signals in temporary storage registers 124 and 125, respectively. The Z values $Z_{M7R}$ and $Z_{M8R}$ associated with the right X clipping value $X_{RC}$ are stored in the form of electrical signals in temporary storage registers 126 and 127, respectively. The left and right X clipping values $X_{LC}$ and $X_{RC}$ are stored in the form of electrical signals in temporary storage registers 128 and 129.

The $Z_{M8L}$ value is electronically subtracted from the $Z_{M7L}$ value by the subtractor 130 and the $Z_{M8R}$ value is electronically subtracted from the $Z_{M7R}$ value by the subtractor 131. The left and right difference signals $Z_{DL}$ and $Z_{DR}$ from the substractors 130 and 131, respectively, are stored in the respective temporary storage registers 132 and 133 and these difference signals are averaged by electronically summing and dividing by two in the adder 134 and the divider 135. The Z average signal $Z_{AV}$ from the divider 135 is applied to a comparator 136 together with each of the difference signals from the registers 132 and 133.

Since an intersection exists, one of the difference values in the registers 132 and 133 will be positive and the other will be negative. The $Z_{AV}$ value may be either positive or negative. The comparator 136 compares the signs of the left and right difference values from the registers 132 and 133 with the sign of the $Z_{AV}$ value and places the $Z_{AV}$ value into the register 132 or 133 which contains the difference signal corresponding in sign to the $Z_{AV}$ signal. This replacement of the left and right difference signals in registers 132 and 133 by the $Z_{AV}$ signal after the above described sign comparison continues until the comparator 136 determines that the contents of both the register 132 and 133 are either zero or minus one.

The manner in which the difference values in the registers 132 and 133 are replaced with the $Z_{AV}$ value by the comparator 136 simultaneously controls the replacement of the left and right X clipping values in the registers 128 and 129 with an average X value $X_{AV}$. The left and right X clipping values $X_{LC}$ and $X_{RC}$ are electronically summed by an adder 137 and electronically divided by two by a divider 138 to provide the $X_{AV}$ signal. The $X_{AV}$ signal is applied to a comparator 139 together with control signals from the comparator 136. If the left difference value $Z_{DL}$ in the register 132 is replaced by the $Z_{AV}$ value by the comparator 136, the left X clipping value $X_{LC}$ in the register 128 is replaced by the $X_{AV}$ value by the comparator 139. Likewise, if the right difference value $Z_{DR}$ in the register 133 is replaced by the $Z_{AV}$ value by the comparator 136, the right X clipping value $X_{RC}$ in the register 129 is replaced by the $X_{AV}$ value by the comparator 139.

The replacement of the left and right difference values in the registers 132 and 133 thus controls the reloading of the registers 128 and 129. As was previously described, this process continues until the left and right difference values in the registers 132 and 133 are both either zero or minus one, at which time both of the registers 128 and 129 will contain the X coordinate of the point of intersection between the two segments in question, i.e., the point of intersection between the segments $S_7$ and $S_8$ in the example of FIG. 7G.

An edge block from free storage is obtained when the above intersection determining technique is complete and the $X_{INT}$ value in either the register 128 or the register 129 is stored in this edge block as an implied edge. This implied edge is listed in an implied edge list with pointers to the two segments causing the intersection. When the visible segment generator proceeds to the next scan line $Y_6$, the intersection of the two segments will again be calculated. The difference between the point of intersection on the current scan line and the point of intersection of the previous scan line may then be used to calculate the incremental value $\Delta X$ of the implied edge. This implied edge may thereafter be treated as any other visible edge and used for determining sample points. Moreover than an implied edge is found to be no longer visible, the edge block associated therewith may be returned to free storage.

With reference to FIG. 7A, the implied edge designated by the coordinate ($X_{INT}$) is then utilized as a sample point and sample span $SS_{14}'$ is generated. The segment $S_8$, being the only visible segment in the sample span $SS_{14}'$, is listed as a visible segment and the sample span $SS_{14}''$ is generated. The segment $S_7$ is the only visible segment in the sample span $SS_{14}''$ and is therefore listed as visible. The listing of visible segments continues for the remainder of the scan line with the sample spans $SS_{15}$ and $SS_{16}$ being generated and tested for the existence of visible segments as was previously described.

Figure 3H:
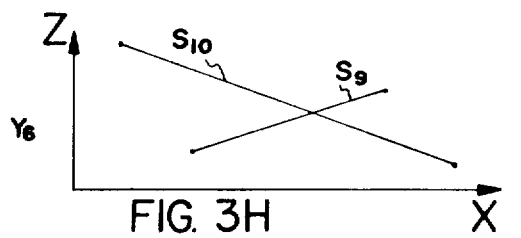

When the visible segment generator proceeds to the next scan line, as is illustrated in FIG. 3H, no new segments are created by the segment generator section 100 of FIG. 2. However, since the segments $S_6$ and $S_8$ have edges which exit on this scan line, the polygon $P_{P3}$ with which these segments are associated has been tagged as a changing polygon. The segment eliminator section 102 therefore packs one of the segment blocks containing the segment $S_6$ and $S_8$ data as was described in connection with FIGS. 4A–4D to provide a single segment block defining the segment $S_9$. The other segment $S_{10}$ appearing along the scan line $Y_6$ is the updated segment $S_7$.

Visibility of segments along the scan line $Y_6$ is determined by selecting sample spans as in the previous examples. The $X_{INT}$ coordinate of the intersection betwen the segments $S_9$ and $S_{10}$ are calculated along the scan line $Y_6$ and this information, together with the intersection information from the scan line $Y_5$, is used to calculate $\Delta X$ for the implied edge defined by the intersection. This implied edge may thereafter be updated for each new scan line and used as a sample point until it exits.

Figure 9:
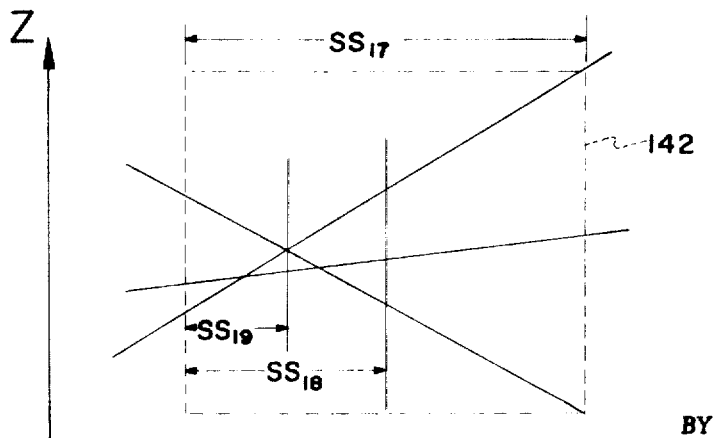
FIG. 9 is an X-Z plot of three overlapping segments along a scan line wherein all segments are visible within a selected sample span.

As was previously described, where two or more visible segments exist within a sample span and one or more edges of the segments are between the sample points, the sample span is subdivided at the leftmost edge existing therein. Where two visible segments exist within the sample span and no edges of the segments are between the sample points, the intersection technique is utilized since an intersection must exist. However, as is illustrated in FIG. 9, three or more visible segments having no edges between the sample points at which to subdivide the sample $SS_{17}$ may exist within the span. When this condition exists, the depth comparator sets a bit to indicate a visible box shown in phantom at 142. The decision processor notes the above condition and causes the sample span $SS_{17}$ to be subdivided by moving the right sample point to the middle of the sample span to form a new sample span $SS_{18}$. Since, in the example of FIG. 9, the above described condition still exists, the sample span $SS_{18}$ is divided in half to form the sample span $SS_{19}$. Only two visible segments exist in the sample span $SS_{19}$ and the intersection technique (since no edges exist between the sample points) may thereafter be utilized to determine the point of intersection for subsequent listing and displaying of the visible segments.

Each of the visible segments in the list of visible segments is associated with a particular polygon. As was previously described, the shading and color information associated with each polygon is stored in the corresponding polygon blocks. Having determined which segments are visible along each scan line, this shading and color information may be utilized to determine the relative illumination or apparent brightness of the visible polygon segments from a specified light source as well as to determine the coloring of the visible polygon segments in any suitable manner, e.g. in accordance with the teachings of the previously referenced Romney et al. application Ser. No. 802,702, or the Erdahl et al. application Ser. No. 40,647 filed on May 26, 1970.

For example, when utilizing the Erdahl et al. system to generate scanning signals from the visible segment data, the boundary required for the Erdahl et al. system would be defined by the leftmost edge of each visible segment. This boundary definition might include, for example, the initial point $(X_O, I_O)$, the inverse slope of the edge intensity $(\Delta I/\Delta X)$ and the number of raster points that the segment is visible. Alternatively, if a non-linear function is to be defined, each point of the display will be specified by an arbitrary value packed into data words following the boundary definition. These and other alternatives are discussed more fully in the Erdahl et al. application, the disclosure of which is hereby incorporated by reference.

Figure 10:
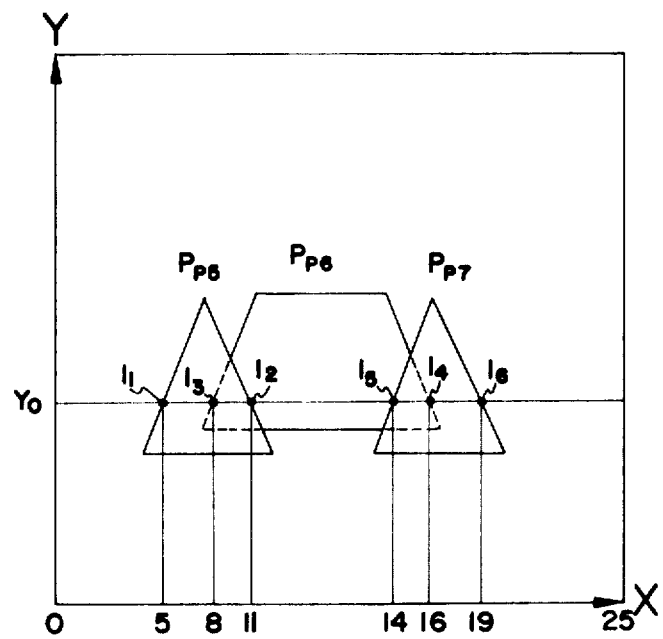
FIG. 10 is an X-Y plot of exemplary projected surfaces of a 3-D object on a 2-D view plane with a scan line shown thereon.

A specific example of a shading determination is graphically illustrated in FIG. 10 where three exemplary projected polygons $P_{P5}$, $P_{P6}$ and $P_{P7}$ are shown. Along a particular scan line, the visible segment data from the visible segment generator may include the end value XEND of each visible segment on a particular scan line, the X values $X_L$ and $X_R$ of the left and right edges of each segment on the scan line, and the intensity values $I_L$ and $I_R$ at the left and right edges of each segment on the scan line. For example, on the scan line Y in FIG. 10, the visible segment output data might be:

OUTPUT DATA

| Polygon | XEND | $X_L$ | $X_R$ | $I_L$ | $I_R$ |
|---|---|---|---|---|---|
| (Background) | 5 | – | – | – | – |
| $P_{P5}$ | 11 | 5 | 11 | $I_1$ | $I_2$ |
| $P_{P6}$ | 14 | 8 | 16 | $I_3$ | $I_4$ |
| $P_{P7}$ | 19 | 14 | 19 | $I_5$ | $I_6$ |
| (Background) | 25 | – | – | – | – |

The shader or display generator may then interpolate to find the intensity $I_X$ at any X value on the scan line in accordance with the following equation:

$$I_X = [(I_L - I_R)/(X_L - X_R)] (X - X_R) + I_R \quad (19)$$

Thus, if $X = 16$, the visible segment output data indicates that the polygon $P_{P7}$ is visible and, from the above equation:

$$I_X \text{ (at } X = 16) = [(I_5 - I_6)/(14 - 19)] (16 - 19) + I_6$$
$$= (I_5 - I_6)(3/5) + I_6$$

The coloring and shading determinations are then utilized to modify the raster scan of a display as by modulating the intensity of the electron beam in a cathode ray tube while maintaining a uniform scan rate or by maintaining a uniform beam intensity and varying the rate of scan, to generate a shaded or half tone perspective picture or image. As was pointed out in the Romney et al. application, provision may alternatively be made for providing arbitrary elimination of particular surfaces as well as providing various natural or arbitrary colors therefor. Moreover, a background may be provided to surround the generated image by controlling the display to produce a predetermined constant intensity for all points along each scan line where no visible segments exist.

The scanning of the display device takes place at either a constant rate or at a rate dependent upon the shading information. For example, the time required to scan one horizontal line on the display device may be in the microsecond range and may be equal for each scan line where a constant scanning rate is utilized. The rate at which the visibility of segments along each scan line is determined, and therefore the calculation time required for each scan line, may vary from line to line. To provide synchronism between the visibility computations and the scanning of the display device, a buffer storage device may be utilized as is subsequently described in greater detail.

Given the foregoing description, the previously described system for displaying perspective images of three dimensional objects may be implemented on a general purpose digital computer by one skilled in the programming art. However, because speed may be important in providing the display of an object, the preferred embodiment of the present invention is the hardwired, special purpose computer described hereinafter in connection with FIGS. 11–27.

DETAILED DESCRIPTION OF SYSTEM

Figure 11:
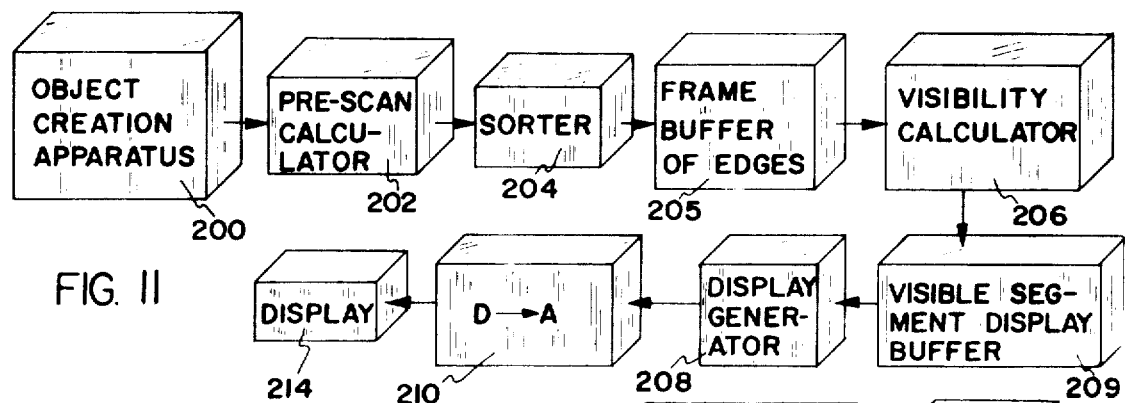
FIG. 11 is a functional block diagram of the overall system of the present invention.
Figure 12:
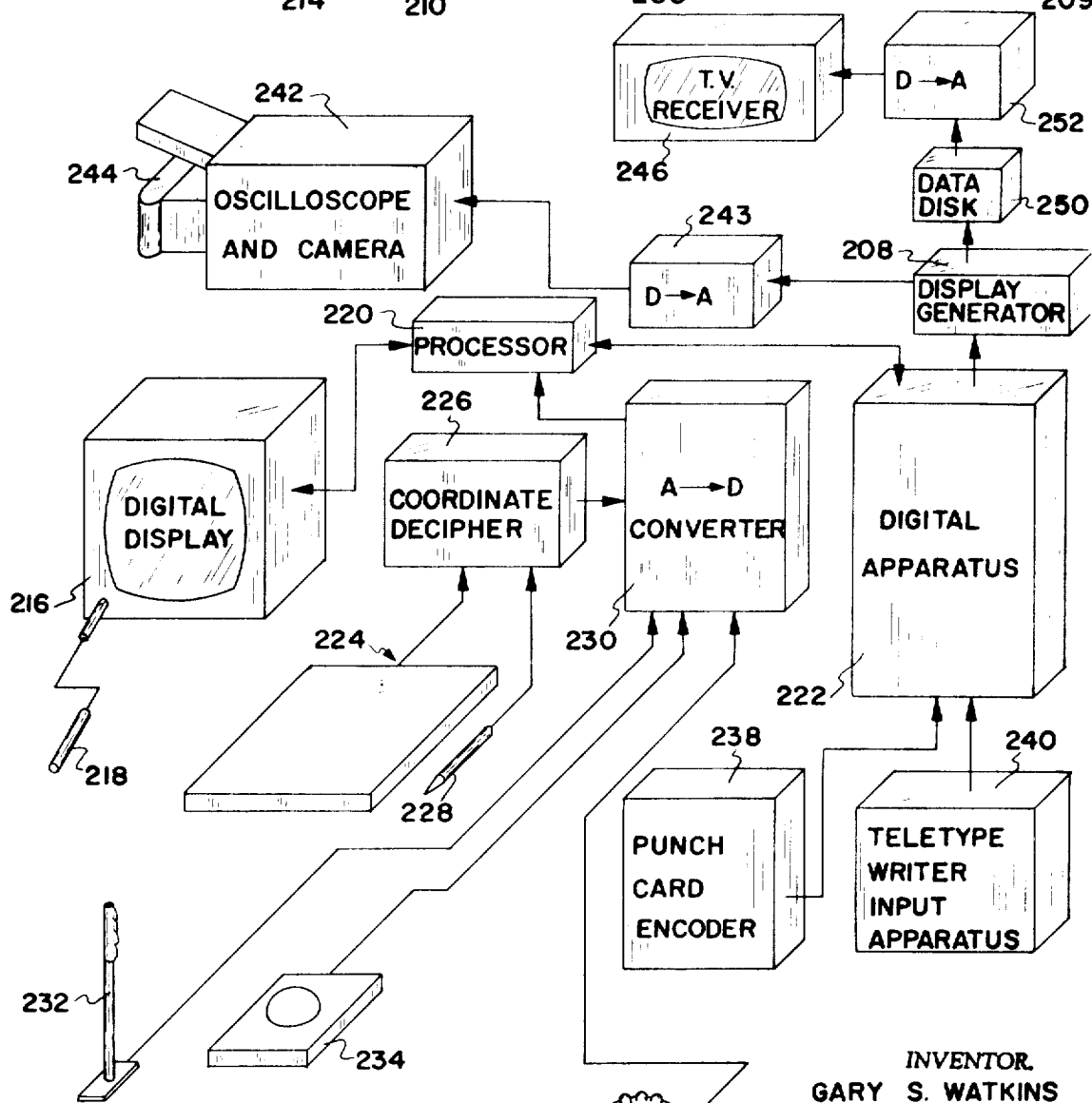
FIG. 12 is a functional block diagram of the system of FIG. 11 showing in greater detail various data input and output devices which may be utilized therewith.

A functional block diagram of the system of the present invention is illustrated in FIG. 11. An object creation apparatus 200 generates sets of electrical signals defining the surfaces of the three dimensional object or objects to be displayed as well as the position of the observer or eye point relative to a three-dimensional coordinate system. The object creation apparatus may include many different devices, as are hereinafter described, which allow the operator to supply sets of electrical signals defining a plurality of surfaces representative of the three-dimensional object to the remaining equipment. These surfaces are preferably convex or non-convex planar polygons bounded by relatively straight lines.

The signals representative of the planar polygons defining the 3-D object are applied to a prescan calculator 202. The prescanning calculator 202 calculates the various projected polygon edge information, e.g. X begin, Y begin, Y end $\Delta X$ and $\Delta Z$, and places this edge information into the edge blocks previously described.

The edge block signals from the prescan calculator 202 are applied to a sorter 204. The sorter 204 orders the edge block signals in accordance with the scanning pattern of the display and places these signals into an ordered list for subsequent use in determining the visibility of the projected polygons.

The ordered signals from the sorter 204 are applied through a suitable buffer 205 to a visibility calculator 206 which utilizes the edge block signals to determine the visibility of the projected polygons to an observer viewing the projected object from a predetermined eye point. The edge block signals are utilized to generate segment signals defining the segments of the projected polygons which appear along the current scan line. These segment signals are ordered in a polygon segments list with all segments associated with each polygon appearing along the current scan line ordered in X. For example, a particular polygon $P_{PA}$ may have three segments associated therewith along the current scan line. These three segments would be ordered in X and tagged as belonging to the polygon $P_{PA}$.

The visibility calculator 206 also checks all segments entering or exiting on the current scan line to insure the correct packing of segment blocks and creates an X-sort list of all segment blocks along the current scan line ordered in X. The visibility calculator 206 then calculates the visibility of the various segments in the X sort list defined by the segment blocks by determining the relative depths of the segments between selected sample points along each scan line. The segments determined to be visible are listed in accordance with the scanning pattern of the display.

The signals defining the visible segments are buffered in a visible display buffer 209 and then applied to a display generator 208. The display generator 208 calculates intensity parameters and color parameters for each visible segment, as previously described. These intensity and color parameters are then fed through a digital to analog converter 210 to a display device 214 to create the desired two-dimensional perspective view of the three-dimensional object.

The display device 214 is a cathode ray tube or the like display upon which a raster pattern scan is created. The display 214 may be a conventional oscilloscope requiring a time delay photograph to be taken to reproduce the shaded perspective view in full, or may be a modified TV type picture tube requiring the insertion of a buffer 212 to receive the display signals from the display generator 208 at one speed and to supply them to the television intensity and color circuits via the display generator 208, and the digital to analog converter 210 at the necessary speed.

As was previously mentioned, any number of suitable conventional devices may be utilized for the object creation apparatus 200 and the display 214. Referring to FIG. 10, the object creation apparatus may include any or all of the plurality of devices. Object description signals may be provided through the use of a CRT display 216, having an optical pen 218. This type of display may be, for example, a Model No. CM 10093 available through Information Displays Inc., Mount Vernon, N.Y.

The optical pen 218 is used to call up any one or more of various predescribed objects from a processor 220 which includes a memory and may be a Model PDP–10 available through Digital Equipment Corporation, Maynard, Mass. The object description signals from the process 220 are then fed to the digital apparatus 222, which for convenience, represents the prescan calculator 202, the sorter 204, the visibility calculator 206 and the display generator 208 of FIG. 9 in addition to a memory hereinafter described.

Another means for supplying sets of electrical signals representative of the 3-D object may comprise an electronic data assembly which includes a tablet 224, a coordinate decipher 226 and an electronic pen 228. The position of the pen 228 relative to the tablet 224 is sensed and the coordinate decipher 226 provides analog output signals which are applied to an A-D converter 230 which in turn converts the signals to digital signals and applies them to the processor 220. The electronic tablet assembly may be a Sylvania Data Tablet Model DT 1 available through Sylvania Electronic System of Walton, Mass. The A-D converter 230 may be a ten bit model A801 available through Digital Equipment Corporation of Maynard, Mass.

The input data called by the display 216 or by the electronic tablet assembly may also be selectively rotated and/or translated by means of either a joy stick 232, a socket ball 234 or a pressure handle 236. All of these devices are analog transducers which convert the physical movement applied thereto into analog electrical signals which are fed to the A-D converter 230 for subsequent processing. The joy stick 232 and the pressure handle 236 may be Model Nos 437 and 327, respectively, available through Measurement Systems Inc. of Norwalk, Conn. The socketed ball 234 may be of the type available through Romney Engineering and Manufacturing Co. of Salt Lake City, Utah.

Object description data may also be supplied to the digital apparatus 222 in digital form by a punch card encoder 238 or a teletypewriter, input apparatus 240. The punch card encoder 238 may be, for example, a Model 1004 available through the Univac Division of Sperry Rand and the teletypewriter 240 may be a model 35 C available through the Teletype Corporation, Skokie, Ill.

The output signals from the digital apparatus 222 may be applied to any number of suitable conventional display devices which are known in the art and described in the previously identified Romney et al. application. For example, an oscilloscope 242 and camera 244 or a TV receiver 246 may be utilized.

Figure 13:
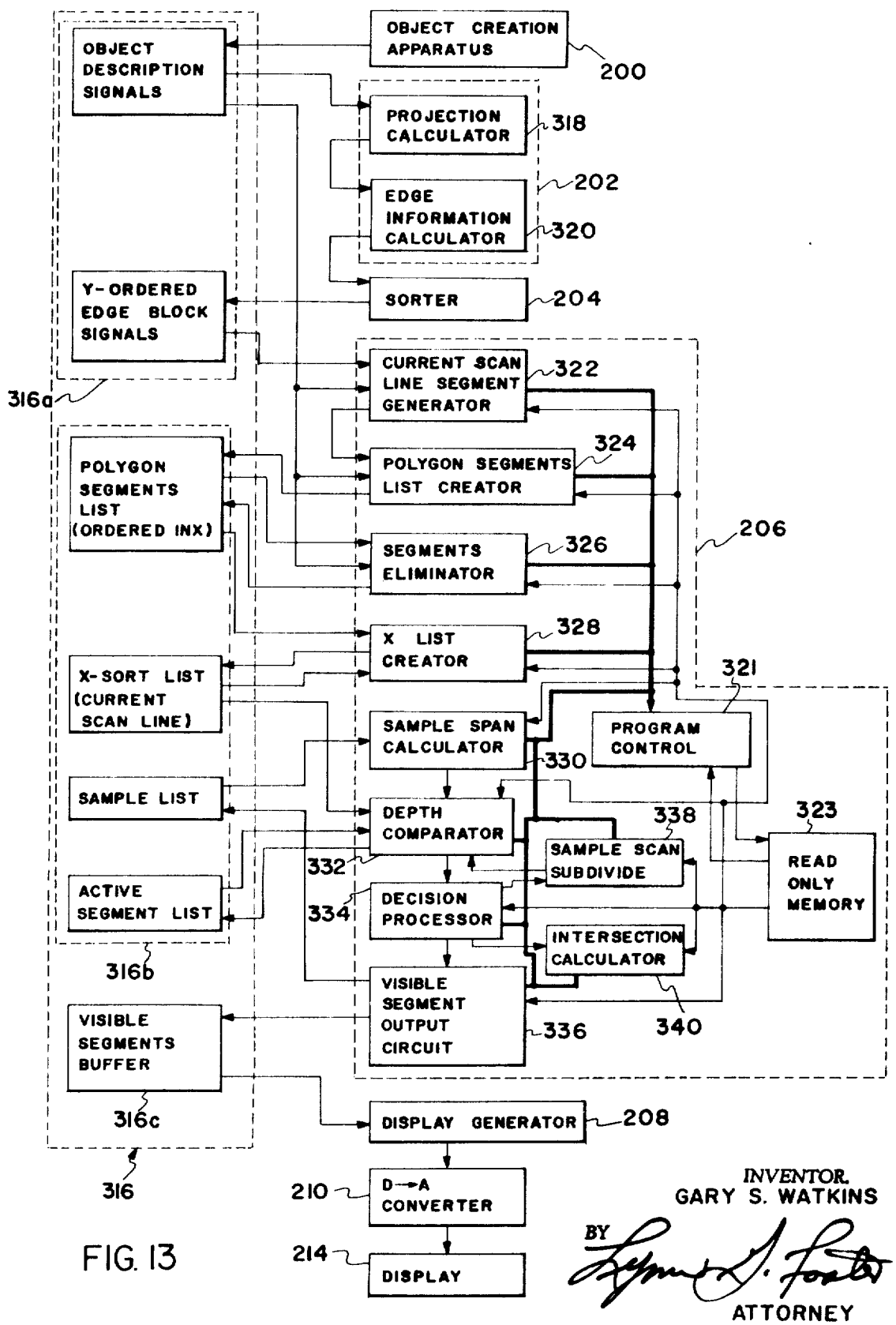
FIG. 13 is a more detailed functional block diagram of the system of FIG. 11.
Figure 14:
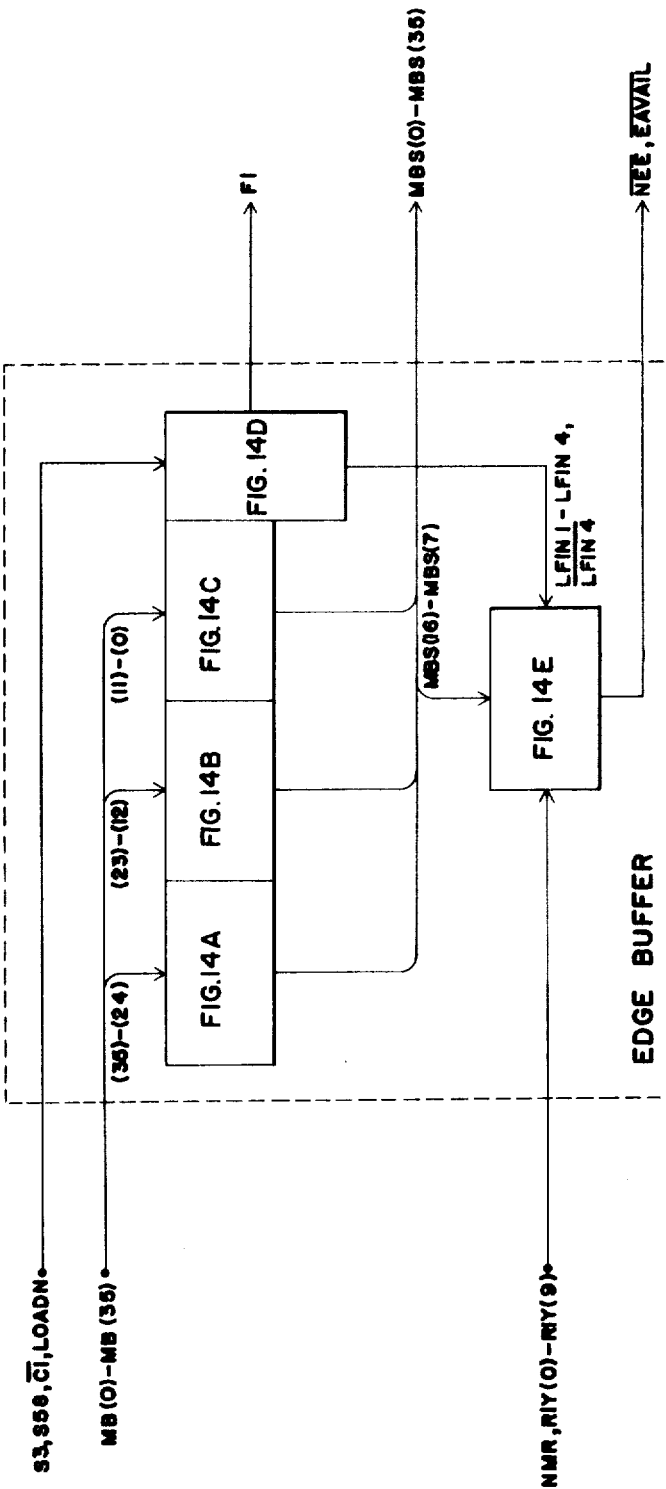
Figure 14:
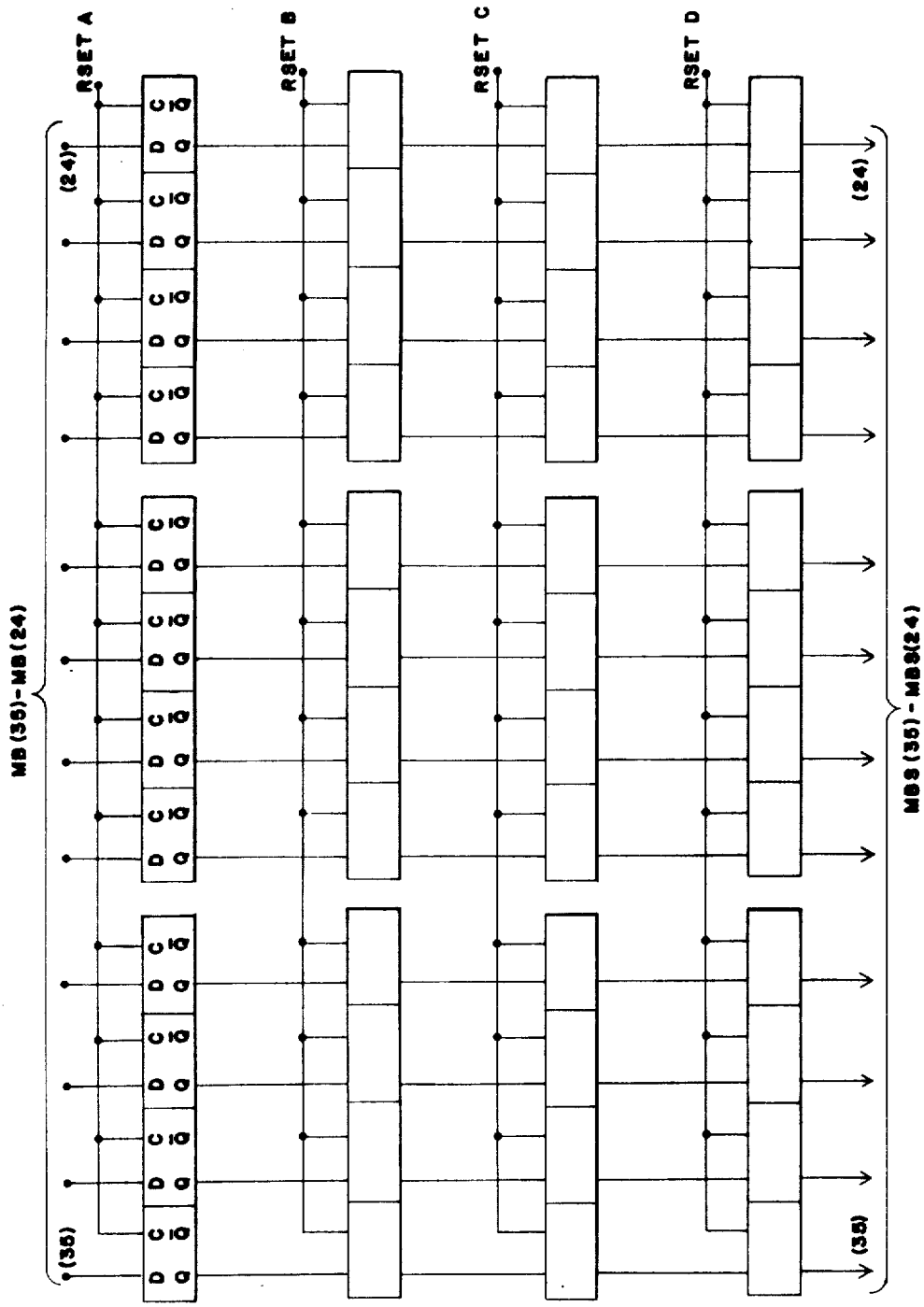
Figure 14B:
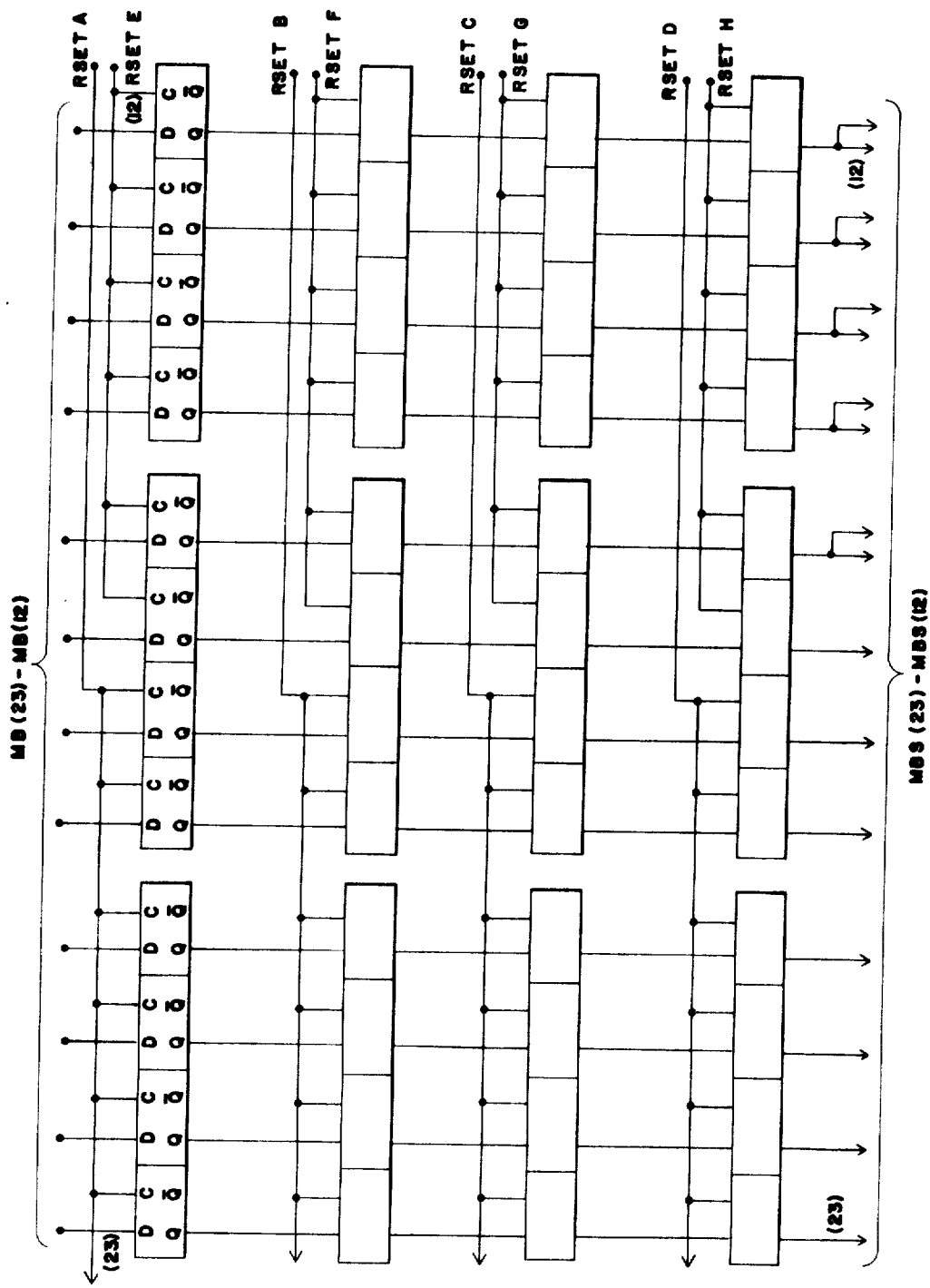
Figure 14C:
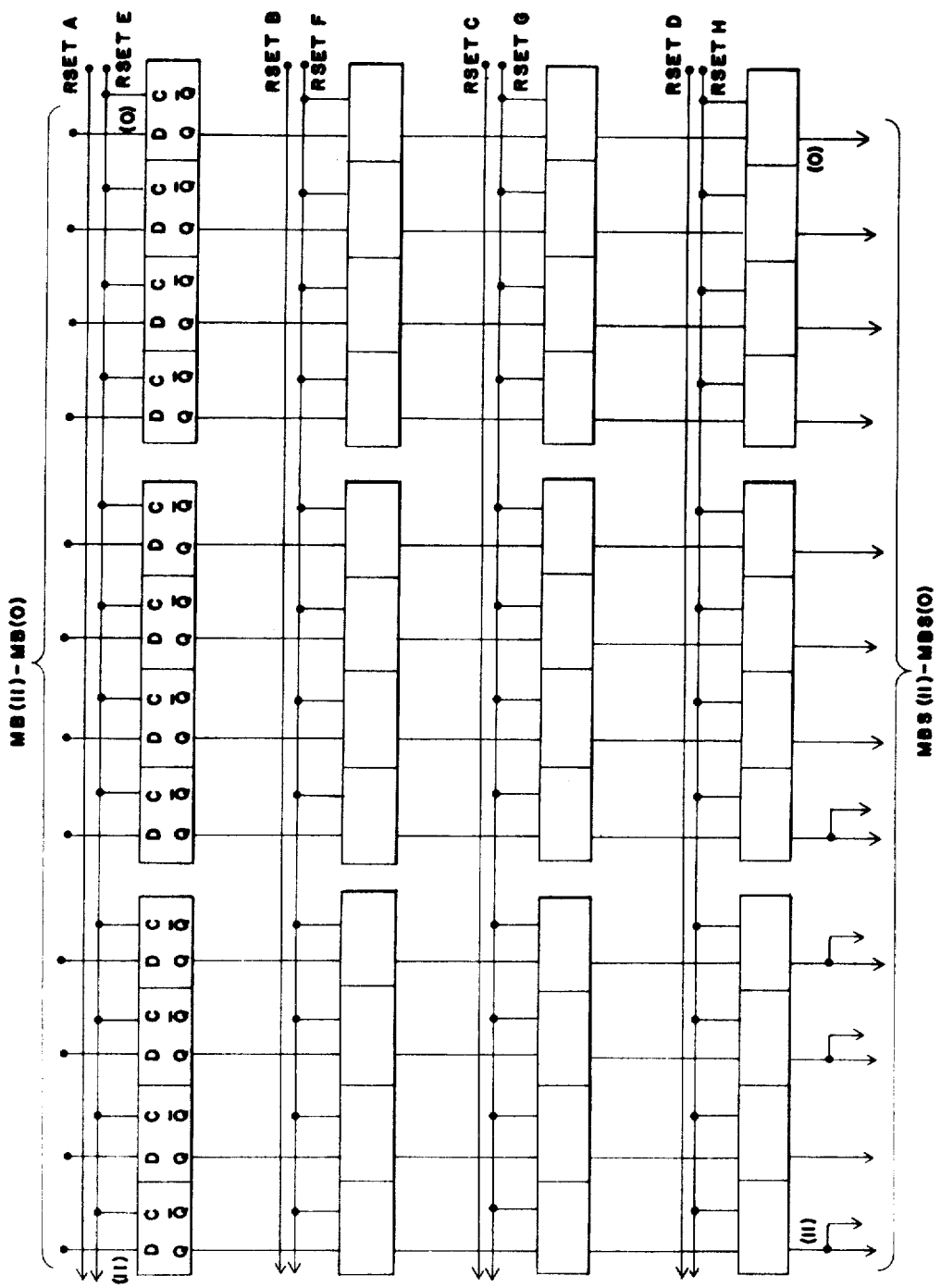
Figure 14D:
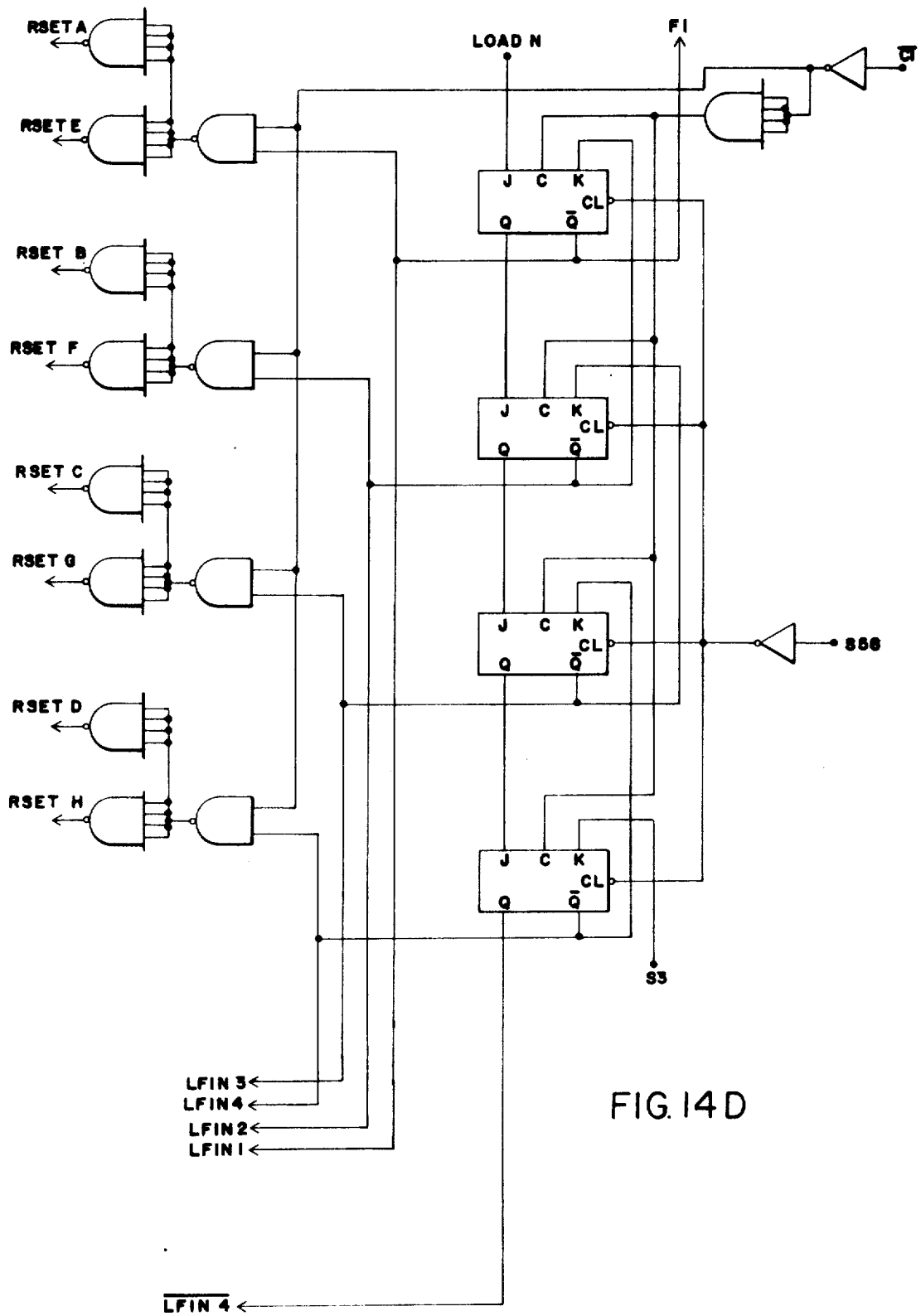
Figure 14E:
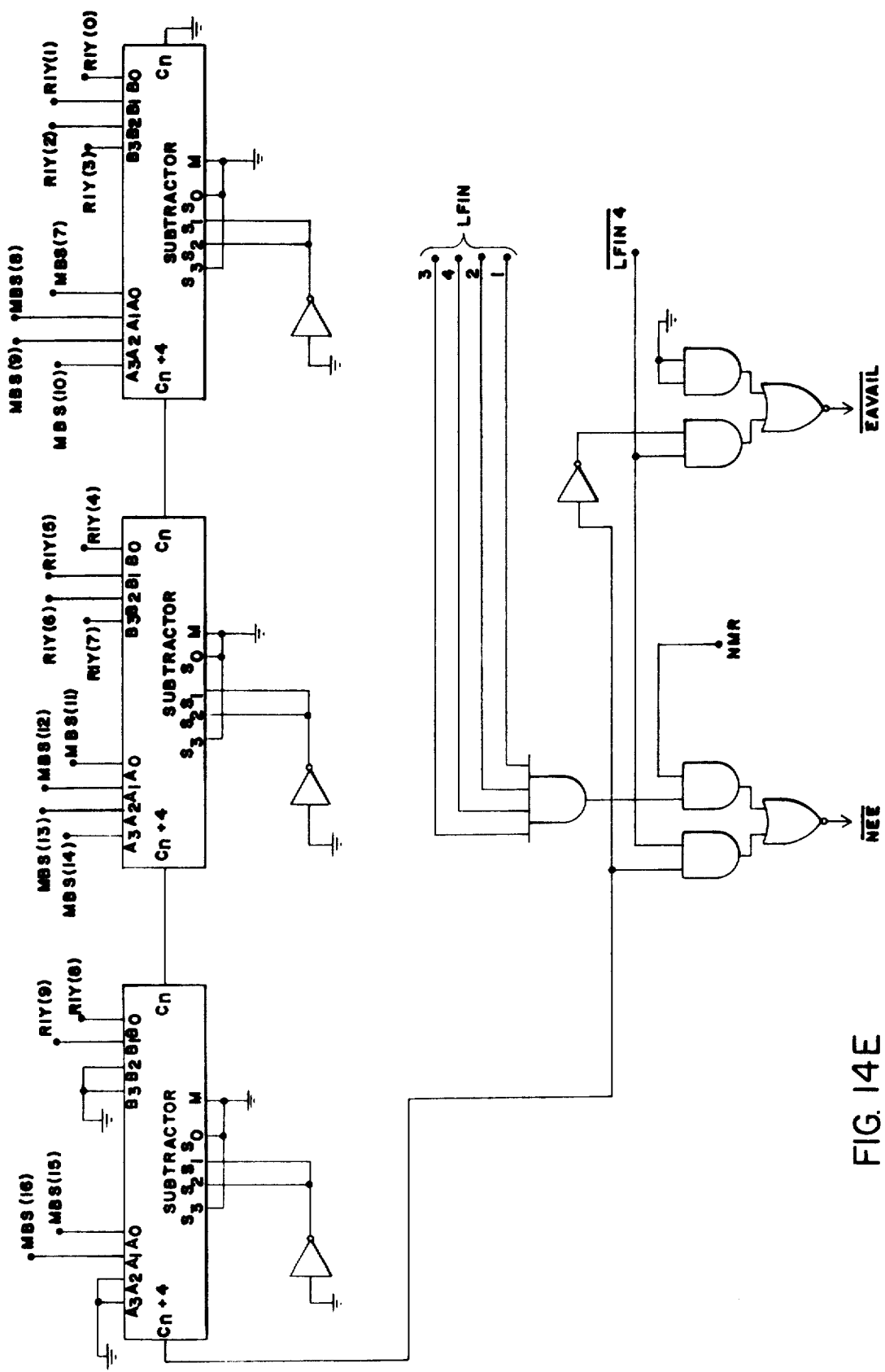
Figure 15:
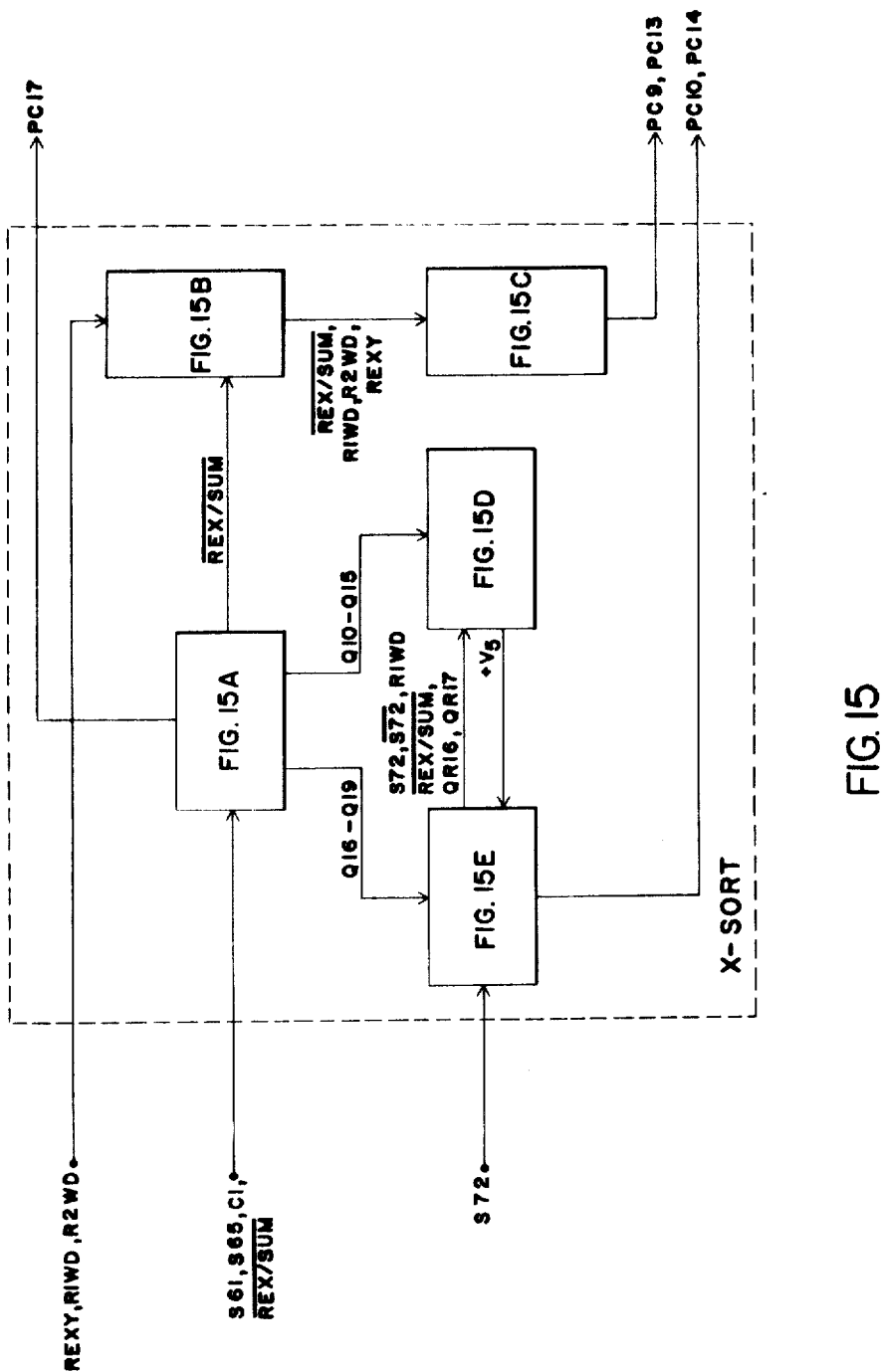
Figure 15A:
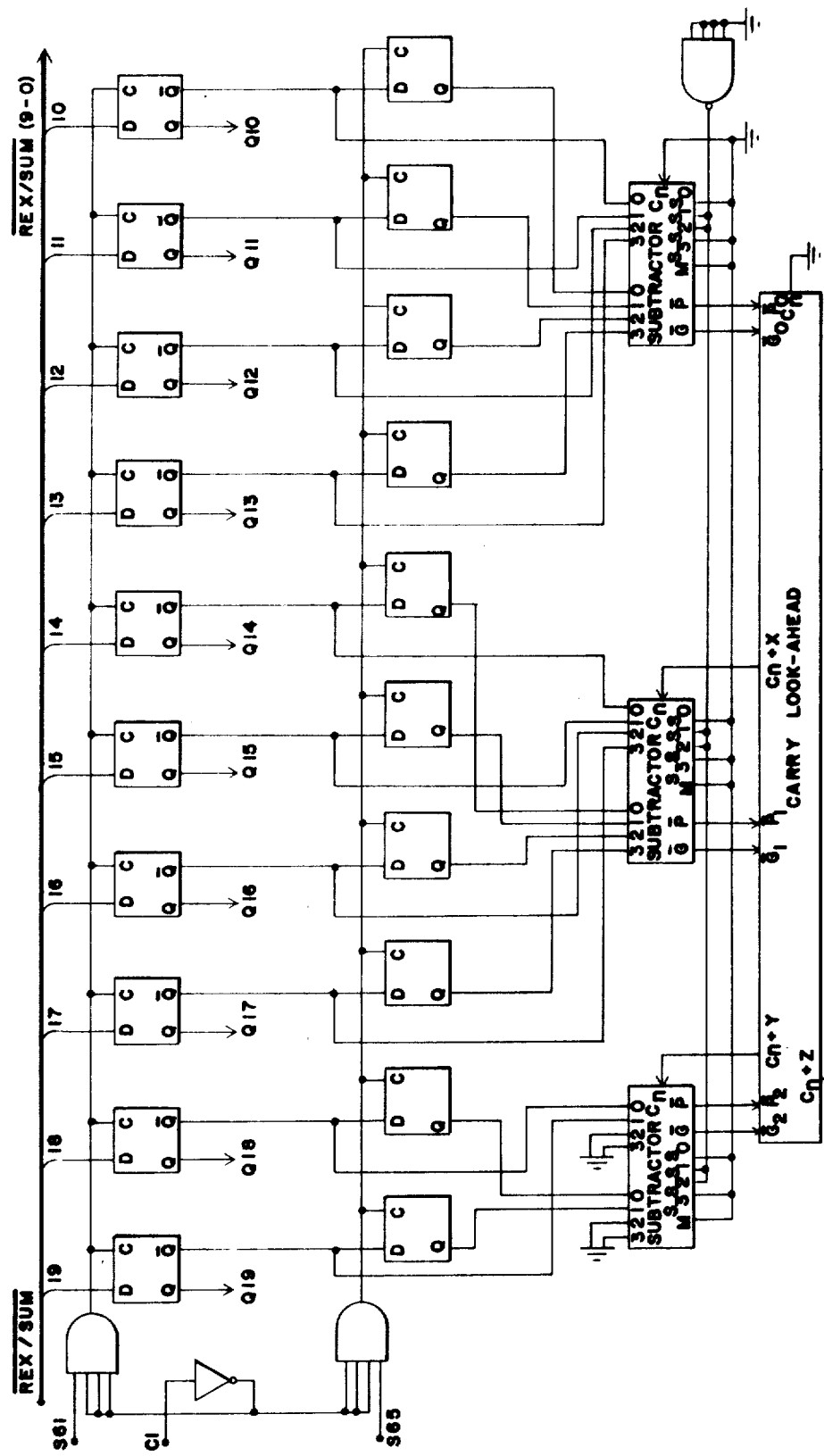
FIGS. 15A–15E are related.
Figure 15B:
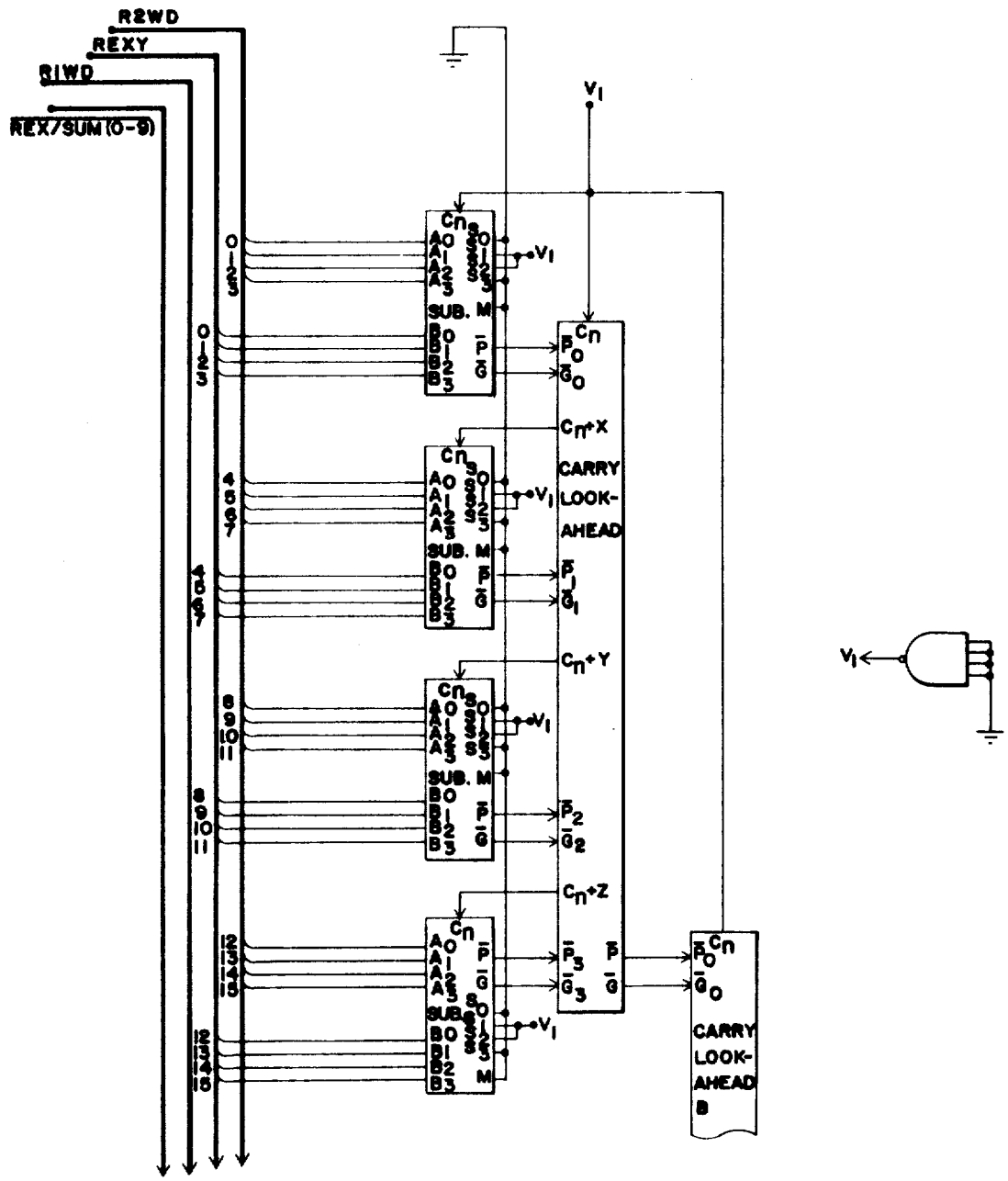
Figure 15C:
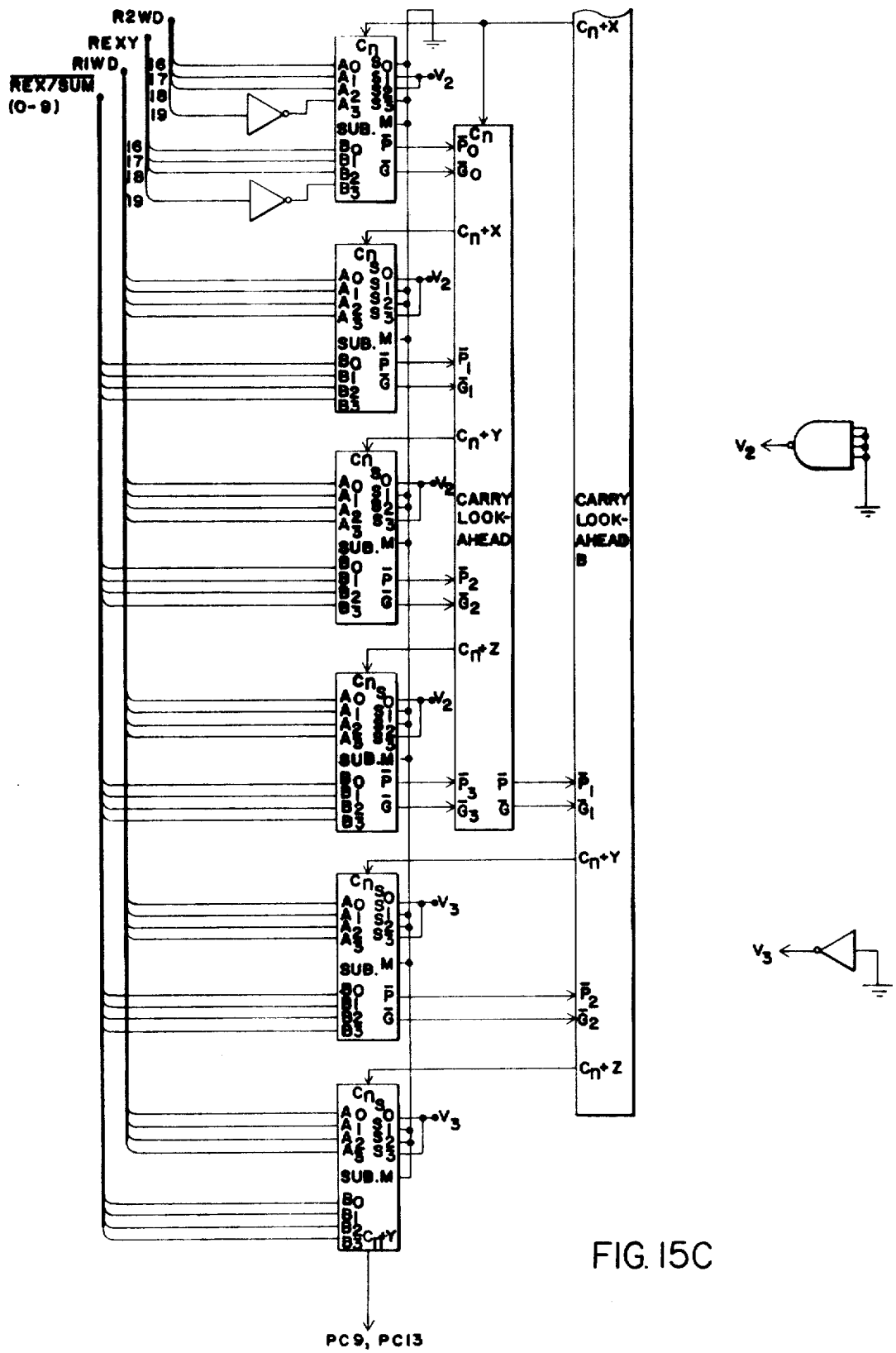
Figure 15D:
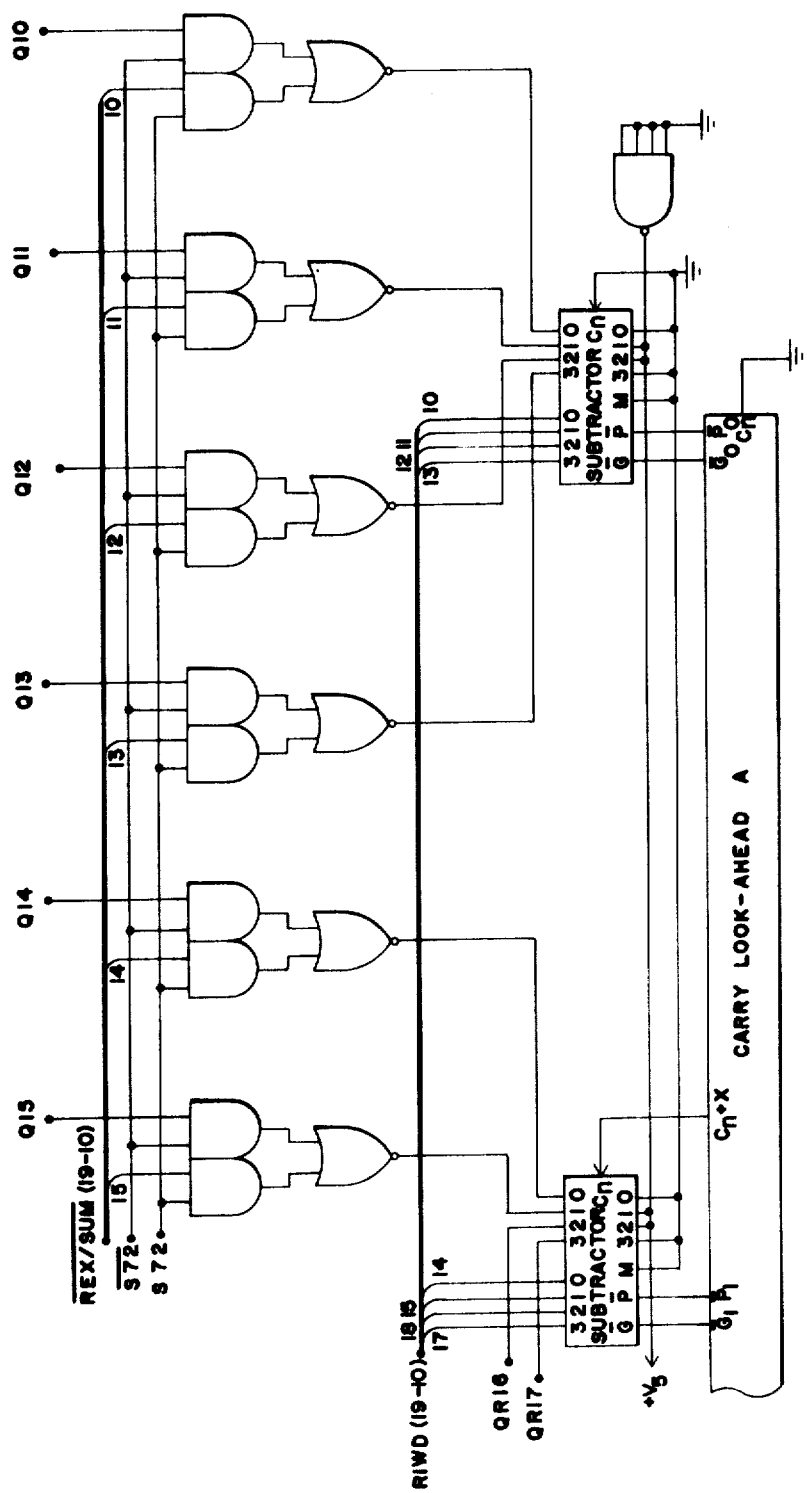
Figure 15E:
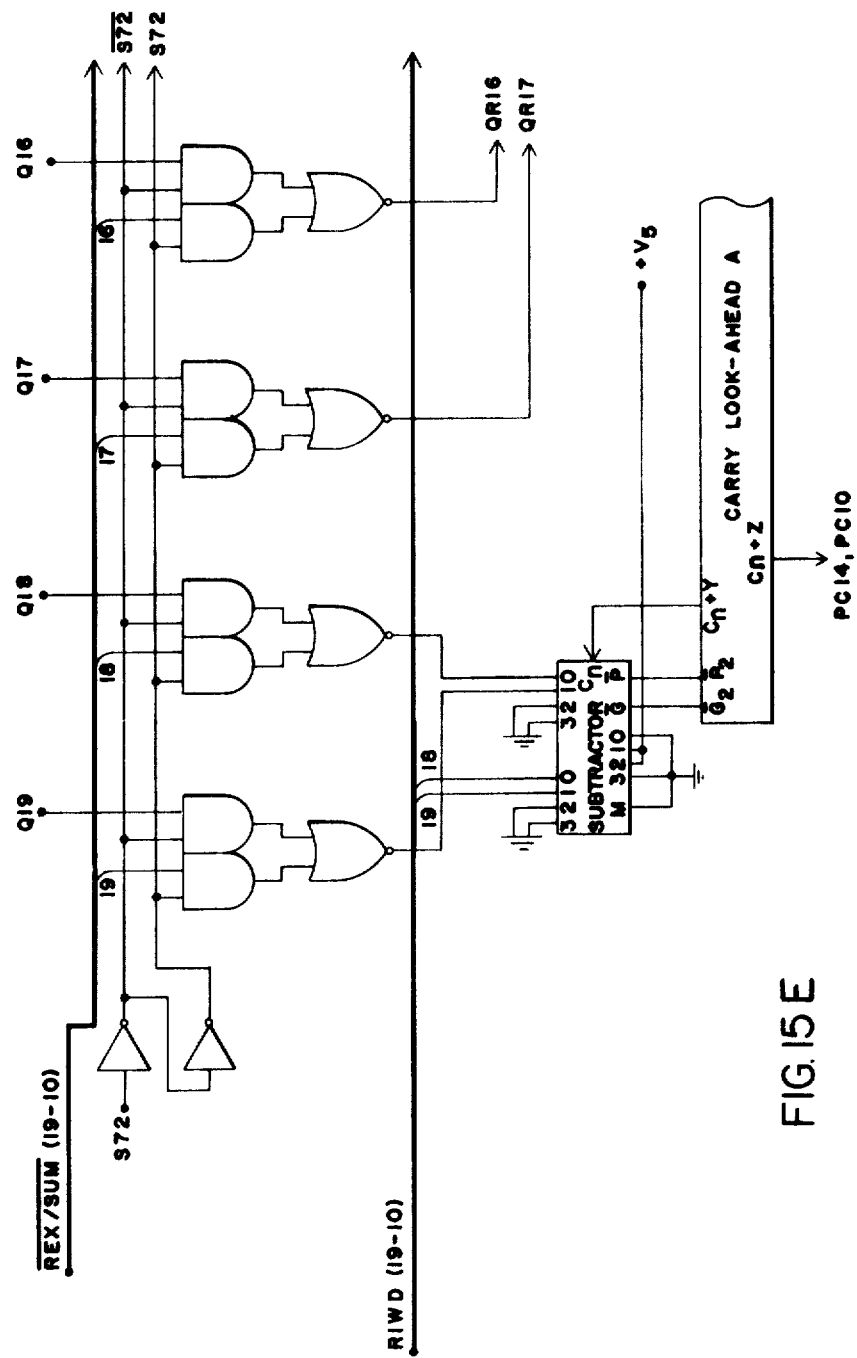
Figure 16:
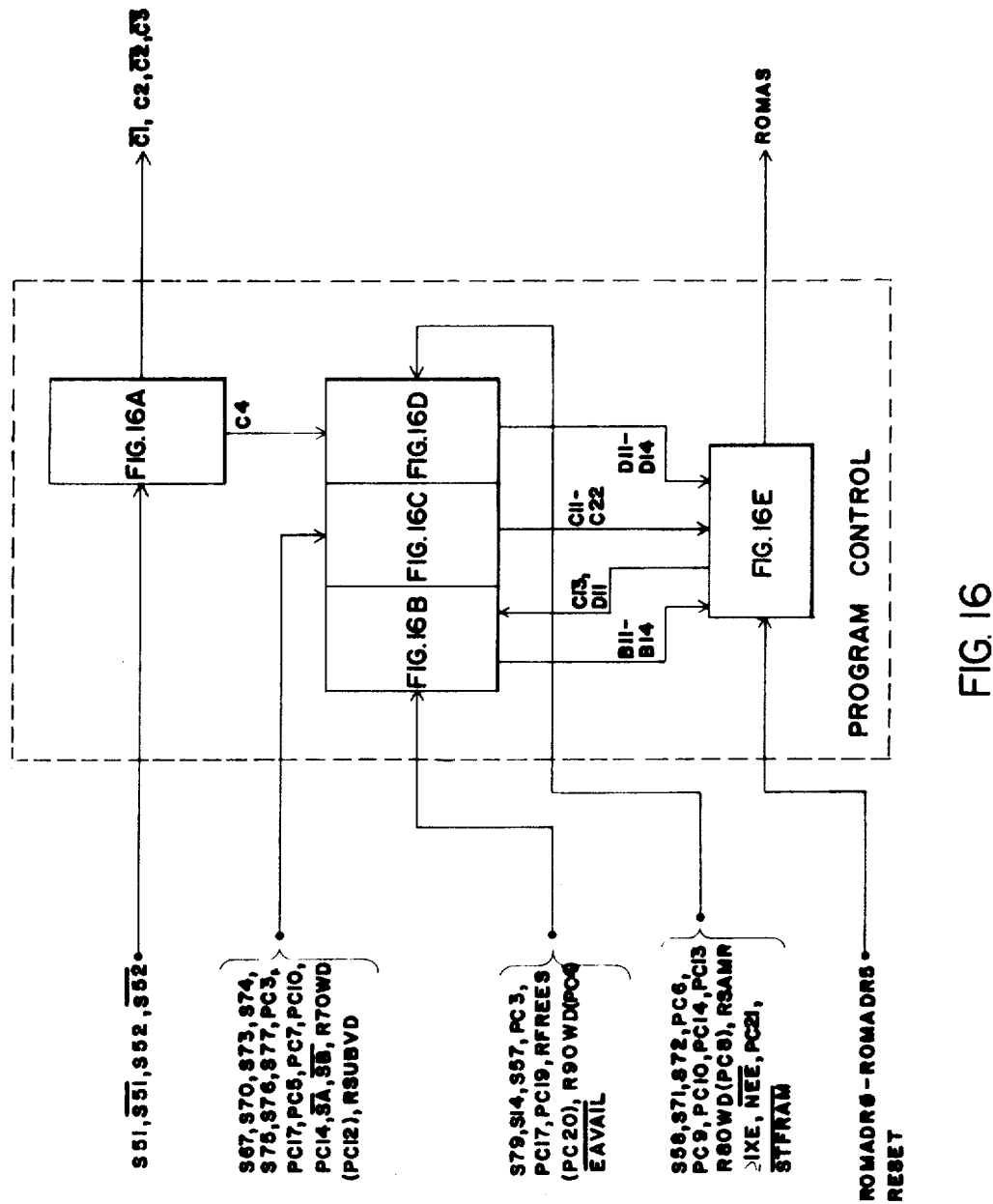
Figure 16A:
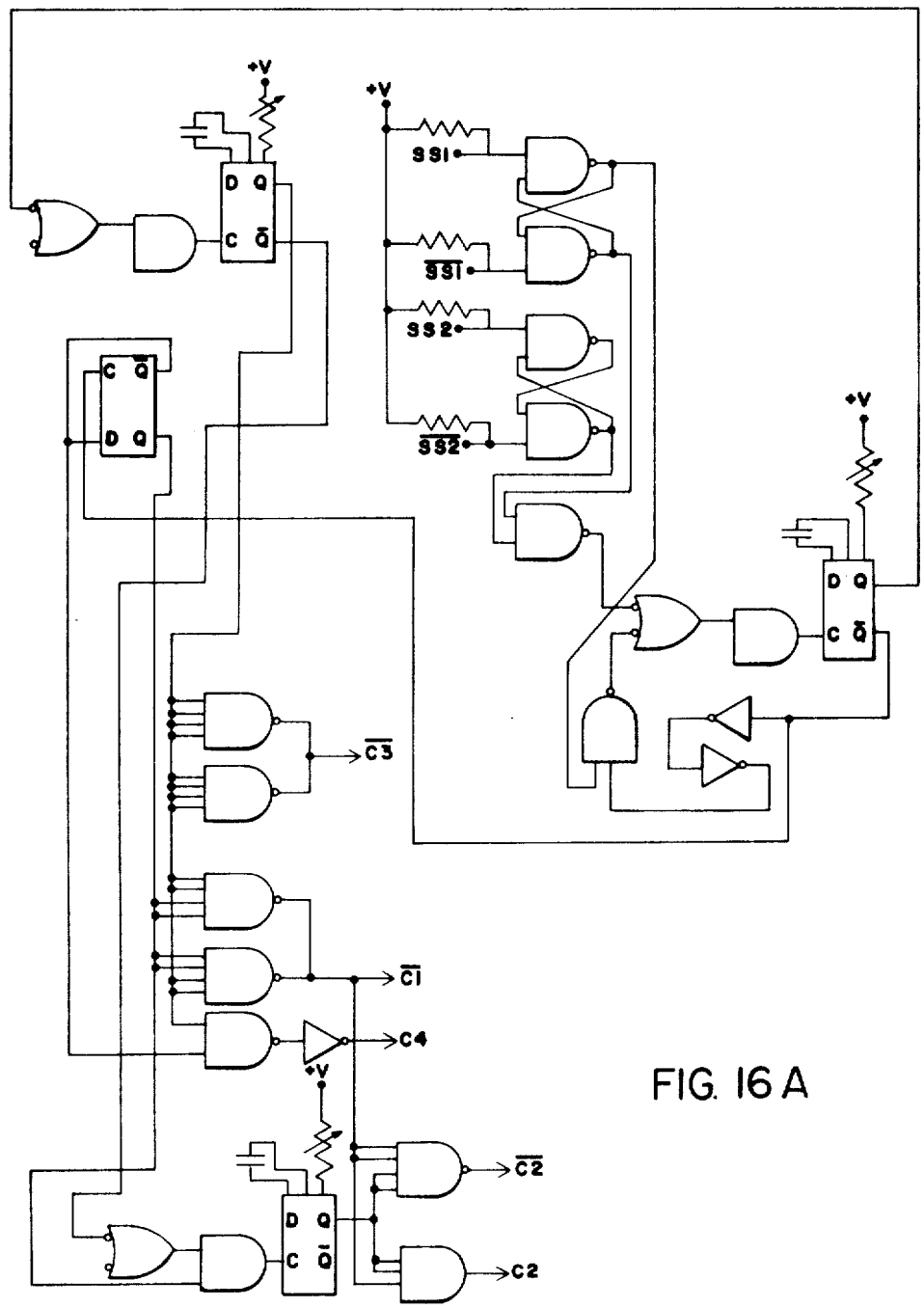
FIGS. 16A–16E are related.
Figure 16B:
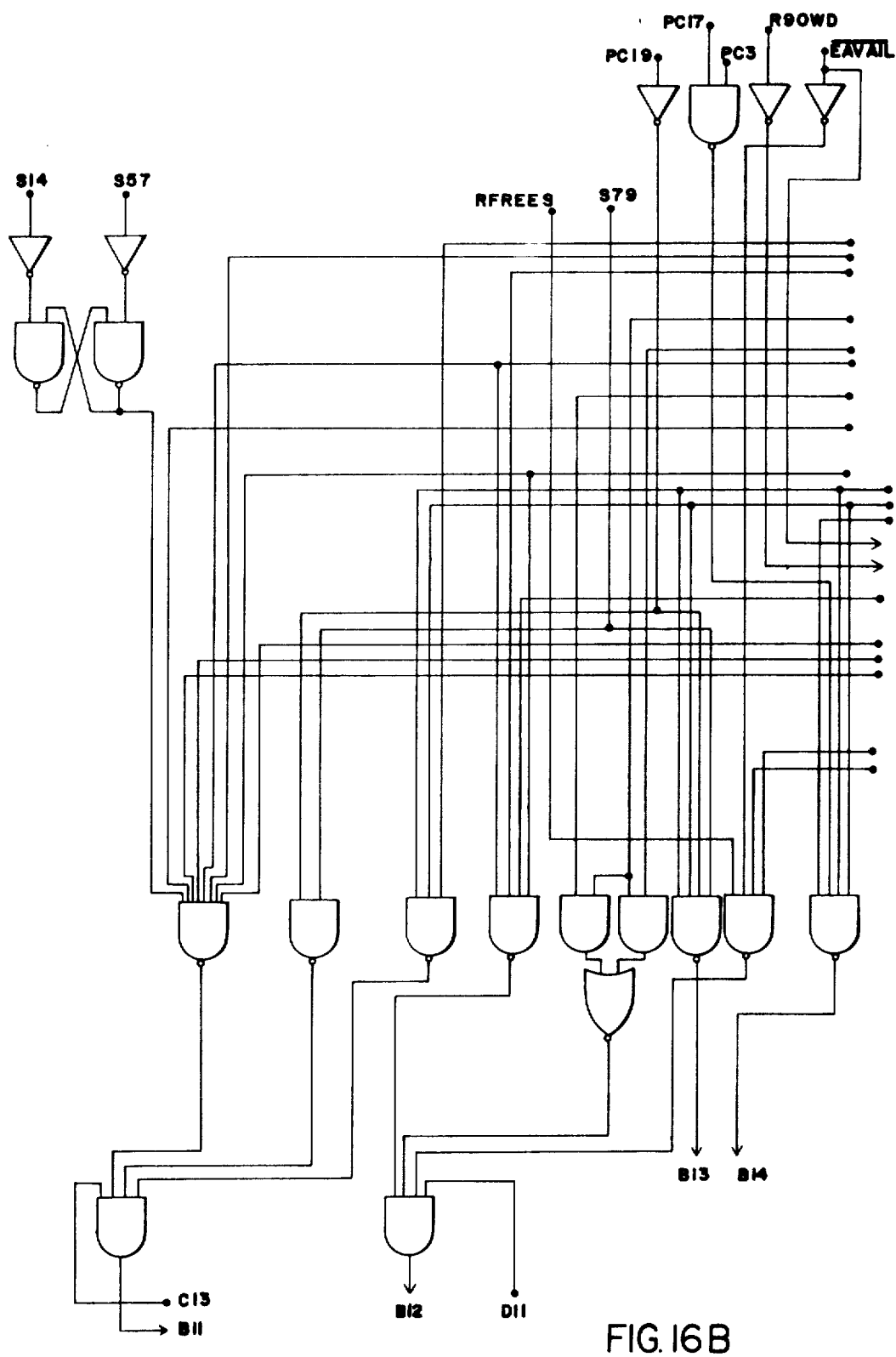
Figure 16C:
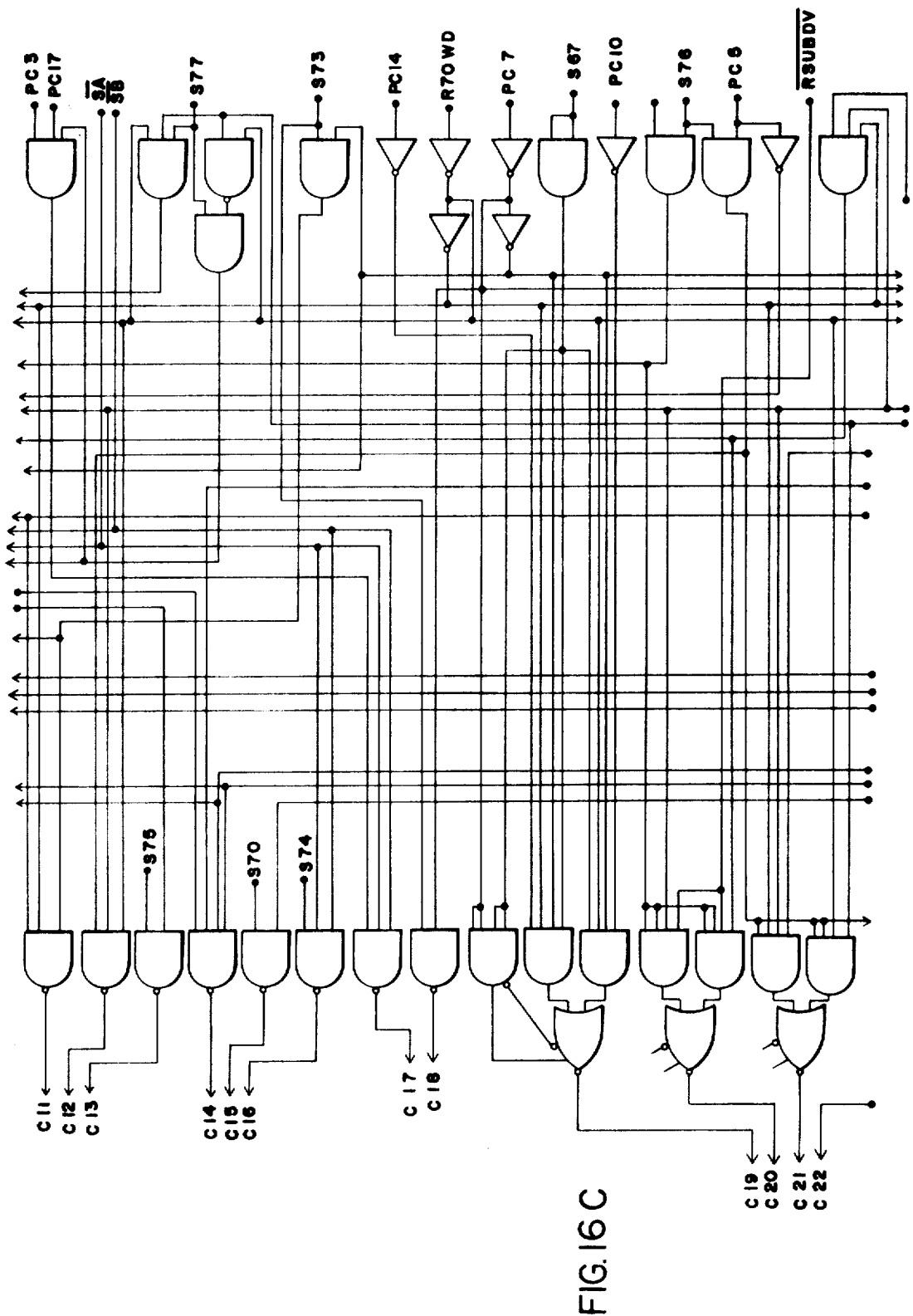
Figure 16D:
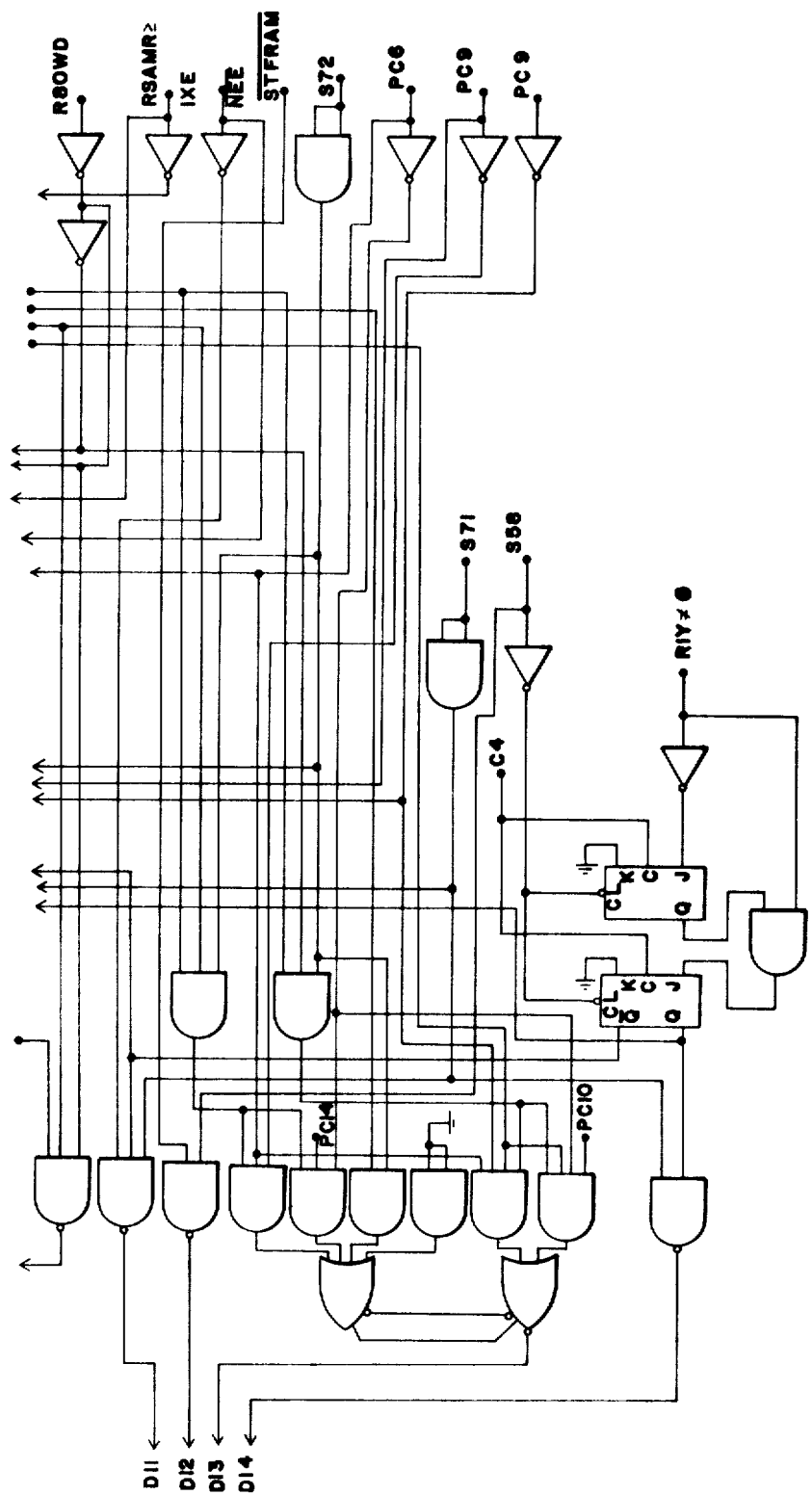
Figure 16E:
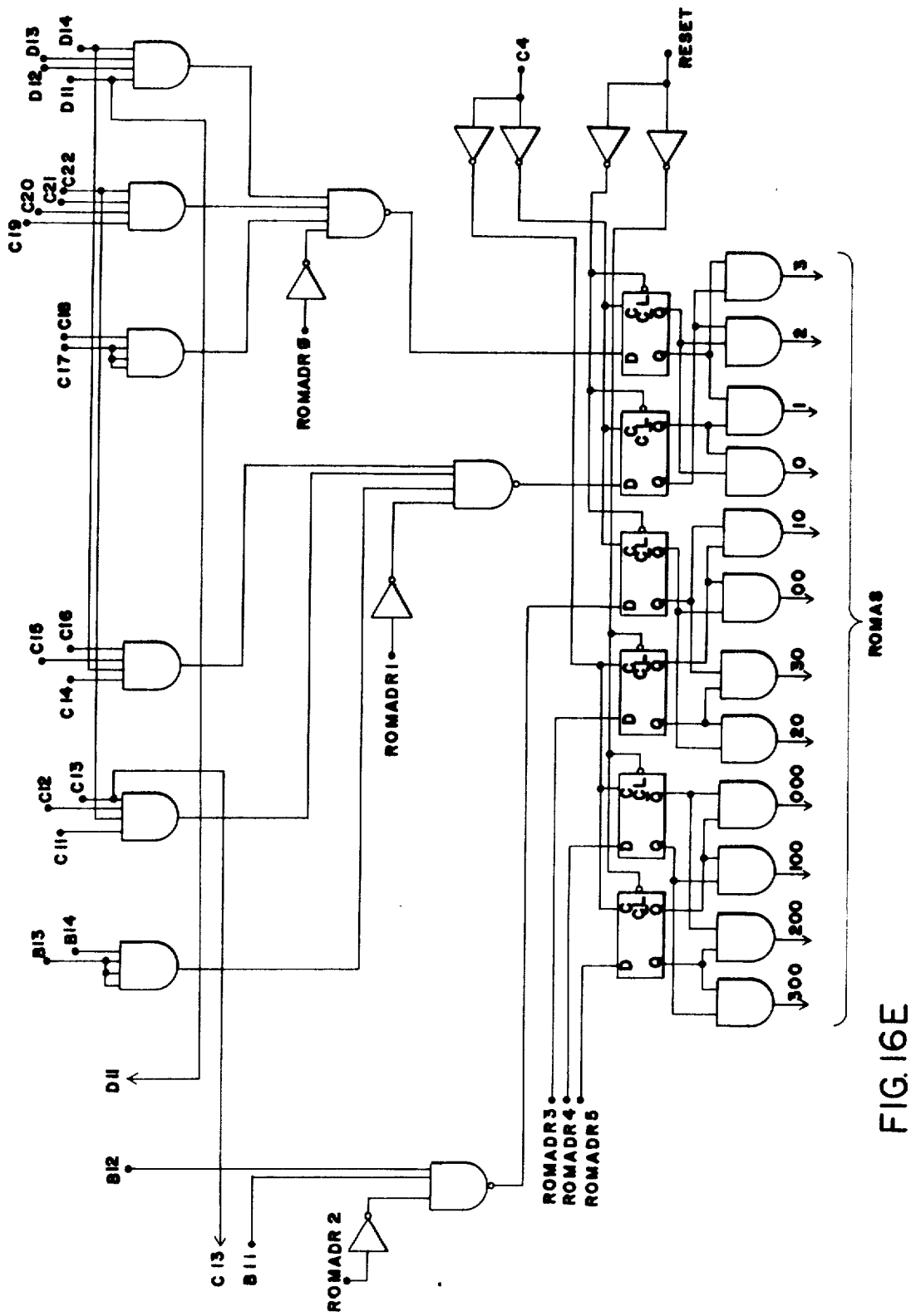
Figure 17A:
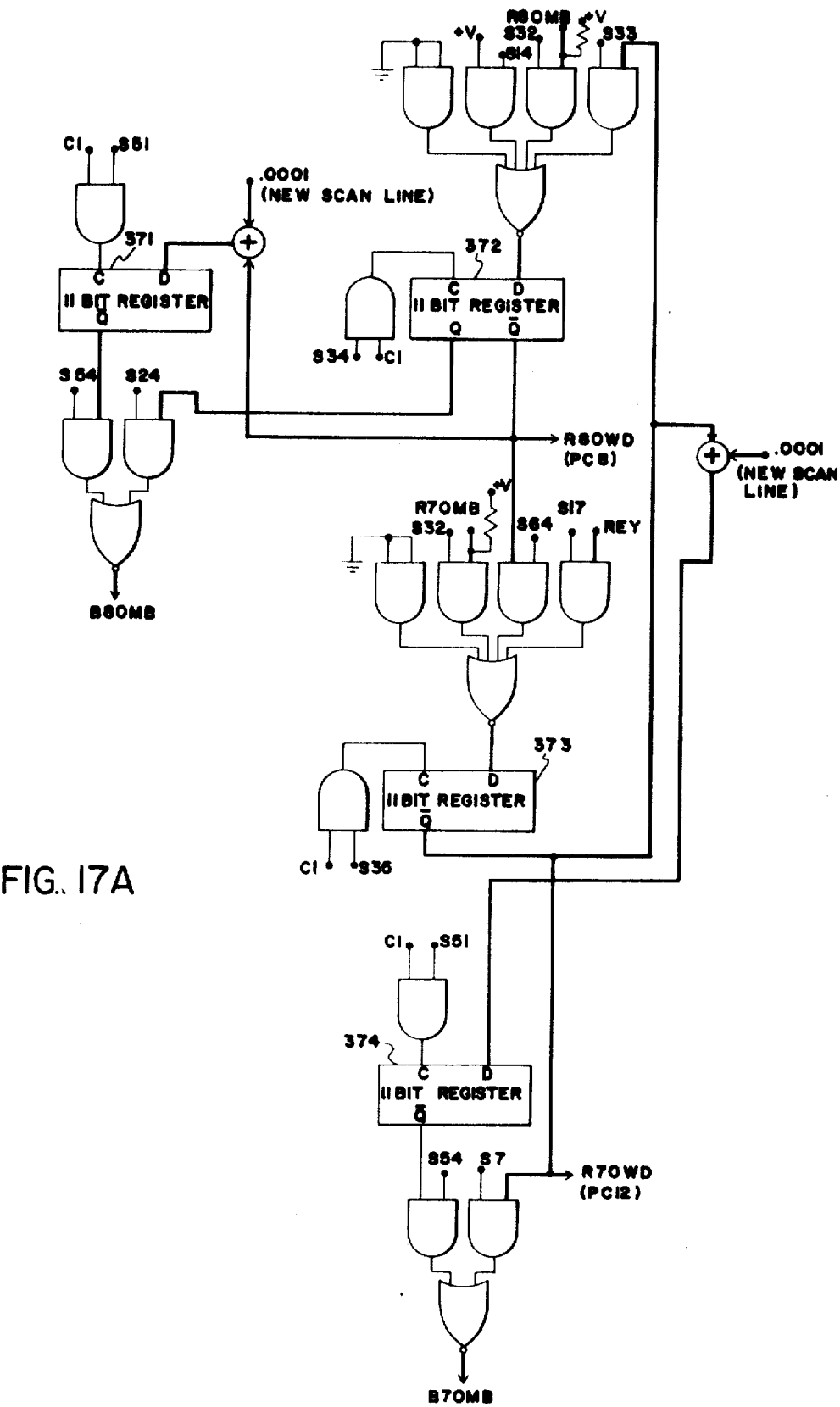
Figure 17C:
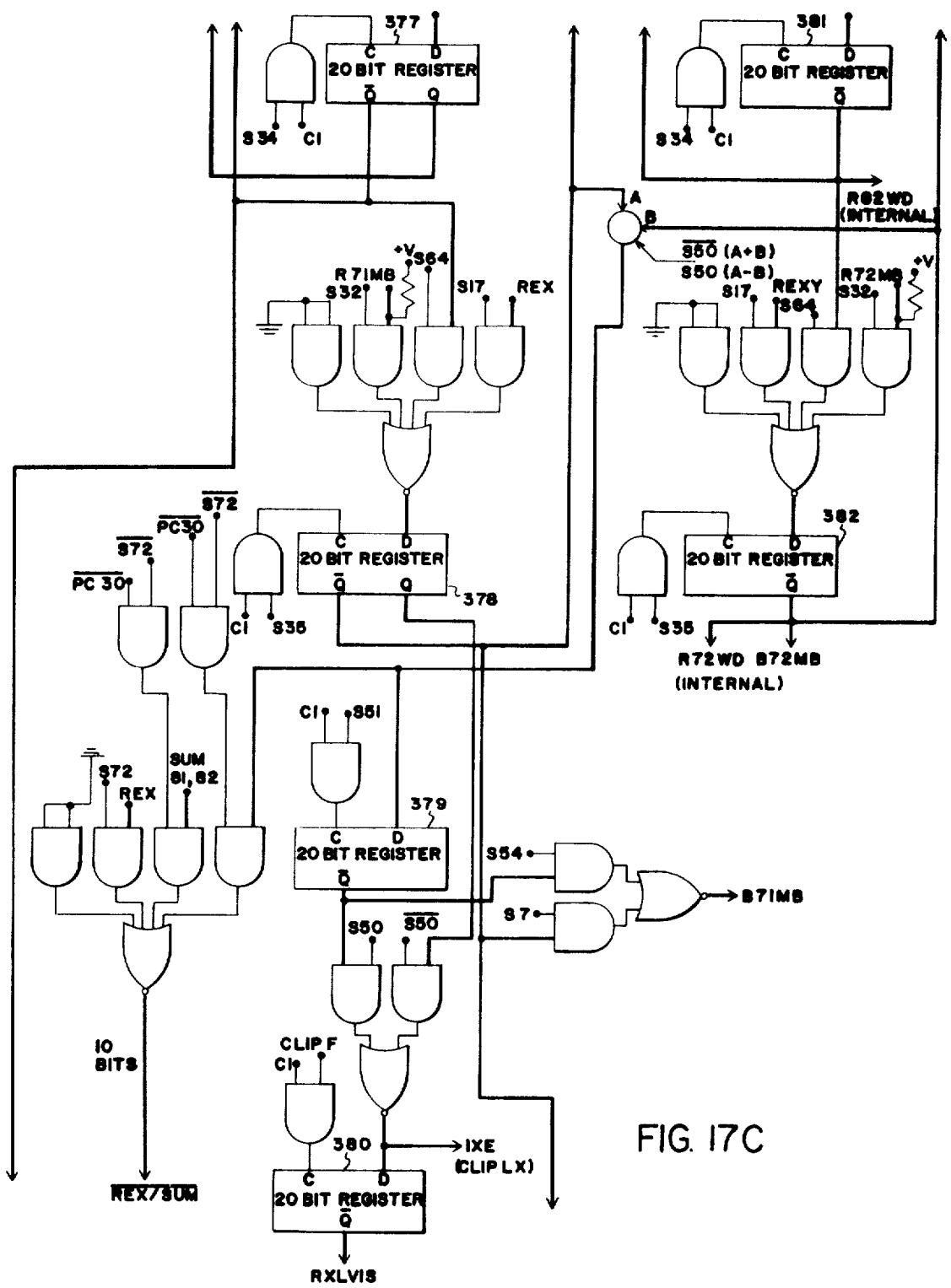
Figure 17D:
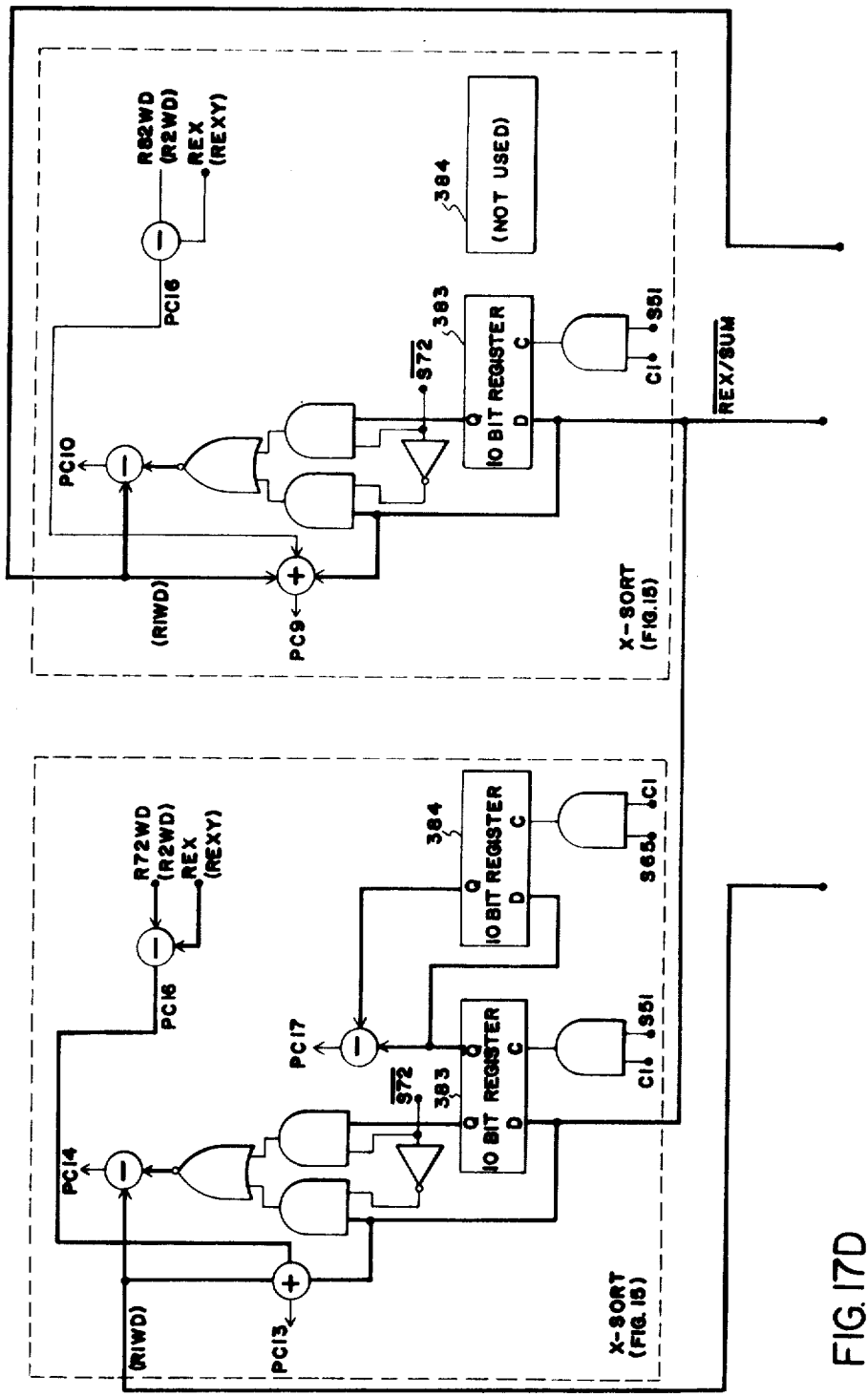
Figure 17E:
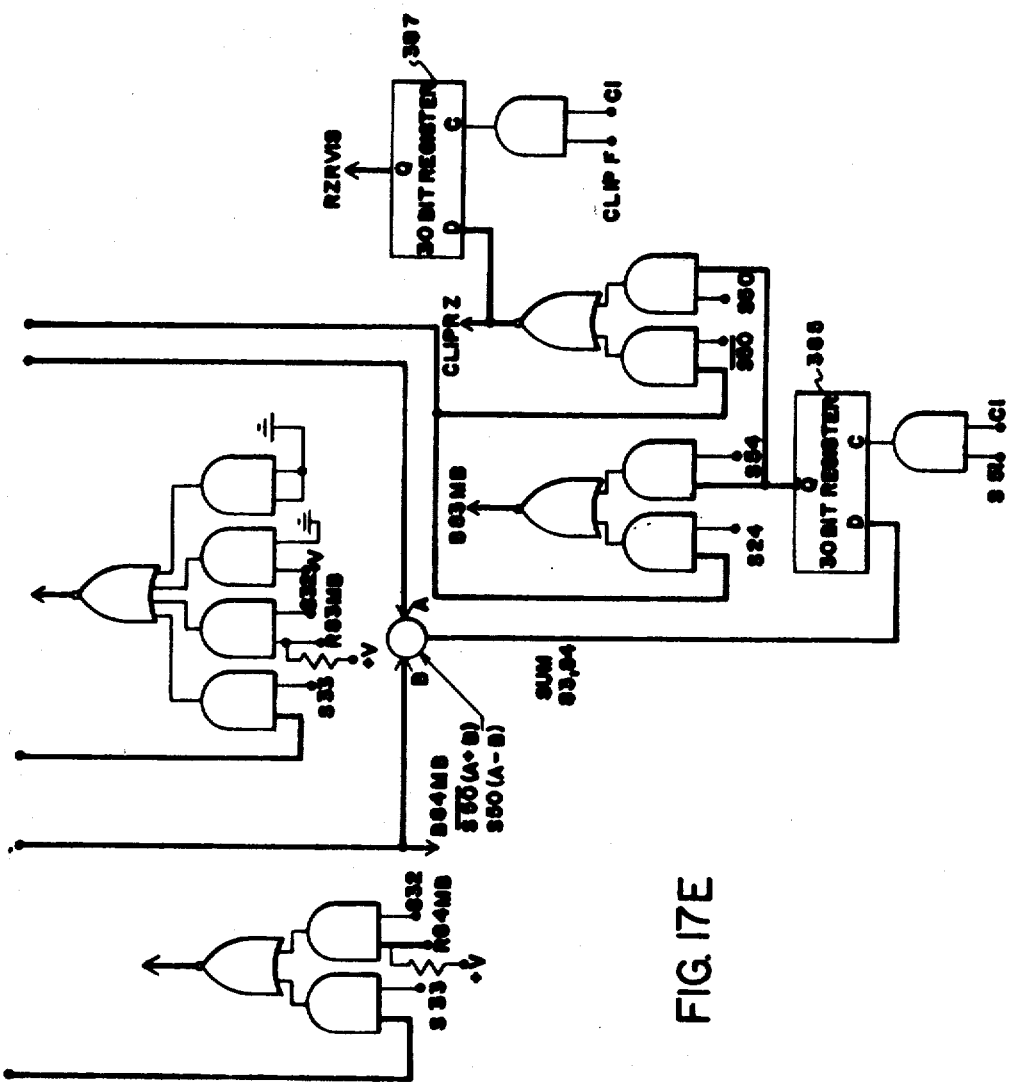
Figure 17F:
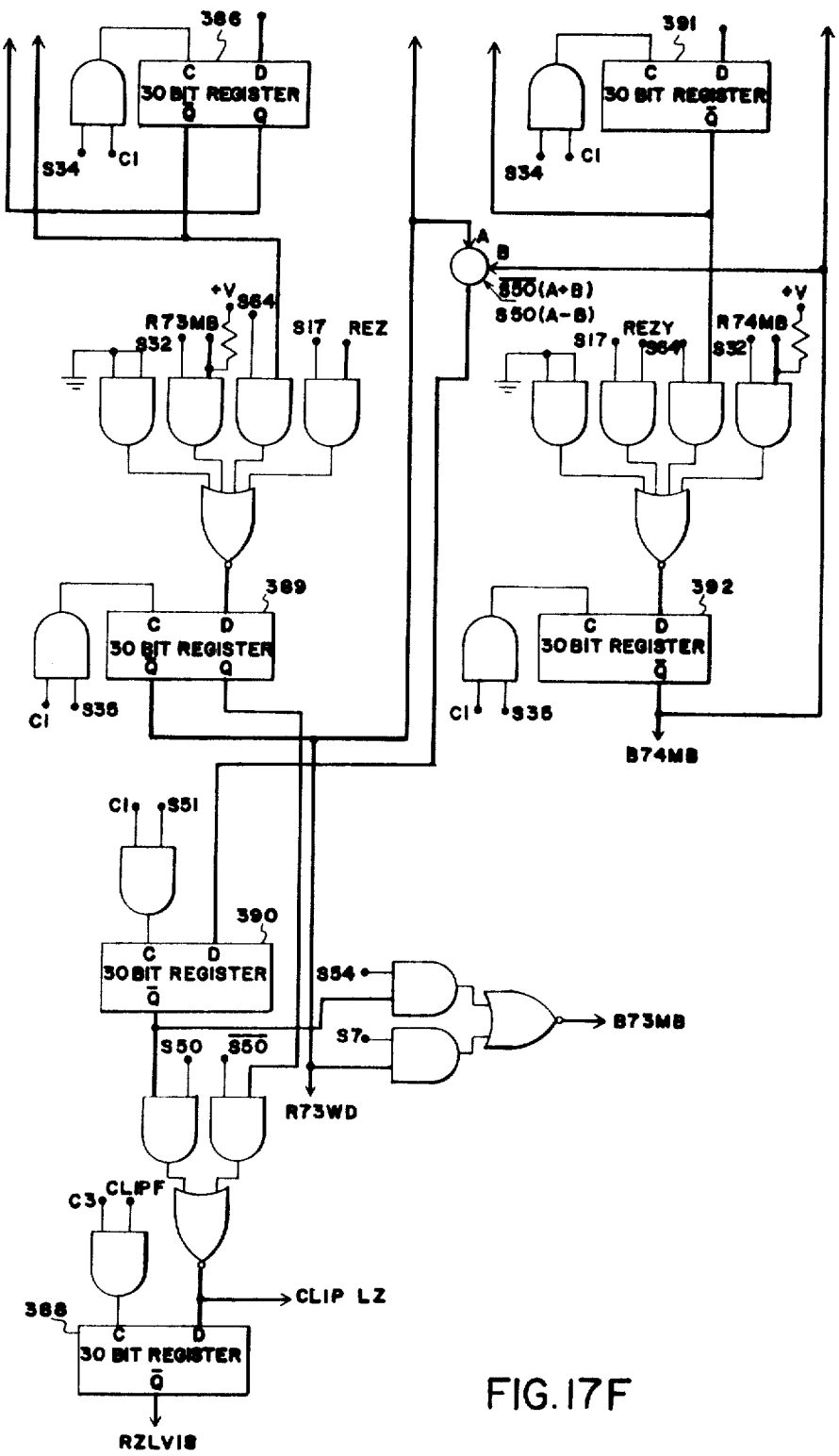

A more detailed functional block diagram of the system of the present invention is illustrated in FIG. 13. Referring now to FIGS. 11 and 13 the sets of electrical signals defining the three-dimensional object are generated by the object creation apparatus 200 and stored in a section of a conventional memory 316. The 3-D object description signals are then fed to a projection calculator 318 in the prescan calculator 202 where sets of electrical signals representing edges of polygons defining the 3-D object as projected onto a selected view plane are generated.

The projected edge signals are fed from the projection calculator 318 to an edge information calculator 320 in the prescan calculator 202. The edge information calculator generates sets of electrical signals defining all of the edges in a specified field of view.

The edge block signals in the field of view are sorted by the sorter 204, are listed in ordered lists in accordance with minimum Y values thereof and are stored in memory. After all of the edge information has been listed in this manner, the system then operates on a scan line by scan line basis to determine the visibility of the projected 3-D object to an observer viewing the object from a predetermine eye point and to subsequently display those portions determined to be visible.

The scan line by scan line visibility determinations are calculated by the visibility calculator 206. The Y-ordered edge block signals from the memory 316 are read by a current scan line segment generator 322 in the visibility calculator 206 under the control of a program control unit 321 and read only memory 323.

The current scan line segment generator 322 starts at the first scan line (at Y = 0) and utilizes the edge block signals to generate segment signals for all polygons existing along the current scan line. These segment signals are applied to a polygon segments list creator 324 which orders the segments in X along the current scan line and stores these signals in a polygon segments list in the memory 316. The segment eliminator 326 in the visibility calculator 206 checks the segments associated with any changing polygons, i.e., any polygons having edges entering or exiting along the current scan line, in the polygon segments list and packs or rearranges the data in the segment blocks as necessary.

The segment signals in the polygon segments list are then applied to an X-list creator 328 and an X-sort list of all segments appearing along the current scan line ordered in X is created and stored in the memory 316.

A sample span calculator 330 in the visibility calculator 206 creates a first sample span along the current scan line utilizing edges from a sample list in the memory 316. If there are no edges in the sample list as might occur, for example, along the very first scan line of the display, the edges of the display screen are utilized as the first sample points. A depth comparator 332 then selects all segments in the X-sort list which exist within the generator sample span and compares these segments in depth. The selected segments are also incremented and placed into the X-sort list for the next scan line. Additionally, any segments appearing in the active segments list in the memory 316 which exist within the generated sample span are compared in depth with all of the other segments existing therein.

Where only one segment exists within the selected sample span, the depth comparator applies the segment information to the decision processor 334 in the visibility calculator 206 and the decision processor 334, noting that there is only one segment within the sample span and that this segment must therefore be visible, applies this sample span and segment information to a visible segment output circuit 336. The visible segments output circuit 336 lists the visible segments information in a visible segments list in the memory 316. It also places the edge data for the visible segments into the sample list for the next scan line.

Where two or more segments exist within the generated sample span, the depth comparator 332 utilizes the clipping technique previously described to find the single visible segment within the sample span if one exists. This single visible segment is then listed in the visible segments list and the sample list, as was previously described. If no single visible segment exists within the sample span, the decision processor 334 first looks at the selected segments to determine if any edges exist within the sample span. If an edge exists within the sample span, the decision processor 334 applies this segment and sample span information to a sample span subdivider 338 which subdivides the sample span by moving the right sample point to the leftmost edge existing within the sample span. This new sample span information is then applied to the depth comparator 332 and the segments existing within the subdivided sample span are compared in depth.

If, however, the depth comparator 332 cannot find a single visible segment within the original sample span or the subdivided sample span and no edges exist therein, an intersection condition must exist and the decision processor 334 applies the sample span information and the segment information to an intersection calculator 340 which is the same hardware as the depth comparator but only operating in a different mode for a determination of the coordinates of the point of intersection of the segments as was previously described. The intersection calculator 340 then applies the segment and calculated implied edge information previously discussed to the visible segment output circuit 336 for listing in the visible segments list and in the sample list in the memory 316.

The visible segments along each scan line of the display are generated in this manner and listed in the visible segments buffer in the memory 316 and, at the end of one complete frame, control is passed to the display generator 208. The display generator 208 reads ordered visible segment information in the visible segments buffer together with the coloring and shading information which is also contained in the visible segment buffer, and generates intensity and color signals for the visible segments of the projected polygons. These intensity and color signals are then applied via the D-A converter 210 and from there to the display 214, as was previously described.

The visible segment generator 206 is illustrated in greater detail in FIGS. 14–27 to facilitate a more precise understanding of the system.

Referring to FIG. 27, a suitable digital computer 400, e.g. a PDP-10 computer, having a suitable conventional input/out (I/O) unit 402 such as a card reader may be utilized to generate the projected edge data from the object description data. The projected edge data is then stored as edge block signals in the PDP-10 random access memory 316a until it is desired to display the object.

When a display request is initiated, a $\overline{\text{STFRAM}}$ signal from the computer 400 initiates the operation of the visible segment generator 206 and the visible segment generator generates the appropriate visible segment, shading and color signals at a read time rate, i.e. at a rate equal to or greater than the scanning rate of the display.

The edge block signals are read through an interface unit 404 and an edge buffer 406 (FIGS. 14 and 14A-E) from the memory 316a of the computer 400 under the control of the program control circuit 408 (FIGS. 16 and 16A-16E) and the read only memory (ROM) 410. The program control circuit 408 advances the visible segment generator through predetermined states which control the reading of control signals S1–S79 from the read only memory 410. These control signals S1–S79 from the ROM in turn cause the loading of edge and slope signals from the computer memory 316a into prdetermined registers in an SEGPT circuit 412 (FIGS. 18, 18A–18D, and 25) and in a DATA (X,Y,Z) circuit 414 (FIGS. 17, 17A–17F. and 24). Moreover, these control signals cause the loading of color and intensity signal from the computer memory 316a into predetermined registers in a color circuit 416 (FIGS. 26 and 26A–26F).

A random access memory (RAM 316b) 418 is provided to store the edge data in the required ordered lists previously discussed. For convenience, the signals from the SEGPT circuit 412 and the DATA circuit 414 applied to the RAM 418 are designated B— —MB and the signals from the RAM 418 to these circuits are designated R— —MB.

After the proper data is loaded in the designated registers, the program control circuit 408 advances to further visible segment generator states and reads appropriate control signals from the ROM 410 to institute the depth comparison and segment visibility determinations by a clipper 420 (FIGS. 20, 20A–20E and 23) and the control of a clipper control circuit 422 (FIGS. 19 and 19A–19H). X-TEST circuit 424 (FIGS. 22 and 22A–22J) comprising two X-TEST Boards and an ADDER circuit 426 (FIGS. 21 and 21A–21D) comprising two ADDER Boards perform various testing and summing functions required during the clipping operations as previously described.

The visible segment data is then stored in an output memory 428 for subsequent display as was previously described.

To facilitate an understanding of the operation of the visible segment generator, the registers in the DATA and SEGPT circuits have been given designations which will be used hereinafter in the description of the system operation. These designations correspond to the numerical designations appearing on the registers in these circuits as follows:

SYSTEM OPERATION

With continued reference to FIG. 27, the operation of the system is controlled primarily by the program control circuit 408, in conjunction with the read only memory 410.

The system is initialized by the RESET signal which is applied to the program control circuit either manually by the operator, through the power on/off switch, or automatically through loss of power or at an appropriate time during the program. Moreover, the system timing switch S1 provides the output signals S1 and $\overline{S1}$ which are applied to the program control circuit 408 to control the generation of the clock signals C1–C4. A second switch S2 may also be provided to allow an operator to simulate a clock signal to step the system through a cycle for test purposes.

When the system is initialized by the reset signal, the read only memory address signals ROMAS applied to the read only memory from the program control circuit indicate a zero address. When the start signal $\overline{STFRAM}$ from the PDP-10 computer is provided, the program control circuit commences its hard wired program, generating the appropriate read only memory address signals ROMAS and thereby selecting the current state of the system and in turn reading the appropriate address lines of the read only memory. These signals from the read only memory, S1–S79, load the signals defining the projected edges of the object to be displayed from the random access memory in the PDP-10 computer into registers in the visible segment generator. As this edge data is loaded into the correct registers in the visible segment generator, and as the appropriate calculations ordered by the signals from the read only memory are performed, the program control circuit modifies the address signals ROMAS and continues through the cycle until visibility has been determined for an entire frame.

| Board | Number | Register designation | Board | Number | Register designation | |
|-------|--------|----------------------|-------|--------|----------------------|---|
| SEGPT | 350 | RFRAMY | DATA | 371 | R80W2 | (R2) |
|       | 351 | R1Y1   |      | 372 | R80WD | (RVAL) |
|       | 352 | R1Y2   |      | 373 | R70WD | (LVAL) |
|       | 353 | RFREES |      | 374 | R70W2 | (L2) |
|       | 354 | RFREES2 |     | 375 | RXRVIS | (RVIS) |
|       | 355 | RNEXT  |      | 376 | R81W2 | (R2) |
|       | 356 | RSAGAC |      | 377 | R81WD | (RVAL) |
|       | 357 | R90WD  |      | 378 | R71WD | (LVAL) |
|       | 358 | RSEGPT1 |     | 379 | R71W2 | (L2) |
|       | 359 | RPREV2 |      | 380 | RXLVIS | (LVIS) |
|       | 360 | RPREV1 |      | 381 | R82WD | (RSLOPE) |
|       | 361 | RPREV11 |     | 382 | R72WD | (LSLOPE) |
|       | 362 | RPREV12 |     | 383 | RSEGXT |  |
|       | 363 | RVISIBLE |    | 384 | RSEG2X |  |
|       | 364 | RSEG2L |      | 385 | R83W2 | (R2) |
|       | 365 | RSEG2S |      | 386 | R83WD | (RVAL) |
|       | 366 | RSEGPT1 |     | 387 | RZRVIS | (RVIS) |
|       | 367 | RSEGPT2 |     | 388 | RZLVIS | (LVIS) |
|       | 368 | R20WD  |      | 389 | R73WD | (LVAL) |
|       | 369 | RSEGXS |      | 390 | R73W2 | (L2) |
|       | 370 | RLSEG2 |      | 391 | R84WD | (RSLOPE) |
|       |     |        |      | 392 | R74WD | (LSLOPE) |

The states of the visible segment generator and the signals read from the read only memory during a particular state of the visible segment generator are given in the following table.

TABLE I

| VSG STATE | ROM OUTPUT SIGNALS |
|---|---|
| 0, 1 | 26, 30, 63 |
| 1, 1 | 2, 15, 26, 27, 30, 31, 36, 44, 70 |
| 2, 0 | 5, 15, 28, 47, 71 |
| 3, 2 | 30, 45, 48, 58 |
| 4, 8 | 13, 14, 17, 20, 25, 26, 43, 51, 55 |
| 5, 22 | 13, 20, 25, 29, 30, 31, 38, 43, 47, 66 |
| 6, 0 | |
| 7, 0 | |
| 8, 8 | 20, 21, 22, 25, 27, 28, 29, 32, 34, 35, 43, 72 |
| 9, 10 | 1, 3, 4, 7, 17, 19, 20, 25, 35, 43, 56 |
| 10, 2 | 1, 19, 22, 28, 45, 51, 62 |
| 11, 13 | 5, 23, 25, 28, 40, 57 |
| 12, 11 | 5, 8, 20, 24, 25, 39, 43, 56 |
| 13, 8 | 20, 43 |
| 14, 0 | |
| 15, 0 | |
| 16, 17 | 6, 18, 23, 27, 32, 34, 35, 50, 55, 74, 78 |
| 17, 17 | 50, 74 |
| 18, 0 | |
| 19, 16 | 20, 22, 25, 28, 43, 49, 50, 51, 52, 56, 79 |
| 20, 20 | 20, 43, 74 |
| 21, 0 | |
| 22, 40 | 6, 18, 23, 27, 32, 34, 35, 49, 52, 53, 55, 76 |
| 23, 0 | |
| 24, 24 | 20, 43, 77 |
| 25, 30 | 20, 25, 39, 41 |
| 26, 40 | 1, 2, 4, 5, 6, 16, 23, 27, 32, 34, 35, 36, 38, 39, 42, 49, 52, 53, 54, 55, 65, 76 |
| 27, 0 | |
| 28, 40 | 2, 4, 5, 6, 23, 26, 27, 32, 34, 35, 36, 44, 49, 52, 53, 54, 55, 59, 76 |
| 29, 0 | |
| 30, 30 | 20, 22, 25, 28, 29, 32, 34, 35, 67 |
| 31, 50 | 1, 2, 37, 42, 60, 68 |
| 32, 32 | 20, 21, 22, 25, 27, 28, 32, 34, 35, 43, 73 |
| 42, 43 | 4, 7, 20, 35, 43, 64 |
| 43, 32 | 20, 22, 25, 39, 43, 51, 56 |
| 44, 16 | 13, 18, 20, 25, 28, 43, 46, 47, 48, 75 |
| 45, 2 | 1, 25, 41, 43, 45, 46, 48 |
| 46, 0 | |
| 47, 0 | |
| 48, 49 | 27, 32, 35 |
| 49, 40 | 5, 8, 14, 20, 24, 33, 34, 43, 76 |

TABLE I (cont'd)

| VSG STATE | ROM OUTPUT SIGNALS |
|---|---|
| 33, 48 | 20, 25, 28, 40, 43 |
| 34, 37 | 4, 23 |
| 35, 0 | |
| 36, 39 | 5, 23 |
| 37, 38 | 5, 8, 20, 24, 25, 28, 33, 34, 40, 43 |
| 38, 40 | 27, 32, 35, 49, 76 |
| 39, 38 | 5, 8, 20, 24, 25, 28, 40, 43 |
| 40, 40 | 76 |
| 41, 24 | 18, 20, 22, 25, 28, 43, 45, 51, 56, 61, 77 |
| 50, 51 | 1, 2, 4, 5, 6, 23, 25, 27, 28, 36, 37, 40, 54, 69 |
| 51, 52 | 16, 20, 28, 43, 52 |
| 52, 40 | 27, 29, 32, 34, 35, 49, 53, 55, 76 |
| 53, 0 | |
| 54, 0 | |
| 55, 0 | |
| 56, 0 | |
| 57, 0 | |
| 58, 0 | |
| 59, 0 | |
| 60, 0 | |
| 61, 0 | |
| 62, 0 | |
| 63, 0 | |

Figure 18A:
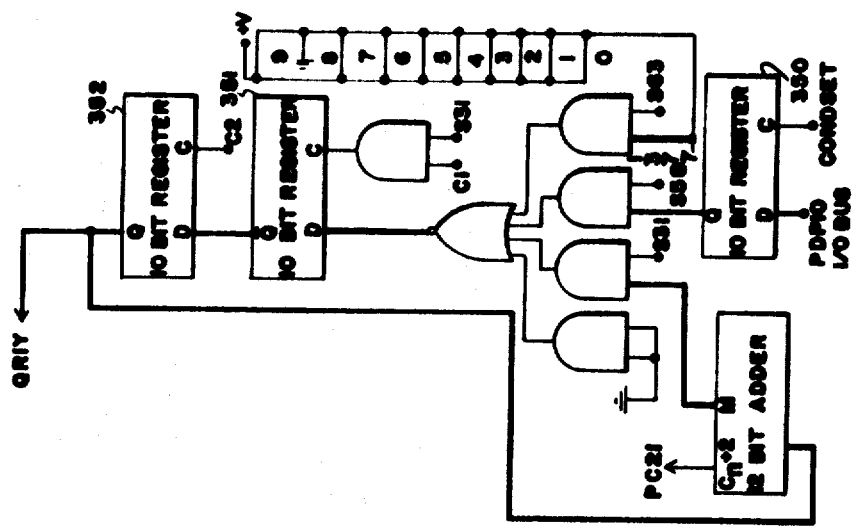
Figure 18:
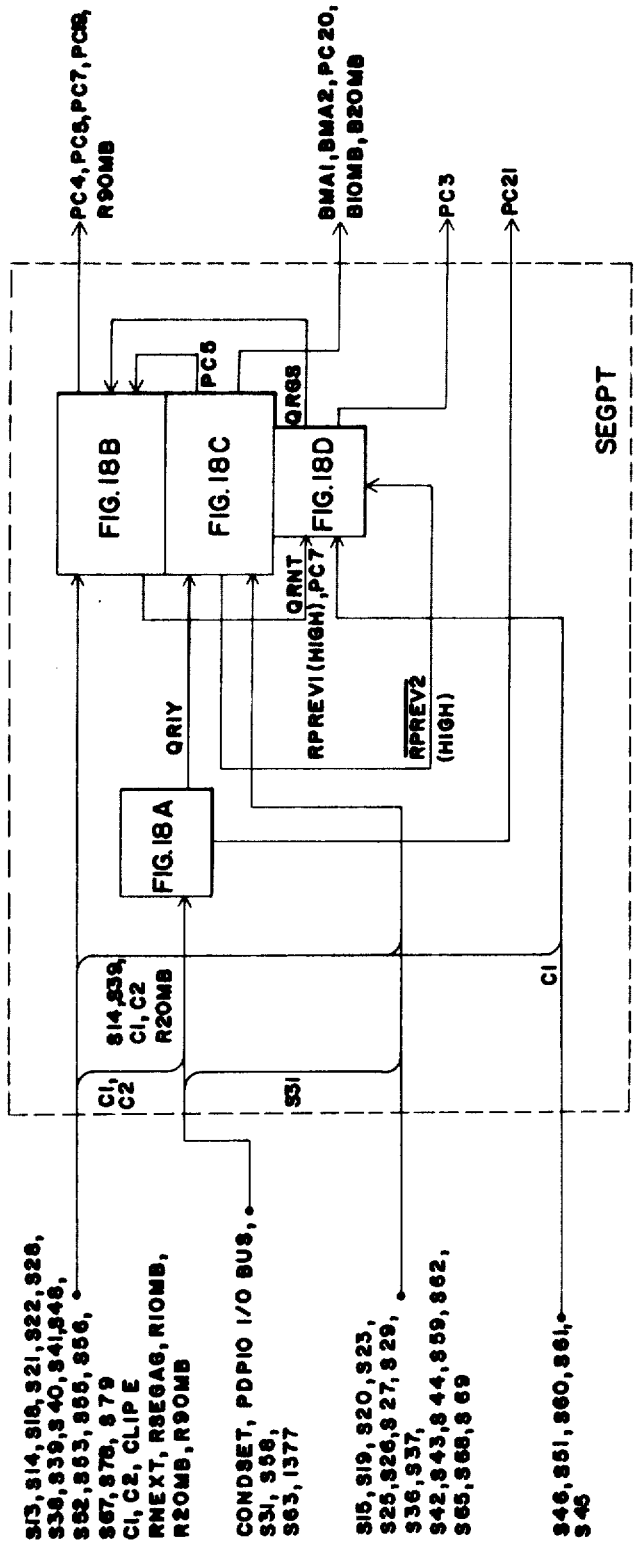
Figure 18B:
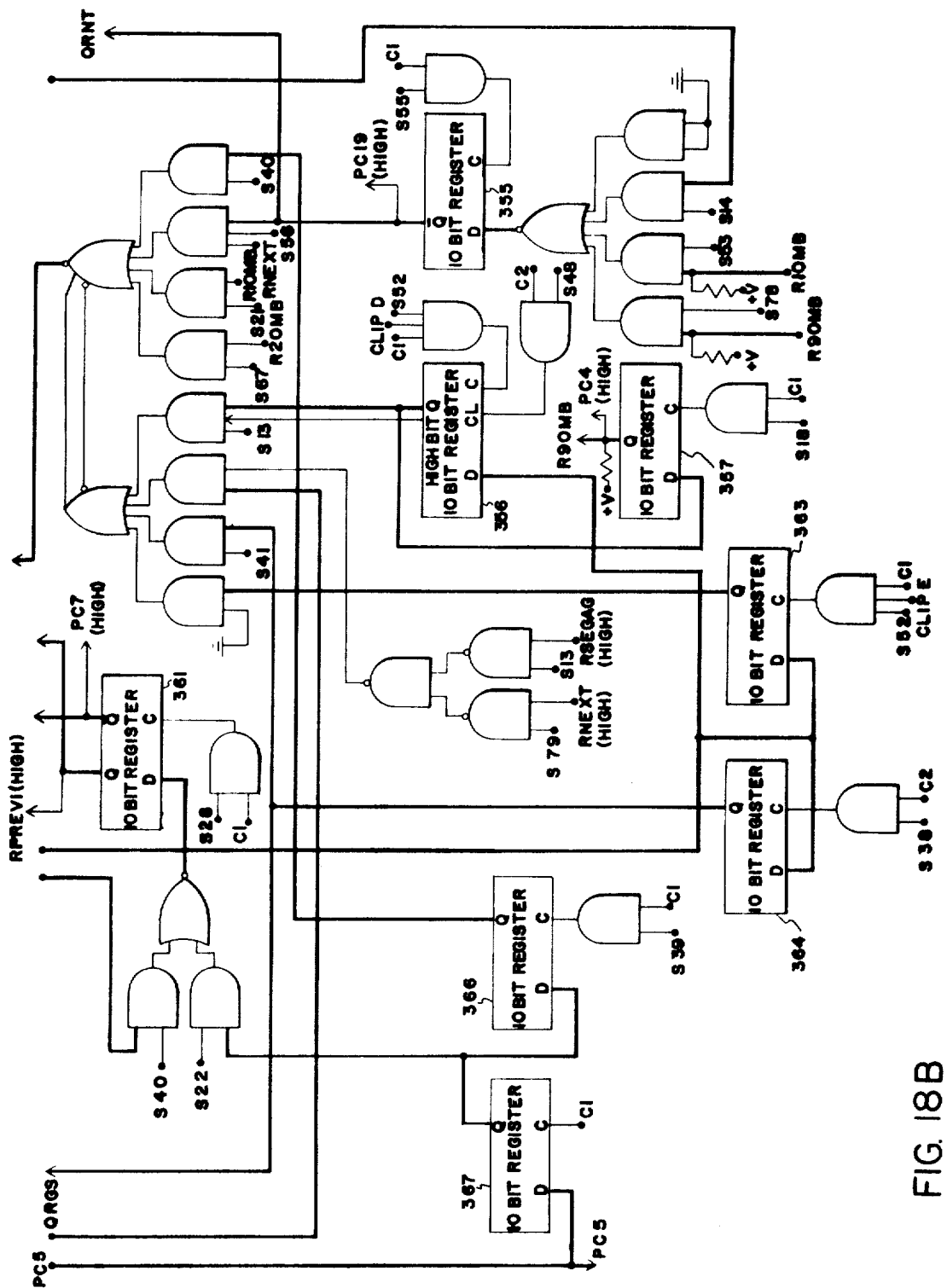
Figure 18C:
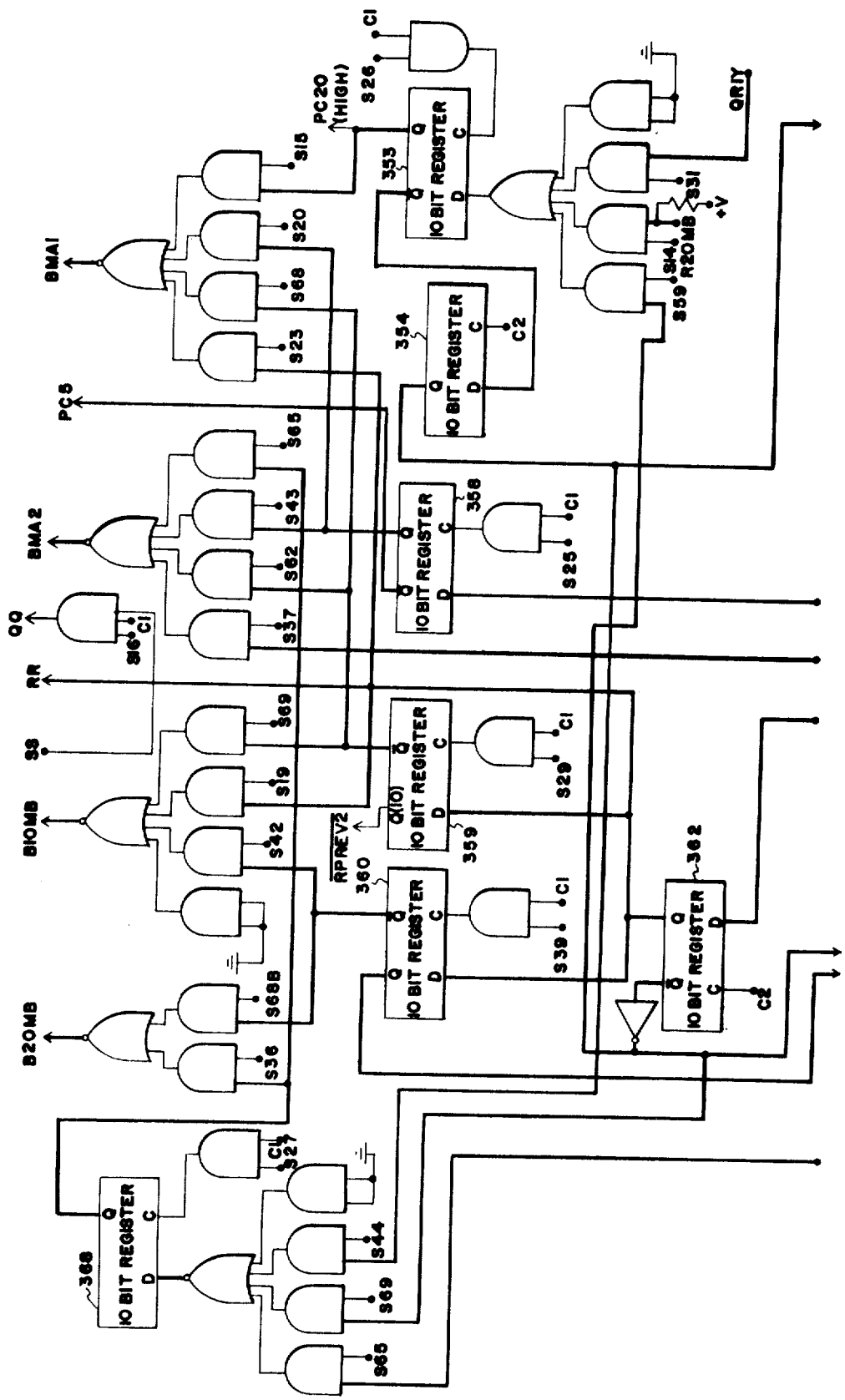
Figure 19A:
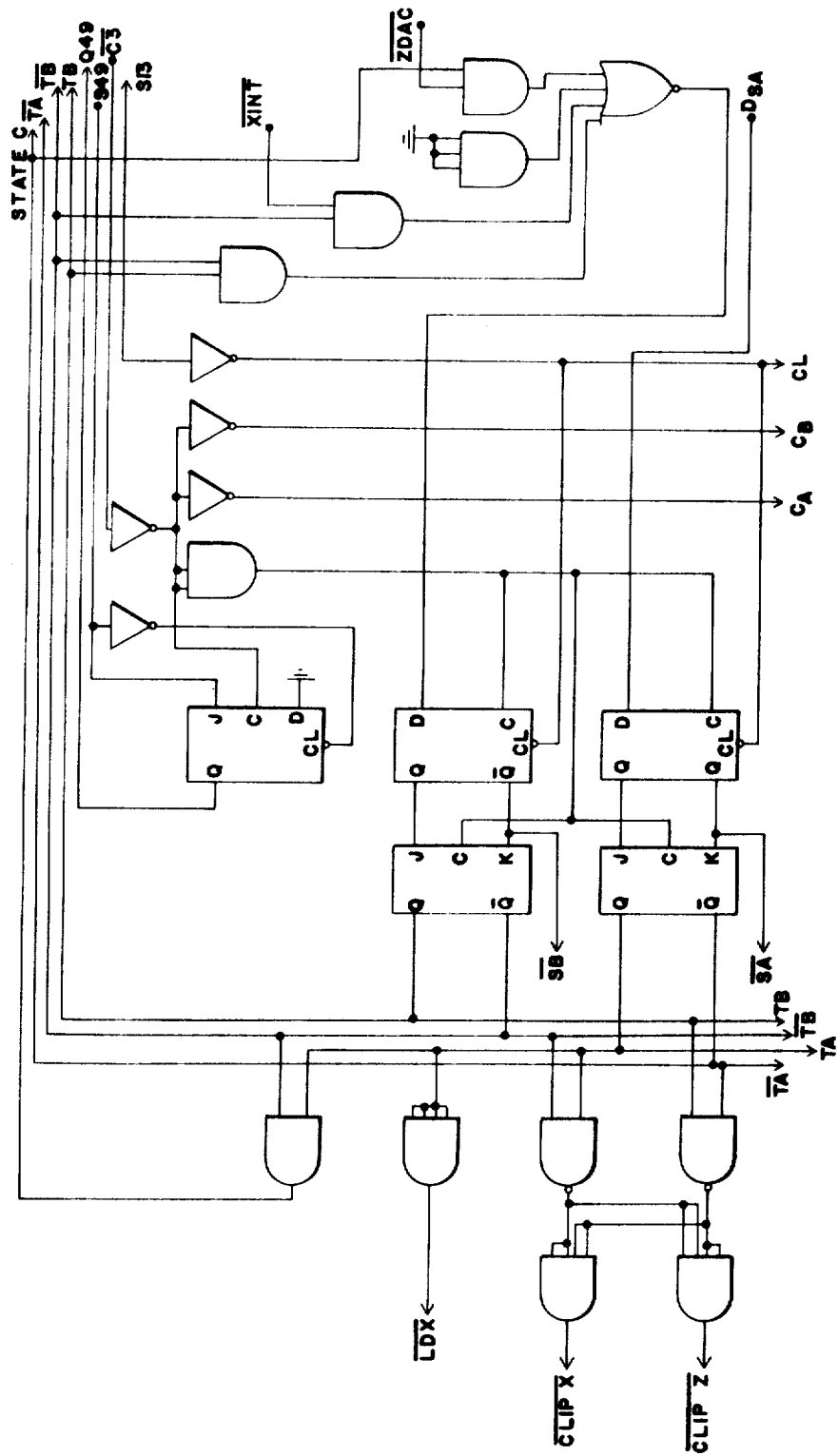
FIGS. 19A–19H are related.
Figure 19B:
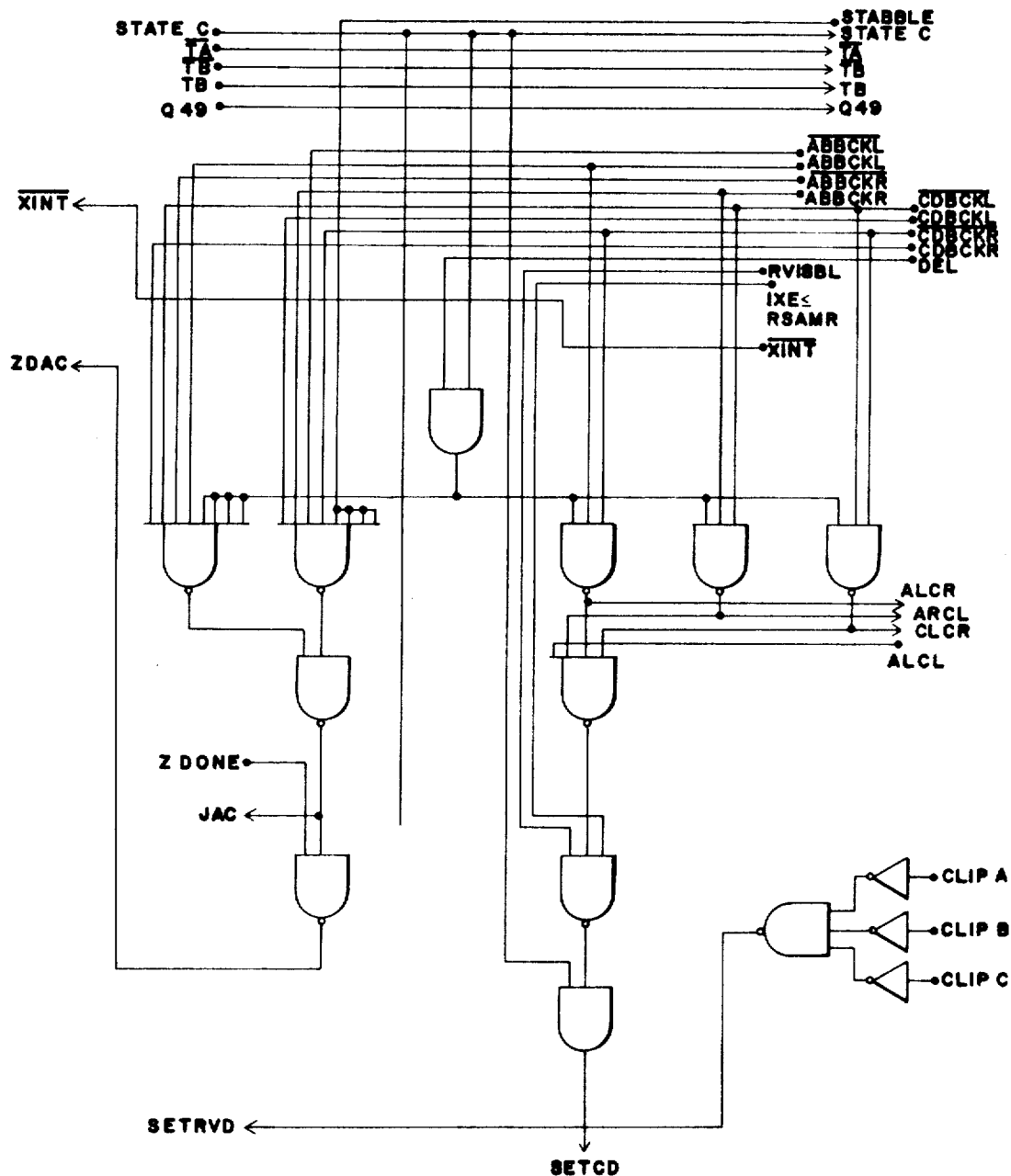
Figure 19C:
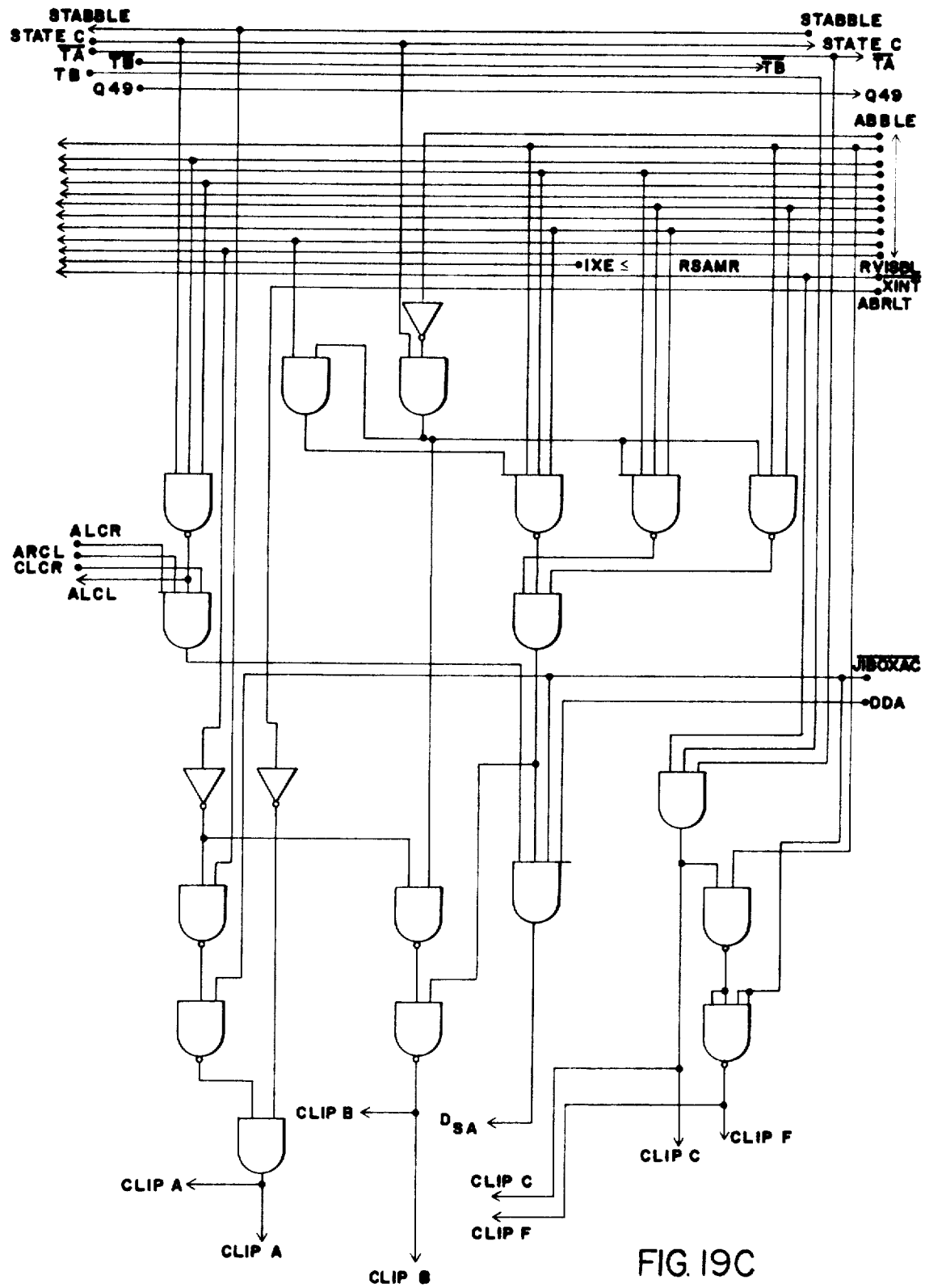
Figure 19D:
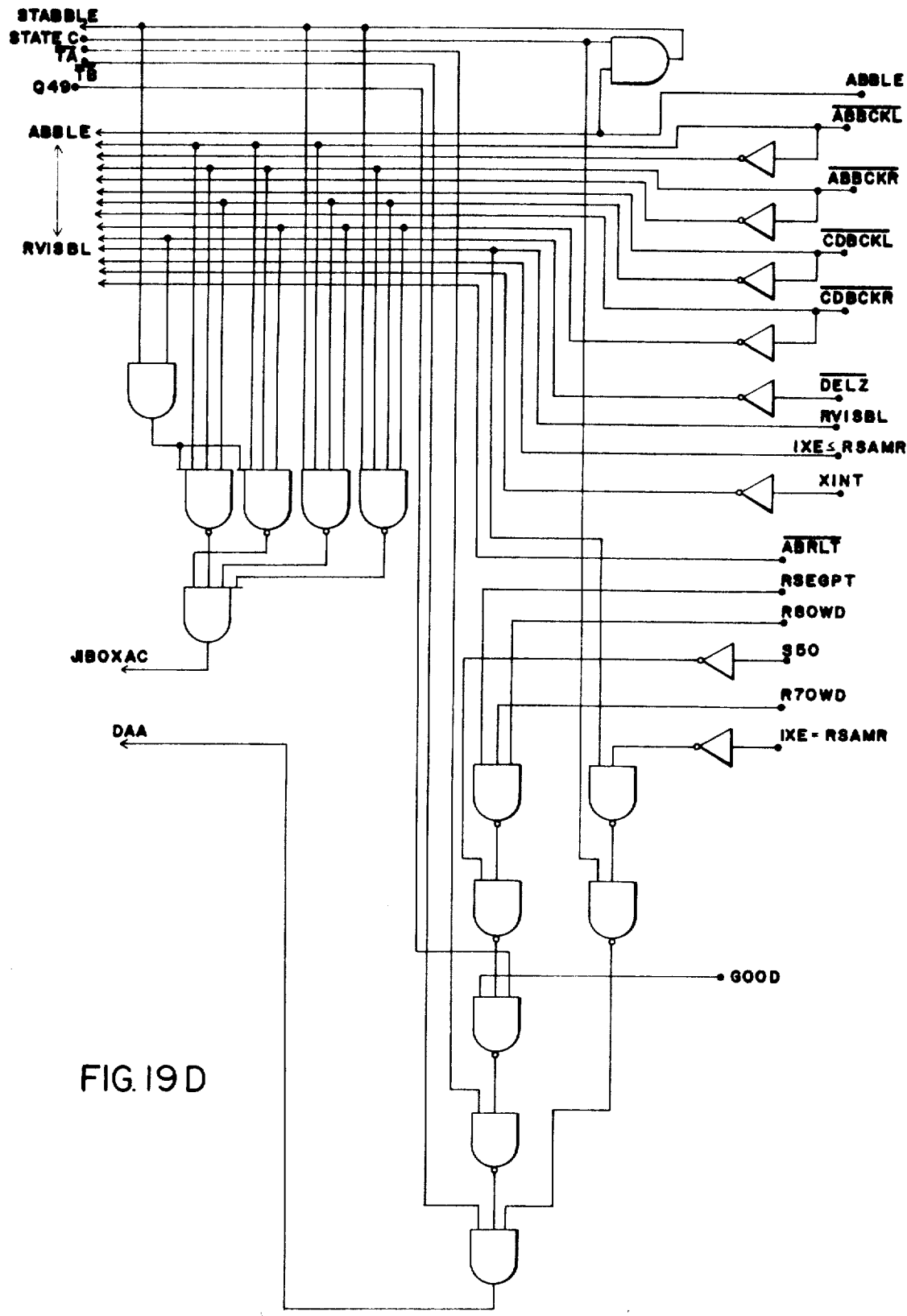
Figure 19E:
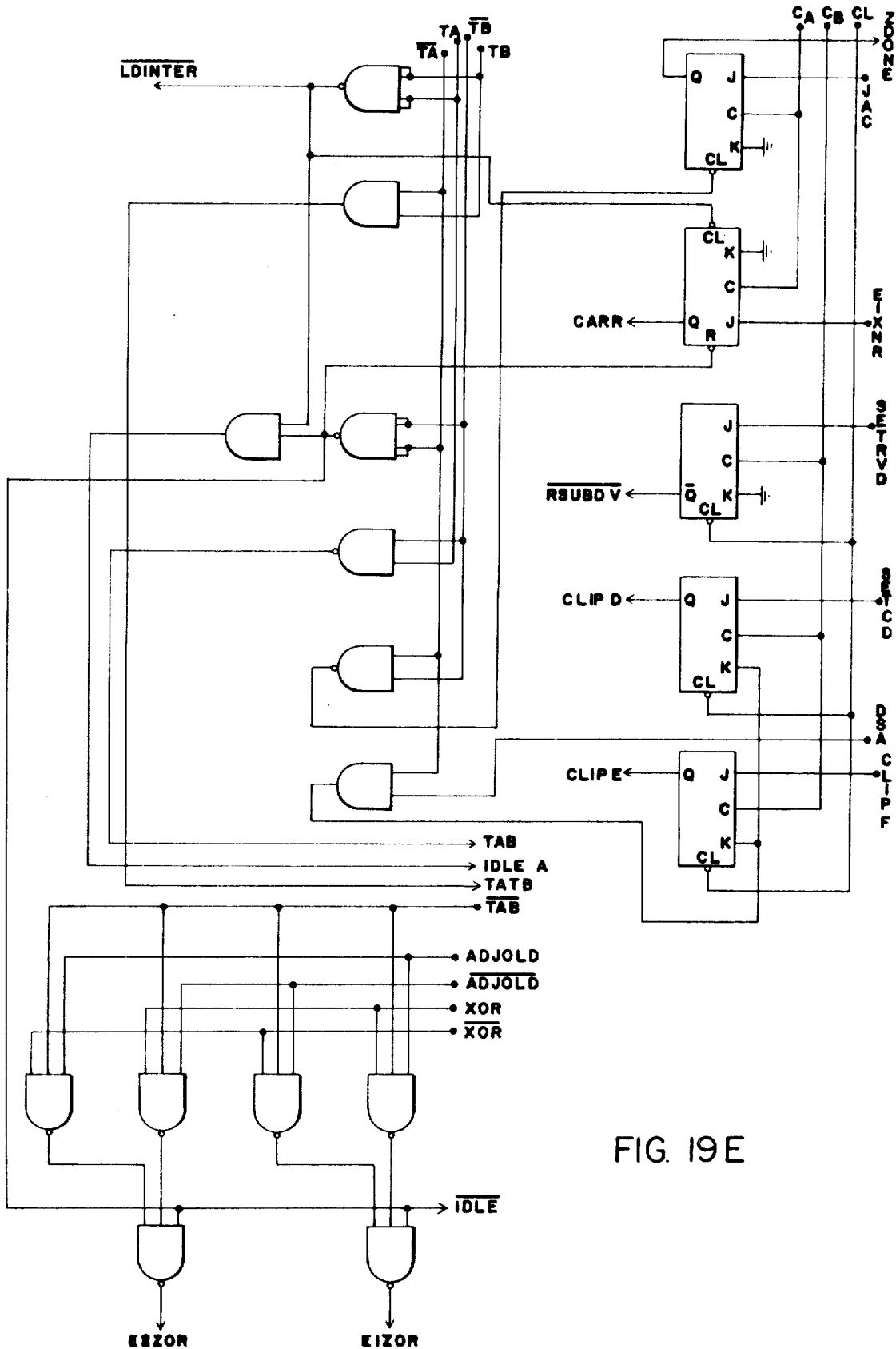
Figure 19F:
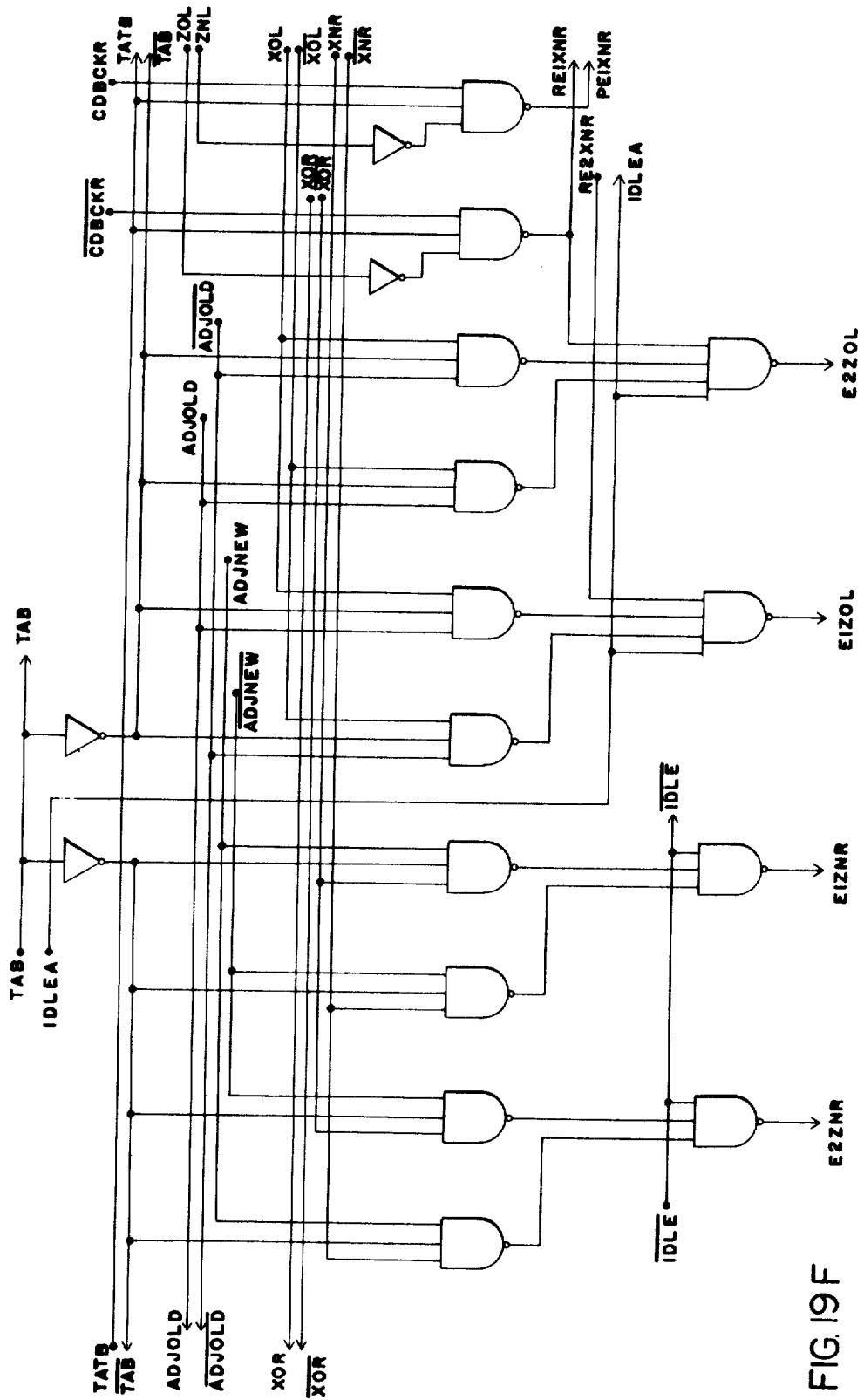
Figure 19G:
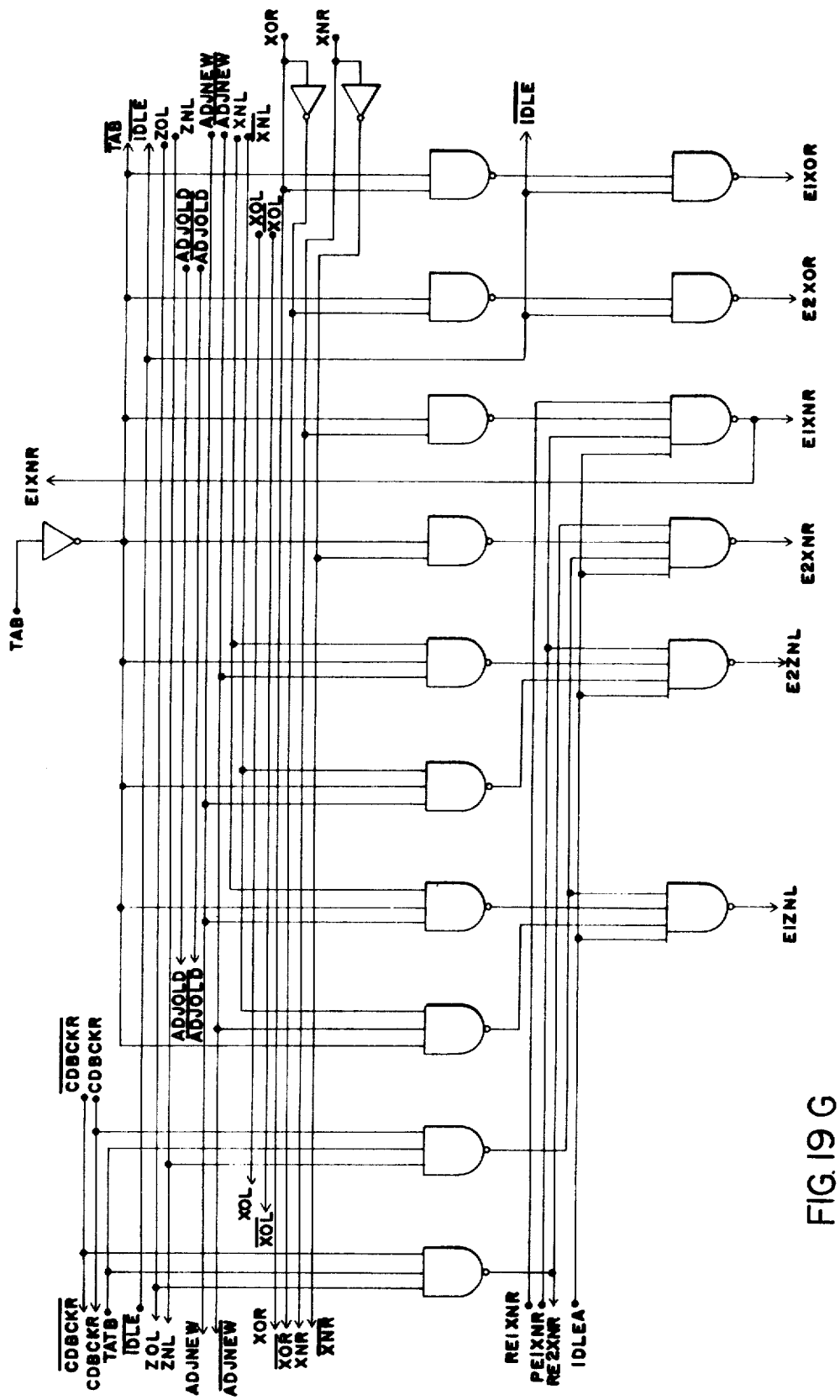
Figure 19H:
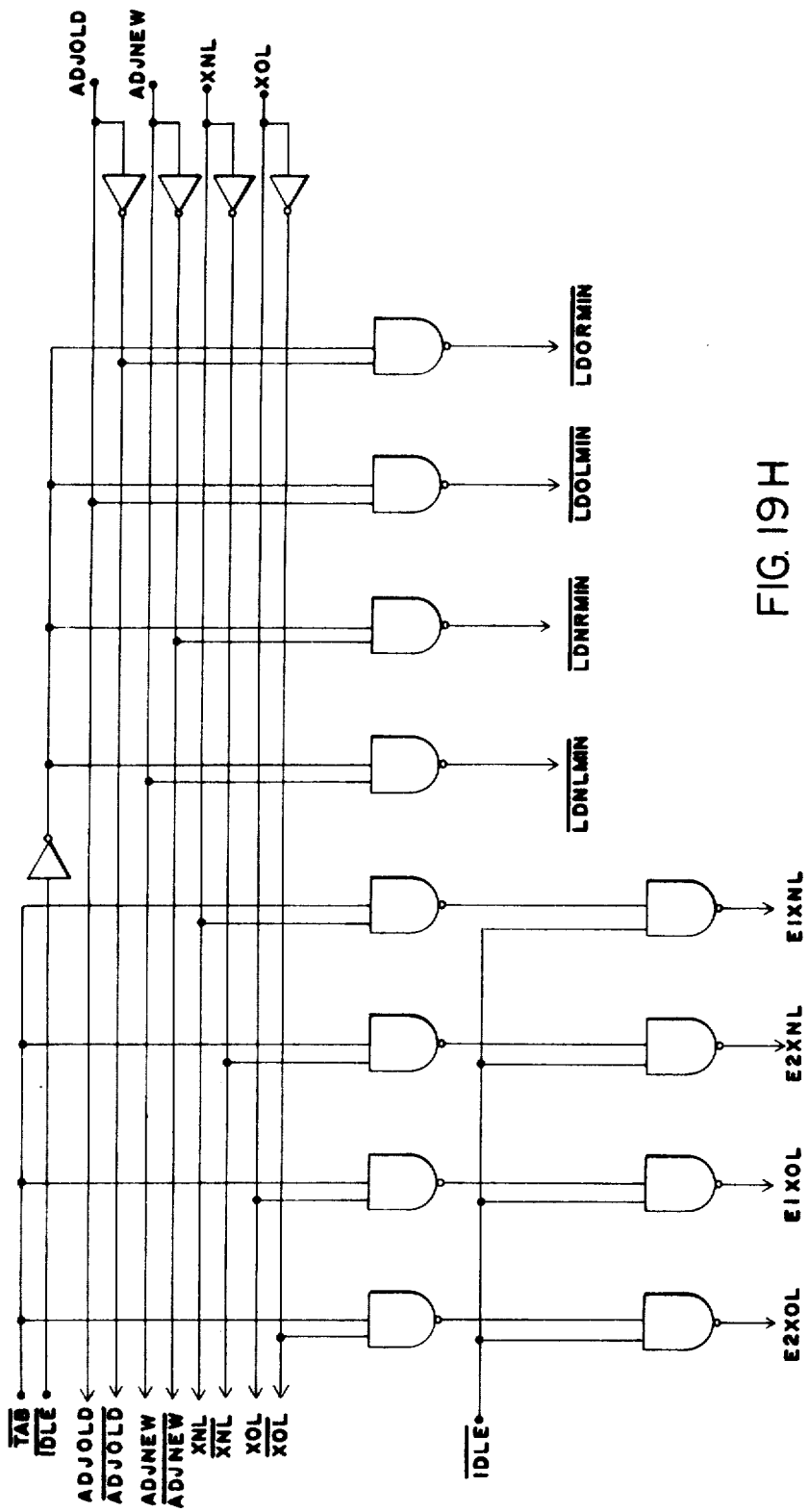
Figure 20:
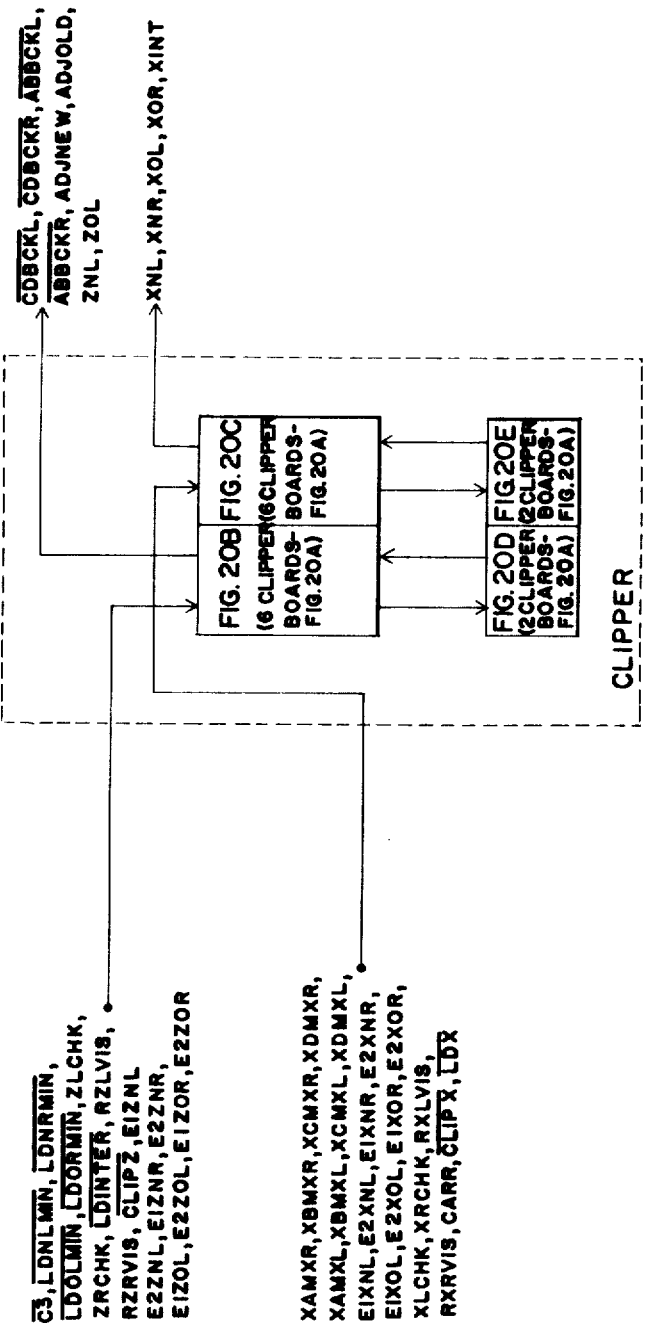
Figure 20A:
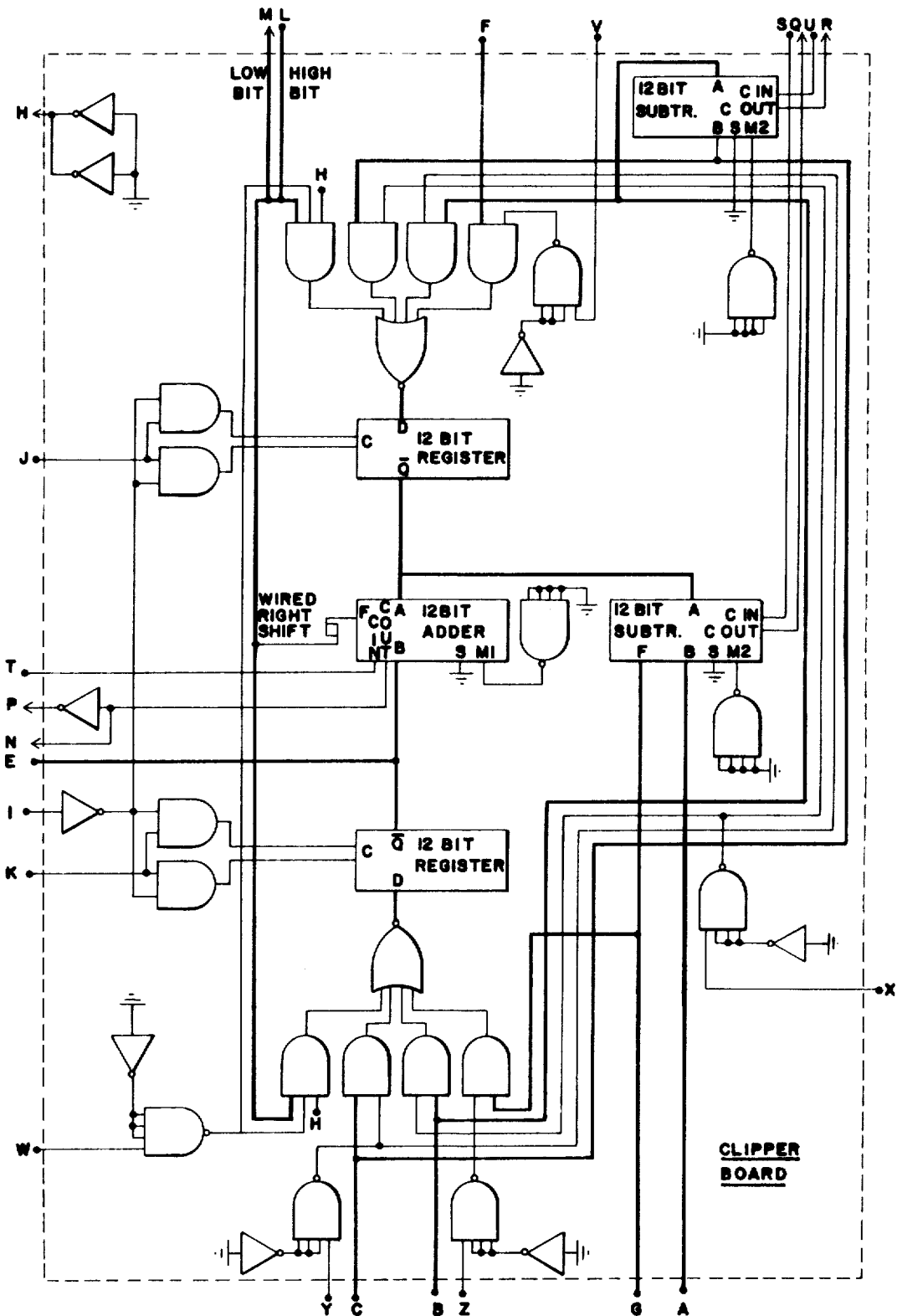
FIG. 20A is a functional block diagram illustrating the CLIPPER BOARD utilized in the CLIPPER of FIG. 20.
Figure 20B:
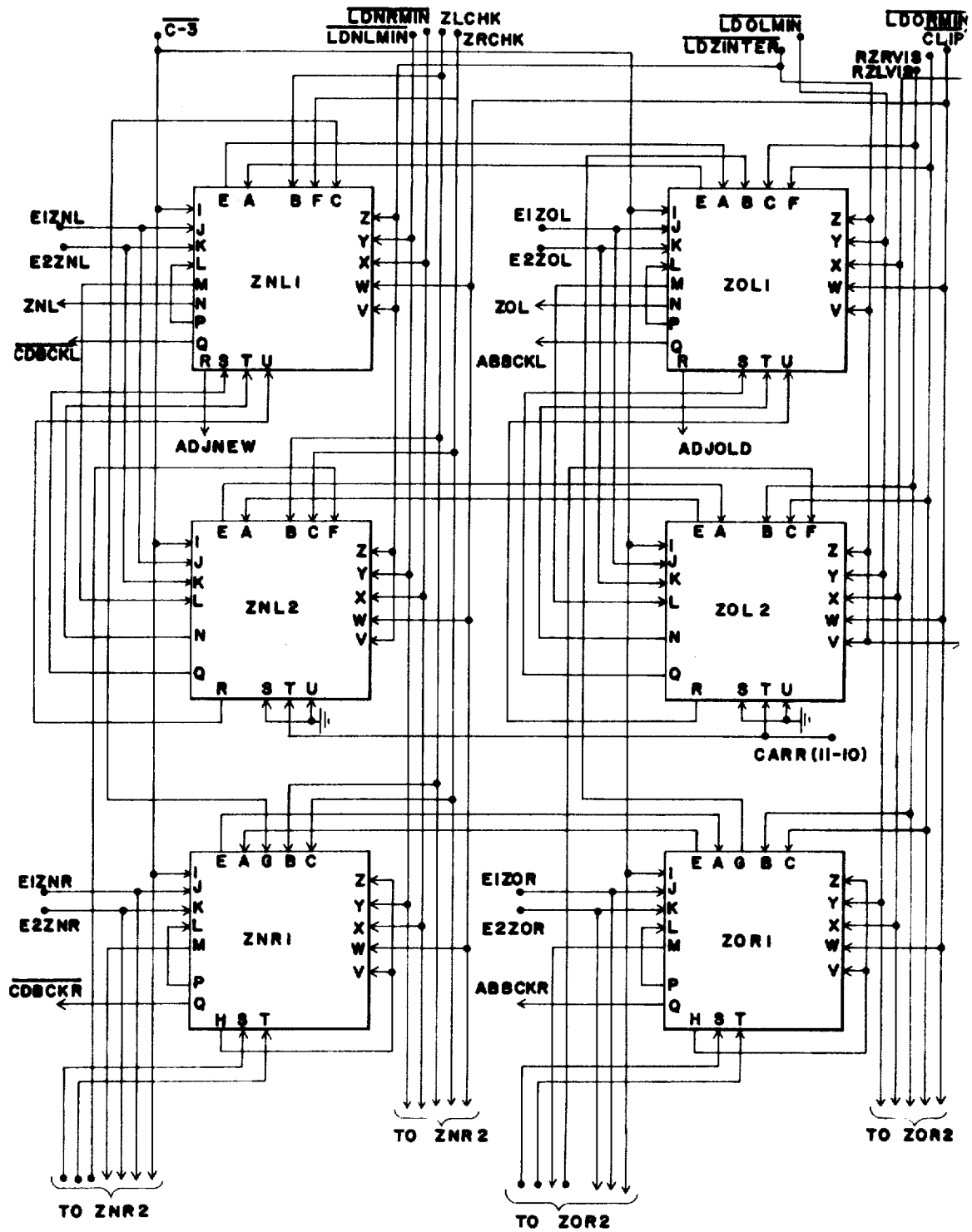
Figure 20C:
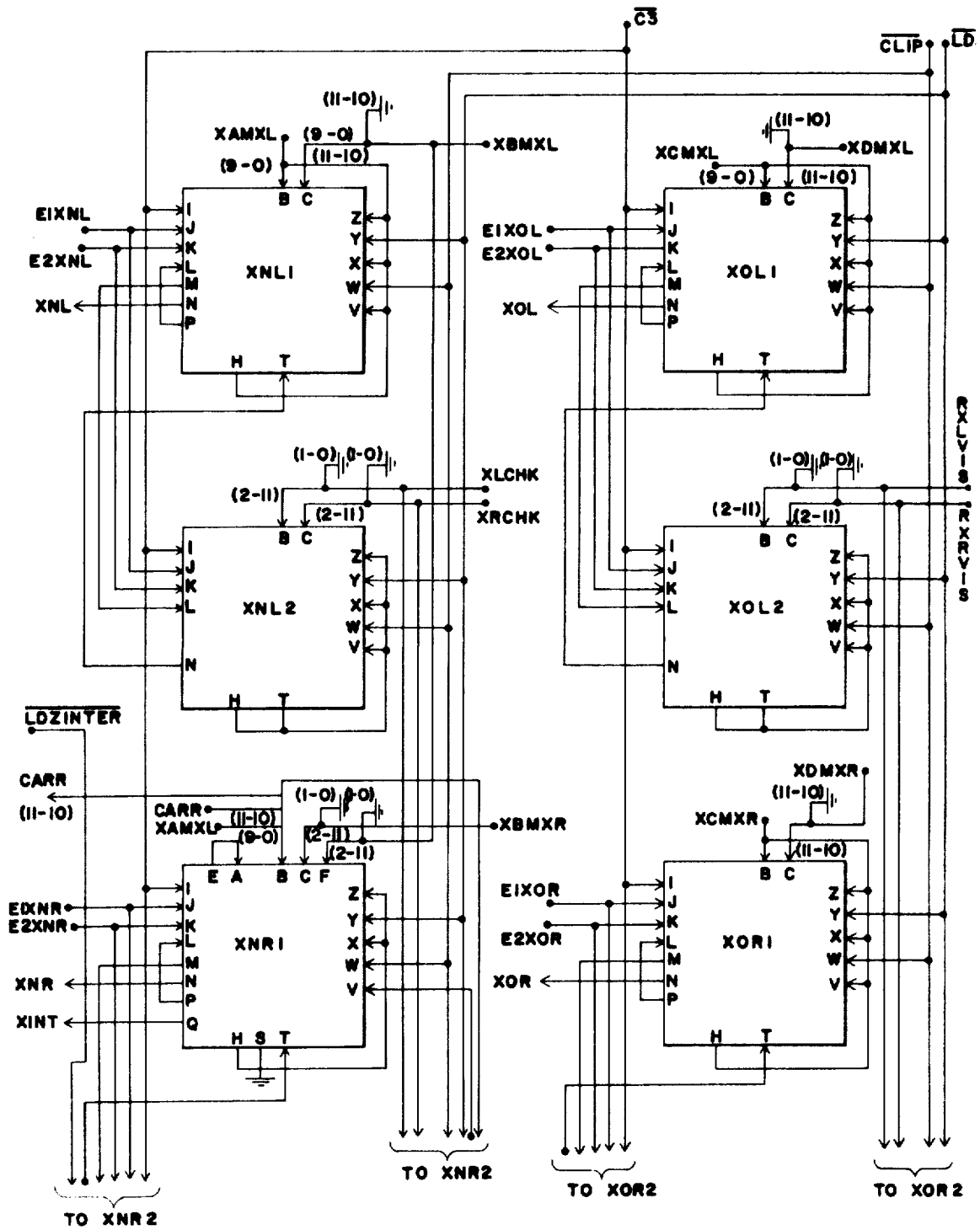
Figure 21:
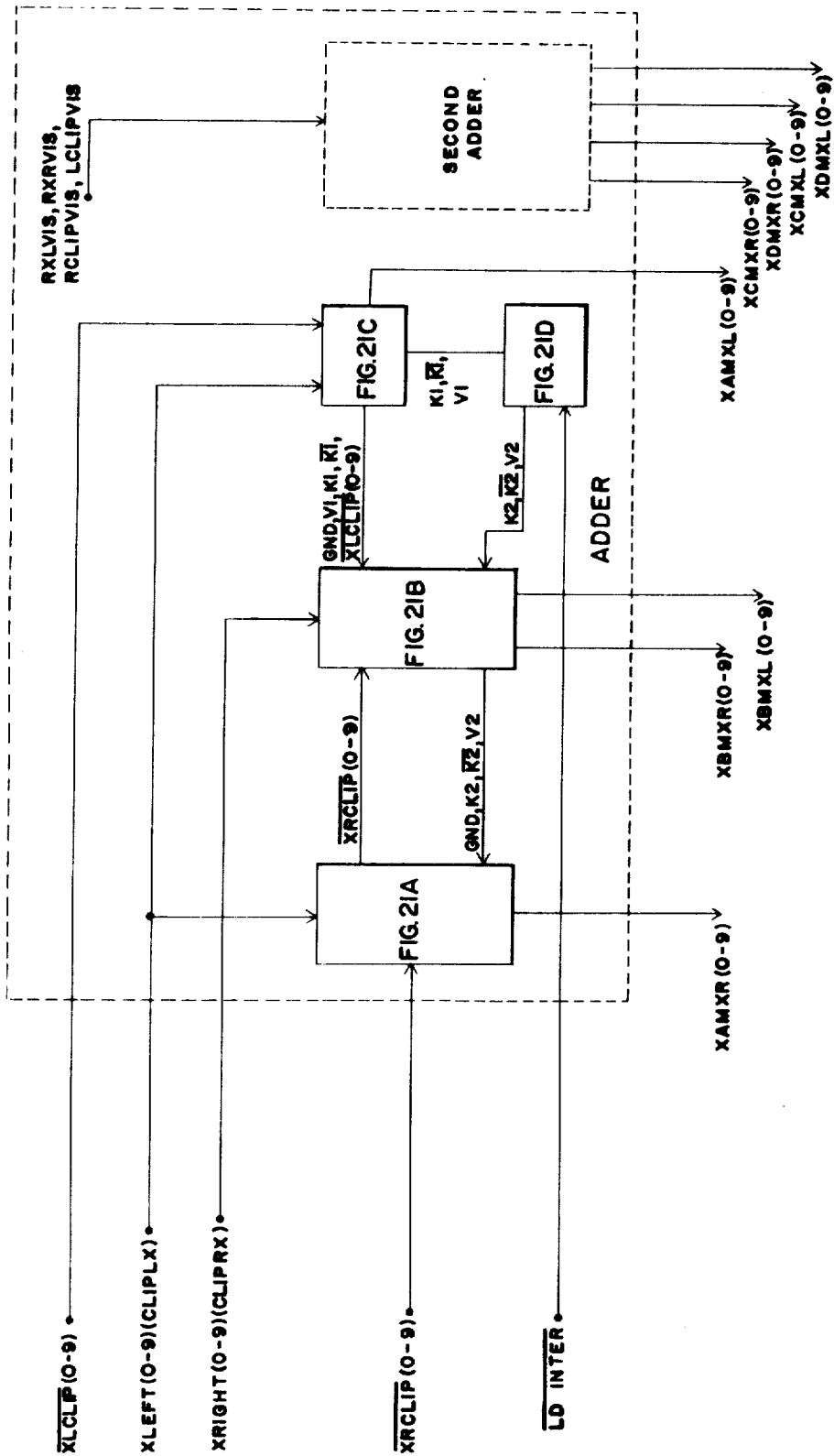
Figure 21A:
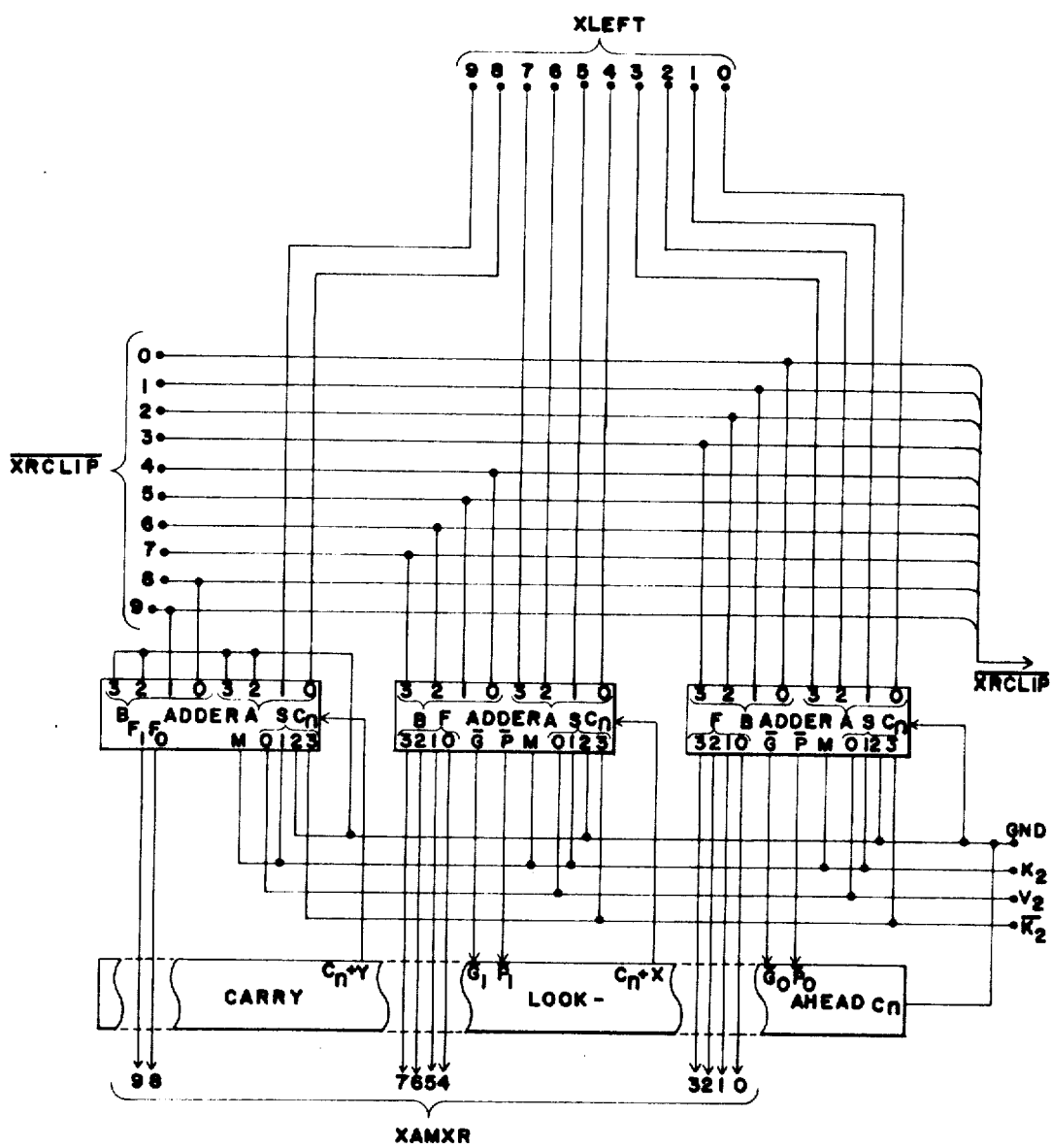
FIGS. 21A–21D are related.
Figure 21B:
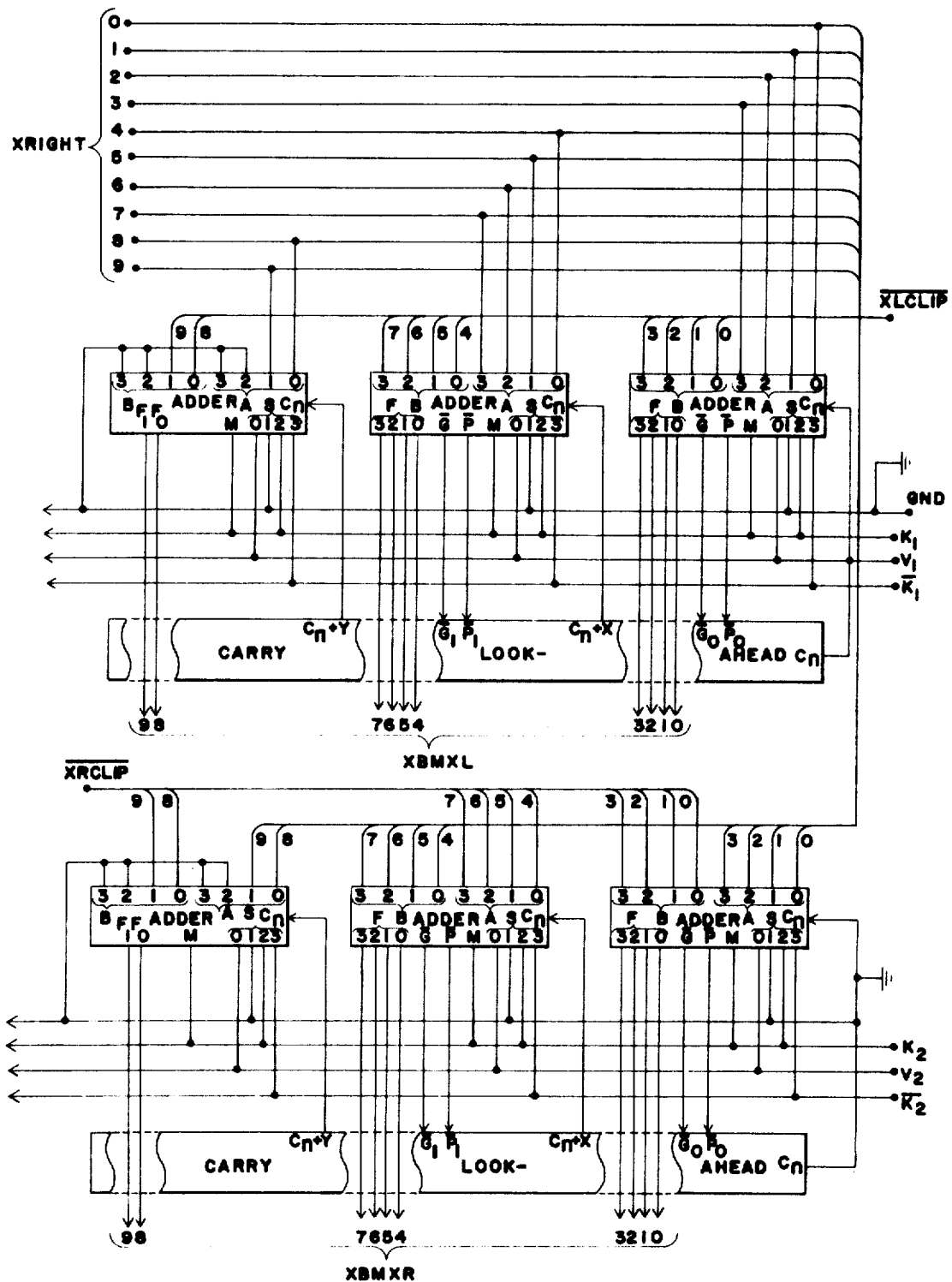
Figure 21C:
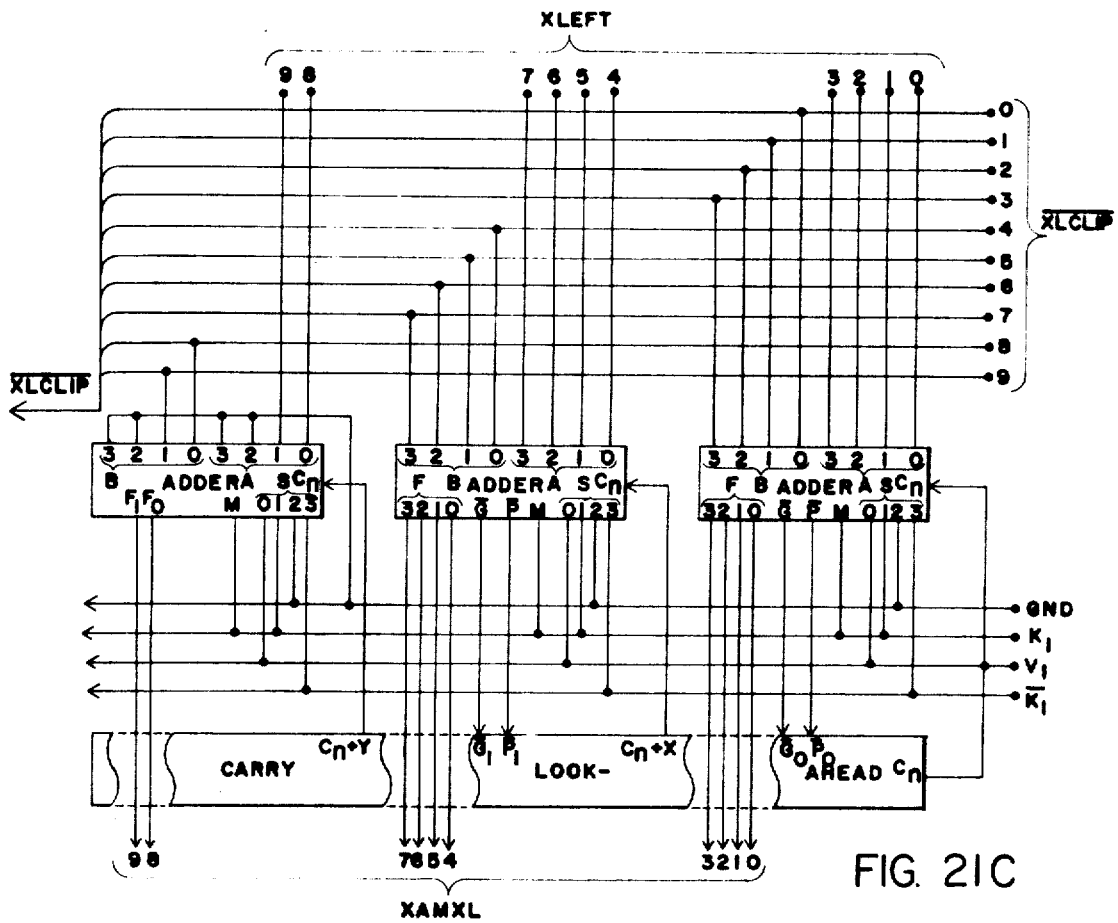
Figure 21D:
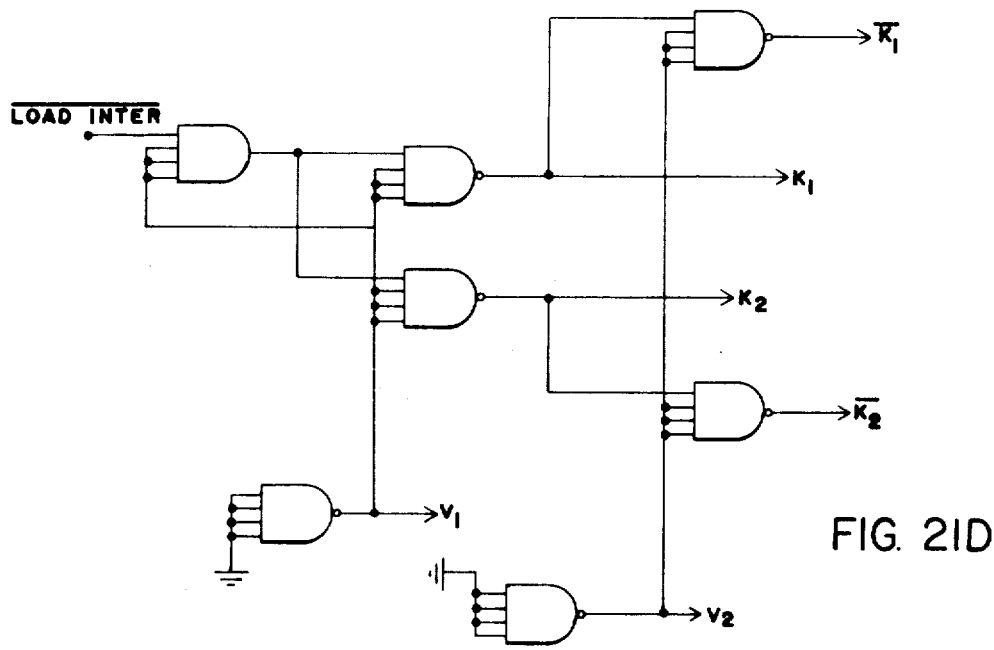
Figure 22:
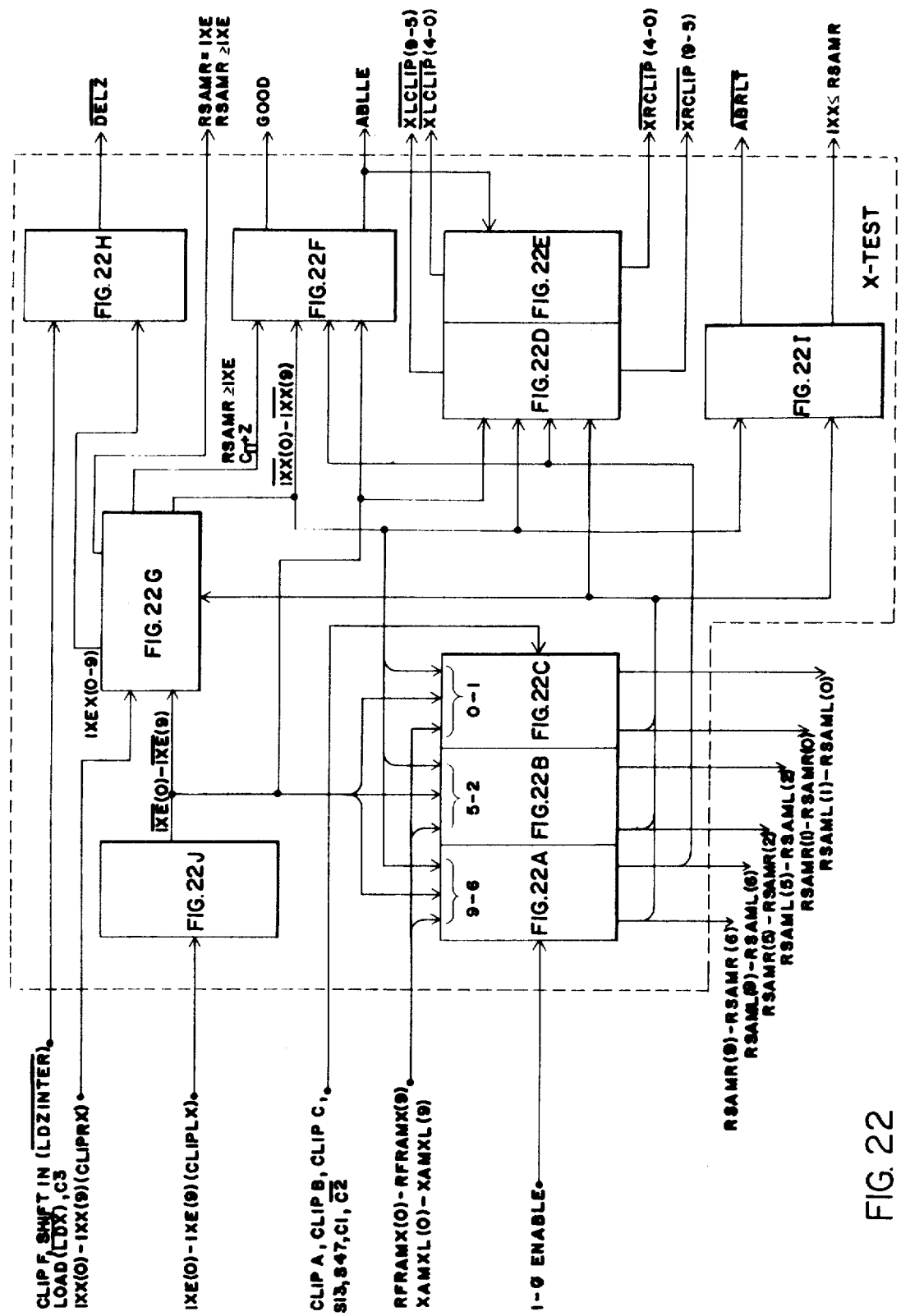
Figure 22A:
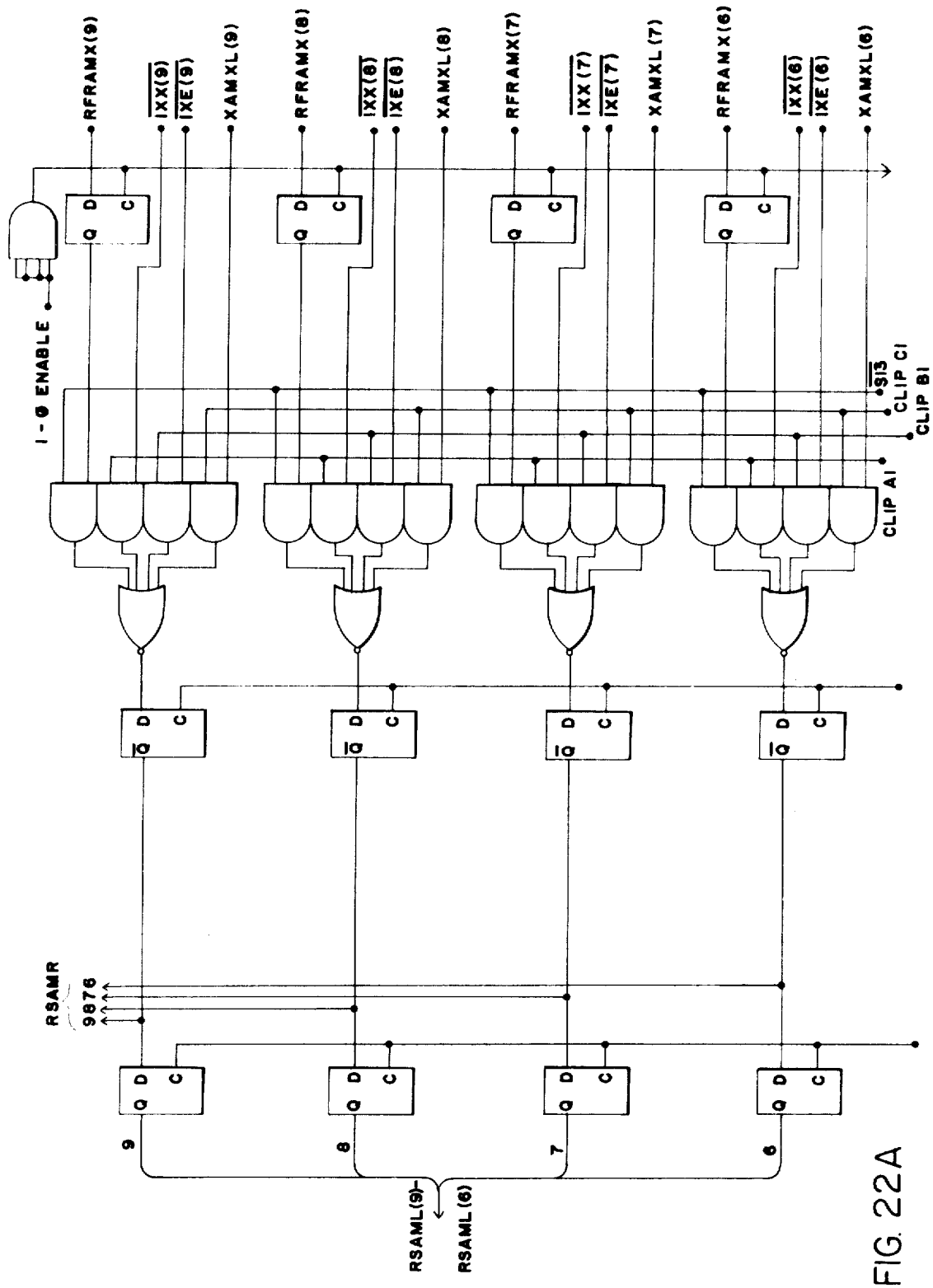
FIGS. 22A–22J are related.
Figure 22B:
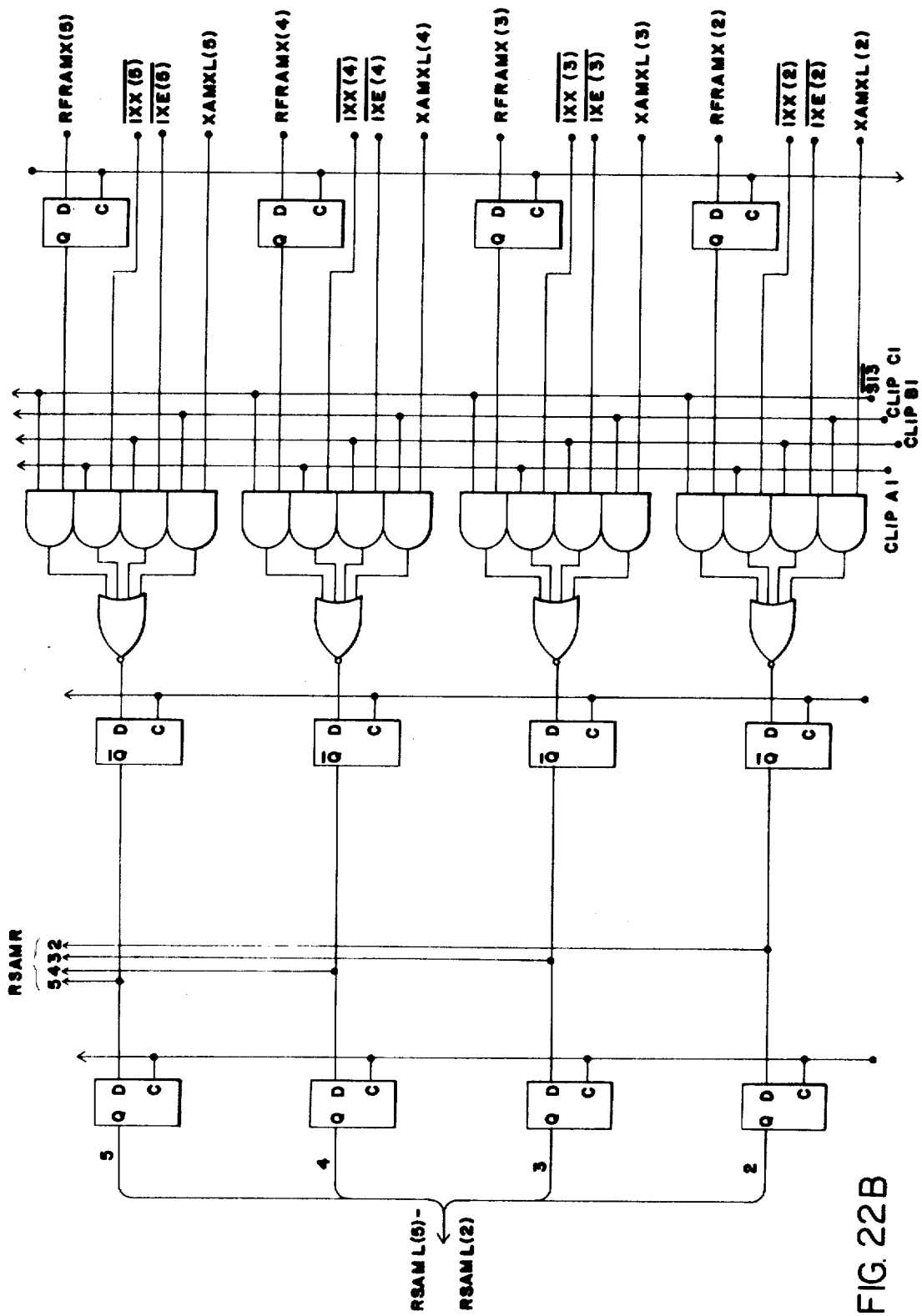
Figure 22C:
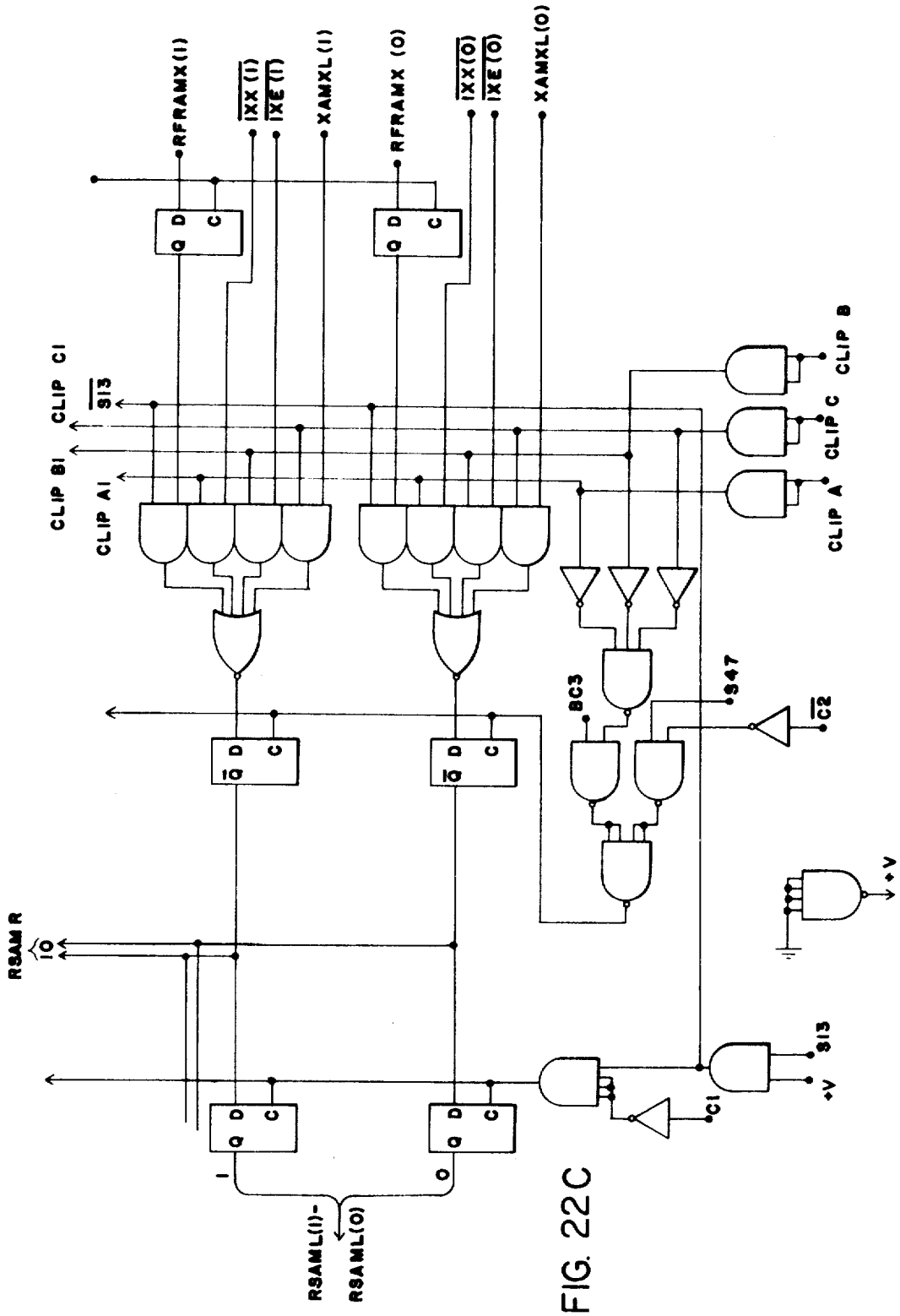
Figure 22D:
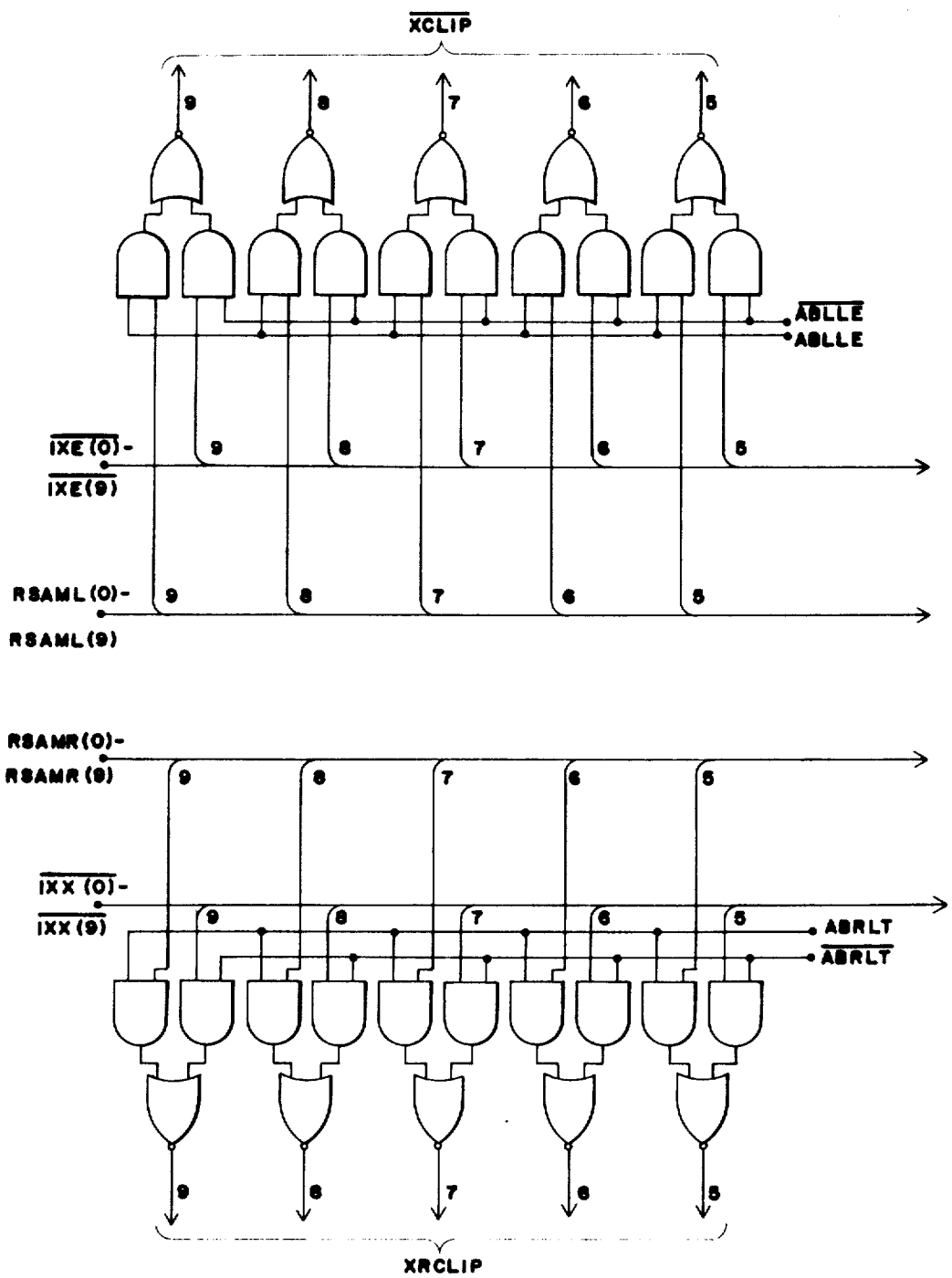
Figure 22E:
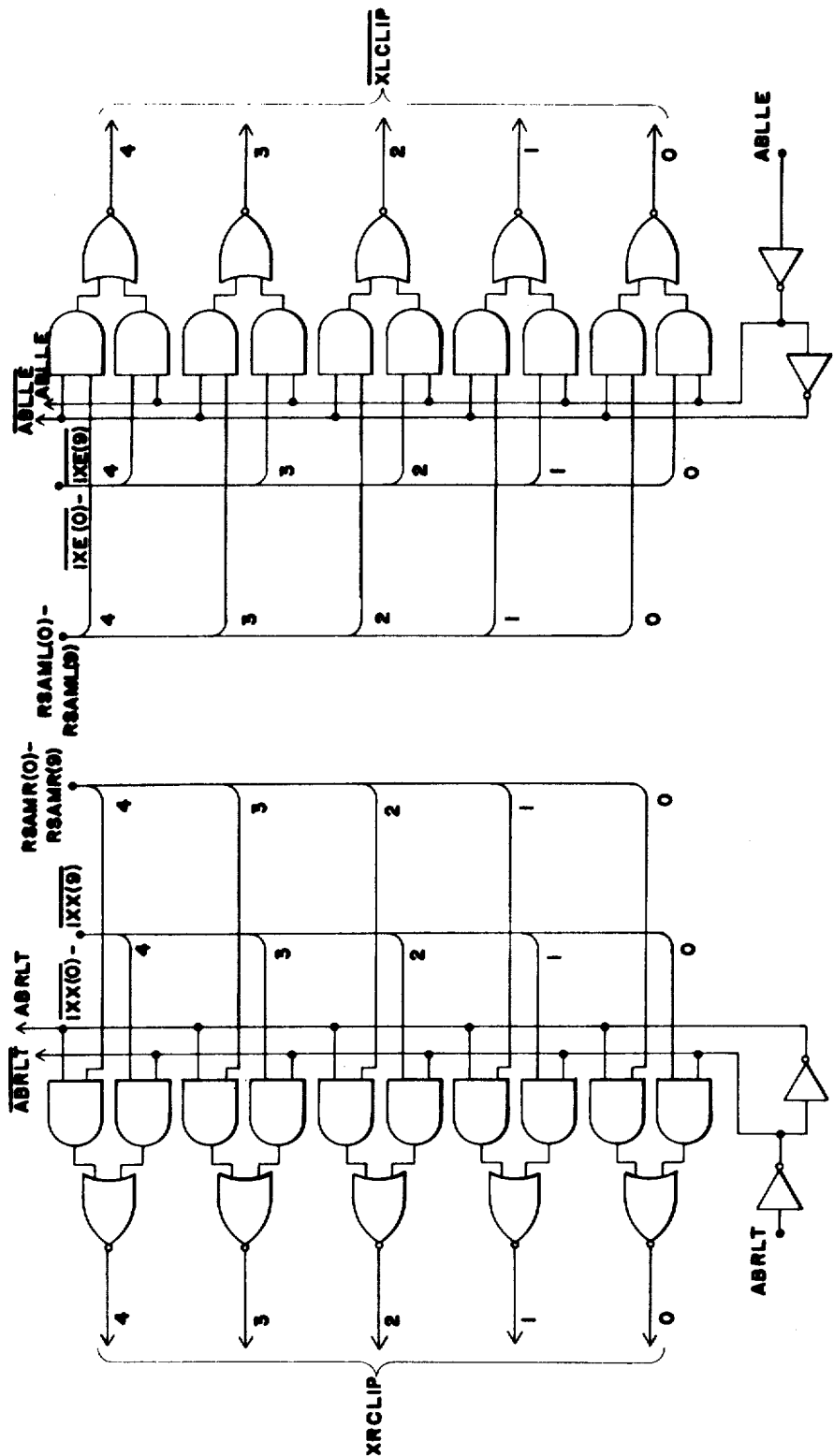
Figure 22F:
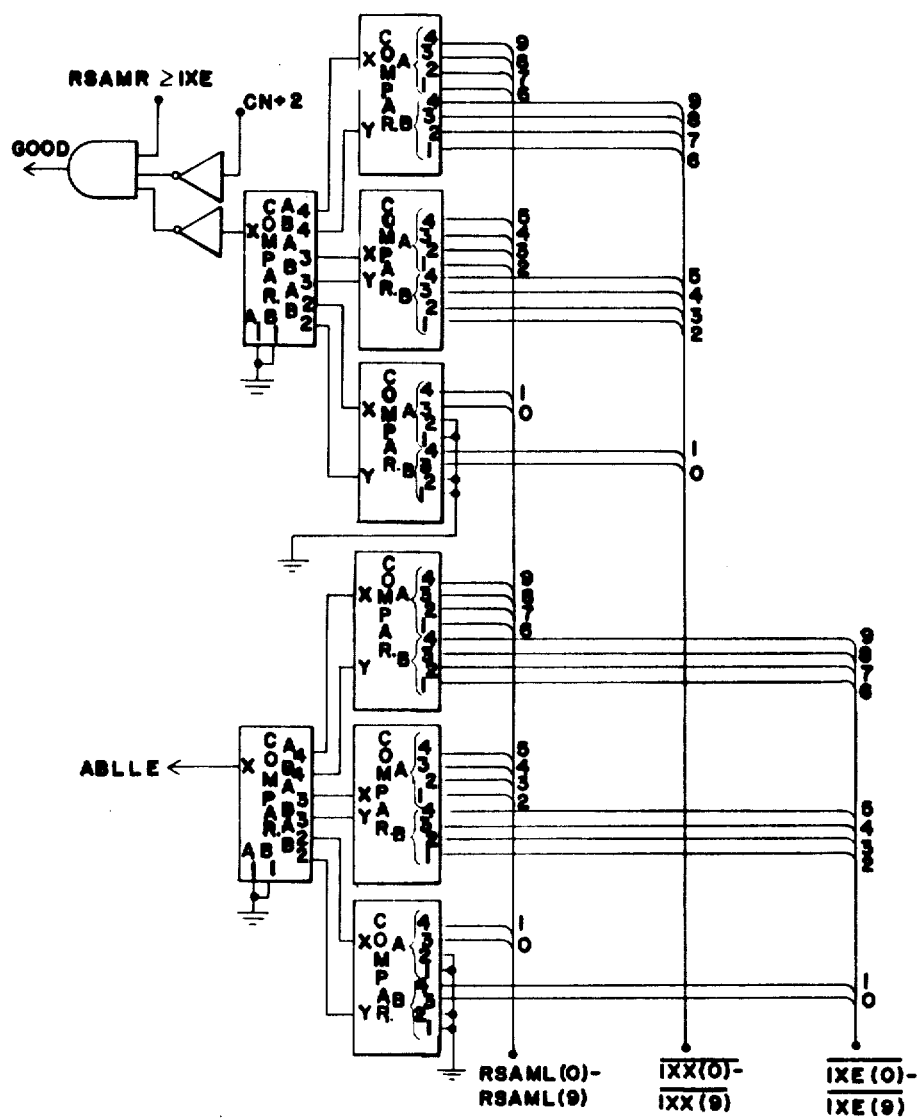
Figure 22G:
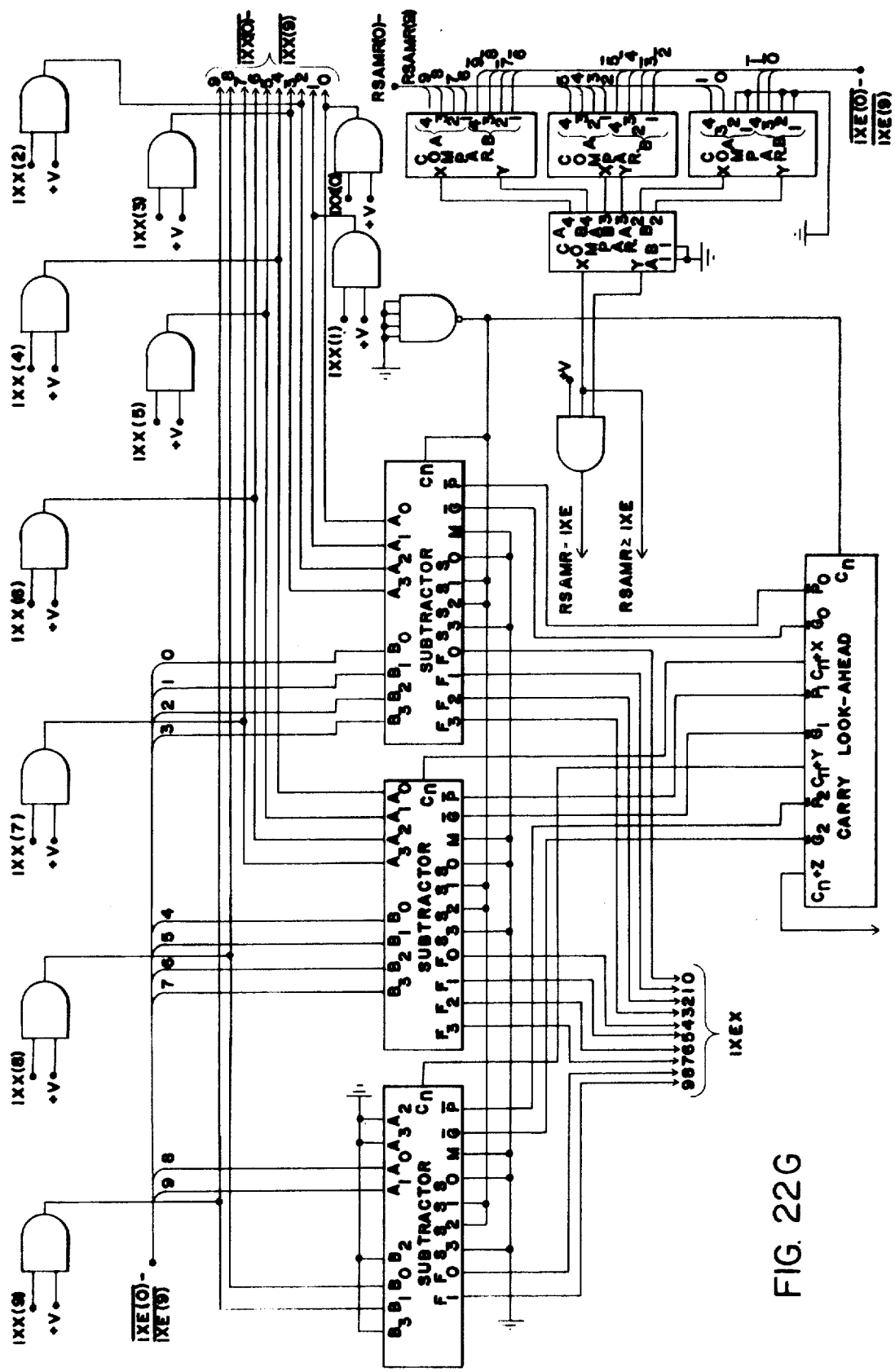
Figure 22H:
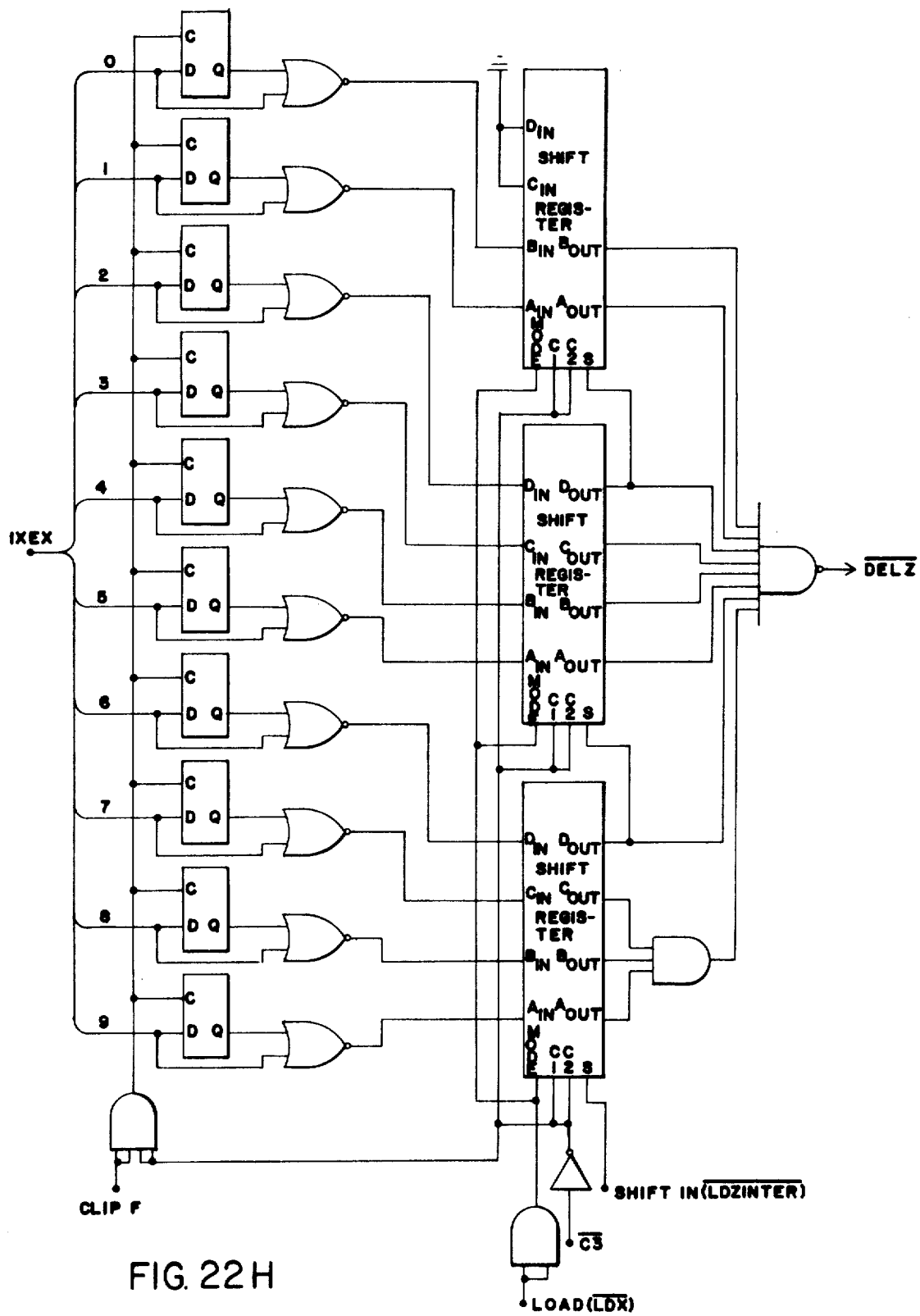
Figure 22J:
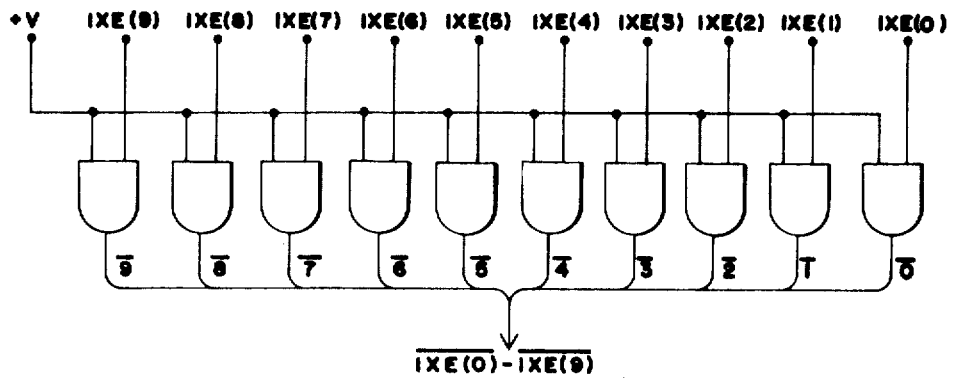
Figure 22I:
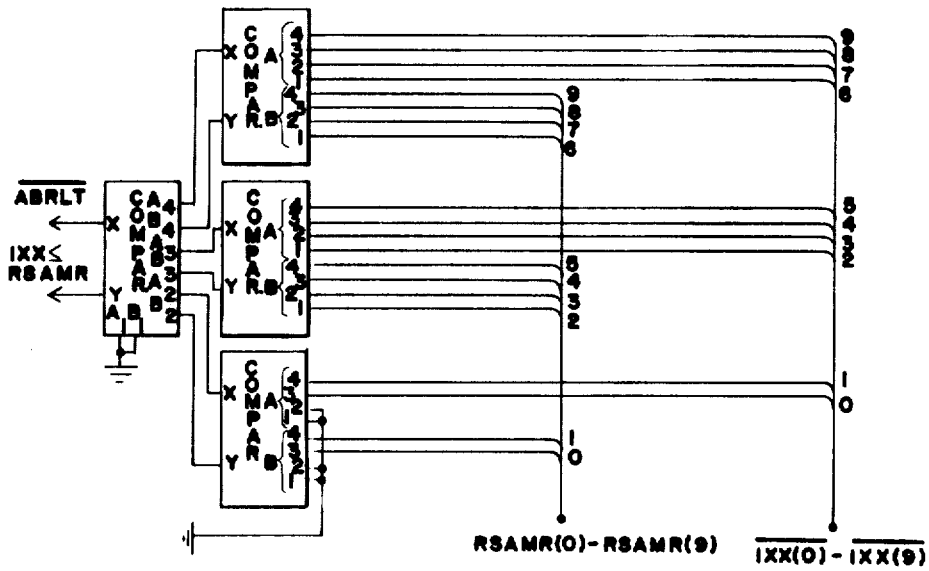
Figure 23:
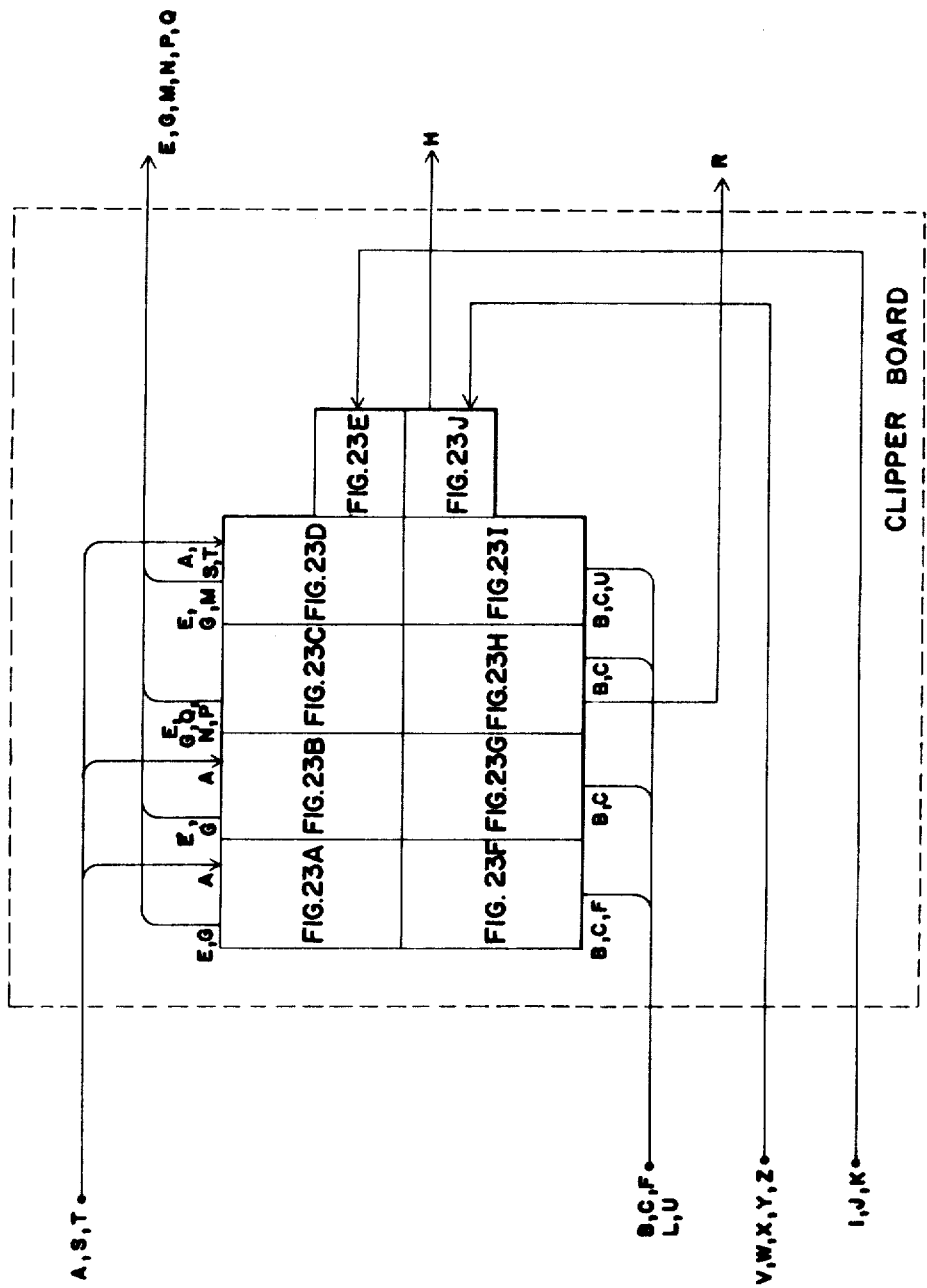
Figure 23A:
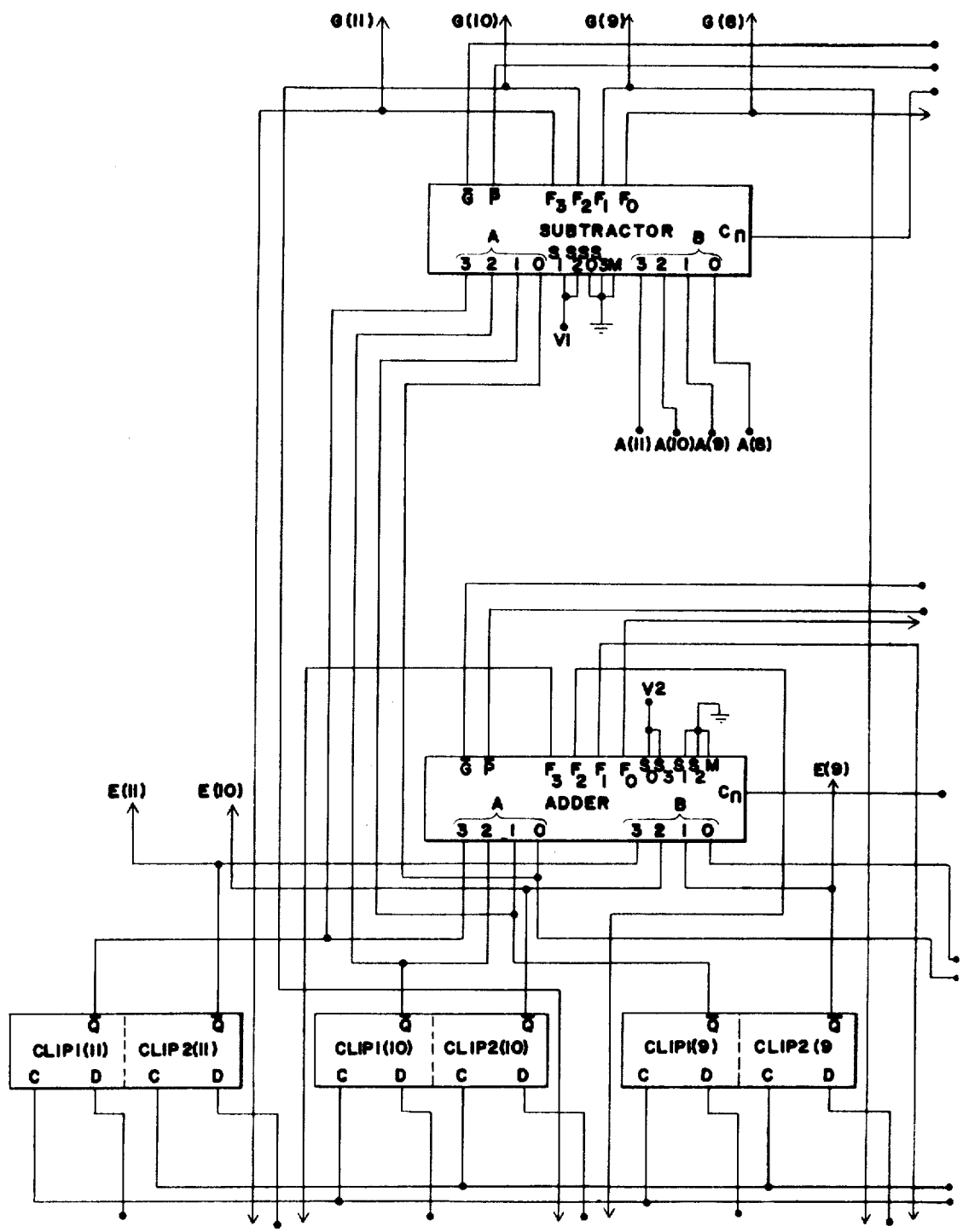
Figure 23B:
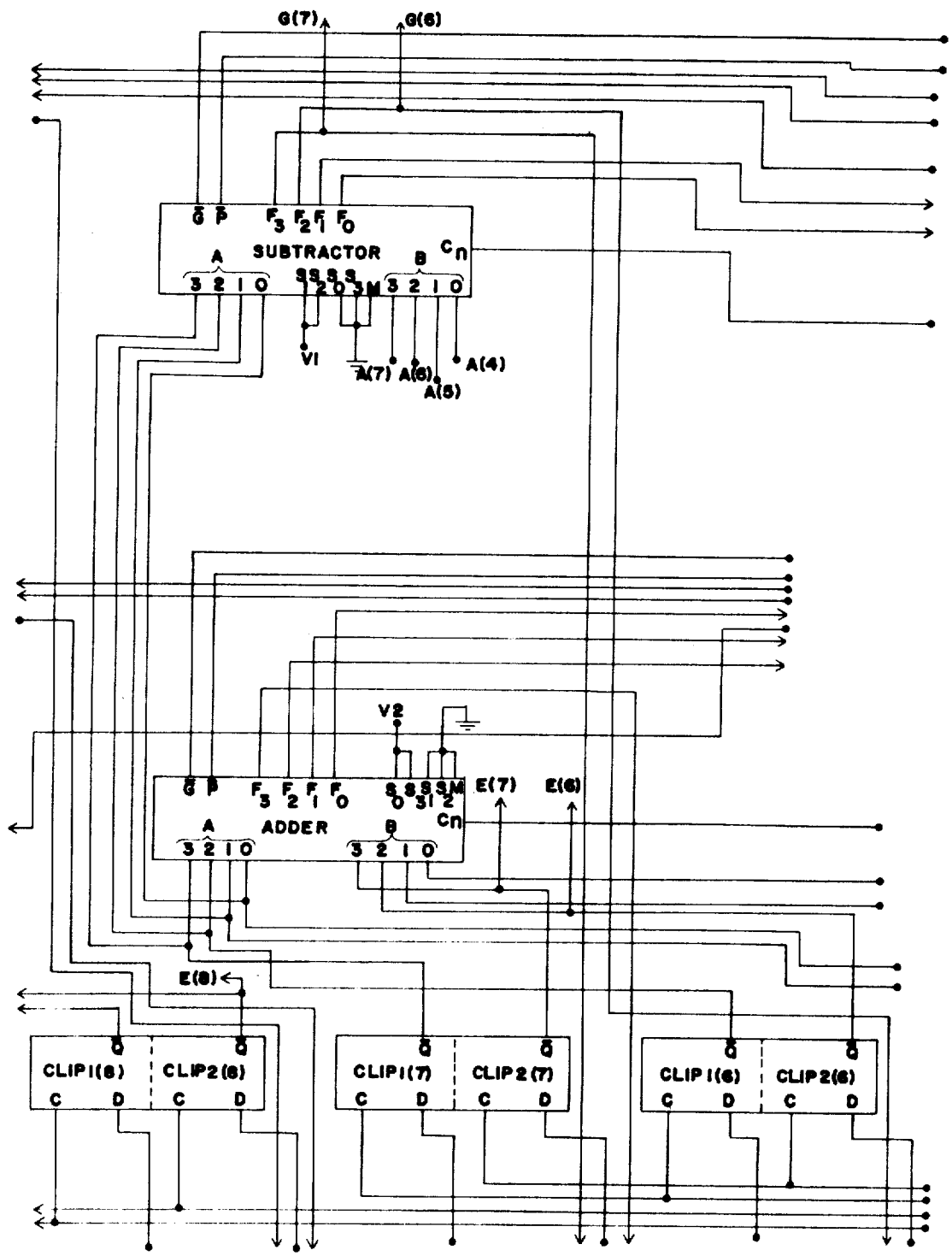
Figure 23C:
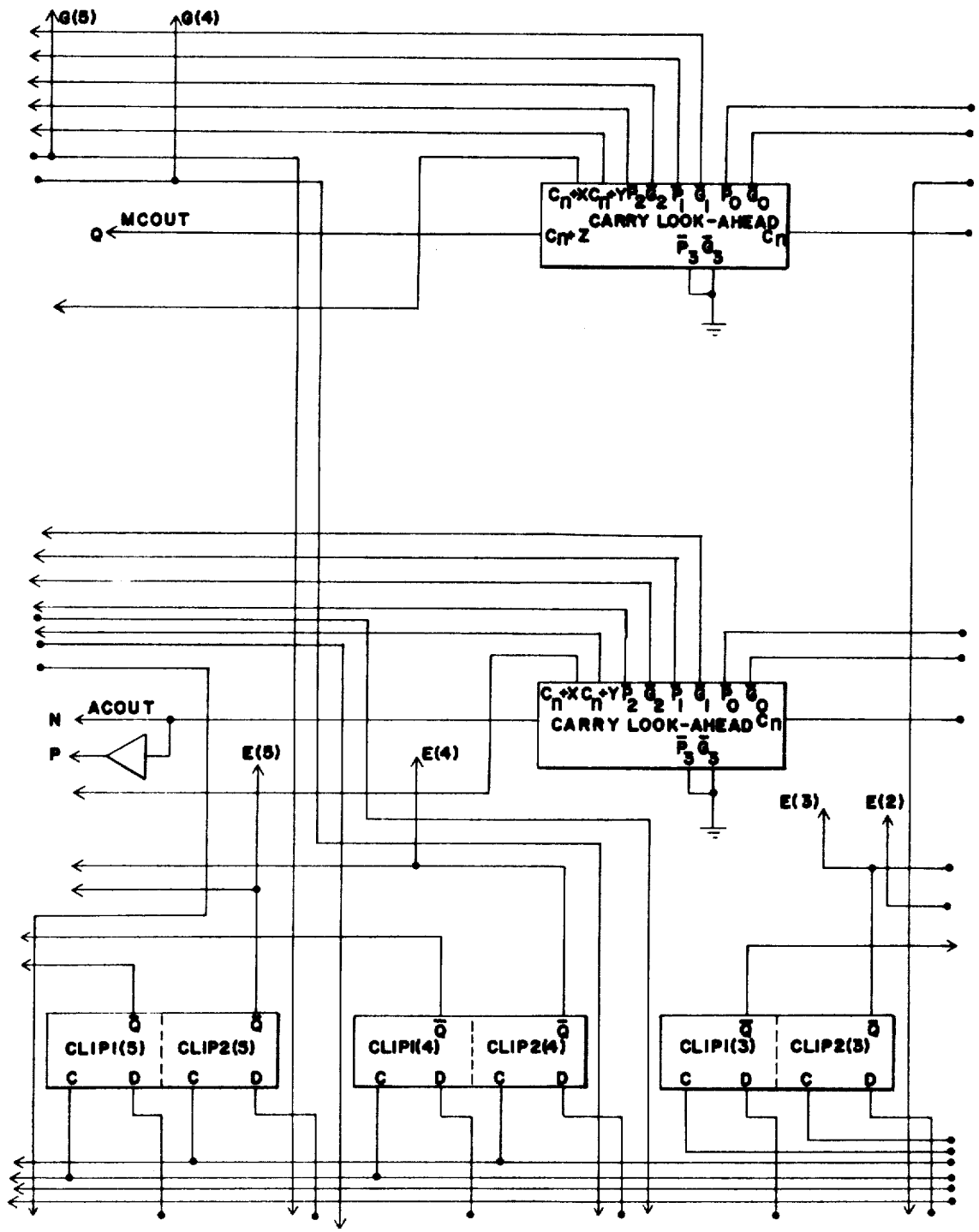
Figure 23D:
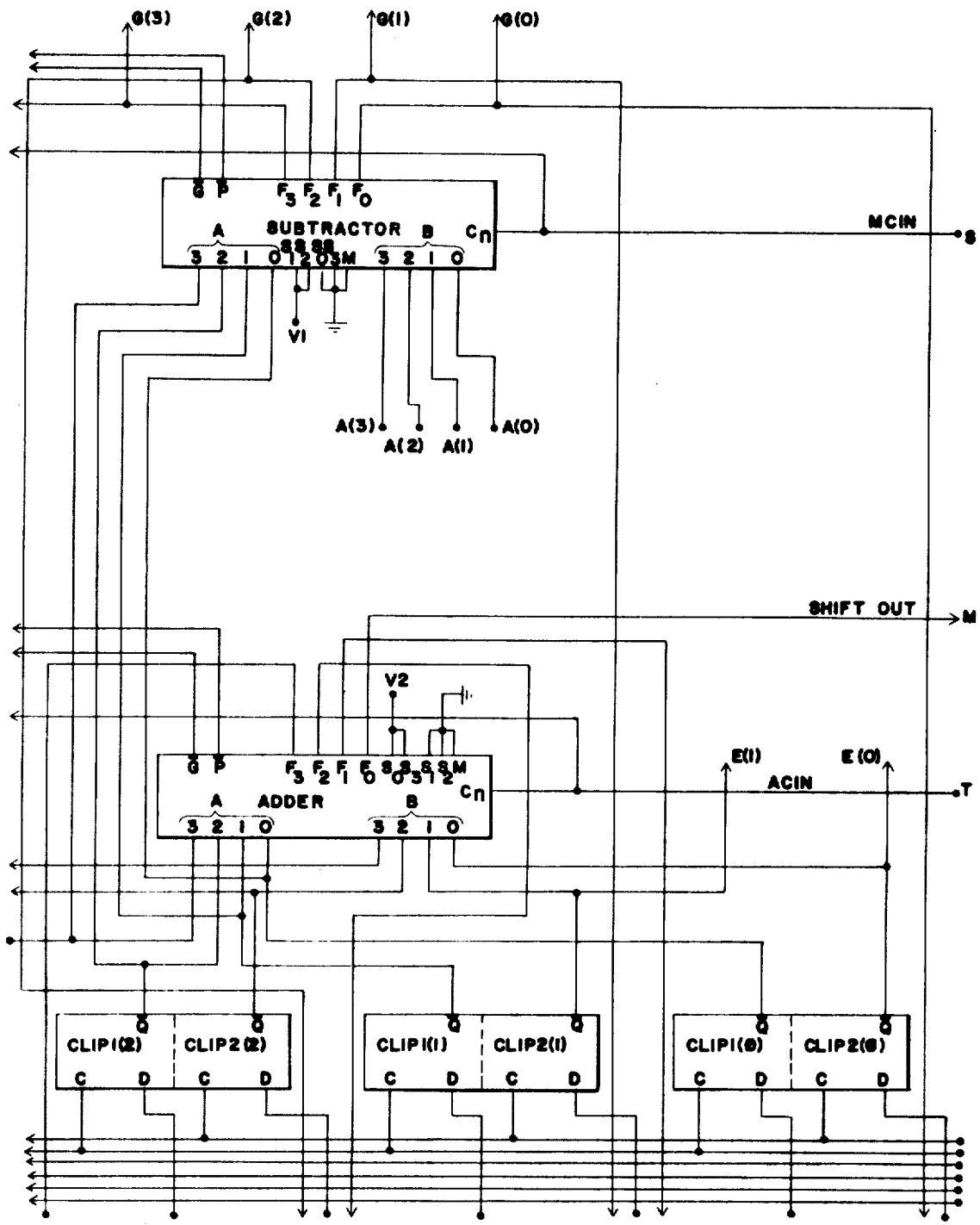
Figure 23E:
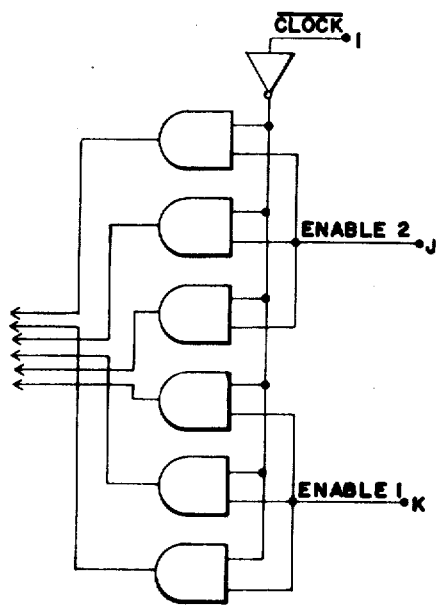
Figure 23J:
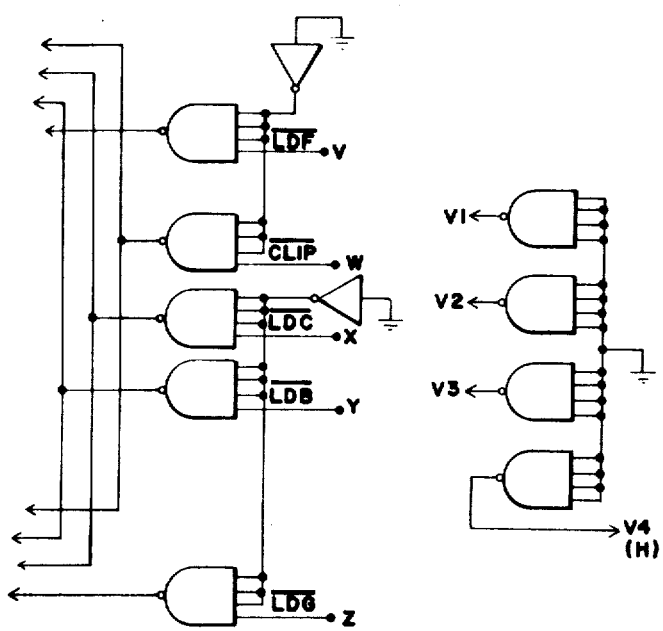
Figure 23F:
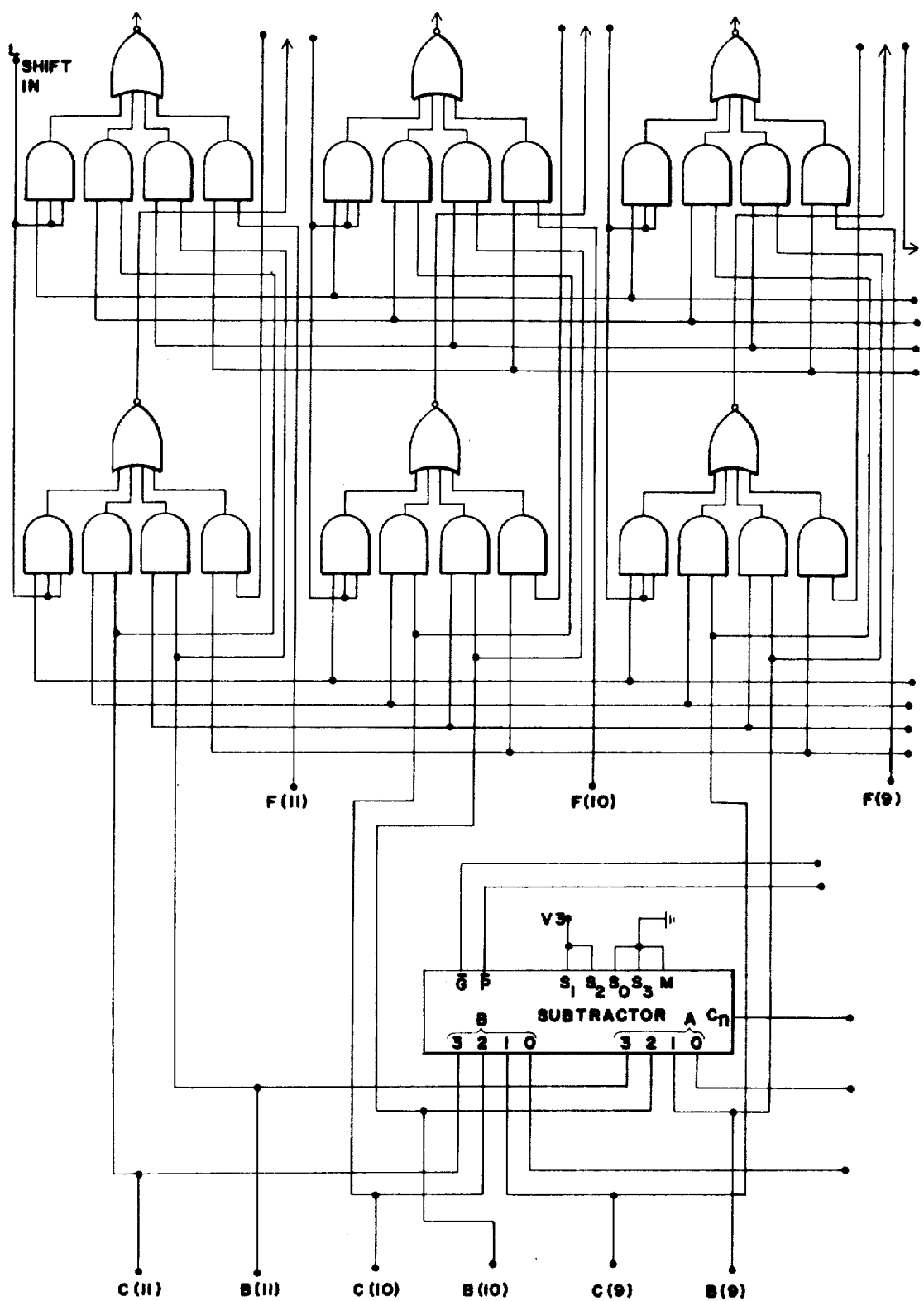
Figure 23G:
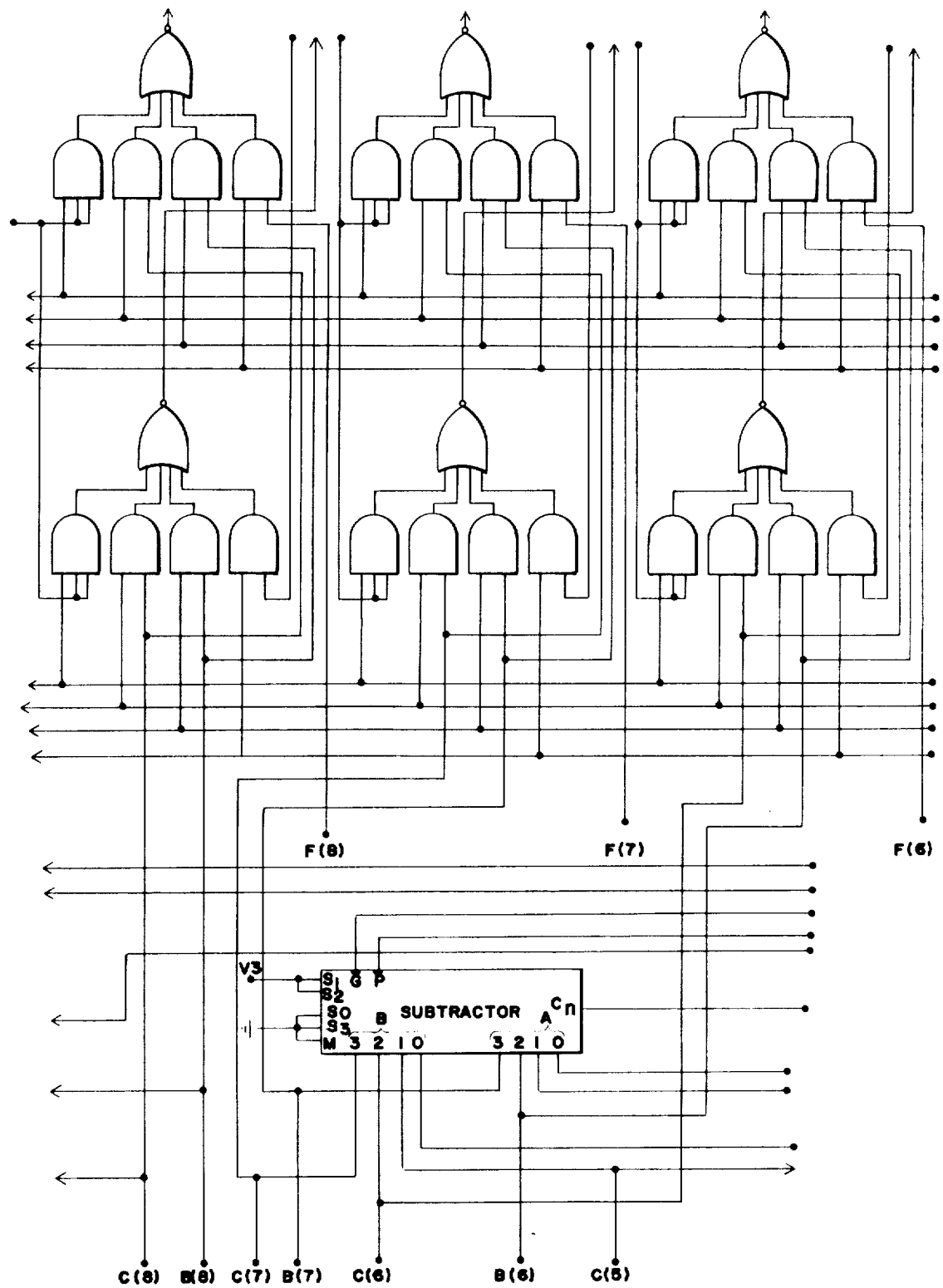
Figure 23H:
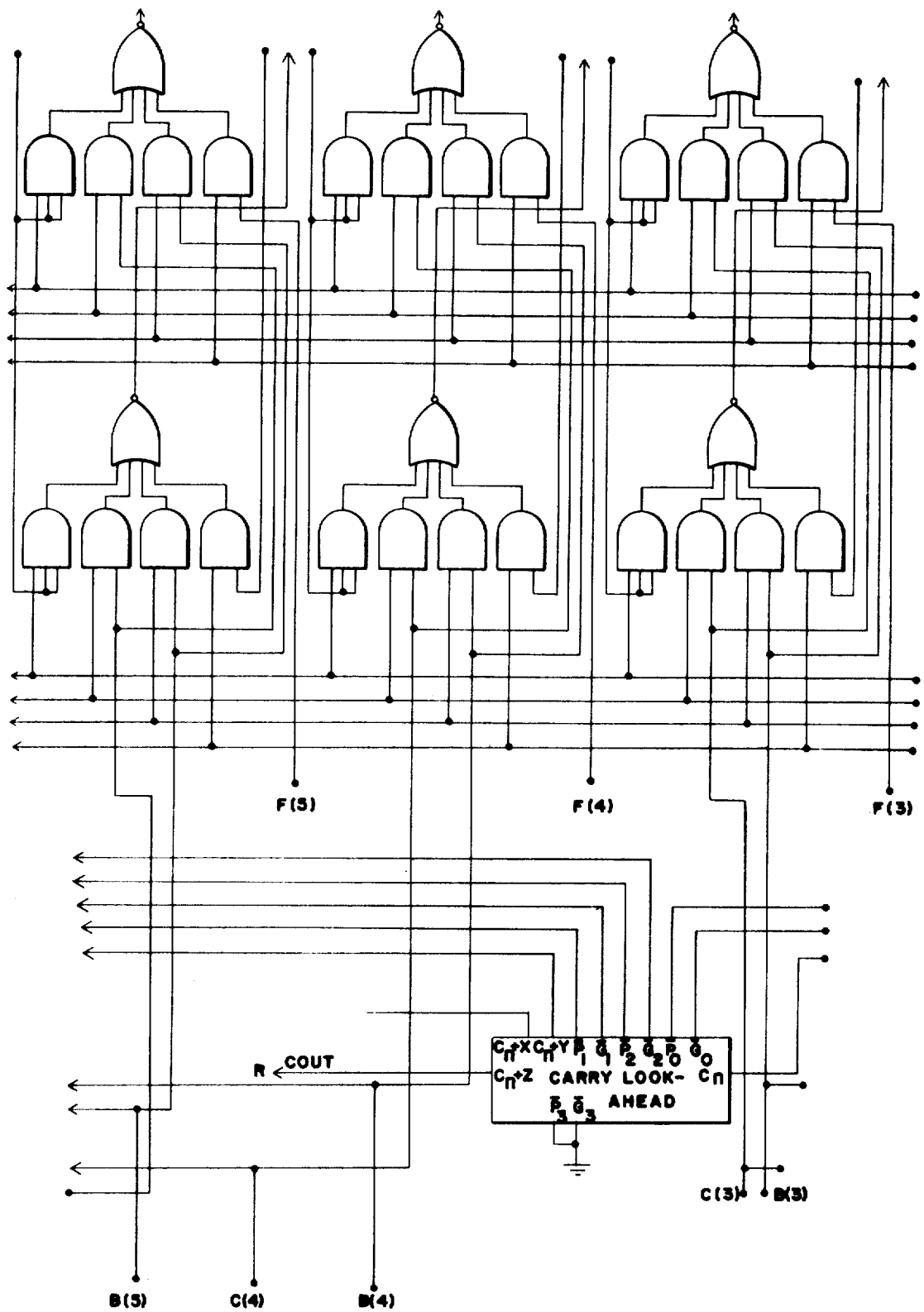
Figure 231:
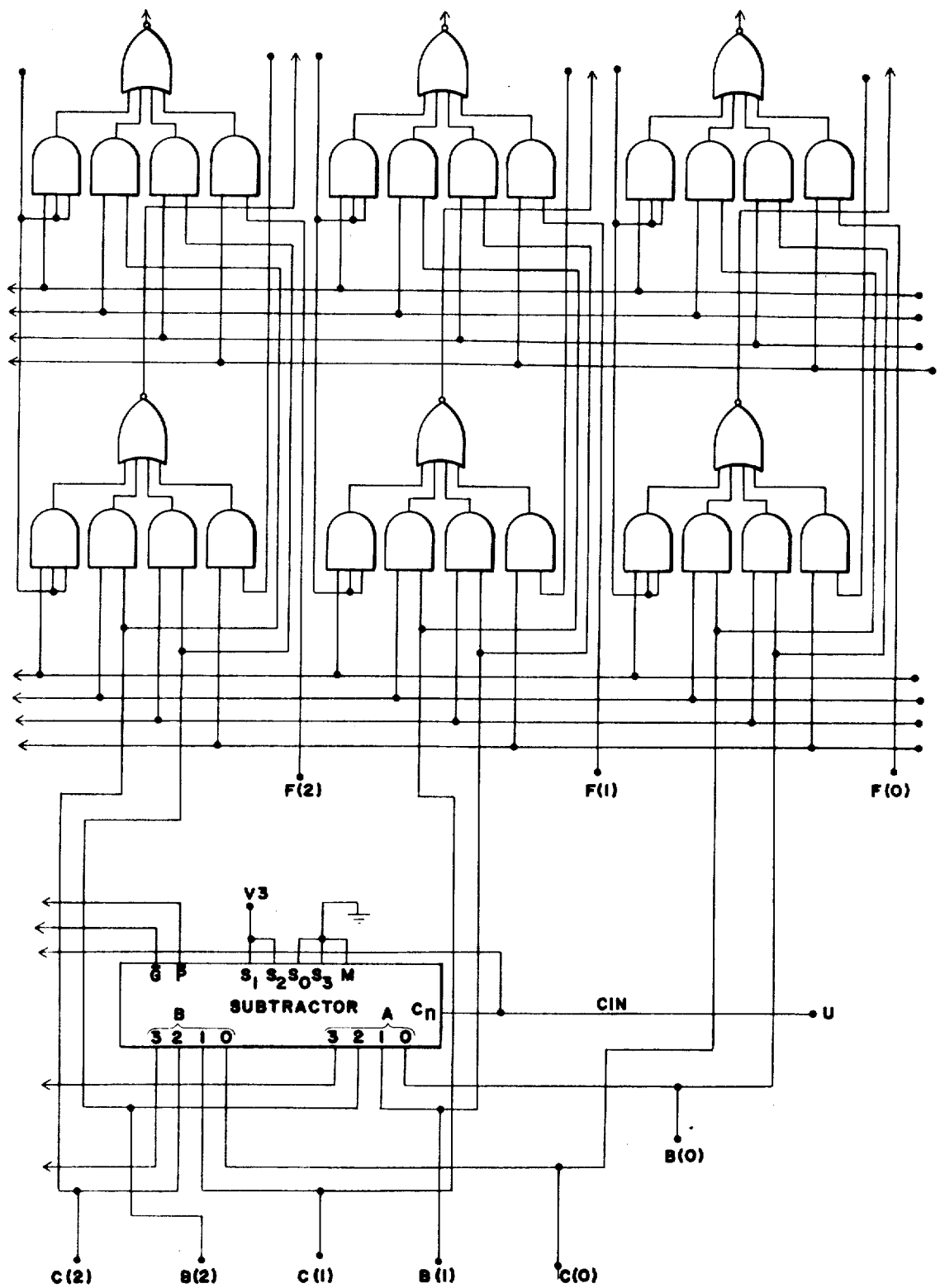
Figure 24A:
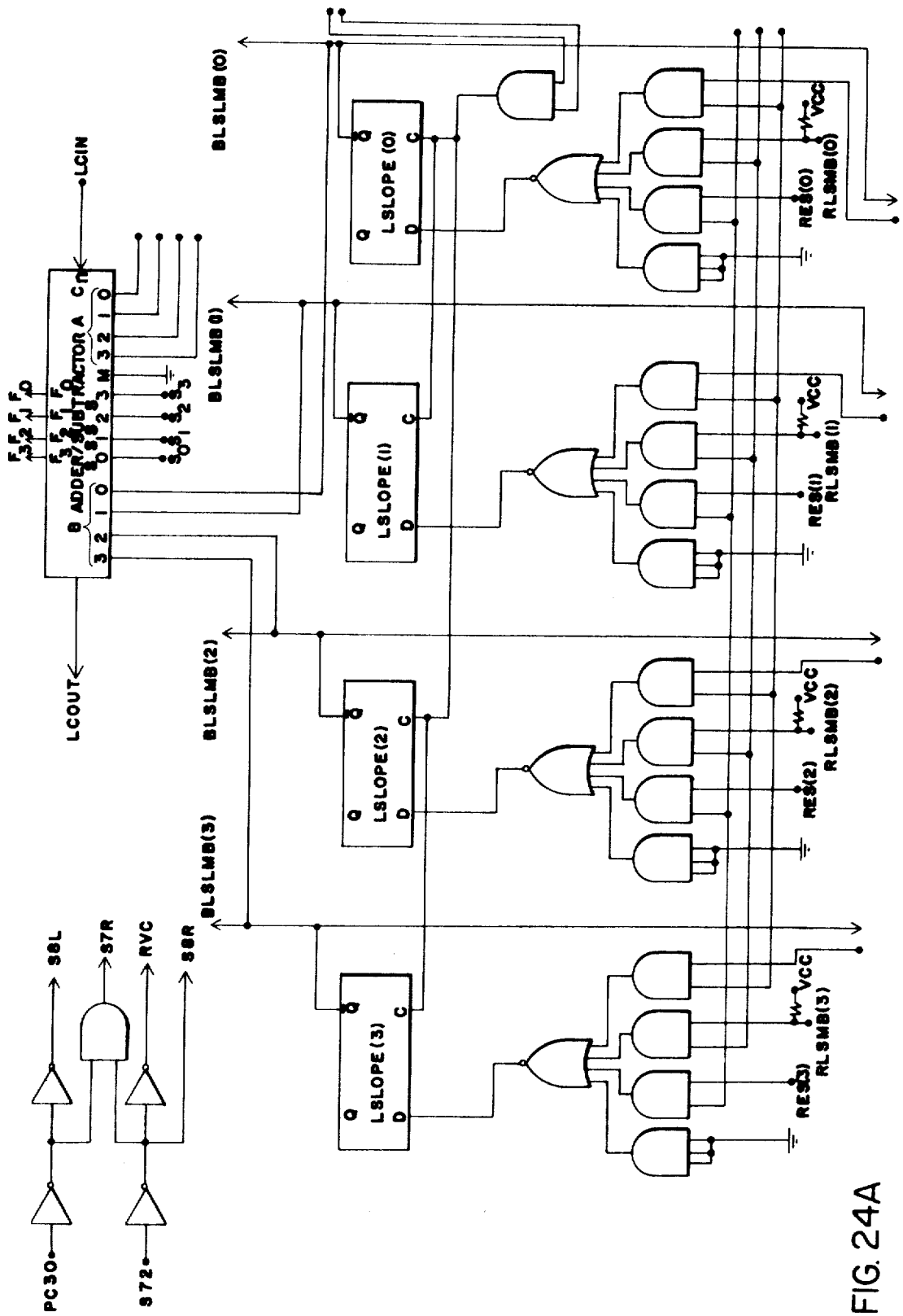
FIGS. 24A–24H are related.
Figure 24B:
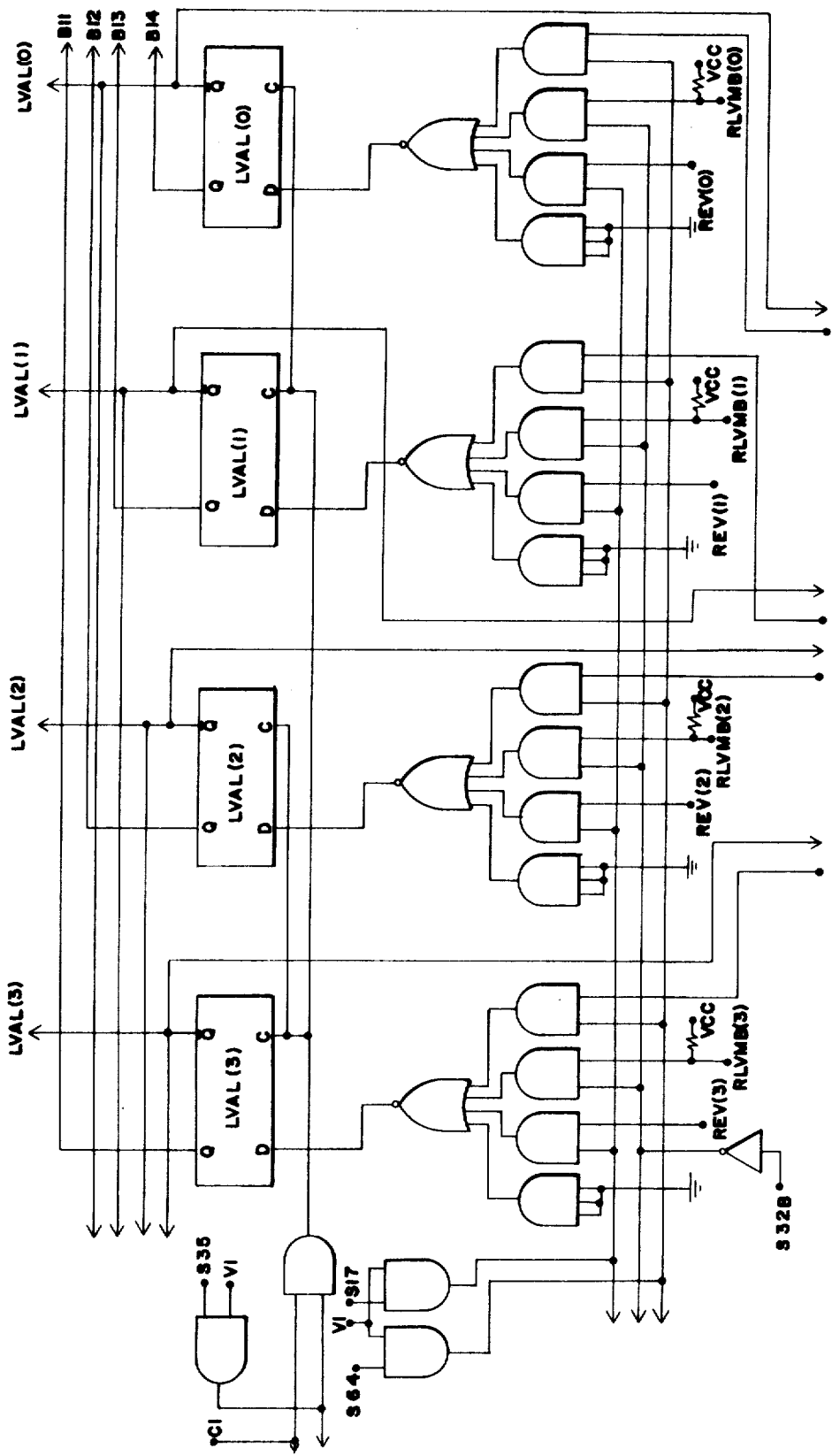
Figure 24C:
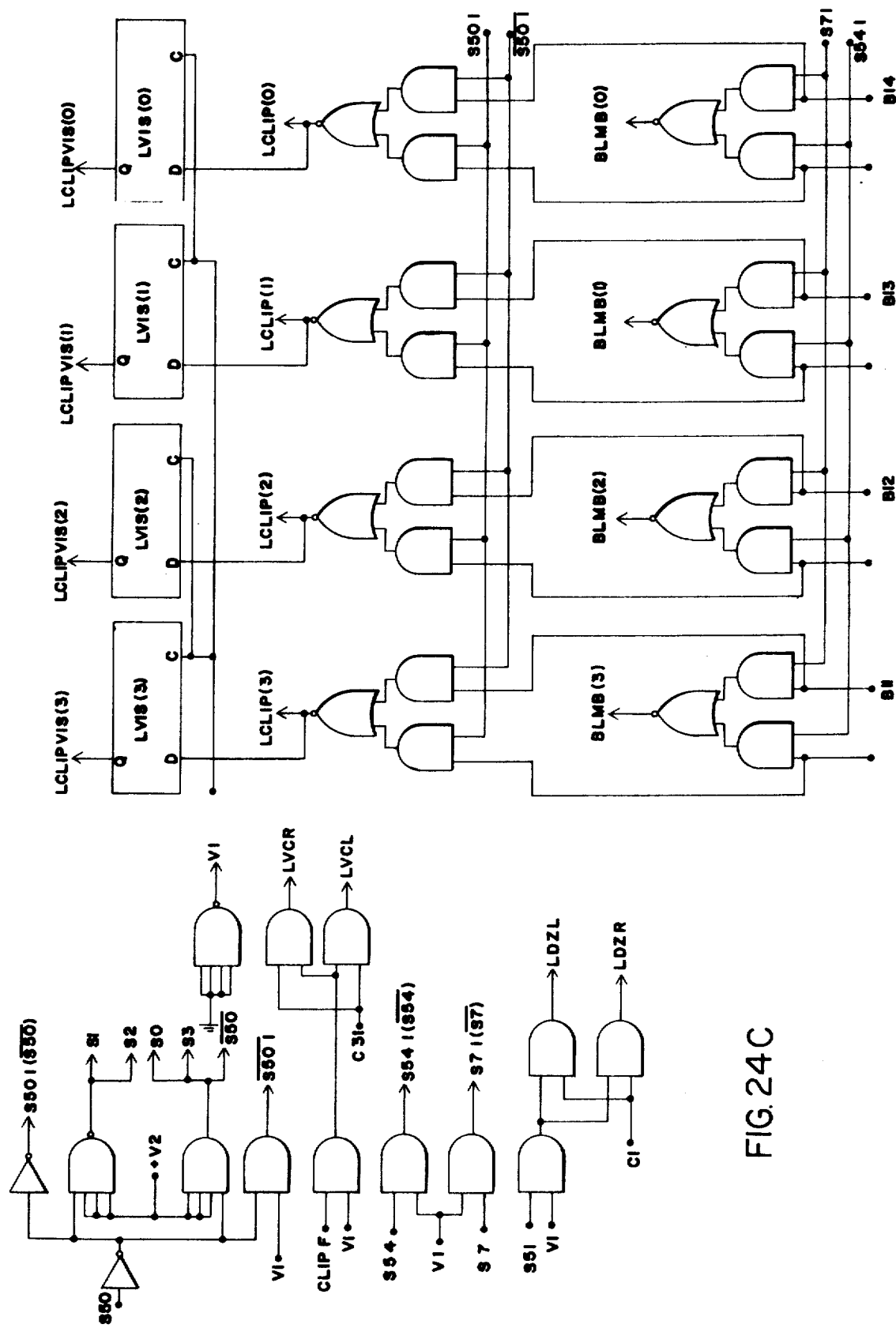
Figure 24D:
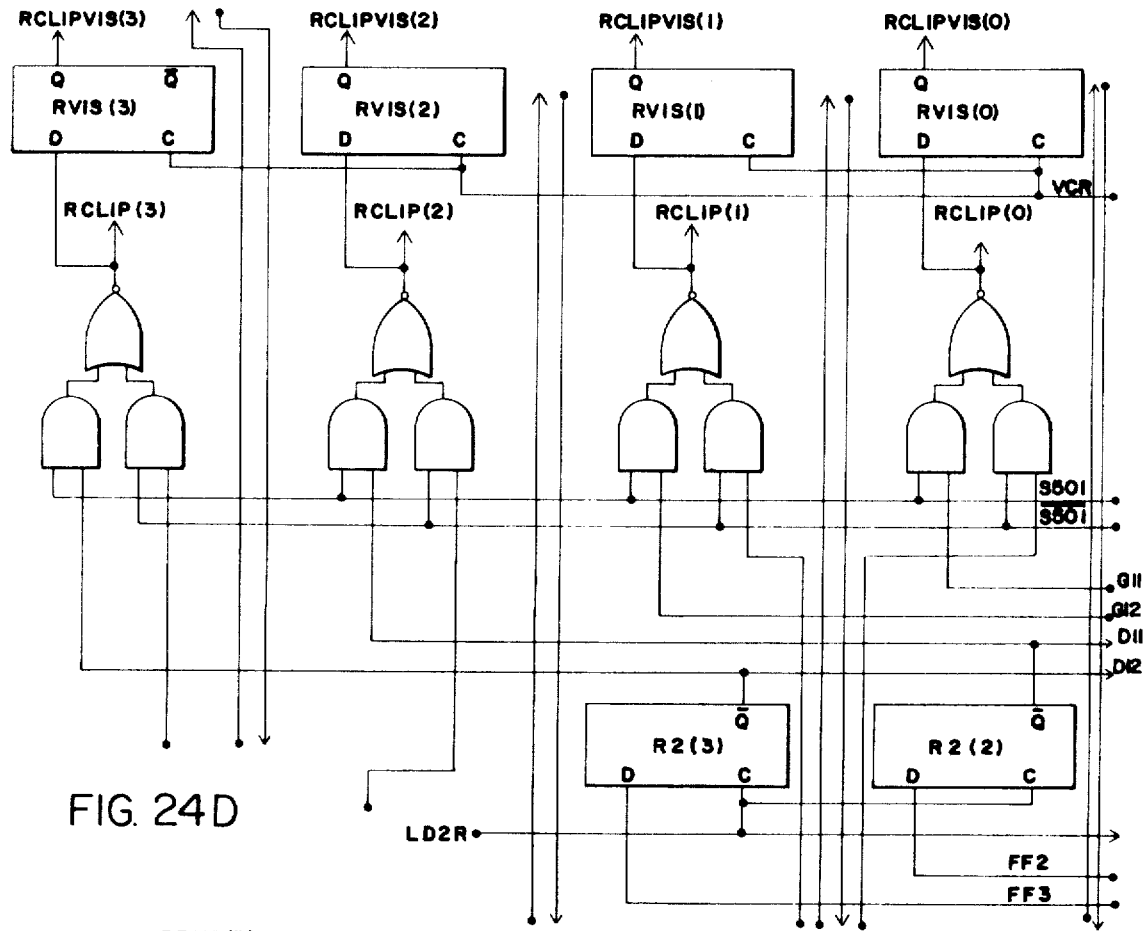
Figure 24G:
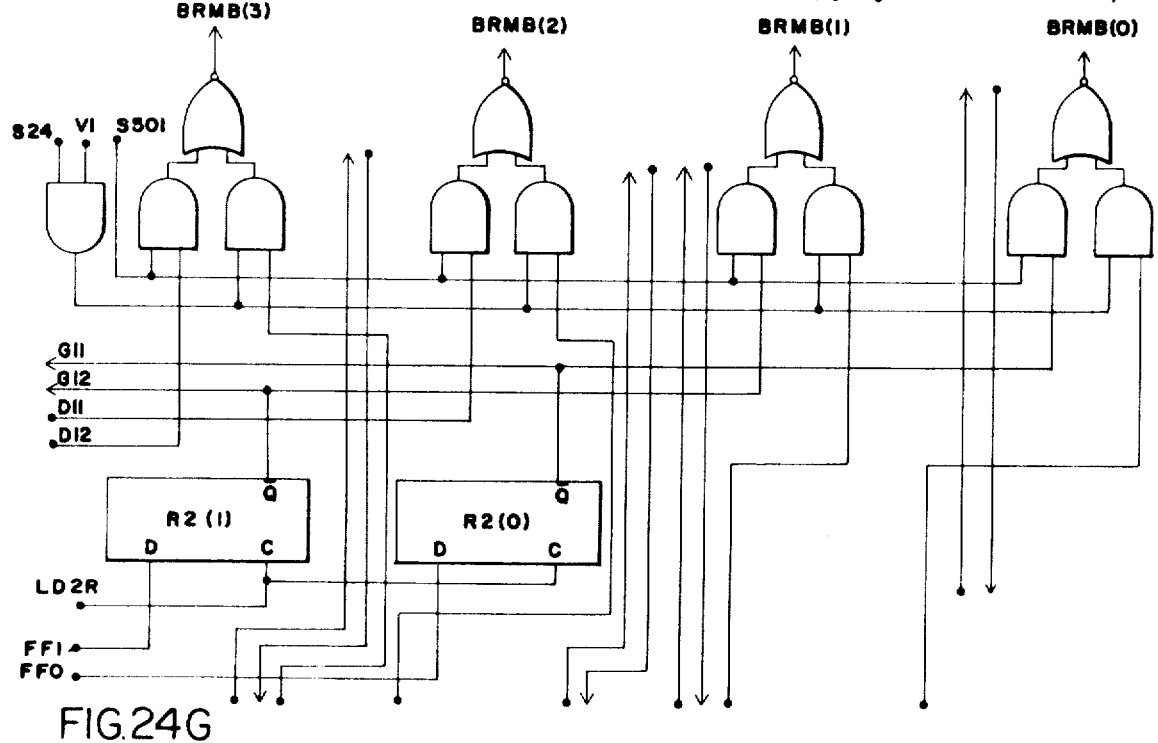
Figure 24E:
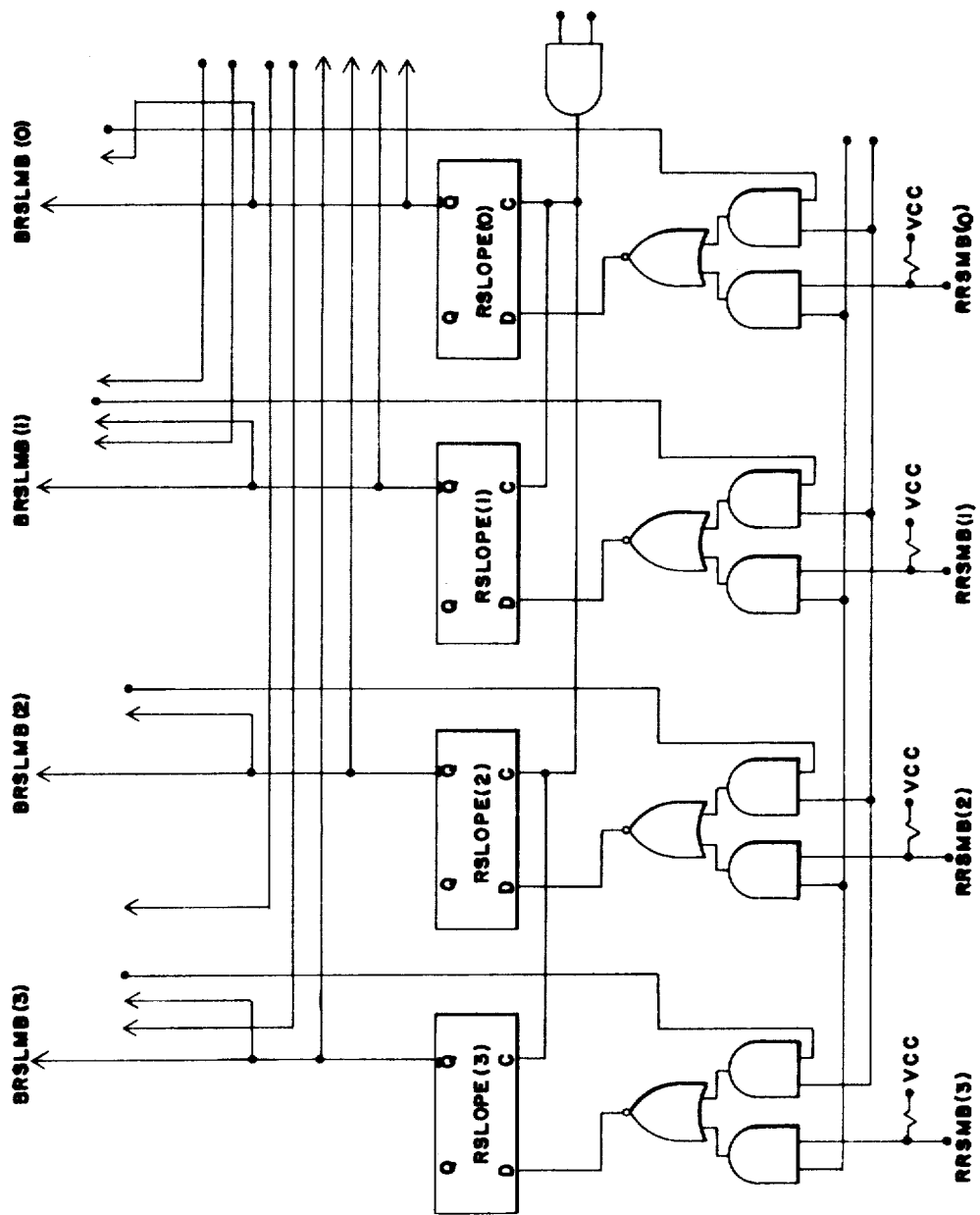
Figure 24F:
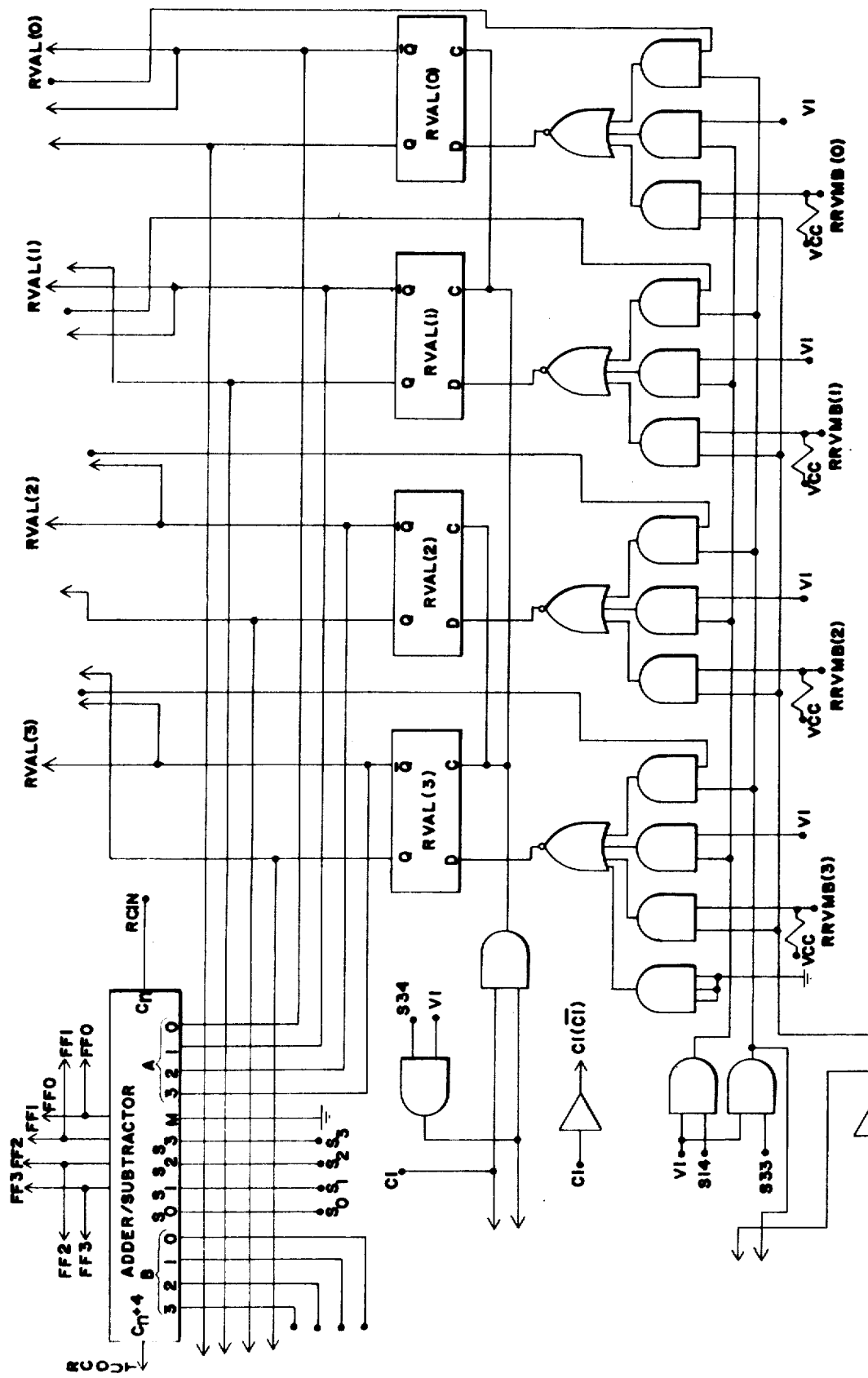
Figure 24H:
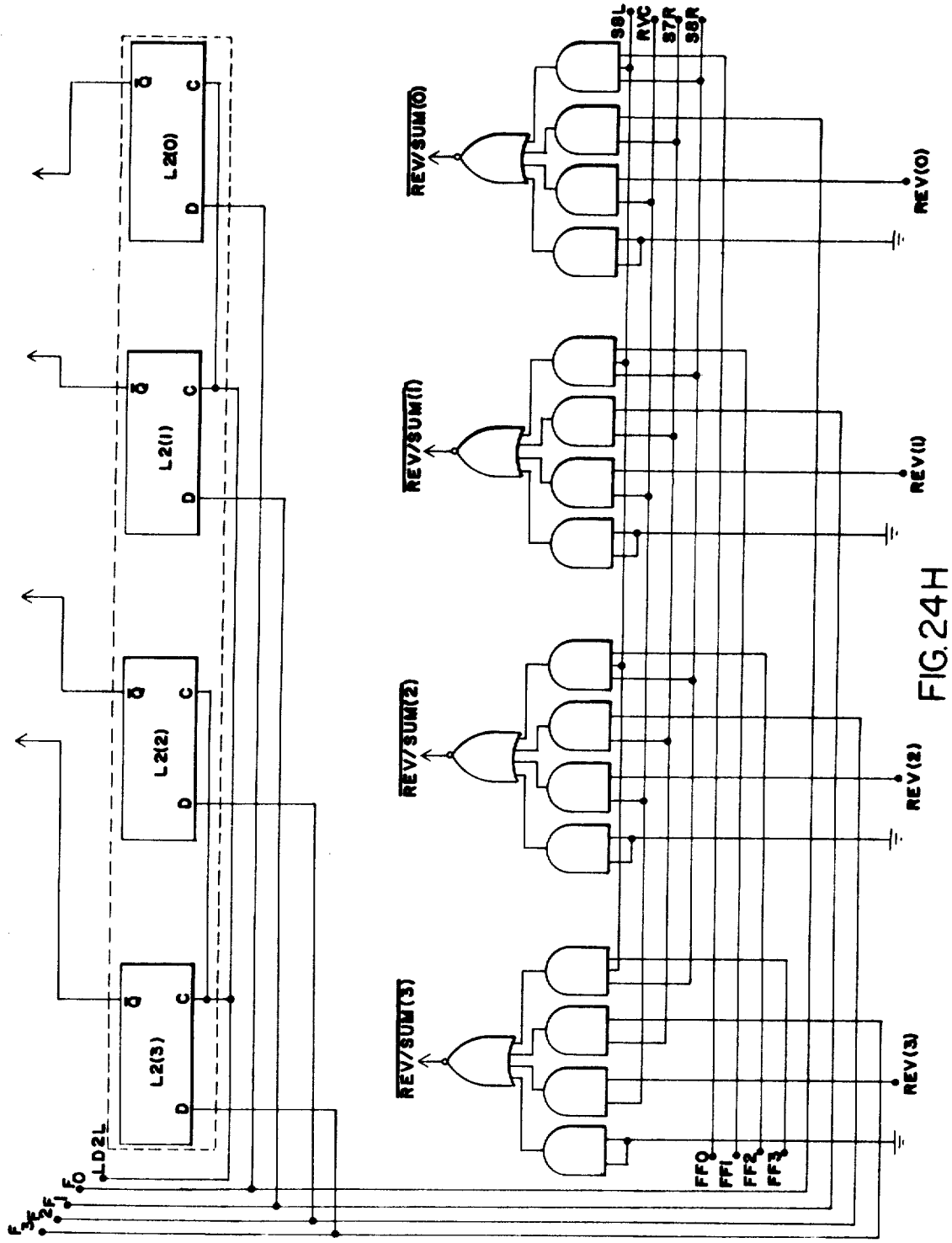
Figure 25:
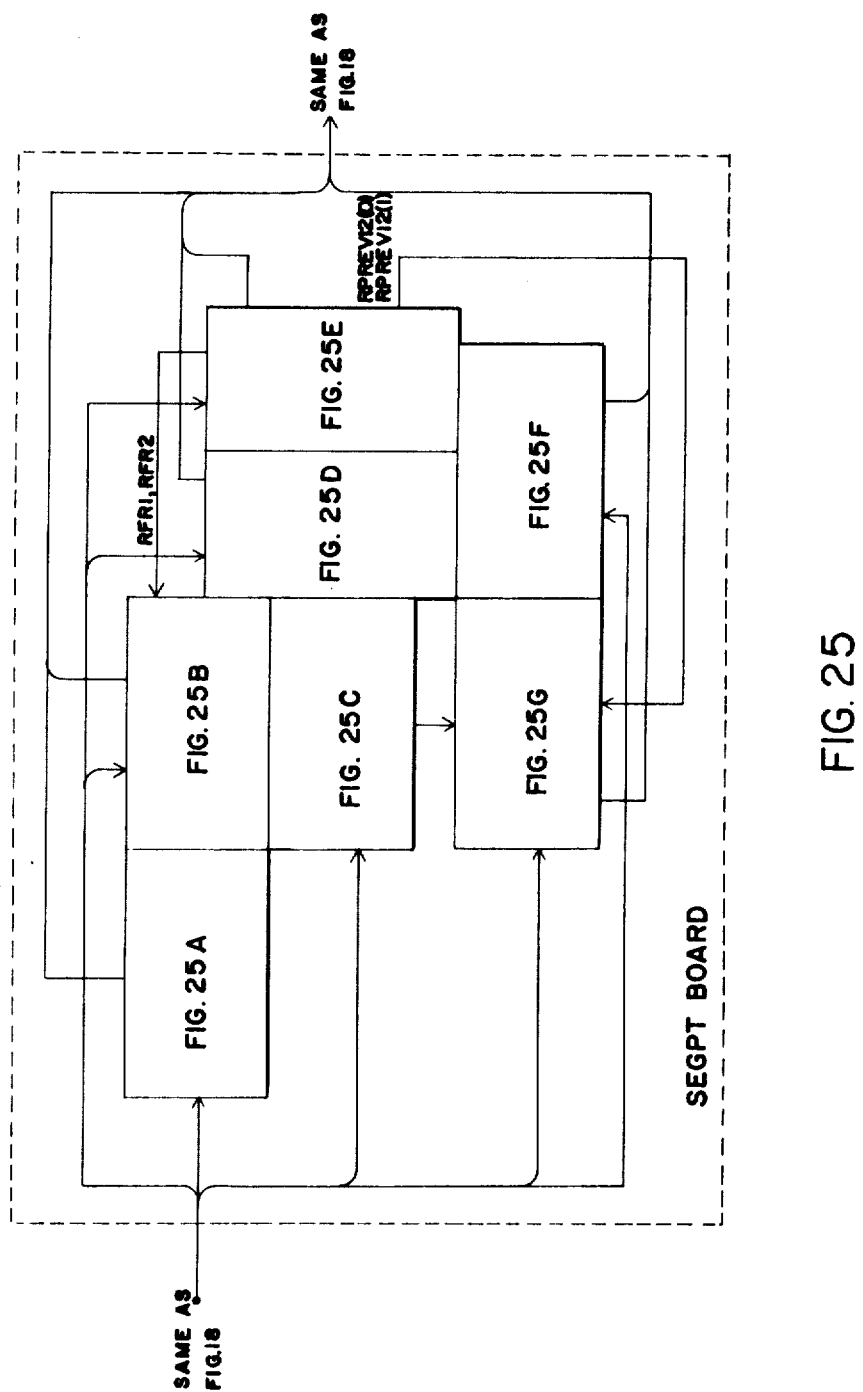
Figure 25A:
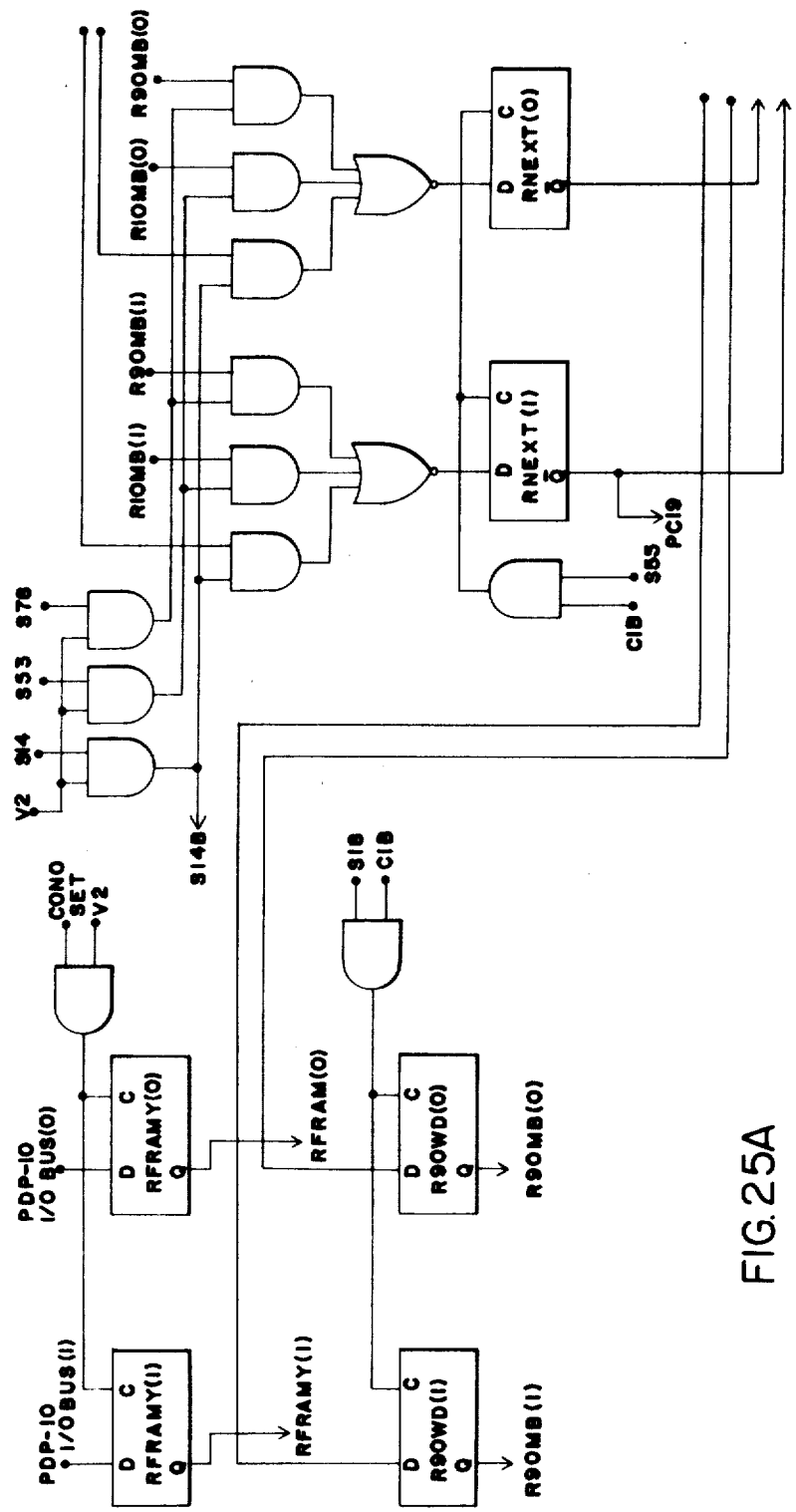
FIGS. 25A–25H are related.
Figure 25B:
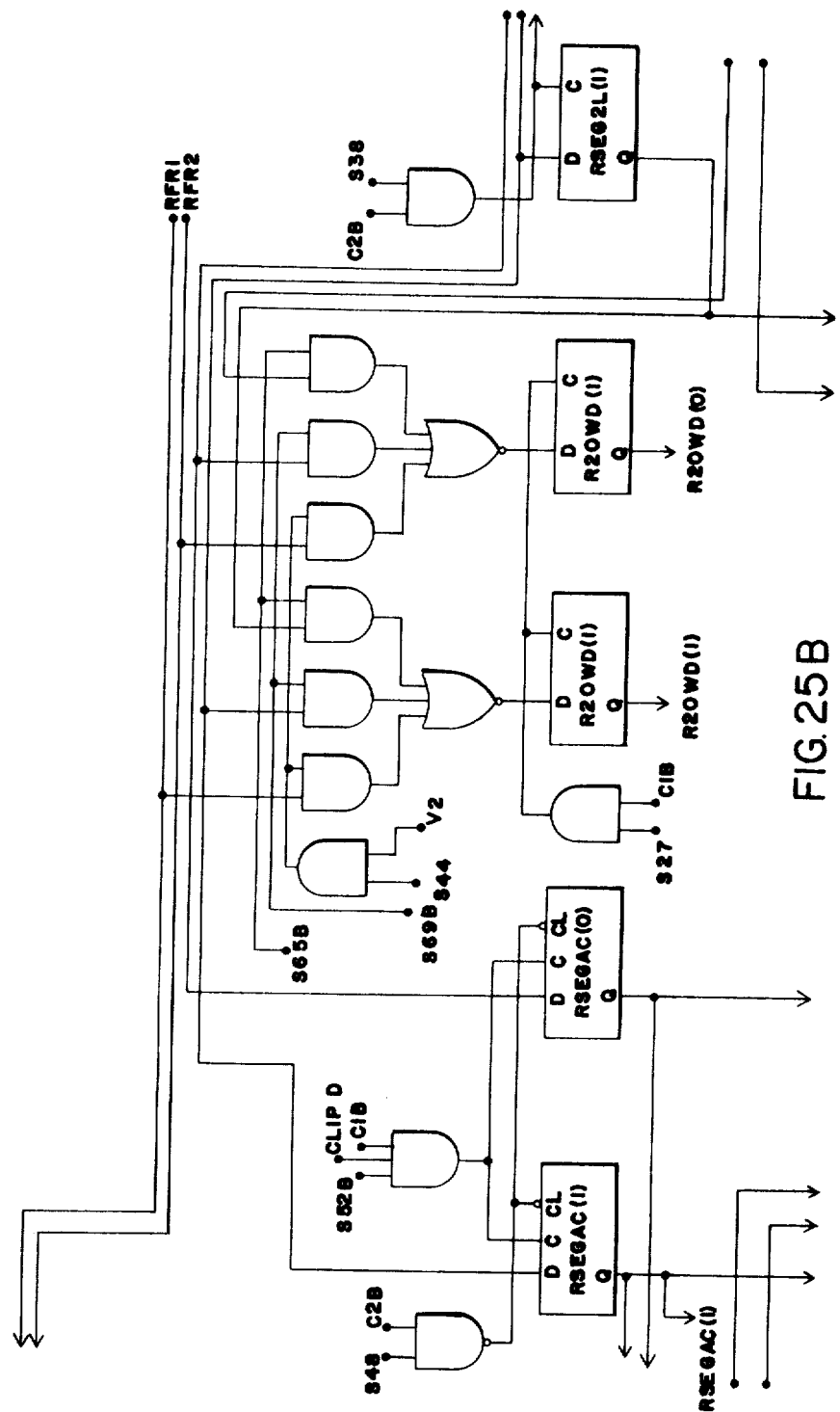
Figure 25C:
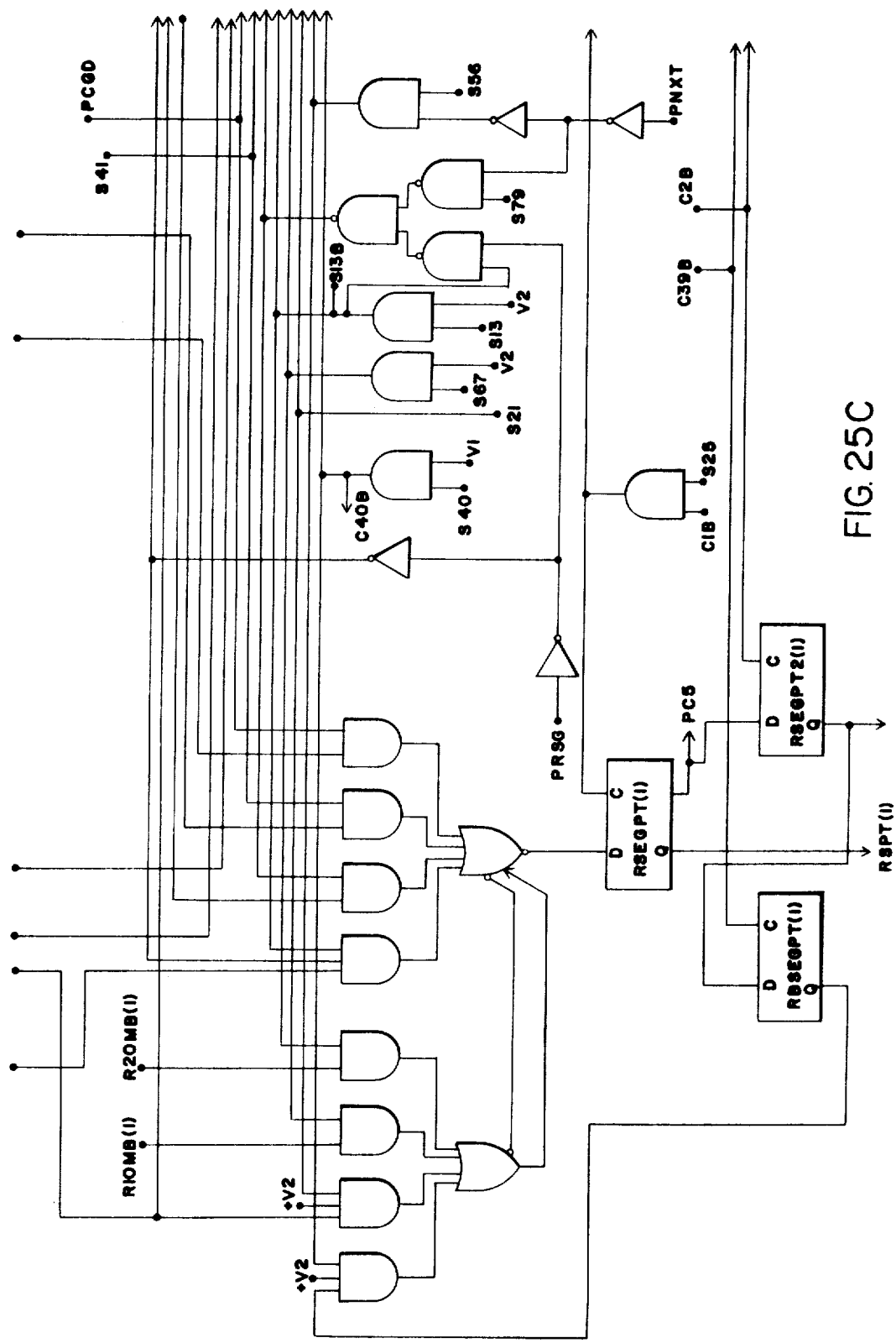
Figure 25D:
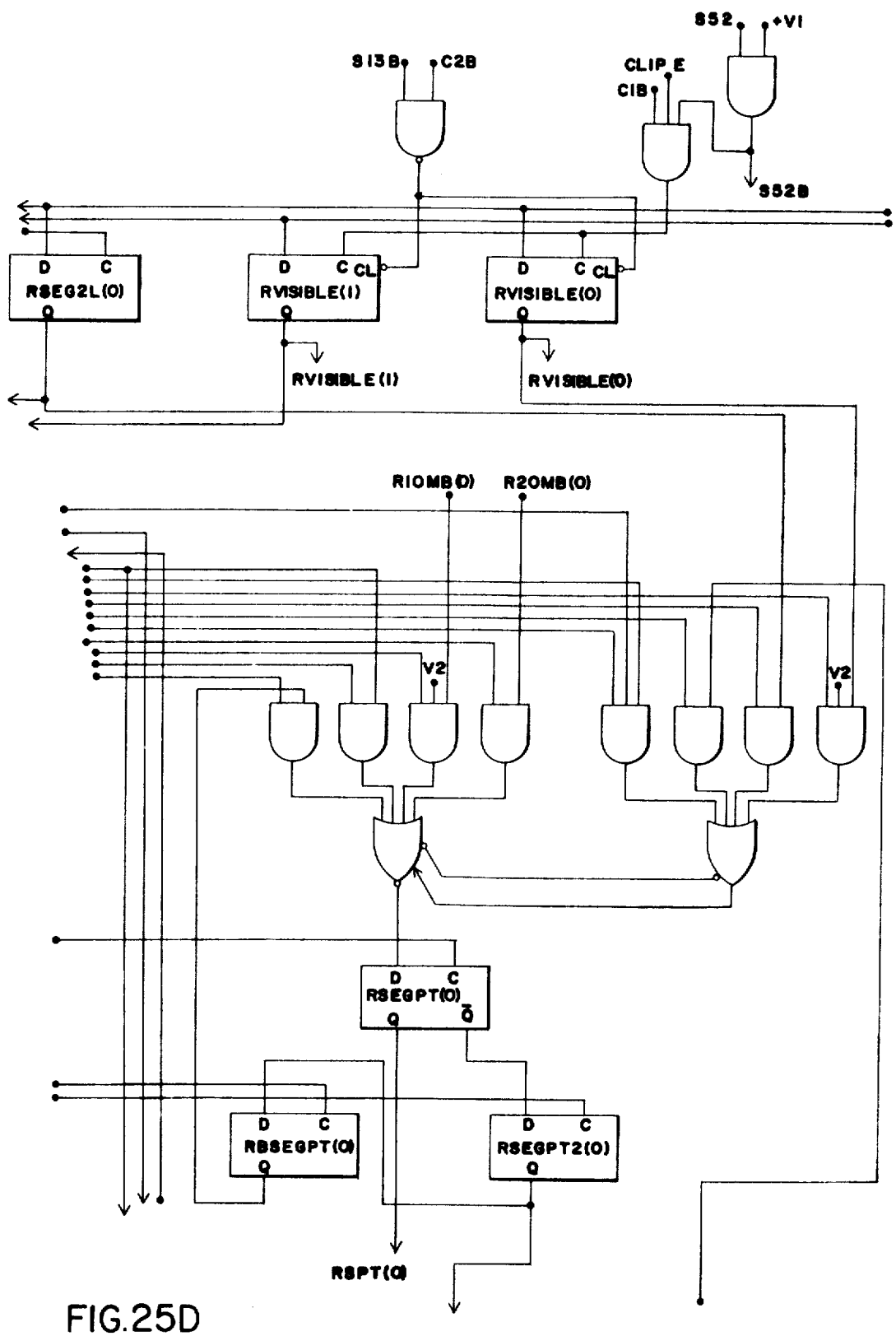
Figure 25E:
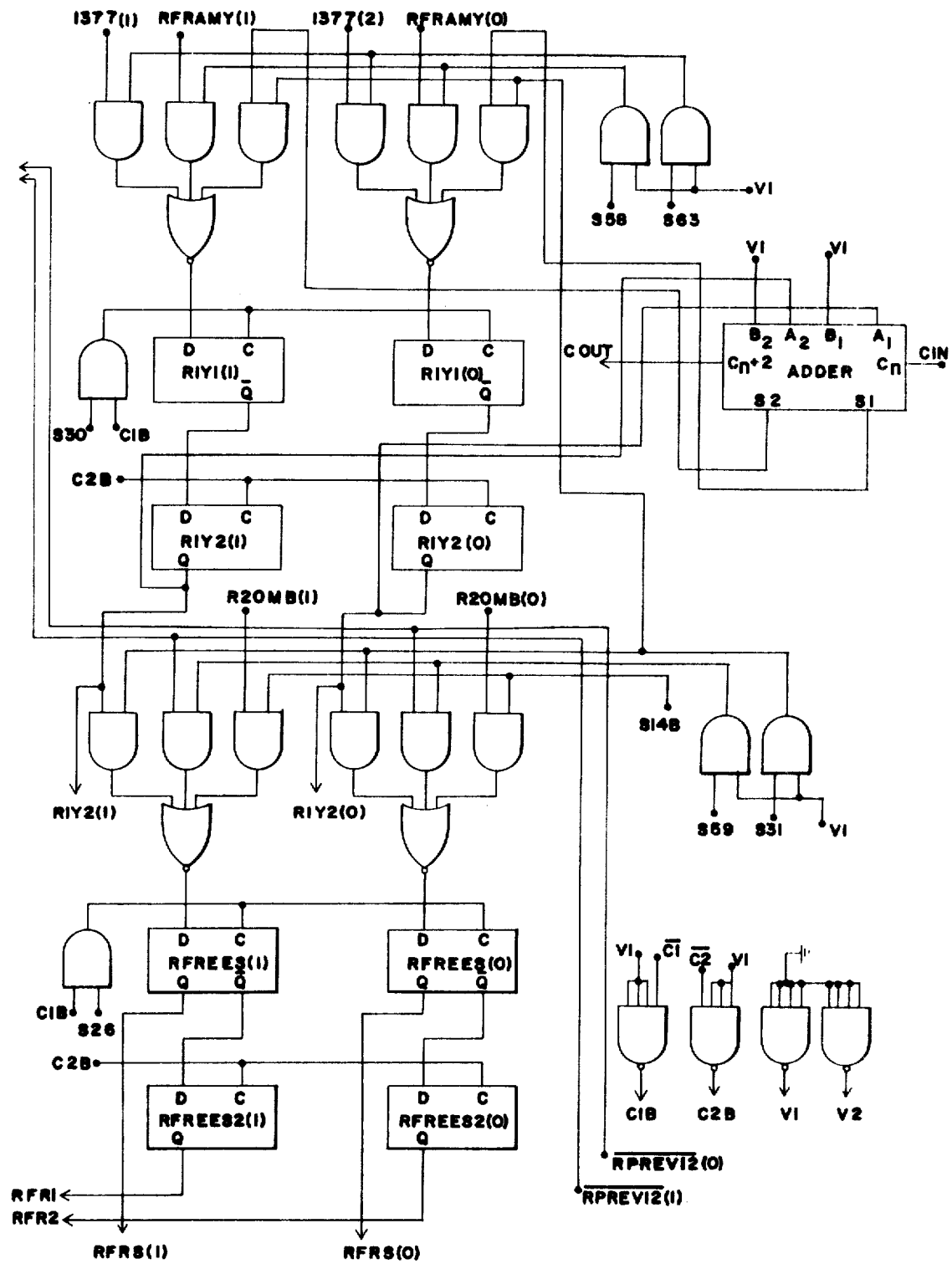
Figure 25F:
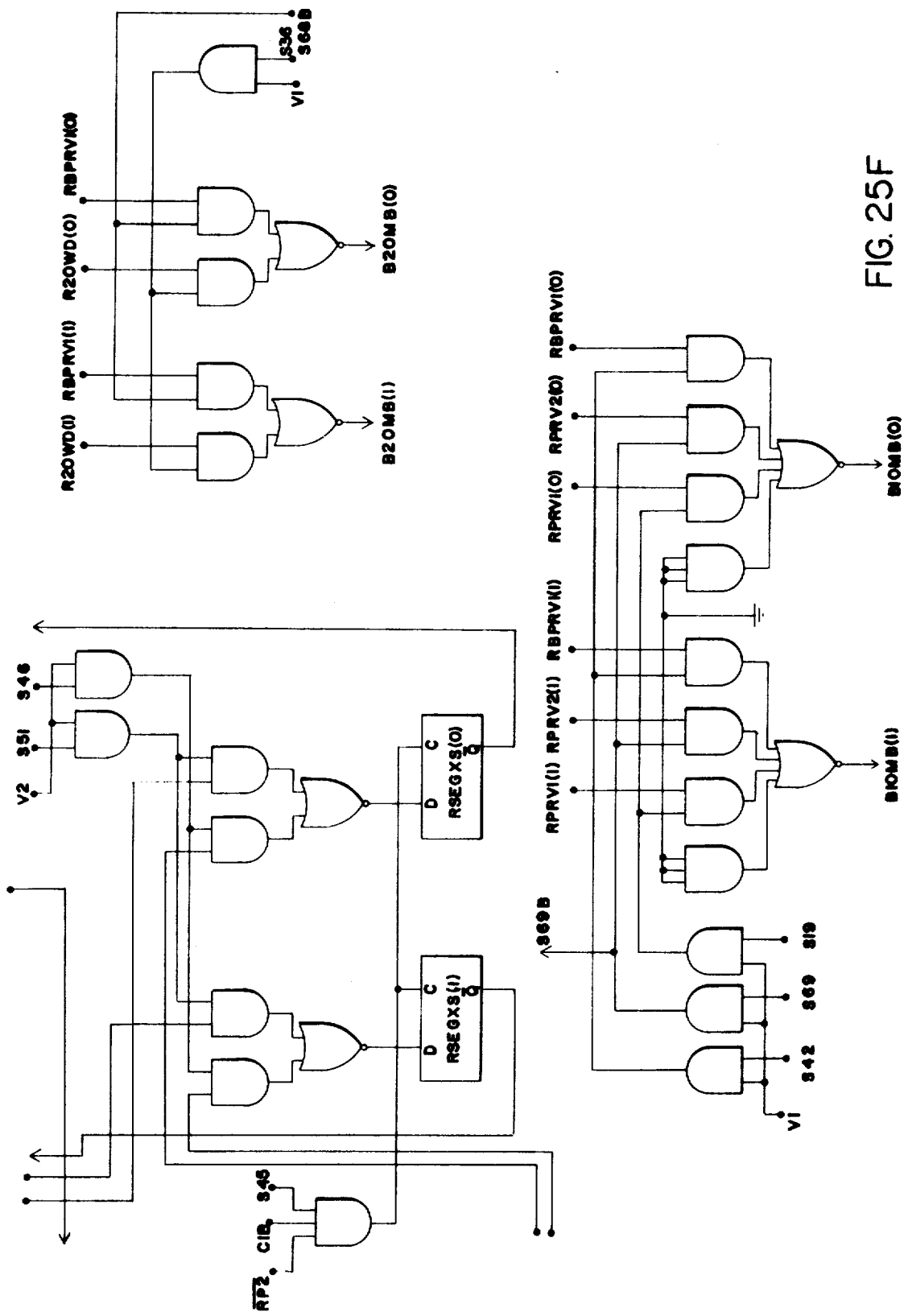
Figure 25G:
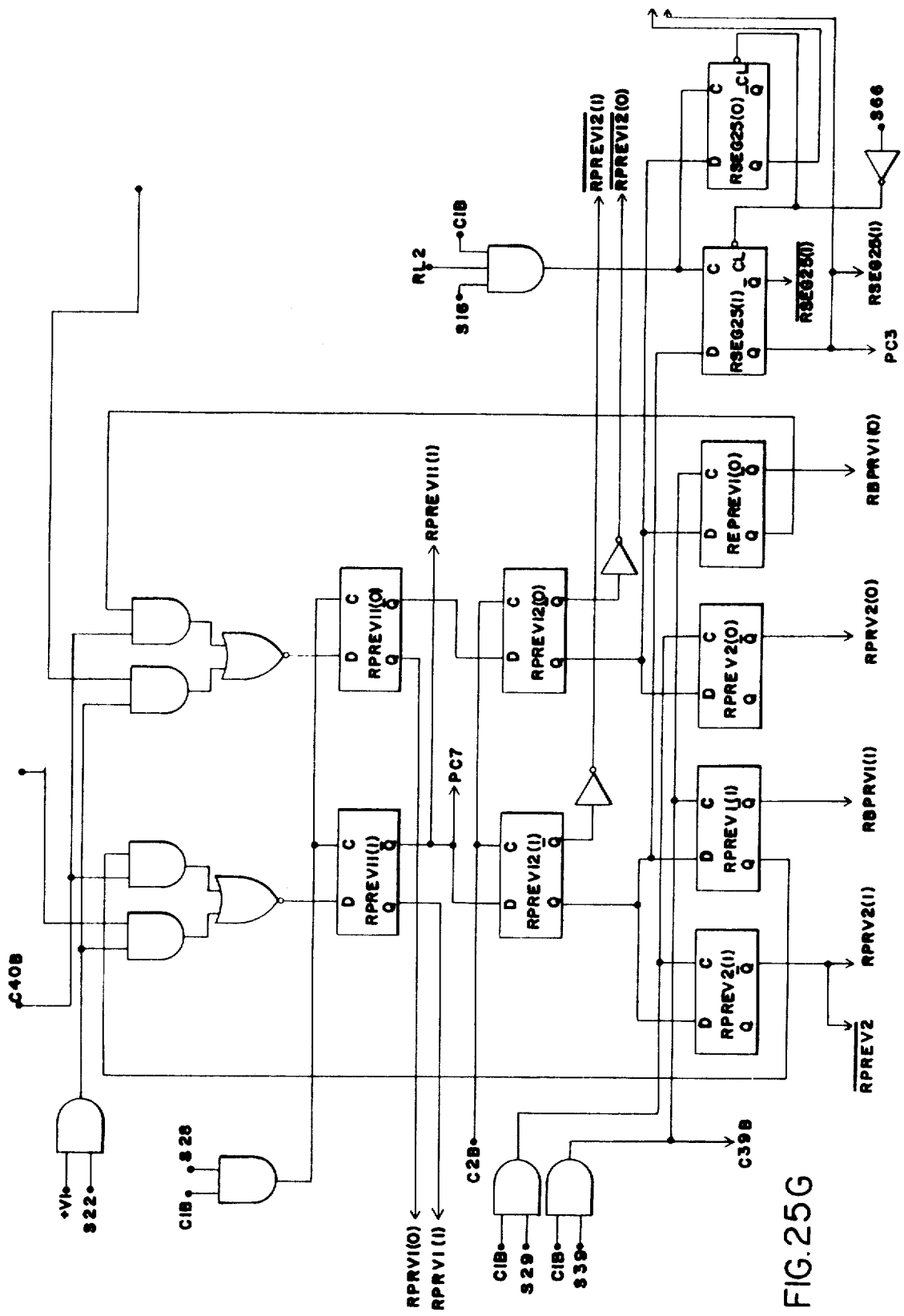
Figure 25H:
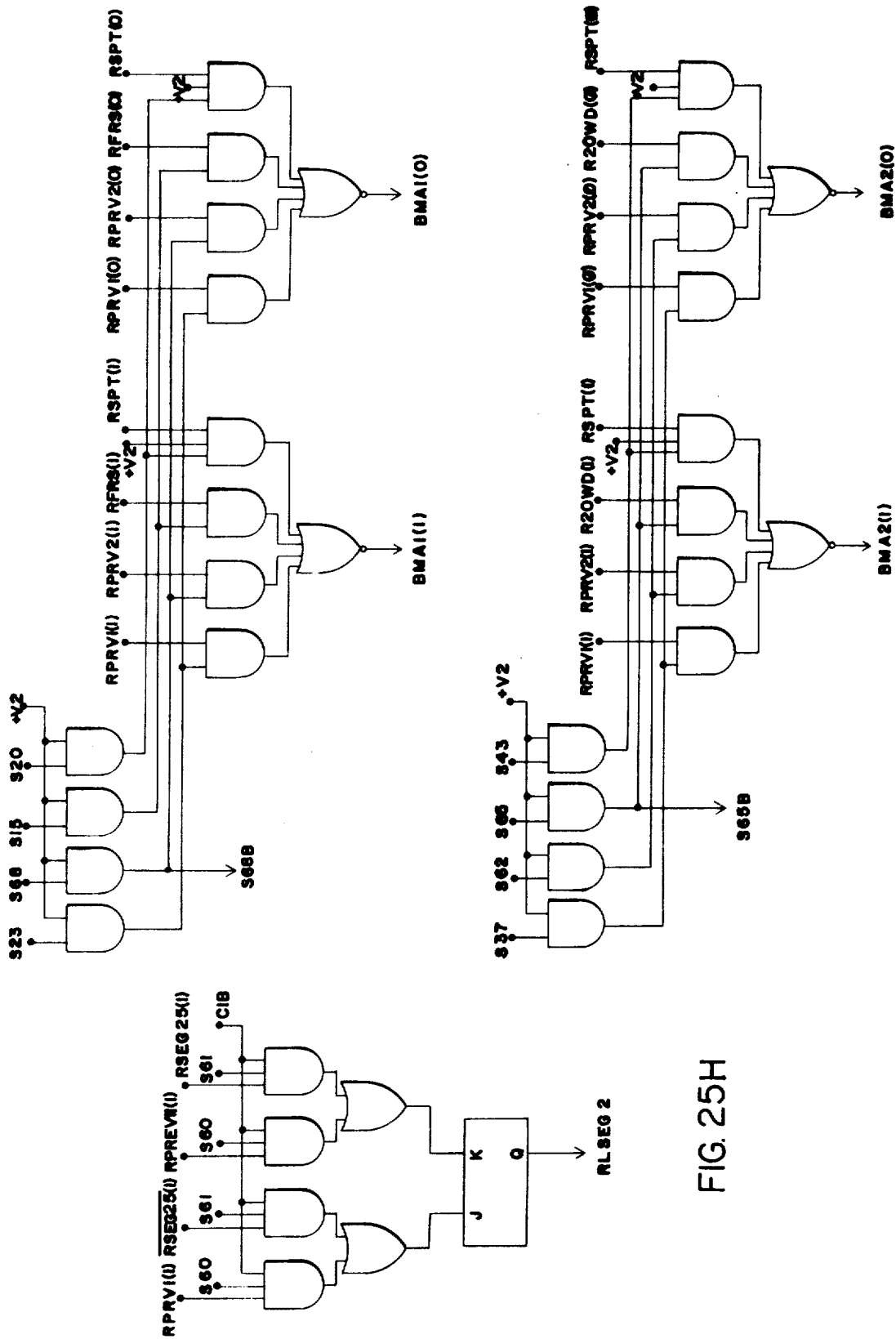
Figure 26:
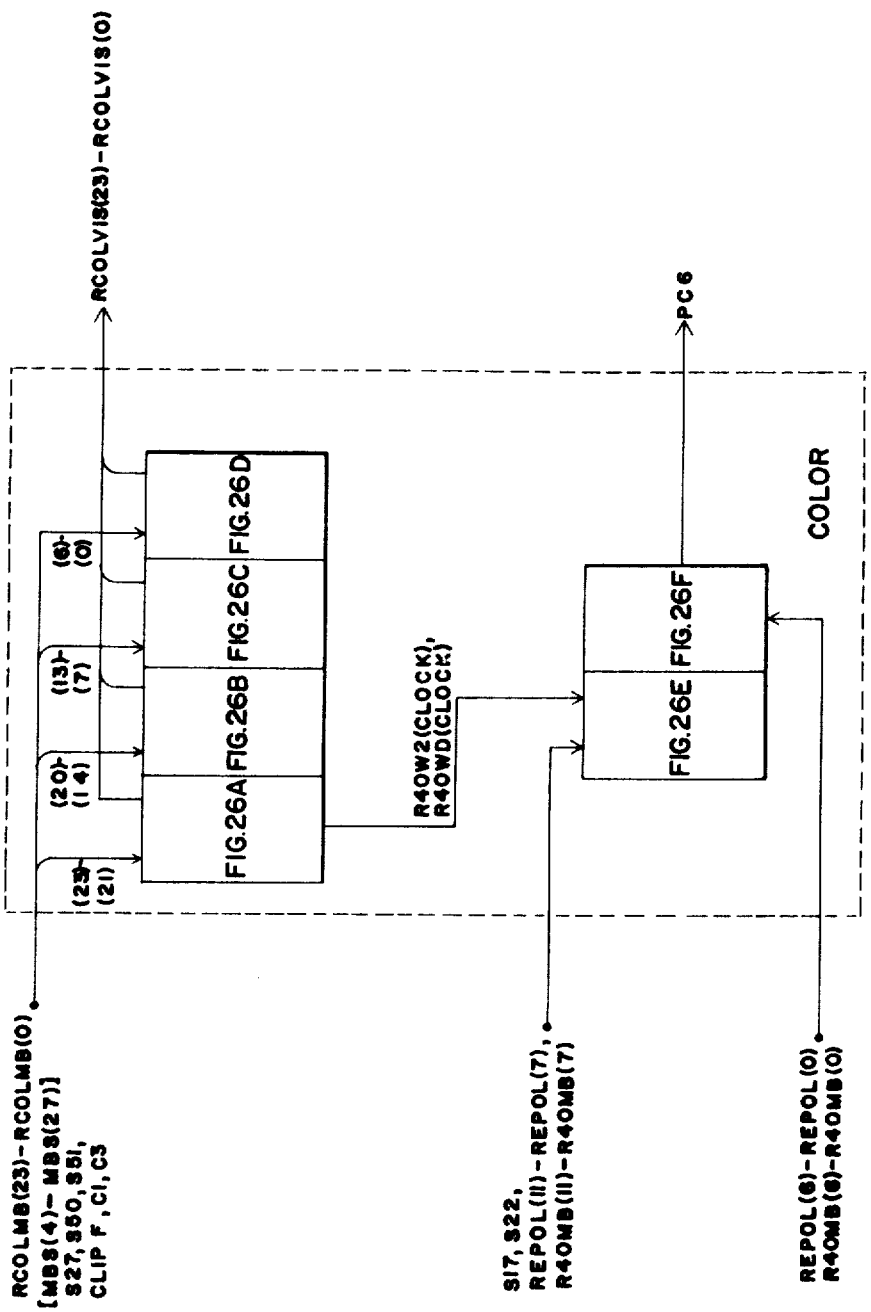
Figure 26A:
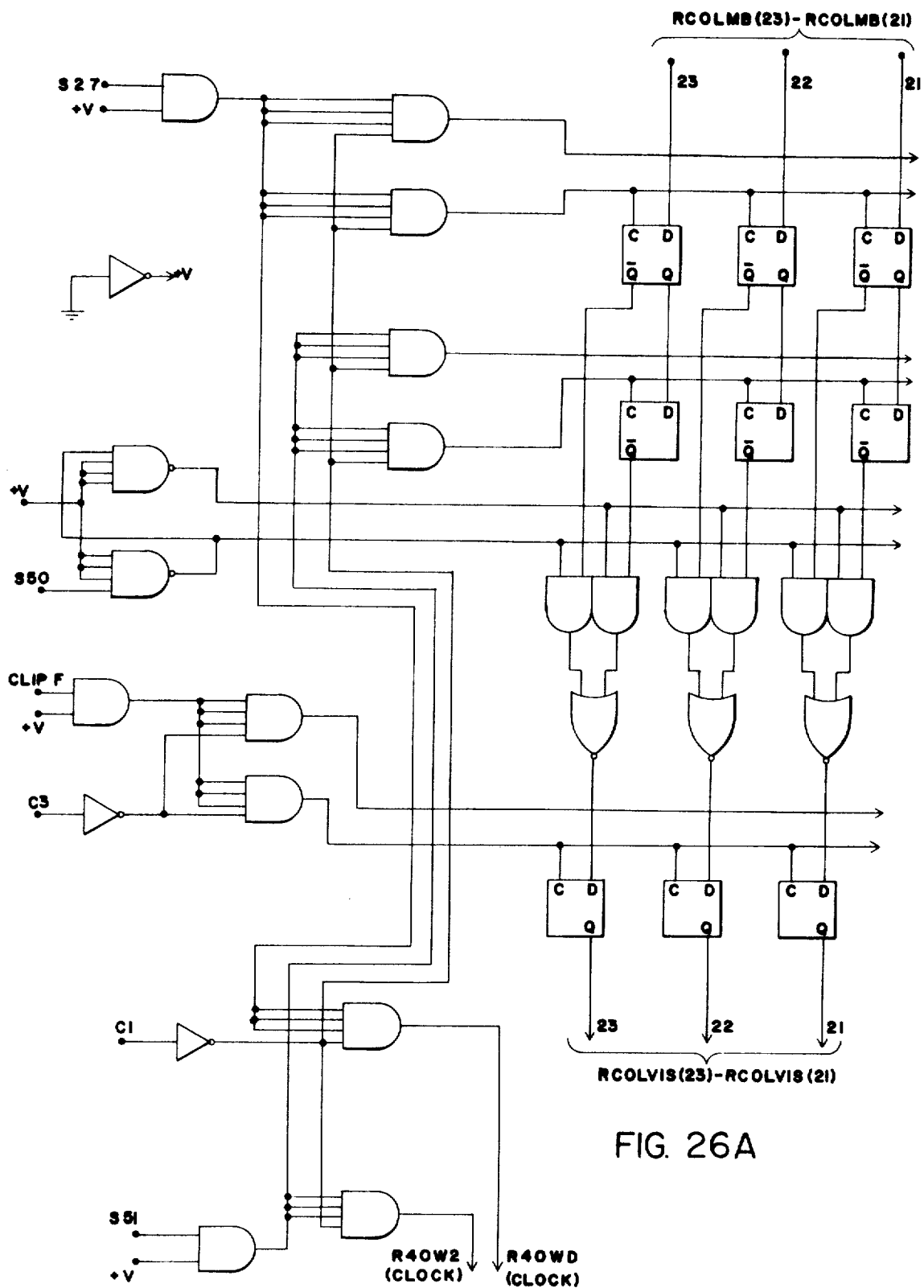
FIGS. 26A–26F are related.
Figure 26B:
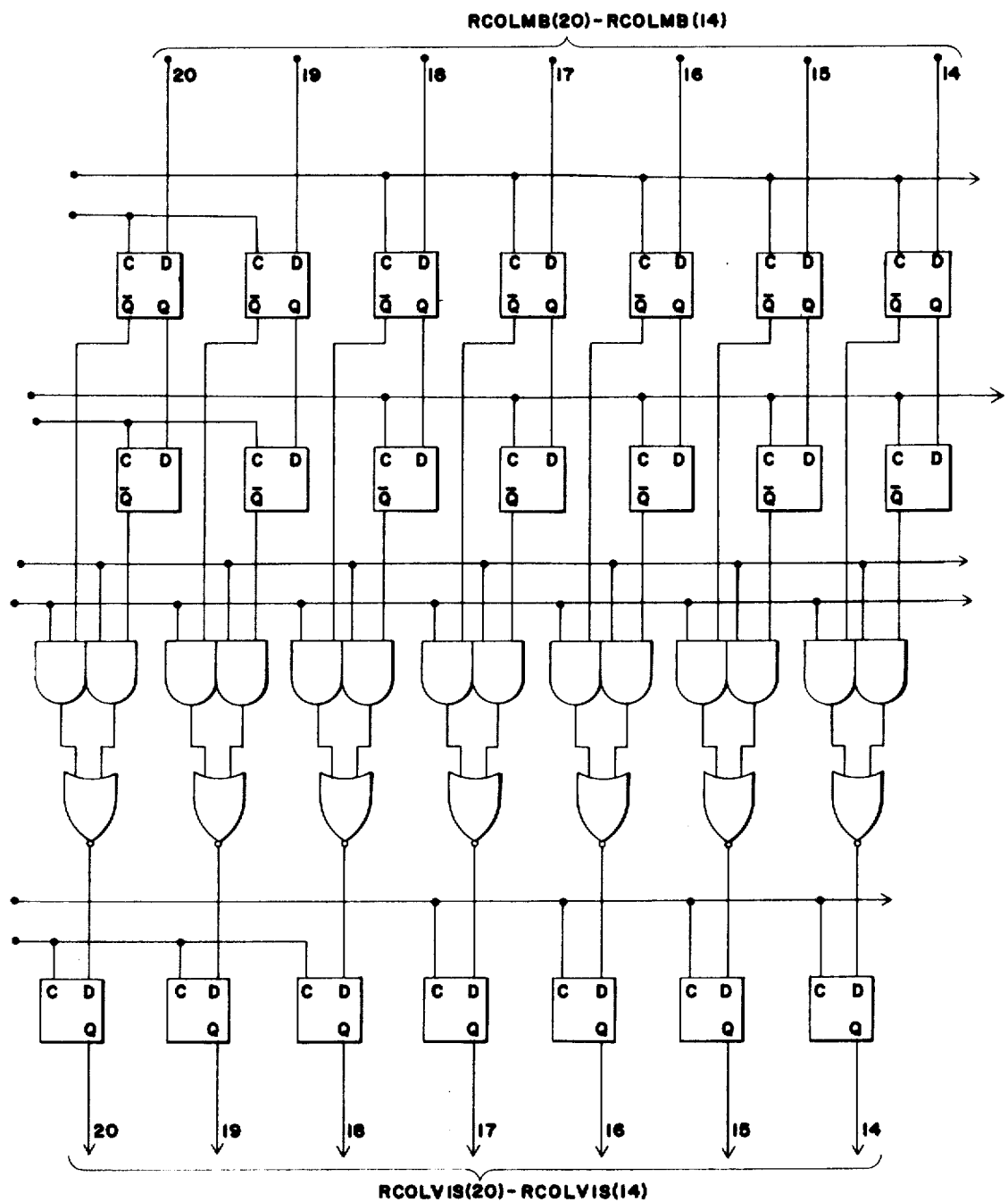
Figure 26C:
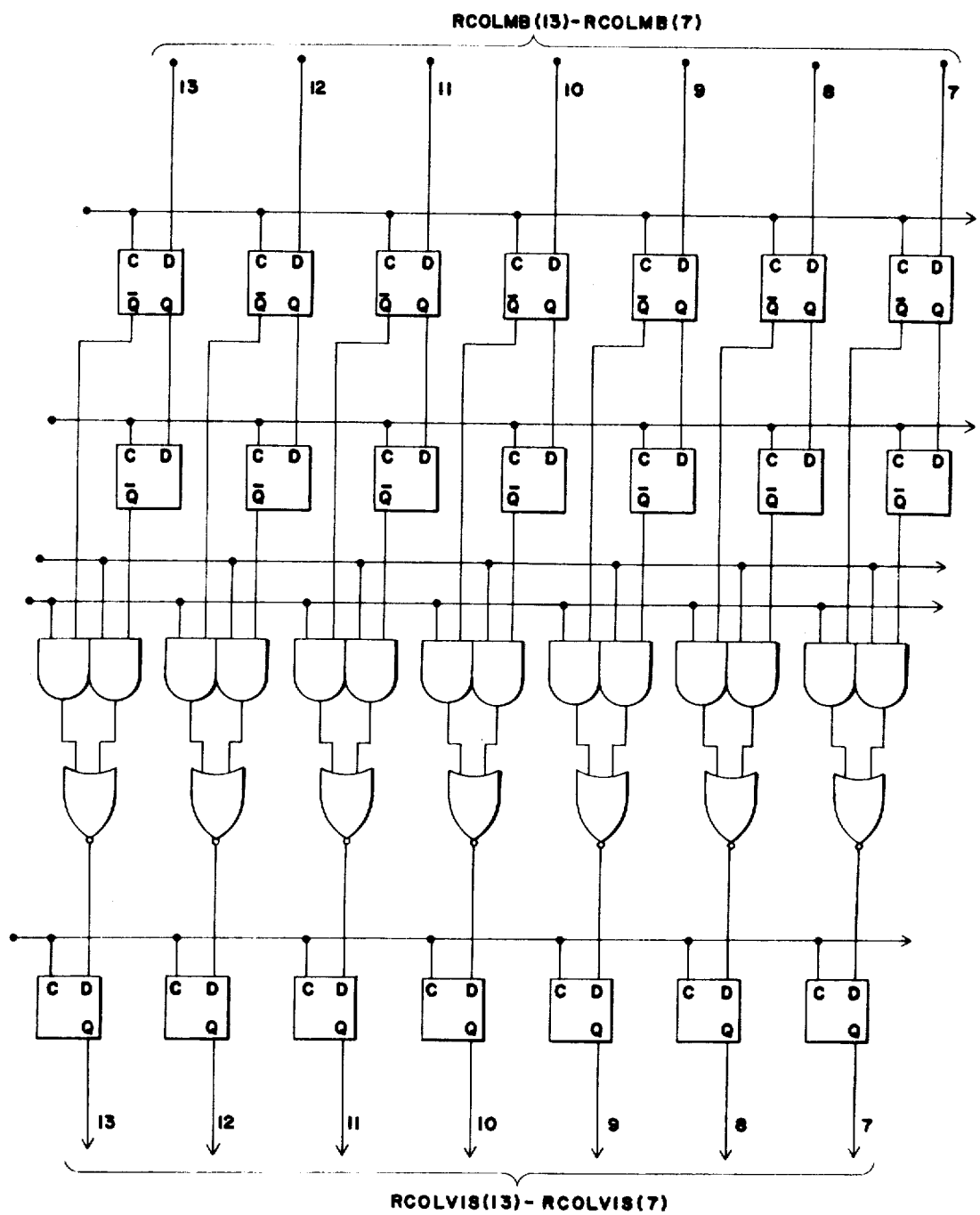
Figure 26D:
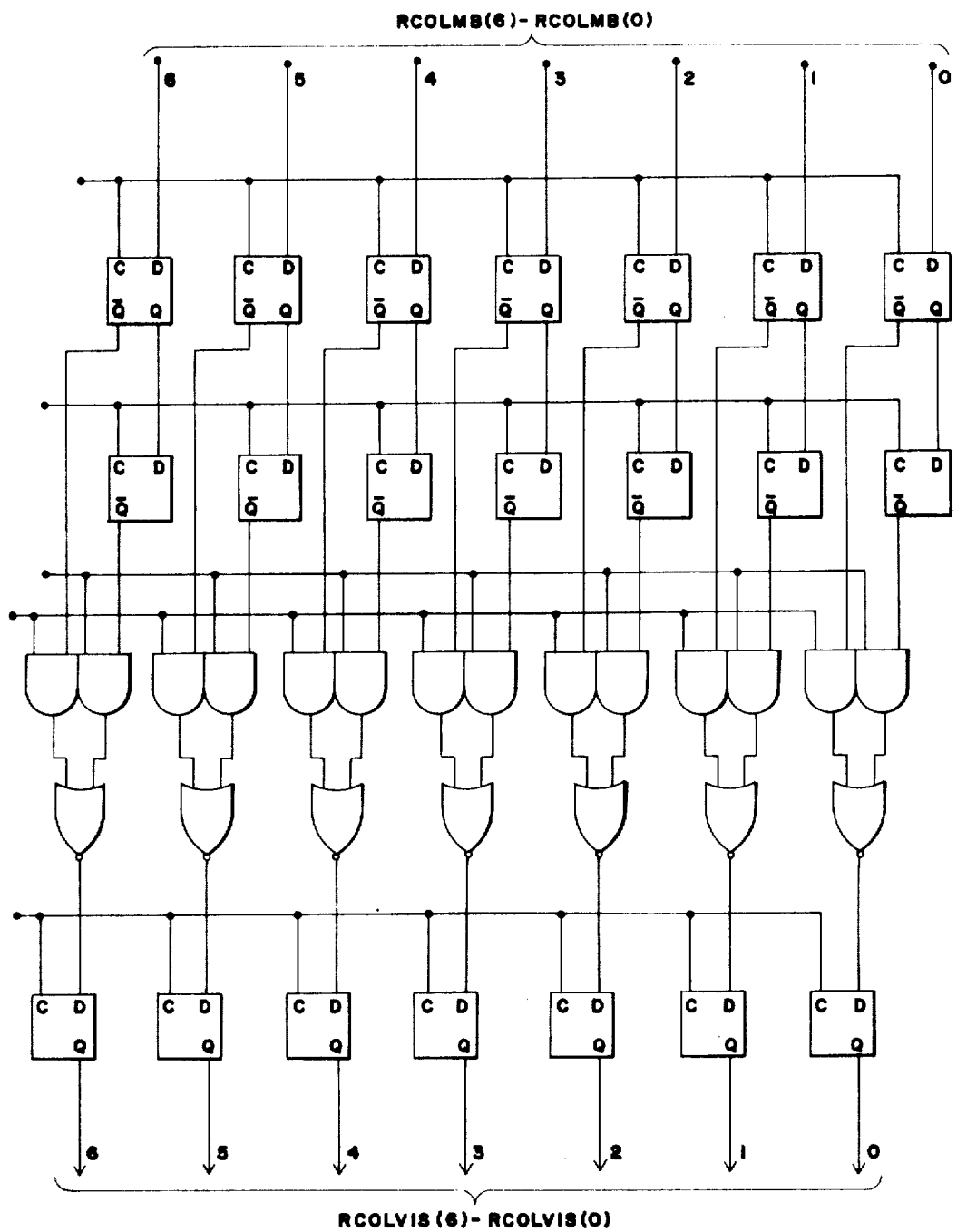
Figure 26E:
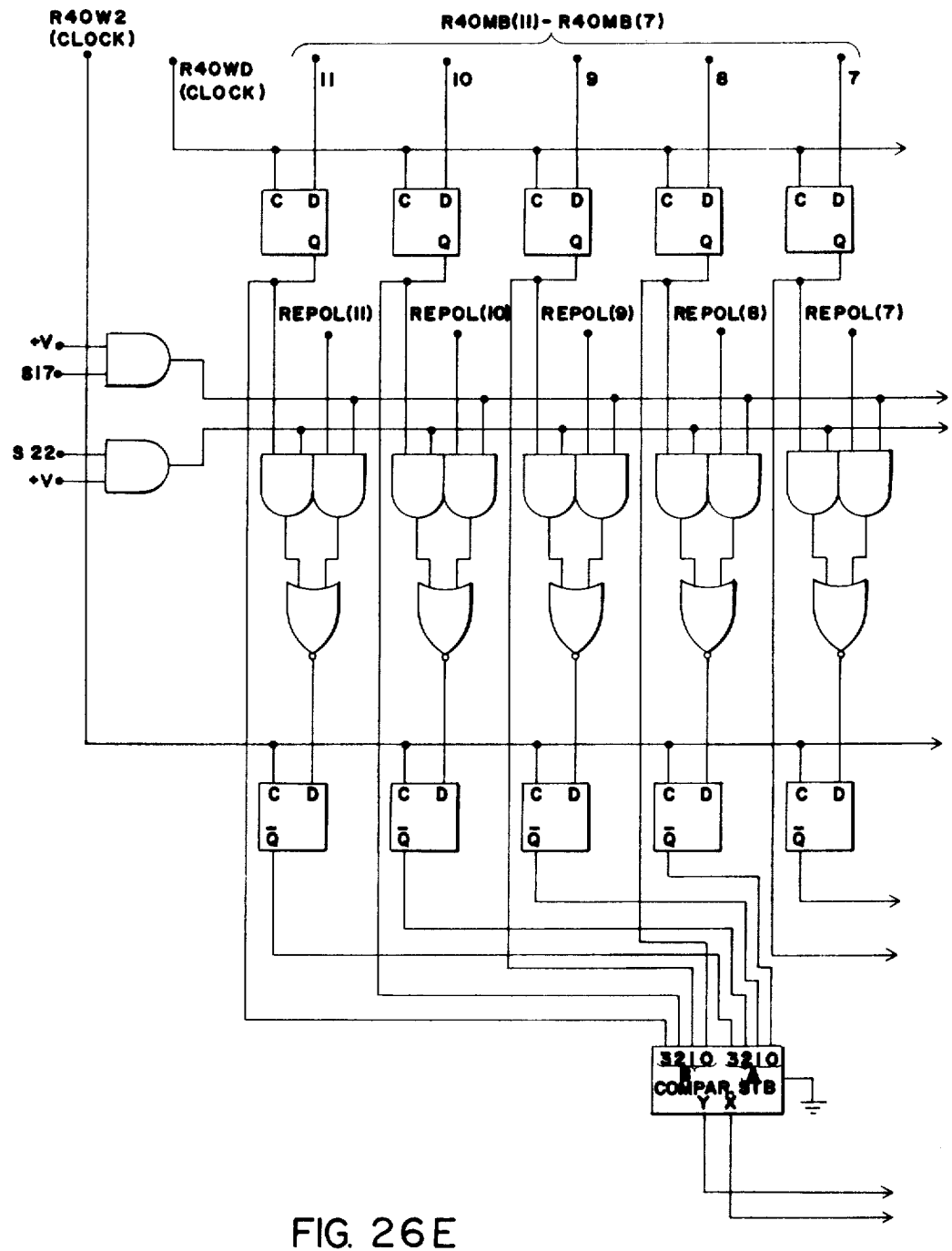
Figure 26F:
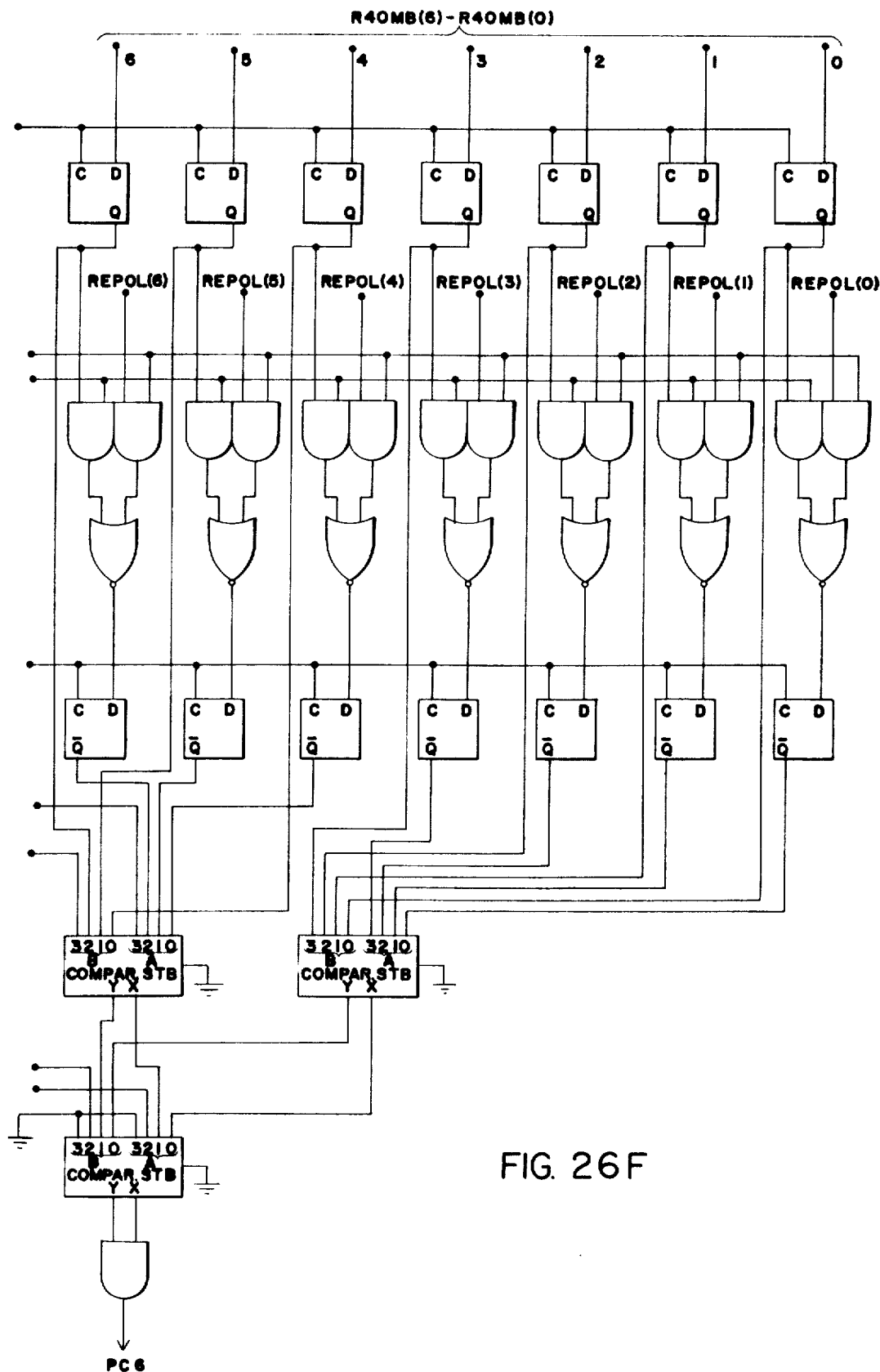

Table 1 indicates that for state 0, for example, the next state of the machine is state 1 and, while the visible segment generator is in state 0, the signals S26, S30 and S63 are read from the read only memory. As is shown in Figure 18, the S26 signal is applied to an AND gate together with the C1 clock signal from the program control circuit, causing the ten bit RFREES register 353 to be loaded. The S30 signal is applied to the AND gate in the SEGPT board, together with the C1 clock signal causing the ten bit RIY1 register 351 to be loaded. The final signal S63 read in state 0 causes the number "1377" to be applied to the input of the RIY1 register 351.

TABLE I-A, below, provides a general functional description of that which occurs during the various states of the visible segment generator previously listed in TABLE I. The states of the visible segment generator and general operations occuring during these states are as follows:

TABLE I-A

| State | General Operation |
|---|---|
| 0,1<br>1,1 | INITIALIZE THE PROCESSOR AND CREATE A LIST STRUCTURE IN THE 256 WORD RANDOM ACCESS MEMORY. |
| 3,2 | IDLE STATE-WAIT TO START A FRAME. |
| 2,3 | SWITCH STATE-WAITS-SENDS CONTROL ON EACH SCAN LINE TO THE SEGMENT GENERATOR STATES OR THE DEPTH SORTER STATES. |
| | -SEGMENT GENERATOR STATES- |
| 4,3 | GETS A SEGMENT WORD FROM THE FREE LIST AND INSERTS THE EDGE DATA ENTERING ON THIS SCAN LINE FROM THE PDP-10 INTO THE SEGMENT WORD. |
| 8,8 | SEARCHES THE X-SORT LIST OF ALL SEGMENTS TO FIND THE CORRECT LOCATION TO INSERT THE NEW SEGMENT JUST CREATED. |
| 9,10<br>10,2 | INSERTS THE SEGMENT IN THE X-SORT LIST. |
| 12,11<br>11,13<br>13,8 | THE NEW SEGMENT BELONGS TO A NON-CONVEX POLYGON. TAKE DATA WHICH USED TO DESCRIBE THE RIGHT EDGE OF THE POLYGON AND PUT IT IN THE RIGHT HALF OF THE NEW SEGMENT OBTAINED FROM THE FREE LIST IN STATE 4,8. |

TABLE I-A(Cont'd)

```
              -DEPTH SORTER STATES-
5,22     INITIALIZE THE DEPTH SORTER.

41,24    READ A SEGMENT FROM THE X-SORT LIST. PASS DATA
24,24    FROM THIS SEGMENT TO THE CLIPPER FOR COMPARING
25,30    VISIBILITY WITH THE CURRENTLY VISIBLE SEGMENT.
30,30    INCREMENT THE VALUES OF THE SEGMENT AND PLACE THE
31,50    SEGMENT IN THE NEW X-SORT LIST BEING PREPARED FOR
50,51    THE NEXT SCAN LINE.
51,52    IF BOTH EDGES OF THE SEGMENT EXIT ON THIS SCAN
52,40    LINE, RETURN THIS SEGMENT WORD TO THE FREE LIST.
26,40
28,40

42,43    IF THE SEGMENT READ FROM THE X-SORT LIST HAS MISSING
43,32    EDGE DATA FROM THE RIGHT OR LEFT HALF OF THE
32,32    SEGMENT, THEN THESE STATES WILL SEARCH THE REMAINDER
33,48    OF THE X-SORT LIST TO FIND INFORMATION FROM
48,49    ANOTHER SEGMENT BELONGING TO THE SAME POLYGON.
49,40    THIS INFORMATION IS THEN TRANSFERRED TO THE
34,37    SEGMENT WHICH HAD MISSING INFORMATION THUS
37,38    GIVING IT A COMPLETE DESCRIPTION.
38,40
36,39
39,38

16,17    THESE STATES SEARCH THROUGH THE ACTIVE LIST (SEGMENTS
17,17    THAT ALREADY HAVE BEEN READ FROM THE X-SORT LIST
19,16    PREVIOUSLY, BUT ARE STILL INVOLVED ON THE CURRENT
20,20    SPAN OF THE SCAN LINE), AND PASSES THE DATA
         INFORMATION TO THE CLIPPER FOR VISIBILITY
         TESTS.

44,16    ONCE A VISIBLE SEGMENT HAS BEEN FOUND, THESE STATES
45,2     WILL OUTPUT THE DESCRIPTION OF THE VISIBLE SEGMENT
         TO THE SHADER. IF IN STATE 44,16, THE PROCESSOR
         CONTINUES TO FIND VISIBLE SEGMENTS FOR THE
         REMAINDER OF THE SCAN LINE. IF IN STATE 45,2,
         THE PROCESSOR HAS FINISHED THE SCAN LINE. IT WILL
         THEN GO TO STATE 2 TO BEGIN THE NEXT SCAN LINE.
```

These general operations are performed by the signals S1-S79, which are read from memory 410. Each signal performs one or more operations given in the following table:

TABLE II

| Signal | Operation | |
|---|---|---|
| 1. | WE#1 | |
| 2. | WE#2 | |
| 3. | WE#3 | |
| 3. | EDGE USED CONTINUE | |
| 4. | WE#4 | |
| 5. | WE#5 | |
| 6. | WE#6 | |
| 7. | WE#7 | |
| 7. | B70MB←R70WD | |
| 7. | B71MB←R71WD | |
| 7. | B73MB←R73WD | |
| 8. | WE#8 | |
| 13. | *RSUBDV (1) | CLEAR (NO CLOCK), (SET FROM CLIPPER) |
| 13. | *RCLIPD (1) | CLEAR (NO CLOCK), (SET FROM CLIPPER) |
| 13. | *RCLIPE (1) | CLEAR (NO CLOCK), (SET FROM CLIPPER) |
| 13. | BSEGPT←RSEGXS | IF(.NOT.RSEGAC) |
| 13. | *RVISBL (10) | CLEAR HIGH BIT NO CLOCK |
| 13. | BSAMR←RFRAMX | |
| 13. | *RSAML (10) | |
| 13. | BSEGPT←RSEGAC | IF(RSEGAC) |
| 14. | B80WD←-1 | |
| 14. | *RSPLIT (1) | CLEAR (NO CLOCK) |
| 14. | BNEXT←RFREES | |
| 14. | BFREES←R20MB | |
| 15. | BMA1←RFREES | |
| 16. | *RSEG2S (10) | IF(RLSEG2) |
| 17. | B70WD←REY | |
| 17. | B71WD←REX | |
| 17. | B72WD←REXY | |
| 17. | B73WD←REZ | |
| 17. | B74WD←REZY | |
| 18. | *R90WD (10) | |
| 19. | B10MB←RPREV1 | |
| 20. | BMA1←RSEGPT | |
| 21. | BSEGPT←R10MB | |
| 22. | B40W2←R40WD | |
| 22. | BPREV1←RSEGPT | |
| 23. | BMA1←RPREV1 | |
| 24. | B80MB←R80WD | |
| 24. | B81MB←R81WD | |
| 24. | B83MB←R83WD | |
| 25. | *RSEGPT (10) | DUAL |
| 26. | *RFREES (10) | DUAL |
| 27. | *R40WD (12) | |
| 27. | *R20WD (10) | |
| 28. | *RPREV1 (10) | DUAL |

TABLE II (cont'd)

```
29.    *RPREV2   (10)
30.    *RIY      (11)  DOWN COUNTER      2ND CLOCK LOAD
31.    BIY←RIY-1
31.    *RIY      (11)  DOWN COUNTER      2ND CLOCK COUNT
31.    BFREES←RIY       (HIGHBIT ← 1)
32.    B70WD←R70MB
32.    B71WD←R71MB
32.    B72WD←R72MB
32.    B73WD←R73MB
32.    B74WD←R74MB
32.    B80WD←R80MB
32.    B81WD←R81MB
32.    B82WD←R82MB
32.    B83WD←R83MB
32.    B84WD←R84MB
33.    B80WD←R70WD
33.    B81WD←R71WD
33.    B82WD←R72WD
33.    B83WD←R73WD
33.    B84WD←R74WD
34.    *R80WD    (11)
34.    *R81WD    (20)
34.    *R82WD    (20)
34.    *R83WD    (30)
34.    *R84WD    (30)
35.    *R70WD    (11)
35.    *R71WD    (20)
35.    *R72WD    (20)
35.    *R73WD    (30)
35.    *R74WD    (30)
36.    B20MB←R20WD
37.    BMA2←RPREV1
38.    *RSEG2L   (10)       2ND CLOCK
39.    *RBPREV   (10)
39.    *RBSEGP   (10)
40.    BPREV1←RBPREV
40.    BSEGPT←RBSEGP
41.    BSEGPT←RSEG2L
42.    B10MB←RBPREV
43.    BMA2←RSEGPT
44.    B20WD←RFREES
45.    *RSEGXS   (10)       IF(.NOT.RPREV2)
46.    BSEGXS←RSEG2S
46.    OUTPUT VISIBLE SEGMENT
47.    *RSAMR    (10)       2ND CLOCK
48.    *RSEGAC   (10)       2ND CLOCK CLEAR HIGH BIT
49.    START THE CLIPPER
50.    ADDER IN SUBTRACT MODE   (ADD MODE IF NOT SET)
51.    BSEGXS←RNEXT
51.    *R40W2    (12)
51.    *R70W2    (11)
51.    *R71W2    (20)
51.    *R73W2    (30)
51.    *R80W2    (11)
51.    *R81W2    (20)
51.    *R83W2    (30)
52.    *RSEGAC   (10)   IF(CLIPD)
52.    *RVISBL   (10)   IF(CLIPE)
53.    BNEXT←R10MB
54.    B70MB←R70W2
```

TABLE II (cont'd)

```
54.     B71MB←R71W2
54.     B73MB←R73W2
54.     B80MB←R80W2
54.     B81MB←R81W2
54.     B83MB←R83W2
55.     *RNEXT   (10)
56.     BSEGPT←RNEXT      IF(RNEXT)
57.     *RSPLIT  (1)      SETS (NO CLOCK)
58.     BIY←RFRAMY
58.     DISPATCH FROM 3
59.     BFREES←RPREV1
60.     *RLSEG2  (1)      SET IF(.NOT.RPREV1)
60.     *RLSEG2  (1)      CLEAR IF(RPREV1)
61.     *RLSEG2  (1)      SET IF(.NOT.RSEG2S)
61.     *RLSEG2  (1)      CLEAR IF(RSEG2S)
61.     *RSEGXT  (10)
62.     BMA2←RPREV2
63.     BIY←1377
64.     B70WD←R80WD
64.     B71WD←R81WD
64.     B72WD←R82WD
64.     B73WD←R83WD
64.     B74WD←R84WD
65.     *RSEG2X  (10)
65.     BMA2←R20WD
65.     B20WD←RSEG2L
66.     *RSEG2S  (10)     CLEAR HIGH BIT   NOT CLOCKED
67.     BSEGPT←R20MB
67.     DISPATCH FROM 29
68.     B20MB←RBPREV
68.     BMA1←RPREV2
69.     B10MB←RPREV2
69.     B20WD←RPREV1
70.     DISPATCH FROM 1
71.     DISPATCH FROM 2
72.     DISPATCH FROM 8
73.     DISPATCH FROM 34
74.     DISPATCH FROM 16
75.     DISPATCH FROM 48
76.     DISPATCH FROM 25
77.     DISPATCH FROM 45
78.     BNEXT←R90MB
79.     BSEGPT←RSEGXS     IF (.NOT.RNEXT)
79.     DISPATCH FROM 20
  .     *RCLIPA  (1)      CLEAR (CLOCK2) , (SET FROM CLIPPER)
  .     *RCLIPB  (1)      CLEAR (CLOCK2) , (SET FROM CLIPPER)
  .     *RCLIPC  (1)      CLEAR (CLOCK2) , (SET FROM CLIPPER)
  .     *RCLIPF  (1)      CLEAR (CLOCK2) , (SET FROM CLIPPER)
  .     BSAMR←RCLIPXX     IF (CLIPA)
  .     BSAMR←RCLIPXE     IF (CLIPB)
  .     BSAMR←RXAMXL      IF (CLIPC)
  .     *RSAMR   (10)     IF(CLIPA.OR.CLIPB.OR.CLIPC)
  .     BSEGPT←RVISBL     (DISABLE CONTROL NOW)
  .     B40WD←R40MB       (ALWAYS)
  .     BPREV2←RPREV1     (ALWAYS)
  .     B72MB←R72WD       (ALWAYS)
  .     B74MB←R74WD       (ALWAYS)
  .     B82MB←R82WD       (ALWAYS)
  .     B84MB←R84WD       (ALWAYS)
  .     B40MB←REPCL       (ALWAYS)
```

TABLE II (cont'd)

```
B90WD←R90WD         (ALWAYS)
BSEGXT←R71WD+R72WD         (ALWAYS IF(R70WD+1.LT.0))  HIGH 10 BITS
BSEGXT←R81WD+R82WD         (ALWAYS IF(R70WD+1.GE.0))  HIGH 10 BITS
BSEG2L←RPREV1       (ALWAYS)
BSEG2S←RPREV1       (ALWAYS)
BBPREV←RPREV1       (ALWAYS)
BBSEGP←RSEGPT       (ALWAYS)
BSAML←RSAMR         (ALWAYS)
B71W2←R71WD+-R72WD  (ALWAYS)
B73W2←R73WD+-R74WD  (ALWAYS)
B81W2←R81WD+-R82WD  (ALWAYS)
B83W2←R83WD+-R84WD  (ALWAYS)
B70W2←R70WD+1       (ALWAYS)
B80W2←R80WD+1       (ALWAYS)
B90WD←RSEGAC        (ALWAYS)
BSEGAC←RPREV1       (ALWAYS)
BVISBL←RPREV1       (ALWAYS)
BSEG2X←RSEGXT       (ALWAYS)
BPC←RPREV1 PC7      HIGH BIT
BPC←R70WD PC12      HIGH BIT
BPC←R80WD PC8       HIGH BIT
BPC←RSPLIT PC2      (.NOT.RSPLIT)
BPC←REX-R71WD PC13      (20 BIT ADDER   HIGH BIT TRANSFERED)
BPC←REXY-R72WD PC16     (20 BIT ADDER   HIGH BIT TRANSFERED)
BPC←REX-R81WD PC9       (20 BIT ADDER   HIGH BIT TRANSFERED)
BPC←REXY-R82WD PC11     (20 BIT ADDER   HIGH BIT TRANSFERED)
BPC←R40W2-R40WD PC6     (12 BIT ADDER   EQUALITY TRANSFERED)
BPC←RSUBDV PC1
BPC←R71CL-RSAMR-1 PC15  (10 BIT ADDER   HIGH BIT TRANSFERED)
BPC←RSEGPT PC5      HIGH BIT
BPC←R70W2 PC20      HIGH BIT
BPC←R80W2 PC18      HIGH BIT
BPC←RSEG2S PC3      HIGH BIT
BPC←RSEGXT-RSEG2X PC17  (10 BIT ADDER   HIGH BIT TRANSFERED)
BPC←RSEGXT-R71WD PC14   (HIGH 10 BIT ADDER   HIGH BIT TRANS)
BPC←RSEGXT-R81WD PC10   (HIGH 10 BIT ADDER   HIGH BIT TRANS)
BPC←R90WD PC4       HIGH BIT
BPC←RNEXT PC19      HIGH BIT
*RPC        DUMMY
BCLIP←RSAML
BCLIP←RSAMR
BCLIP←R71CL-RSAMR       (10 BIT ADDER EQUALITY TRANSFERED)
BCLIP←R70WD         HIGH BIT
BCLIP←R80WD         HIGH BIT
BCLIP←R71CL
BCLIP←R81CL
BCLIP←R73CL
BCLIP←R83CL
BCLIP←RSEGPT        HIGH BIT
BCLIP←RVISBL        HIGH BIT
BCLIP←R71CL-R73CL       (10 BIT ADDER HIGH BIT TRANS)
BCLIP←R81CL-RSAML       (10 BIT ADDER HIGH BIT TRANS)
BCLIP←R71CL-RSAML       (10 BIT ADDER HIGH BIT TRANS)
BCLIP←R81CL-RSAMR       (10 BIT ADDER HIGH BIT TRANS)
*RCLIP       DUMMY
*R71CL   (20) DUMMY REGISTER
*R73CL   (30) DUMMY REGISTER
*R81CL   (20) DUMMY REGISTER
*R83CL   (30) DUMMY REGISTER
*R40CL   ()  DUMMY REGISTER
```

TABLE II (cont'd)

```
• B71CL←R71W2      IF(BIT(50))
• B71CL←R71WD      IF(.NOT.BIT(50))
• B73CL←R73W2      IF(BIT(50))
• B73CL←R73WD      IF(.NOT.BIT(50))
• B81CL←R81W2      IF(BIT(50))
• B81CL←R81WD      IF(.NOT.BIT(50))
• B83CL←R83W2      IF(BIT(50))
• B83CL←R83WD      IF(.NOT.BIT(50))
• B40CL←R40W2      IF(BIT(50))
• B40CL←R40WD      IF(.NOT.BIT(50))
• *RXLVIS (20)  IF(CLIPF)
• *RXRVIS (20)  IF(CLIPF)
• *RZLVIS (20)  IF(CLIPF)
• *RZRVIS (20)  IF(CLIPF)
• *R40VIS ()    IF(CLIPF)
• BXLVIS←R71CL     (ALWAYS)
• BXRVIS←R81CL     (ALWAYS)
• BZLVIS←R73CL     (ALWAYS)
• BZRVIS←R83CL     (ALWAYS)
• B40VIS←R40CL     (ALWAYS)
• *R10MB  (10)
• *R20MB  (10)
• *R40MB  (18)
• *R70MB  (11)
• *R71MB  (20)
• *R72MB  (20)
• *R73MB  (30)
• *R74MB  (30)
• *R80MB  (11)
• *R81MB  (20)
• *R82MB  (20)
• *R83MB  (30)
• *R84MB  (30)
• *R90MB  (10)
• *RMA1   (10)
• *RMA2   (10)
• *RFRAMX (10)    IF SET FROM PDP10 CONO
• BFRAMX←DATA FROM PDP10 IO
• *RFRAMY (10)    IF SET FROM PDP10 CONO
• BFRAMY←DATA FROM PDP10 IO
  %ZZZZ
```

Table II illustrates, for example, that when the signal S7 stored in the read only memory is addressed, a number of operations occur. The WE #7 operation readies the random access memory 418 so that data can be stored therein (Write Enable). The B70MB ← R70WD operation indicates that the data stored in the R70WD register is clocked onto the B70MB bus to the random access memory. The R prefix indicates a register, the arrow indicates the direction of data flow, and the B prefix indicates a bus. The other two operations initiated by the signal S7 also comprise transferring data out of the registers R71WD and R73WD onto data buses B70MB and B71MB, respectively, for storage in the random access memory.

In the way of further explanation of the operations listed in Table II, it should be noted that an astericks (*) indicates that the signal loads the register following the asterisk. In addition, the word DISPATCH following a signal designation (e.g. 71. DISPATCH FROM 2) indicates a program control circuit operation.

Summarizing, as the program control circuit 408 cycles the visible segment generator through the states listed in Table I, the various signals corresponding to the present state of the machine are read from the read only memory 410. These signals then perform the operations corresponding thereto in Table II.

To further aid in an understanding of the operation of the system, the source of input signals to the various registers is given by the following Table III. It should be noted that where a register is loaded from a different source for different control signals applied thereto, the control signal and the register data source are given.

TABLE III

| Signal | Register | |
|---|---|---|
| | SOURCE OF INPUTS TO A REGISTER | |
| | REGISTER IS RSUBDV | |
| | REGISTER IS RCLIPD | |
| | REGISTER IS RCLIPE | |
| | REGISTER IS RVISBL | |
| . | BVISBL←RPREV1 | (ALWAYS) |
| | REGISTER IS RSAML | |
| . | BSAML←RSAMR | (ALWAYS) |
| | REGISTER IS RSPLIT | |
| | REGISTER IS RSEG2S | |
| . | BSEG2S←RPREV1 | (ALWAYS) |
| | REGISTER IS RSØWD | |
| . | BSØWD←RSEGAC | (ALWAYS) |
| | REGISTER IS RSEGPT | |
| 13. | BSEGPT←RSEGXS | IF(.NOT.RSEGAC) |
| 13. | BSEGPT←RSEGAC | IF(RSEGAC) |
| 21. | BSEGPT←R1ØMB | |
| 40. | BSEGPT←RESEGP | |
| 41. | BSEGPT←RSEG2L | |
| 56. | BSEGPT←RNEXT | IF(RNEXT) |
| 67. | BSEGPT←R2ØMB | |
| 79. | BSEGPT←RSEGXS | IF (.NOT.RNEXT) |
| . | BSEGPT←RVISBL | (DISABLE CONTROL NOW) |
| | REGISTER IS RFREES | |
| 14. | BFREES←R2ØMB | |
| 31. | BFREES←R1Y | (HIGHBIT ← 1) |
| 59. | BFREES←RPREV1 | |

TABLE III (cont'd)

REGISTER IS R40WD

- B40WD←R40MB (ALWAYS)

REGISTER IS R20WD

- 44. B20WD←RFREES
- 65. B20WD←RSEG2L
- 69. B20WD←RPREV1

REGISTER IS RPREV1

- 22. BPREV1←RSEGPT
- 40. BPREV1←RBPREV

REGISTER IS RPREV2

- BPREV2←RPREV1 (ALWAYS)

REGISTER IS RIY

- 31. BIY←RIY-1
- 58. BIY←RFRAMY
- 63. BIY←255

REGISTER IS R80WD

- 14. B80WD←-1
- 32. B80WD←R80MB
- 33. B80WD←R70WD

REGISTER IS R81WD

- 32. B81WD←R81MB
- 33. B81WD←R71WD

REGISTER IS R82WD

- 32. B82WD←R82MB
- 33. B82WD←R72WD

REGISTER IS R83WD

- 32. B83WD←R83MB
- 33. B83WD←R73WD

REGISTER IS R84WD

- 32. B84WD←R84MB
- 33. B84WD←R74WD

REGISTER IS R70WD

TABLE III (cont'd)

17. B70WD←REY
32. B70WD←R70MB
64. B70WD←R60WD

REGISTER IS R71WD

17. B71WD←REX
32. B71WD←R71MB
64. B71WD←R61WD

REGISTER IS R72WD

17. B72WD←REXY
32. B72WD←R72MB
64. B72WD←R62WD

REGISTER IS RPREV2

BPREV2←RPREV1    (ALWAYS)

REGISTER IS RIY

31. BIY←RIY-1
58. BIY←RFRAMY
63. BIY←255

REGISTER IS R80WD

14. B80WD←-1
32. B80WD←R80MB
33. B80WD←R70WD

REGISTER IS R81WD

32. B81WD←R81MB
33. B81WD←R71WD

REGISTER IS R82WD

32. B82WD←R82MB
33. B82WD←R72WD

REGISTER IS R83WD

32. B83WD←R83MB
33. B83WD←R73WD

REGISTER IS R84WD

32. B84WD←R84MB
33. B84WD←R74WD

REGISTER IS R70WD

TABLE III (cont'd)

| | |
|---|---|
| 17. | B70WD←REY |
| 32. | B70WD←R70MB |
| 64. | B70WD←R80WD |

REGISTER IS R71WD

| | |
|---|---|
| 17. | B71WD←REX |
| 32. | B71WD←R71MB |
| 64. | B71WD←R81WD |

REGISTER IS R72WD

| | |
|---|---|
| 17. | B72WD←REXY |
| 32. | B72WD←R72MB |
| 64. | B72WD←R82WD |

REGISTER IS R73WD

| | |
|---|---|
| 17. | B73WD←REZ |
| 32. | B73WD←R73MB |
| 64. | B73WD←R83WD |

REGISTER IS R74WD

| | |
|---|---|
| 17. | B74WD←REZY |
| 32. | B74WD←R74MB |
| 64. | B74WD←R84WD |

REGISTER IS RSEG2L

| | |
|---|---|
| . | BSEG2L←RPREV1   (ALWAYS) |

REGISTER IS RBPREV

| | |
|---|---|
| . | BBPREV←RPREV1   (ALWAYS) |

REGISTER IS RBSEGP

| | |
|---|---|
| . | BBSEGP←RSEGPT   (ALWAYS) |

REGISTER IS RSEGXS

| | |
|---|---|
| 46. | BSEGXS←RSEG2S |
| 51. | BSEGXS←RNEXT |

REGISTER IS RSAMR

| | | |
|---|---|---|
| 13. | BSAMR←RFRAMX | |
| . | BSAMR←RCLIPXX | IF (CLIPA) |
| . | BSAMR←RCLIPXE | IF (CLIPB) |
| . | BSAMR←RXAMXL | IF (CLIPC) |

REGISTER IS RSEGAC

| | |
|---|---|
| . | BSEGAC←RPREV1   (ALWAYS) |

TABLE III (cont'd)

```
         REGISTER IS R40W2
22.      B40W2←R40WD

REGISTER IS R70W2
  .      B70W2←R70WD+1        (ALWAYS)

REGISTER IS R71W2
  .      B71W2←R71WD+-R72WD   (ALWAYS)

REGISTER IS R73W2
  .      B73W2←R73WD+-R74WD   (ALWAYS)

REGISTER IS R80W2
  .      B80W2←R80WD+1        (ALWAYS)

REGISTER IS R81W2
  .      B81W2←R81WD+-R82WD   (ALWAYS)

REGISTER IS R83W2
  .      B83W2←R83WD+-R84WD   (ALWAYS)

REGISTER IS RNEXT
14.      BNEXT←RFREES
53.      BNEXT←R10MB
78.      BNEXT←R90MB

REGISTER IS RLSEG2

REGISTER IS RSEGXT
  .      BSEGXT←R71WD+R72WD   (ALWAYS IF(R70WD+1.LT.0))  HIGH 10 BITS
  .      BSEGXT←R81WD+R82WD   (ALWAYS IF(R70WD+1.GE.0))  HIGH 10 BITS

REGISTER IS RSEG2X
  .      BSEG2X←RSEGXT        (ALWAYS)

REGISTER IS RCLIPA

REGISTER IS RCLIPB
```

TABLE III (cont'd)

REGISTER IS RCLIPC

REGISTER IS RCLIPF

REGISTER IS RPC

- BPC←RPREV1 PC7  HIGH BIT
- BPC←R70WD PC12  HIGH BIT
- BPC←R80WD PC8  HIGH BIT
- BPC←RSPLIT PC2  (.NOT.RSPLIT)
- BPC←REX-R71WD PC13   (20 BIT ADDER  HIGH BIT TRANSFERED)
- BPC←REXY-R72WD PC16   (20 BIT ADDER  HIGH BIT TRANSFERED)
- BPC←REX-R81WD PC9    (20 BIT ADDER  HIGH BIT TRANSFERED)
- BPC←REXY-R82WD PC11   (20 BIT ADDER  HIGH BIT TRANSFERED)
- BPC←R40W2-R40WD PC6   (12 BIT ADDER  EQUALITY TRANSFERED)
- BPC←RSUBDV PC1
- BPC←R71CL-RSAMR-1 PC15   (10 BIT ADDER  HIGH BIT TRANSFERED)
- BPC←RSEGPT PC5  HIGH BIT
- BPC←R70W2 PC20  HIGH BIT
- BPC←R80W2 PC18  HIGH BIT
- BPC←RSEG2S PC3  HIGH BIT
- BPC←RSEGXT-RSEG2X PC17   (10 BIT ADDER  HIGH BIT TRANSFERED)
- BPC←RSEGXT-R71WD PC14   (HIGH 10 BIT ADDER  HIGH BIT TRANS)
- BPC←RSEGXT-R81WD PC10   (HIGH 10 BIT ADDER  HIGH BIT TRANS)
- BPC←R90WD PC4  HIGH BIT
- BPC←RNEXT PC19  HIGH BIT

REGISTER IS R71CL

- B71CL←R71W2    IF(BIT(50))
- B71CL←R71WD    IF(.NOT.BIT(50))

REGISTER IS R73CL

- B73CL←R73W2    IF(BIT(50))
- B73CL←R73WD    IF(.NOT.BIT(50))

REGISTER IS R81CL

- B81CL←R81W2    IF(BIT(50))
- B81CL←R81WD    IF(.NOT.BIT(50))

REGISTER IS R83CL

- B83CL←R83W2    IF(BIT(50))
- B83CL←R83WD    IF(.NOT.BIT(50))

REGISTER IS R40CL

- B40CL←R40W2    IF(BIT(50))
- B40CL←R40WD    IF(.NOT.BIT(50))

TABLE III (cont'd)

```
           REGISTER IS RXLVIS

.        BXLVIS←R71CL     (ALWAYS)

REGISTER IS RXRVIS

.        BXRVIS←R81CL     (ALWAYS)

REGISTER IS RZLVIS

.        BZLVIS←R73CL     (ALWAYS)

REGISTER IS RZRVIS

.        BZRVIS←R83CL     (ALWAYS)

REGISTER IS R40VIS

.        B40VIS←R40CL     (ALWAYS)

REGISTER IS R10MB

19.       B10MB←RPREV1
 42.       B10MB←RBPREV
 69.       B10MB←RPREV2

REGISTER IS R20MB

36.       B20MB←R20WD
 68.       B20MB←RBPREV

REGISTER IS R40MB

.        B40MB←REPOL      (ALWAYS)

REGISTER IS R70MB

7.       B70MB←R70WD
 54.       B70MB←R70W2

REGISTER IS R72MB

.        B72MB←R72WD      (ALWAYS)

REGISTER IS R73MB

7.       B73MB←R73WD
 54.       B73MB←R73W2

REGISTER IS R74MB

.        B74MB←R74WD      (ALWAYS)
```

TABLE III (cont'd)

REGISTER IS R80MB

24.  B80MB←R80WD
54.  B80MB←R80W2

REGISTER IS R81MB

24.  B81MB←R81WD
54.  B81MB←R81W2

REGISTER IS R82MB

.    B82MB←R82WD    (ALWAYS)

REGISTER IS R83MB

24.  B83MB←R83WD
54.  B83MB←R83W2

REGISTER IS R84MB

.    B84MB←R84WD    (ALWAYS)

REGISTER IS R90MB

.    B90MB←R90WD    (ALWAYS)

REGISTER IS RMA1

15.  BMA1←RFREES
20.  BMA1←RSEGPT
23.  BMA1←RPREV1
68.  BMA1←RPREV2

REGISTER IS RMA2

37.  BMA2←RPREV1
43.  BMA2←RSEGPT
62.  BMA2←RPREV2
65.  BMA2←R20WD

REGISTER IS RFRAMX

.    BFRAMX←DATA FROM PDP10 10

REGISTER IS RFRAMX

.    BFRAMX←DATA FROM PDP10 10

REGISTER IS RFRAMY

.    BFRAMY←DATA FROM PDP10 10

In addition, the following table, Table IV, gives the destination of output signals from the registers:

TABLE IV

Signal        Register

```
DESTINATION OF OUTPUTS FROM A REGISTER

REGISTER IS RSUBDV

·       BPC←RSUBDV PC1

REGISTER IS RCLIPD

REGISTER IS RCLIPE

REGISTER IS RVISBL

·       BSEGPT←RVISBL    (DISABLE CONTROL NOW)
·       BCLIP←RVISBL     HIGH BIT

REGISTER IS RSAML

·       BCLIP←RSAML
·       BCLIP←R81CL-RSAML      (10 BIT ADDER HIGH BIT TRANS)
·       BCLIP←R71CL-RSAML      (10 BIT ADDER HIGH BIT TRANS)

REGISTER IS RSPLIT

·       BPC←RSPLIT PC2   (.NOT.RSPLIT)

REGISTER IS RSEG2S

46.     BSEGXS←RSEG2S
·       BPC←RSEG2S PC3   HIGH BIT

REGISTER IS R90WD

·       BS0ME←R90WD      (ALWAYS)
·       BPC←R90WD PC4    HIGH BIT
```

TABLE IV (cont'd)

REGISTER IS RSEGPT

```
20.      BMA1←RSEGPT
22.      BPREV1←RSEGPT
43.      BMA2←RSEGPT
  .      BSEGP←RSEGPT       (ALWAYS)
  .      BPC←RSEGPT PC5     HIGH BIT
  .      BCLIP←RSEGPT       HIGH BIT
```

REGISTER IS RFREES

```
14.      BNEXT←RFREES
15.      BMA1←RFREES
44.      B20WD←RFREES
```

REGISTER IS R40WD

```
22.      B40W2←R40WD
  .      B40CL←R40WD        IF(.NOT.BIT(50))
  .      BPC←R40W2-R40WD PC6    (12 BIT ADDER   EQUALITY TRANSFERED)
```

REGISTER IS R20WD

```
36.      B20MB←R20WD
65.      BMA2←R20WD
```

REGISTER IS RPREV1

```
19.      B10MB←RPREV1
23.      BMA1←RPREV1
37.      BMA2←RPREV1
59.      BFREES←RPREV1
69.      B20WD←RPREV1
  .      BPREV2←RPREV1      (ALWAYS)
  .      BSEG2L←RPREV1      (ALWAYS)
  .      BSEG2S←RPREV1      (ALWAYS)
  .      BBPREV←RPREV1      (ALWAYS)
  .      BSEGAC←RPREV1      (ALWAYS)
  .      BVISBL←RPREV1      (ALWAYS)
  .      BPC←RPREV1 PC7     HIGH BIT
```

REGISTER IS RPREV2

```
62.      BMA2←RPREV2
68.      BMA1←RPREV2
69.      B10MB←RPREV2
```

REGISTER IS RIY

```
31.      BIY←RIY-1
31.      BFREES←RIY         (HIGHBIT ← 1)
```

TABLE IV (cont'd)

REGISTER IS R80WD

```
24.      B80MB←R80WD
64.      B70WD←R80WD
  .      B80W2←R80WD+1        (ALWAYS)
  .      BPC←R80WD PC8        HIGH BIT
  .      BCLIP←R80WD          HIGH BIT
```

REGISTER IS R81WD

```
24.      B81MB←R81WD
64.      B71WD←R81WD
  .      BSEGXT←R81WD+R82WD   (ALWAYS IF(R70WD+1.GE.0)) HIGH 10 BITS
  .      B81W2←R81WD+-R82WD   (ALWAYS)
  .      B81CL←R81WD          IF(.NOT.BIT(50))
  .      BPC←REX-R81WD PC9    (20 BIT ADDER  HIGH BIT TRANSFERED)
  .      BPC←RSEGXT-R81WD PC10 (HIGH 10 BIT ADDER  HIGH BIT TRANS)
```

REGISTER IS R82WD

```
64.      B72WD←R82WD
  .      B82MB←R82WD          (ALWAYS)
  .      BSEGXT←R81WD+R82WD   (ALWAYS IF(R70WD+1.GE.0)) HIGH 10 BITS
  .      B81W2←R81WD+-R82WD   (ALWAYS)
  .      BPC←REXY-R82WD PC11  (20 BIT ADDER  HIGH BIT TRANSFERED)
```

REGISTER IS R83WD

```
24.      B83MB←R83WD
64.      B73WD←R83WD
  .      B83W2←R83WD+-R84WD   (ALWAYS)
  .      B83CL←R83WD          IF(.NOT.BIT(50))
```

REGISTER IS R84WD

```
64.      B74WD←R84WD
  .      B84MB←R84WD          (ALWAYS)
  .      B83W2←R83WD+-R84WD   (ALWAYS)
```

REGISTER IS R70WD

```
7.       B70MB←R70WD
33.      B80WD←R70WD
  .      B70W2←R70WD+1        (ALWAYS)
  .      BPC←R70WD PC12       HIGH BIT
  .      BCLIP←R70WD          HIGH BIT
```

REGISTER IS R71WD

```
7.       B71MB←R71WD
33.      B81WD←R71WD
  .      BSEGXT←R71WD+R72WD   (ALWAYS IF(R70WD+1.LT.0)) HIGH 10 BITS
  .      B71W2←R71WD+-R72WD   (ALWAYS)
  .      B71CL←R71WD          IF(.NOT.BIT(50))
  .      BPC←REX-R71WD PC13   (20 BIT ADDER  HIGH BIT TRANSFERED)
  .      BPC←RSEGXT-R71WD PC14 (HIGH 10 BIT ADDER  HIGH BIT TRANS)
```

TABLE IV (cont'd)

REGISTER IS R72WD

```
33.    B82WD←R72WD
  .    B72MB←R72WD           (ALWAYS)
  .    BSEGXT←R71WD+R72WD    (ALWAYS IF(R70WD+1.LT.0)) HIGH 10 BITS
  .    B71W2←R71WD+-R72WD    (ALWAYS)
  .    BPC←REXY-R72WD PC16   (20 BIT ADDER  HIGH BIT TRANSFERED)
```

REGISTER IS R73WD

```
7.     B73MB←R73WD
33.    B83WD←R73WD
  .    B73W2←R73WD+-R74WD    (ALWAYS)
  .    B73CL←R73WD           IF(.NOT.BIT(50))
```

REGISTER IS R74WD

```
33.    B84WD←R74WD
  .    B74MB←R74WD           (ALWAYS)
  .    B73W2←R73WD+-R74WD    (ALWAYS)
```

REGISTER IS RSEG2L

```
41.    BSEGPT←RSEG2L
65.    B20WD←RSEG2L
```

REGISTER IS RBPREV

```
40.    BPREV1←RBPREV
42.    B10MB←RBPREV
68.    B20MB←RBPREV
```

REGISTER IS RBSEGP

```
40.    BSEGPT←RBSEGP
```

REGISTER IS RSEGXS

```
13.    BSEGPT←RSEGXS    IF(.NOT.RSEGAC)
79.    BSEGPT←RSEGXS    IF (.NOT.RNEXT)
```

REGISTER IS RSAMR

```
  .    BSAML←RSAMR           (ALWAYS)
  .    BCLIP←RSAMR
  .    BPC←R71CL-RSAMR-1 PC15  (10 BIT ADDER  HIGH BIT TRANSFERED)
  .    BCLIP←R71CL-RSAMR       (10 BIT ADDER EQUALITY TRANSFERED)
  .    BCLIP←R81CL-RSAMR       (10 BIT ADDER HIGH BIT TRANS)
```

REGISTER IS RSEGAC

```
13.    BSEGPT←RSEGAC    IF(RSEGAC)
  .    B90WD←RSEGAC     (ALWAYS)
```

REGISTER IS R40W2

```
  .    BPC←R40W2-R40WD PC6   (12 BIT ADDER  EQUALITY TRANSFERED)
  .    B40CL←R40W2           IF(BIT(50))
```

TABLE IV (cont'd)

```
         REGISTER IS R70W2

54.      B70MB←R70W2
 .       BPC←R70W2 PC20   HIGH BIT

REGISTER IS R71W2

54.      B71MB←R71W2
 .       B71CL←R71W2      IF(BIT(50))

REGISTER IS R73W2

54.      B73MB←R73W2
 .       B73CL←R73W2      IF(BIT(50))

REGISTER IS R80W2

54.      B80MB←R80W2
 .       BPC←R80W2 PC18   HIGH BIT

REGISTER IS R81W2

54.      B81MB←R81W2
 .       B81CL←R81W2      IF(BIT(50))

REGISTER IS R83W2

54.      B83MB←R83W2
 .       B83CL←R83W2      IF(BIT(50))

REGISTER IS RNEXT

51.      BSEGXS←RNEXT
56.      BSEGPT←RNEXT     IF(RNEXT)
 .       BPC←RNEXT PC19   HIGH BIT

REGISTER IS RLSEG2

REGISTER IS RSEGXT

.       BSEG2X←RSEGXT       (ALWAYS)
 .       BPC←RSEGXT-RSEG2X PC17  (10 BIT ADDER  HIGH BIT TRANSFERED)
 .       BPC←RSEGXT-R71WD PC14   (HIGH 10 BIT ADDER  HIGH BIT TRANS)
 .       BPC←RSEGXT-R81WD PC10   (HIGH 10 BIT ADDER  HIGH BIT TRANS)

REGISTER IS RSEG2X

.       BPC←RSEGXT-RSEG2X PC17  (10 BIT ADDER  HIGH BIT TRANSFERED)

REGISTER IS RCLIPA
```

TABLE IV (cont'd)

REGISTER IS RCLIPB

REGISTER IS RCLIPC

REGISTER IS RCLIPF

REGISTER IS RPC

REGISTER IS R71CL

- BPC←R71CL-RSAMR-1 PC15    (10 BIT ADDER   HIGH BIT TRANSFERED)
- BCLIP←R71CL-RSAMR         (10 BIT ADDER EQUALITY TRANSFERED)
- BCLIP←R71CL
- BCLIP←R71CL-R73CL         (10 BIT ADDER HIGH BIT-TRANS)
- BCLIP←R71CL-RSAML         (10 BIT ADDER HIGH BIT TRANS)
- BXLVIS←R71CL      (ALWAYS)

REGISTER IS R73CL

- BCLIP←R73CL
- BZLVIS←R73CL      (ALWAYS)
- BCLIP←R71CL-R73CL         (10 BIT ADDER HIGH BIT TRANS)

REGISTER IS R81CL

- BCLIP←R81CL
- BCLIP←R81CL-RSAML         (10 BIT ADDER HIGH BIT TRANS)
- BCLIP←R81CL-RSAMR         (10 BIT ADDER HIGH BIT TRANS)
- BXRVIS←R81CL      (ALWAYS)

REGISTER IS R83CL

- BCLIP←R83CL
- BZRVIS←R83CL      (ALWAYS)

REGISTER IS R40CL

- B40VIS←R40CL      (ALWAYS)

REGISTER IS RXLVIS

REGISTER IS RXRVIS

REGISTER IS RZLVIS

REGISTER IS RZRVIS

REGISTER IS R40VIS

TABLE IV (cont'd)

REGISTER IS R10MB

21. BSEGPT←R10MB
53. BNEXT←R10MB

REGISTER IS R20MB

14. BFREES←R20MB
67. BSEGPT←R20MB

REGISTER IS R40MB

B40WD←R40MB       (ALWAYS)

REGISTER IS R70MB

32. B70WD←R70MB

REGISTER IS R71MB

32. B71WD←R71MB

REGISTER IS R72MB

32. B72WD←R72MB

REGISTER IS R73MB

32. B73WD←R73MB

REGISTER IS R74MB

32. B74WD←R74MB

REGISTER IS R80MB

32. B80WD←R80MB

REGISTER IS R81MB

32. B81WD←R81MB

REGISTER IS R82MB

32. B82WD←R82MB

REGISTER IS R83MB

32. B83WD←R83MB

TABLE IV (cont'd)

```
           REGISTER IS R84MB
    32.    B84WD←R84MB

REGISTER IS R90MB
    78.    BNEXT←R90MB

REGISTER IS RMA1

REGISTER IS RMA2

REGISTER IS RFRAMX
    13.    BSAMR←RFRAMX

REGISTER IS RFRAMY
    58.    BIY←RFRAMY
```

It can be seen from Tables III and IV that, for example, when control signal S14 is read from the read only memory, the RFREES register receives a signal from the B20MB bus and the contents of the RFREES register are applied to the BNEXT bus. All input signals to the registers and output signals from the registers may be determined from these tables.

The initial ordering of data in lists subsequently utilized to determine the visibility of the projected surfaces is very important. As the visible segment generator is incremented in X and Y to thereby simulate the scanning pattern of the display, the visible segment generator need only check the edge list and the polygon list at locations associated with the scanning pattern position of the current scan line to determine if any new edges enter on the current scan line. If, for example, the edge blocks were not initially ordered in the edge list in accordance with the scanning pattern of the display, a search of all of the edge blocks would be necessary each time the visible segment generator advanced to a new scan line.

Likewise, the ordering of the various lists of data within the visible segment generator portion of the system decreases the searching time required along each scan line. For example, the ordering of the X-sort list allows the visible segment generator to successively check for visible segments along a scan line without running through the entire X-sort list each time a new sample span is generated.

Moreover, it should be noted that the scan line to scan line coherence usually allows the X-sort list created for each successive scan line from the immediately preceding scan line segment data to remain ordered in X. In other words, each time an X-sort list is created for the next scan line data, the updated or incremented segments which will appear on the next scan line may be placed in the X-sort list in the same order in which they appear along the current scan line in most cases. Test data gathered on ten test objects indicated that 97 percent to 99 percent of all segment data along the current scan line will be in the same order along the next scan line. This means that the X-sort list can always remain sorted in X with very little time spent for rearranging segments.

The sample list developed by the depth sorter section 104 will likewise remain sorted in X most of the time. However, even when the order of the sample list does change, the previously calculated simple points for the remainder of the scan line are still valid.

Another advantageous feature of the present invention resides in the use of the incremental values ΔX and ΔZ to describe the boundaries of the projected surfaces of the object. Since only beginning and end points of the boundaries, together with the incremental values, must be stored, very little memory space is required to define each entire continuous edge. Moreover, as the visible segment generator proceeds according to the scanning pattern of the display, the required data need only be incremented, eliminating the need to reference an extremely long list defining the edges point by point.

In addition, it is important to note that the speed of the visible segment generator depends mostly on the speed of the depth sorter section 104 of FIG. 2. The segment generator and segment eliminator sections 100 and 102, respectively, are concerned only with polygons that change, i.e. either enter or exit, on the current scan line. The depth sorter section 104 is concerned with all polygons that exist on the current scan line. Therefore, the list handling and memory referencing in the depth sorter section 104 are extremtingly critical to the overall speed of the visible segment generator. It should be noted in this regard that scan line to scan line coherence usually allows the depth sorter section 104 to find visible segments by sampling only the visible edges contained in the sample list. Thus, the speed of the depth sorter section is related more to the visible complexity of the object than to the total object complexity, thereby greatly increasing the speed of the visible segment generator.

The present invention may thus be embodied on other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein

What is claimed is:

1. A method for generating a perspective view display of a three-dimensional object on a two-dimensional raster scan display comprising the steps of:
   a. providing input data defining surfaces of the object to be displayed;
   b. generating segment data defining segments of the surfaces existing along the scan lines of the display responsively to the input data;
   c. determining the visibility of the segments existing within sample spans selected along the scan lines of the display; and,
   d. displaying the segments determined to be visible within the sample spans.

2. The method of claim 1 wherein the step of determining the visibility of the segments existing within selected sample spans includes selectively subdividing those sample spans within which more than one segment is determined to be visible.

3. The method of claim 2 wherein the sample spans extend between two sample points selected along the scan lines, the sample points including at least the edges of the display.

4. The method of claim 3 wherein the sample points include the edges of segments determined to be visible along a previous scan line.

5. The method of claim 4 wherein a sample span within which more than one segment is determined to be visible is selectively subdivided by moving the rightmost sample point to coincide with the leftmost segment edge existing between the sample points when at least one segment edge exists therebetween.

6. The method of claim 5 wherein a sample span within which two segments are determined to be visible and within which no segment edges exist is selectively subdivided by calculating the point of intersection between the two segments and moving the rightmost sample point to coincide with the calculated point of intersection.

7. The method of claim 6 wherein a sample span within which more than two segments are determined to be visible and within which no segment edges exist is selectively subdivided by moving the rightmost sample point to coincide with the mid-point of the sample span.

8. The method of claim 1 wherein the visibility of the segments existing within a selected sample span is determined by:
   comparing the relative depths of the segments to determine if more than one segment is visible within the sample span when more than one segment exists within the sample span; and,
   selectively subdividing the sample span until only one visible segment exists in a subdivision thereof responsively to the relative depth comparison.

9. The method of claim 8 wherein the relative depth of the segments existing within a sample span are compared by:
   selecting left and right clipping points defining at least a portion of the sample span;
   successively subdividing the segments relative to the selected clipping points; and,
   comparing the relative depths of the subdivided segments after each successive subdivision.

10. The method of claim 9 wherein the segments are successively subdivided relative to the selected clipping points until a predetermined relationship exists between the clipping points and the subdivided segments or until it is determined that only one visible segment exists between the clipping points responsively to the relative depth comparison between the subdivided segments.

11. The method of claim 8 wherein the sample spans extend between two sample points selected along the scan lines, the sample points including the edges of the display and edges of segments determined to be visible along a previous scan line.

12. The method of claim 11 wherein a sample span within which more than one segment is determined to be visible is selectively subdivided by moving the rightmost sample point to coincide with the leftmost segment edge existing between the sample points when at least one segment edge exists therebetween.

13. The method of claim 12 wherein a sample span within which two segments are determined to be visible and within which no segment edges exist is selectively subdivided by calculating the point of intersection between the two segments and moving the rightmost sample point to coincide with the calculated point of intersection.

14. The method of claim 13 wherein a sample span within which more than two segments are determined to be visible and within which no segment edges exist is selectively subdivided by moving the rightmost sample point to coincide with the mid-point of the sample span.

15. The method of claim 1 wherein the segment data is generated by:
  generating edge data defining the edges of the surfaces of the object to be displayed;
  ordering the edge data according to the scanning pattern of the display; and,
  generating the segment data responsively to the ordered edge data.

16. The method of claim 15 wherein the step of determining the visibility of the segments existing within selected sample spans includes selectively subdividing those sample spans within which more than one segment is determined to be visible.

17. The method of claim 16 wherein the sample spans extend between two sample points selected along the scan lines, the sample points including at least the edges of the display.

18. The method of claim 17 wherein the sample spans include the edges of segments determined to be visible along a previous scan line.

19. The method of claim 15 wherein the visibility of the segments existing within a selected sample span is determined by:
  comparing the relative depths of the segments to determine if more than one segment is visible within the sample span when more than one segment exists within the sample span; and,
  selectively subdividing the sample span until only one visible segment exists in a subdivision thereof responsively to the relative depth comparison.

20. The method of claim 19 wherein the relative depth of the segments existing within a sample span are compared by:
  selecting left and right clipping points defining at least a portion of the sample span;
  successively subdividing the segments relative to the selected clipping points; and,
  comparing the relative depths of the subdivided segments after each successive subdivision.

21. The method of claim 20 wherein the segments are successively subdivided relative to the selected clipping points until a predetermined relationship exists between the clipping points and the subdivided segments or until it is determined that only one visible segment exists between the clipping points responsively to the relative depth comparison between the subdivided segments.

22. The method of claim 19 wherein the sample spans extend between two sample points selected along the scan lines, the sample points including the edges of the display and edges of segments determined to be visible along a previous scan line.

23. The method of claim 22 wherein a sample span is selectively subdivided responsively to the relative depth comparison by:
  moving the rightmost sample point to coincide with the leftmost segment edge existing between the sample points when at least one segment edge exists between the sample points;
  calculating the point of intersection between the segments existing between the sample points when two segments are visible within the sample span and when no segment edges exist between the sample points; and,
  moving the rightmost sample point to coincide with the mid-point of the sample span when more than two visible segments are visible within the sample span and no segment edges exist between the sample points.

24. A method for generating a perspective view display of a three-dimensional object on a two-dimensional raster scan display comprising the steps of:
  a. providing input data defining surfaces of the object to be displayed;
  b. generating segment data defining segments of the surfaces existing along the scan lines of the display responsively to the input data;
  c. comparing the relative depths of the segments existing within sample spans selected along the scan lines to determine if more than one segment is visible within the selected sample spans wherein more than one segment exists;
  d. selectively subdividing the sample spans wherein more than one visible segment is determined to exist; and,
  e. displaying the segments determined to be visible within the sample spans and the subdivisions thereof.

25. The method of claim 24 wherein the relative depths of the segments existing within a sample span are compared by:
  selecting left and right clipping points defining at least a portion of the sample span;
  successively subdividing the segments relative to the selected clipping points; and,
  comparing the relative depths of the subdivided segments after each successive subdivision.

26. The method of claim 25 wherein the segments are successively subdivided relative to the selective clipping points until a predetermined relationship exists between the clipping points and the subdivided segments or until it is determined that only one visible segment exists between the clipping points responsively to the relative depth comparison between the subdivided segments.

27. The method of claim 24 wherein the sample spans extend between two sample points selected along the scan lines, and wherein a sample span within which more than one segment is determined to be visible is selectively subdivided by moving the rightmost sample point to coincide with the leftmost segment edge existing between the sample points when at least one segment edge exists therebetween.

28. The method of claim 27 wherein a sample span within which two segments are determined to be visible and within which no segment edges exist is selectively subdivided by calculating the point of intersection between the two segments and moving the rightmost sample point to coincide with the calculated point of intersection.

29. The method of claim 28 wherein a sample span within which more than two segments are determined to be visible and within which no segment edges exist is selectively subdivided by moving the rightmost sample point to coincide with the mid-point of the sample span.

30. A real time method of converting input data into output data, said input data describing the surfaces of a three-dimensional object, said output data describing only the visible surfaces of the object projected onto a two-dimensional view plane established according to a desired orientation of the of the object, said method comprising the steps of:
   a. providing a view plane comprising a predetermined number of vertically spaced, substantially coextensive and substantially horizontal lines;
   b. generating segment data defining segments of the projected surfaces existing between edges of the projected surfaces along each horizontal line;
   c. selecting a predetermined number of sample points along each horizontal line;
   d. determining the number of visible segments existing between the selected sample points by comparing the relative depths of the segments as measured in a direction perpendicular to the view plane that exist between selected sample points along each horizontal line;
   f. selectively subdividing the portions of the horizontal lines that are defined by the selected sample points if more than one visible segment exist between the selected sample points; and
   g. generating output data defining a visible segment when the relative depth comparison indicates that only one segment is visible between the sample points or the subdivisions thereof.

31. In a method for generating a perspective view display of a three-dimensional object on a two-dimensional raster scan display device from input data defining surfaces of the object converted into projected surface data representing the surfaces of the object projected onto a two-dimensional view plane established according to the desired orientation of the object, said method including determining which of the surfaces represented by the projected surface data are to be displayed, and modifying the brightness of the display according to the projected surface data representing the surfaces determined to be displayed, the improvement wherein the surfaces to be displayed are determined and displayed in real time for each frame of the raster scan display device by:
   generating edge data from the projected surface data, the edge data representing edges of the projected surfaces;
   generating segment data defining continuous segments of the projected surfaces existing along each scan line responsively to the edge data;
   comparing the relative depths of the segments defined by the segment data along each scan line to generate visible segment data; and
   modifying the brightness of the raster scan display responsively to the visible segment data.

32. A method for determining the relative visibility of two line segments projected onto a predetermined two-dimensional view plane along a line of intersection between the view plane and a plane perpendicular to the view plane, said line segments being coplanar and lying in a plane perpendicular to the view plane, each of said line segments being specified by two X end value specified in the view plane and two Z end values specified in the plane perpendicular to the view plane, said method comprising the steps of:
   a. selecting a sample span between two sample points along said line of intersection;
   b. comparing the relative depths of the line segments existing between the sample points to determine which line segment is visible between the sample points;
   c. selecting a new sample span by moving the left sample point to coincide with the right sample point and by selecting a new right sample point; and
   d. repeating steps b) and c) until the visibility of all portions of said line segments has been determined.

33. A method for determining the relative visibility of two line segments projected onto a predetermined two-dimensional view plane along a line of intersection between the view plane and a plane perpendicular to the view plane, said line segments being coplanar and lying in a plane perpendicular to the view plane, each of said line segments being specified by two X end values specified in the view plane and two Z end value specified in the plane perpendicular to the view plane, said method comprising the steps of:
   a. selecting a sample span between two sample points along said line of intersection;
   b. comparing the X end values of said line segments with the values of said sample points to determine if any of said X end values lie between said sample points;
   c. moving the rightmost sample point to coincide with the leftmost X end value of said line segments existing within the selected sample span if an X end value is determined to exist therein;
   d. comparing the relative depths of the line segments existing between the sample points to determine which line segment is visible between the sample points;
   e. selecting a new sample span by moving the left sample point to coincide with the right sample point and by selecting a new right sample point; and
   f. repeating steps b) through e) until the visibility of all portions of said line segments has been determined.

34. A system for generating perspective images on a two-dimensional raster scan display of three-dimensional objects comprising:
   a. object creation means for generating first electrical signals representative of the three-dimensional object to be displayed;

b. means responsive to said first electrical signals for generating second electrical signals corresponding to line segments of surfaces of said object which exist along scan lines of said display;

c. means responsive to said second electrical signals for determining which line segments existing within a sample span selected along a particular scan line of the display are visible; and d. circuit means connecting signals from said visibility determining means to said display to generate a perspective image of said three-dimensional object.

35. The system of claim 34 wherein said visibility determining means includes a further means for selectively subdividing any sample spans within which more than one segment is determined to be visible.

36. The system of claim 35 wherein the sample spans extend between two sample points selected along the scan lines, the sample points including at least the edges of the display.

37. The system of claim 36 wherein the sample points include the edges of segments determined to be visible along the previous scan line.

38. The system of claim 35 wherein the means for determining the visibility of line segments along a particular scan line further includes:

means for comparing the relative depths of the segments to determine if more than one segment is visible within the sample span when more than one segment exists within the sample span; and means responsive to said comparative depth determination means for selectively subdividing the sample span until only one visible segment exists in a subdivision thereof.

39. The system of claim 38 wherein the means for determining relative depth of the segments existing within a sample span further comprises:

circuit means for selecting left and right clipping pints defining at least a portion of the sample span;

means responsive to the selected clipping points to successively subdivide the segments relative to such selected clipping points; and means responsive to signals generated after each successive subdivision for comparing the relative depths of the subdivided segments.

40. The system of claim 39 wherein said depth comparison means comprises a circuit arrangement for successively subdividing said segment relative to said clipping points until a predetermined relationship exists between the clipping points and the subdivided segments or until it is determined that only one visible segment exists between the clipping points.

41. A system for generating perspective images on a two-dimensional raster scan display of three-dimensional objects comprising:

a. object creation means for producing a first set of digital signals representative of said object;

b. storage means for receiving said first set of digital signals;

c. a pre-scan calculator connected to said storage means for retrieving said first set of digital signals and changing them in accordance with the desired orientation of the object to produce a second set of digital signals;

d. a display device;

e. means coupled to said pre-scan calculator for receiving said second set of digital signals and generating edge data signals defining the edges of the surfaces of the object to be displayed;

f. means responsive to the edge data signals for ordering the edge data according to the scanning pattern of the display device;

g. means responsive to the ordered edge data signals for generating further electrical signals corresponding to segments of lines in surfaces of said object which exist along scan lines of said display;

h. means responsive to said further electrical signals for determining which segments of lines existing along a particular scan line of the display are visible; and i. circuit means connecting signals from said visibility determining means to said display device to generate a perspective image of said three-dimensional object.

42. The system of claim 41 wherein the visibility determining means includes means for examining the data existing between two sample points along a scan line within selected sample spans in said line and means for selectively subdividing those sample spans within which more than one segment is determined to be visible.

43. The system of claim 42 wherein the sample spans include the edges of segments determined to be visible along the previous scan line and the sample points include at least the edges of the display.

44. The system of claim 41 wherein the visibility determining means includes:

means comparing the relative depths of line segments within a selected sample span to determine if more than one segment is visible within said sample span when more than one segment exists within the sample span; and circuit means responsive to signals from said relative depth comparison means for selectively subdividing the sample span until only one visible segment exists in a subdivision thereof.

45. The system of claim 44 wherein said relative depth comparison means further comprises:

means selecting left and right clipping points defining at least a portion of the sample span;

means responsive to the selected clipping points for selectively subdividing said segments relative to said clipping points; and further circuit means responsive to the signals from said successively subdividing means for comparing the relative depth of the subdivided segments.

46. Apparatus for generating a perspective view display of a three-dimensional object on a two-dimensional raster scan device comprising:

a. object creation means for producing a first set of electrical signals defining surfaces of the object to be displayed;

b. means responsive to said first electrical signals for generating a second set of electrical signals related to data defining segments of the surfaces existing along scan lines of the display;

c. means responsive to said second set of electrical signals for comparing the relative depths of the segments existing within sample spans selected along scan lines of said display device to determine if more than one segment is visible within the selected sample spans;

d. means responsive to the condition wherein more than one visible segment is determined to exist for selectively subdividing the sample spans;

e. a display device; and f. circuit means connected connected between said display device and said depth comparison means and said subdividing means for displaying the segments determined to be visible within the sample spans and the subdivisions thereof.

47. Apparatus of claim 46 wherein the depth comparison means comprises:

means for selecting left and right clipping points defining at least a portion of the sample span;

means for successively subdividing the segments relative to the selected clipping points; and means comparing the relative depths of the subdivided segments after each successive subdivision.

48. Apparatus of claim 47 together with means responsive to signals from said depth comparison means for successively subdividing the segments until a predetermined relationship exists between the clipping points and the subdivided segments, or until it is determined that only one visible segment exists between the clipping points.

49. Apparatus of claim 46 wherein the sample spans extend between two sample points selected along the scan lines and further comprising means responsive to the condition in which more than one segment is determined to be visible within a sample span for selectively subdividing said span by moving the rightmost sample point of said span to coincide with the leftmost segment edge existing between the sample points when at least one segment edge exists therebetween.

50. Apparatus of claim 49 further having means responsive to a condition wherein a sample span within which two segments are determined to be visible and no segment edges exist for selectively subdividing said span by calculating the point of intersection between the two segments and moving the rightmost sample point to coincide with the calculated point of intersection.

51. Apparatus of claim 50 further having means responsive to the condition where a sample span has more than two segments which are determined to be visible and no segment edges exist for selectively subdividing said span by moving the rightmost sample point to coincide with the mid-point of the sample span.

52. A system operating in real time for converting stored input data into output data, said input data describing the surfaces of a three-dimensional object, said output data describing only the visible surfaces of the object projected onto a two-dimensional view plane established according to the desired orientation of the object, said system comprising:

a. a display device wherein the display is produced on a view plane via a predetermined number of vertically spaced, substantially horizontal lines;

b. means for generating segment data defining segments of the projected surfaces existing between edges of the projected surfaces along each horizontal line;

c. means selecting a predetermined number of sample points along each horizontal line;

d. means determining the number of visible segments existing between the selected sample points including means for comparing the relative depths of the segments as measured in a direction perpendicular to the view plane that exists between selected sample points along each horizontal line;

e. means in response to the condition wherein more than one visible segment exists between the selected sample points for selectively subdividing the portions of the horizontal lines that are defined by the selected sample points;

f. means responsive to the condition when the relative depth comparison means indicates that only one segment is visible between the sample points or the subdivisions thereof for generating output data defining a visible segment; and g. circuit means for connecting signals from said output data generating means to said display device.

53. In a system for generating a perspective view display of a three-dimensional object on a two-dimensional raster scan display device from input data defining surfaces of the object converted into projected surface data representing the surfaces of the object projected into a two-dimensional view plane established according to the desired orientation of the object by apparatus including means for determining which of the surfaces represented by the projected surface data are to be displayed, and means for modifying the brightness of the display according to the projected surface data representing the surfaces determined to be displayed, the improvement wherein the surfaces to be displayed are determined and displayed in real time for each frame of the raster scan display device by apparatus including:

means for generating edge data in the form of electrical signals from the projected surface data, the edge data representing edges of the projected surfaces;

mean responsive to the edge data electrical signals for generating segment data electrical signals defining continuous segments of the projected surfaces existing along each scan line;

means responsive to the segment data electrical signals for comparing the relative depths of the segments defined by the segment data along each scan line to generate visible segment data signals; and means responsive to the visible segment data electrical signals for modifying the brightness of the raster screen display.

54. In apparatus for determining the relative visibility of two line segments projected onto a predetermined two-dimensional view plane along a line of intersection between the view plane and a plane perpendicular to the view plane, said line segments being coplanar and lying in a plan perpendicular to the view plane, each of said line segments being specified by two X end values specified in the view plane and two Z end values specified in the plane perpendicular to the view plane; circuit means for selecting a sample span between two sample points along said line of intersection; means for comparing the relative depths of the line segments existing between the sample points to determine which line segment is visible between the sample points; means selecting a new sample span by moving the next sample point to coincide with the right sample point and for selecting a new right sample point; means for storing signals corresponding to the visible portions of said line segments; and means for utilizing said visible portions in a display.

55. Apparatus as defined in claim 54 further having means comparing the X end values of line segments with the values of said sample points to determine if any of said X values lie between said sample points; and means responsive to the condition where an X end value is determined to exist within said sample span for moving the rightmost sample point in said sample span to coincide with the leftmost X end value of said line segments existing within the selected sample span.

* * * * *